(12) United States Patent
Yoshida et al.

(10) Patent No.: US 12,506,851 B2
(45) Date of Patent: Dec. 23, 2025

(54) IMAGE DISPLAY SYSTEM

(71) Applicant: CANON KABUSHIKI KAISHA, Tokyo (JP)

(72) Inventors: Takehiro Yoshida, Tokyo (JP); Hirohito Kai, Tokyo (JP); Nobuyoshi Suzuki, Tokyo (JP); Hiroshi Atobe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 18/631,913

(22) Filed: Apr. 10, 2024

(65) Prior Publication Data
US 2024/0259540 A1 Aug. 1, 2024

Related U.S. Application Data

(63) Continuation of application No. PCT/JP2022/033557, filed on Sep. 7, 2022.

(30) Foreign Application Priority Data

Oct. 19, 2021 (JP) ................................ 2021-171151

(51) Int. Cl.
*H04N 13/161* (2018.01)
*H04N 13/178* (2018.01)
(Continued)

(52) U.S. Cl.
CPC ......... *H04N 13/161* (2018.05); *H04N 13/178* (2018.05); *H04N 13/194* (2018.05); *H04N 13/344* (2018.05); *H04N 13/398* (2018.05)

(58) Field of Classification Search
CPC .. H04N 13/161; H04N 13/178; H04N 13/194; H04N 13/344; H04N 13/398; H04N 5/64; H04N 13/366
(Continued)

(56) References Cited

U.S. PATENT DOCUMENTS

| | | | |
|---|---|---|---|
| 7,660,487 B2* | 2/2010 | Kobayashi | H04N 7/014 348/598 |
| 2008/0159597 A1* | 7/2008 | Noguchi | H04N 19/20 375/E7.076 |

(Continued)

FOREIGN PATENT DOCUMENTS

| | | |
|---|---|---|
| CN | 112887646 A | 6/2021 |
| JP | 2006050164 A | 2/2006 |

(Continued)

*Primary Examiner* — Tung T Vo
(74) *Attorney, Agent, or Firm* — Canon U.S.A., Inc., IP Division

(57) ABSTRACT

The present invention provides an image display system in which images can be displayed at at least a predetermined framerate even with limited processor performance. The image display system having a head-mounted display capable of displaying a three-dimensional image, the image display system includes a selection unit for selecting a viewing object desired by a viewer from the three-dimensional image, a detection unit for detecting a part to view corresponding to the viewing object selected by the selection unit, and a resolution increasing unit for increasing a resolution of the part to view that has been detected, wherein the head-mounted display displays the three-dimensional image in which the resolution of the part to view has been increased at at least a predetermined framerate.

29 Claims, 87 Drawing Sheets

(51) Int. Cl.
*H04N 13/194* (2018.01)
*H04N 13/344* (2018.01)
*H04N 13/398* (2018.01)

(58) Field of Classification Search
USPC .......................................................... 348/43
See application file for complete search history.

(56) References Cited

U.S. PATENT DOCUMENTS

| | | | | |
|---|---|---|---|---|
| 2010/0124271 | A1* | 5/2010 | Martz | H04N 5/77 |
| | | | | 375/E7.076 |
| 2016/0191997 | A1* | 6/2016 | Eklund | H04N 21/4314 |
| | | | | 725/59 |
| 2017/0018121 | A1 | 1/2017 | Lawson | |
| 2017/0178408 | A1* | 6/2017 | Bavor, Jr. | G06T 19/006 |
| 2017/0340969 | A1* | 11/2017 | Lim | G06F 3/013 |
| 2018/0004289 | A1 | 1/2018 | Wilson | |
| 2018/0075820 | A1* | 3/2018 | Hicks | G06F 3/14 |
| 2019/0045178 | A1* | 2/2019 | Lutter | G06F 3/011 |
| 2019/0052870 | A1* | 2/2019 | Lutter | G06T 19/003 |
| 2019/0237021 | A1 | 8/2019 | Peng | |
| 2021/0241667 | A1* | 8/2021 | Akimoto | G09G 5/00 |
| 2024/0406368 | A1* | 12/2024 | Lemay | H04N 13/296 |
| 2025/0080713 | A1* | 3/2025 | Lee | H04N 13/305 |
| 2025/0148568 | A1* | 5/2025 | Leonardi | G06T 3/4007 |

FOREIGN PATENT DOCUMENTS

| | | |
|---|---|---|
| JP | 2017174125 A | 9/2017 |
| JP | 2018004950 A | 1/2018 |
| JP | 2018061850 A | 4/2018 |
| JP | 2020030805 A | 2/2020 |
| JP | 2020048185 A | 3/2020 |
| JP | 6802393 B2 | 12/2020 |
| WO | 2018016464 A1 | 1/2018 |
| WO | 2018105436 A1 | 6/2018 |
| WO | 2018227102 W | 12/2018 |
| WO | 2019078033 A1 | 4/2019 |
| WO | 2020054456 A1 | 3/2020 |

* cited by examiner

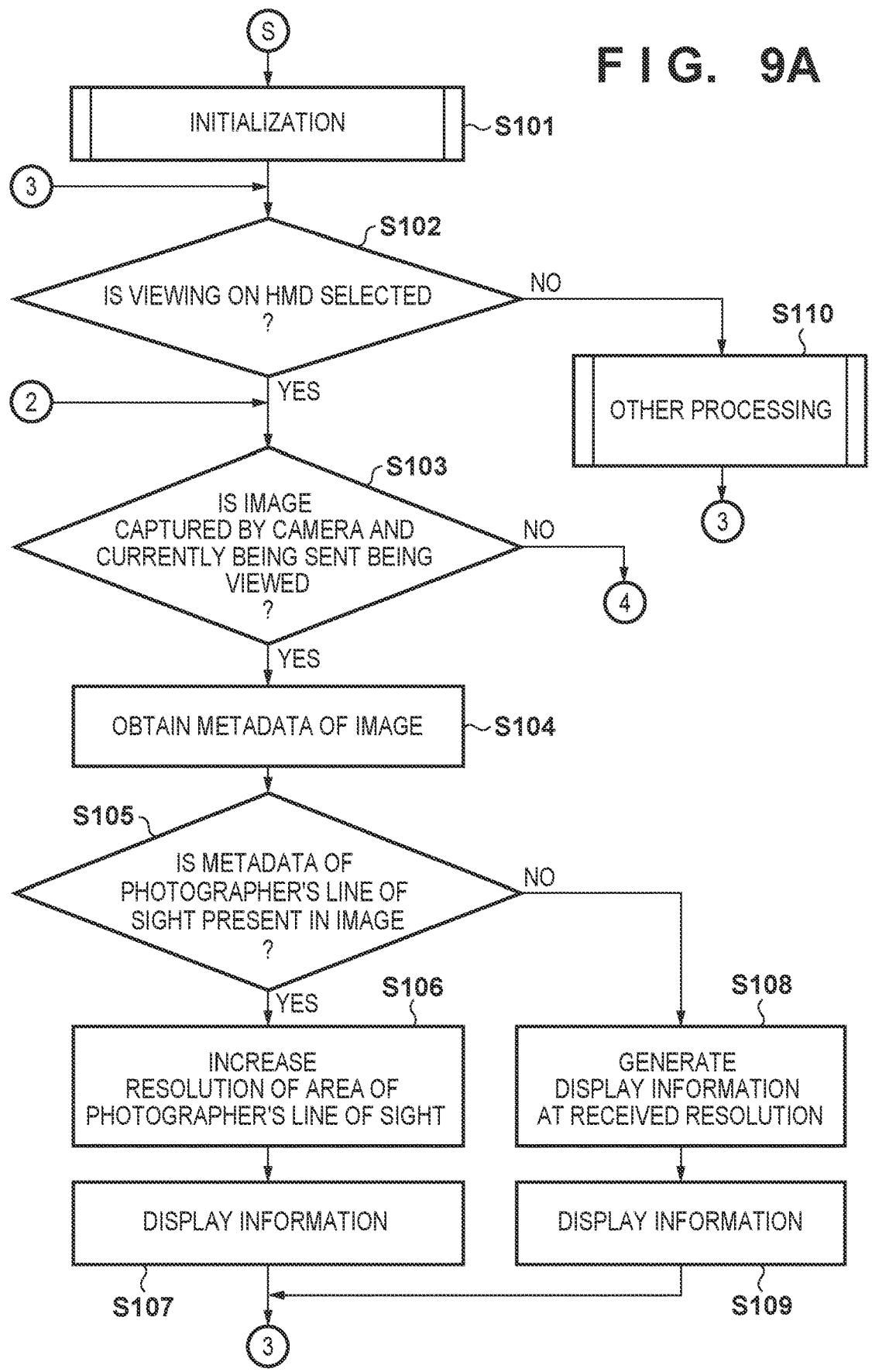

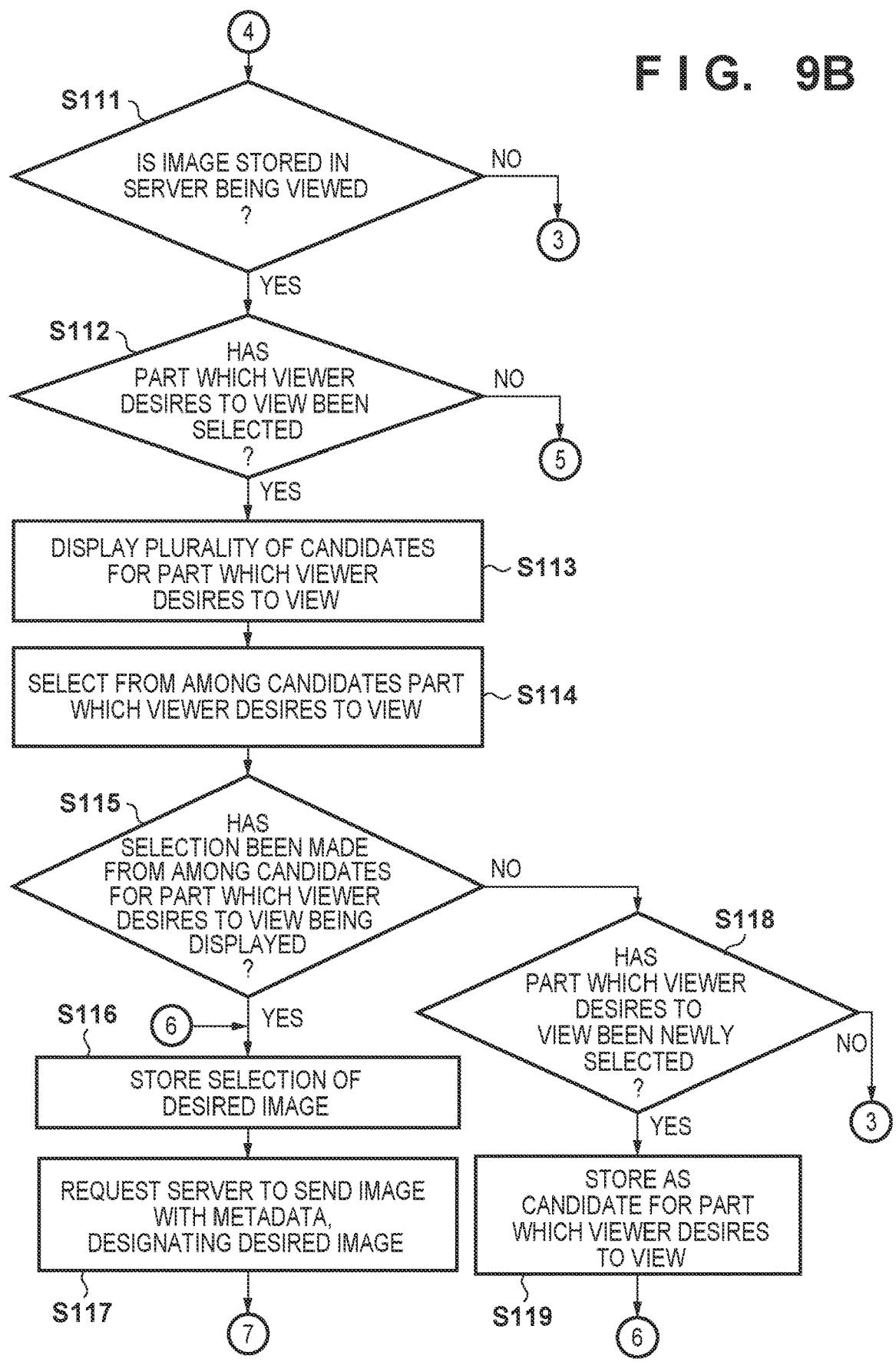

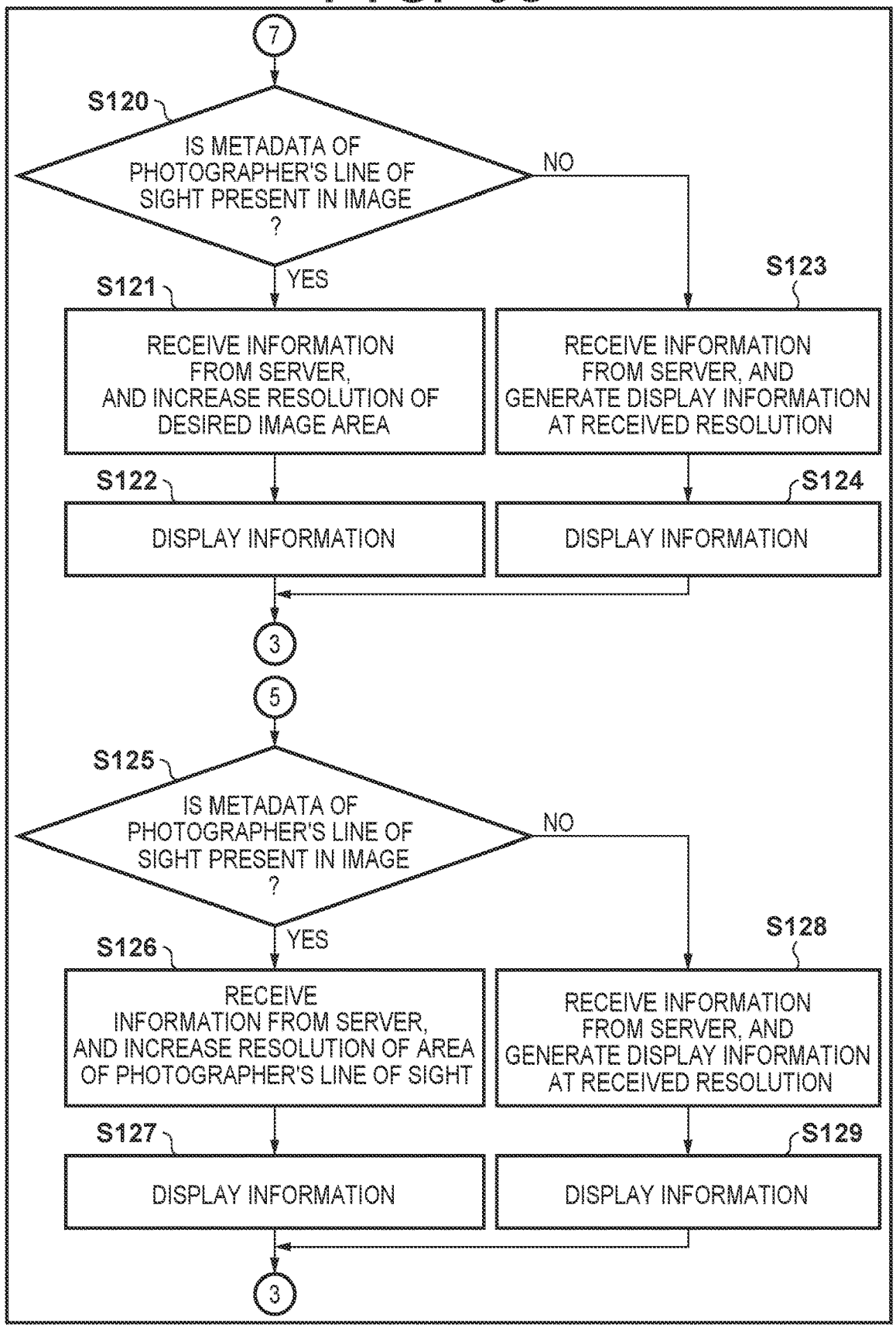

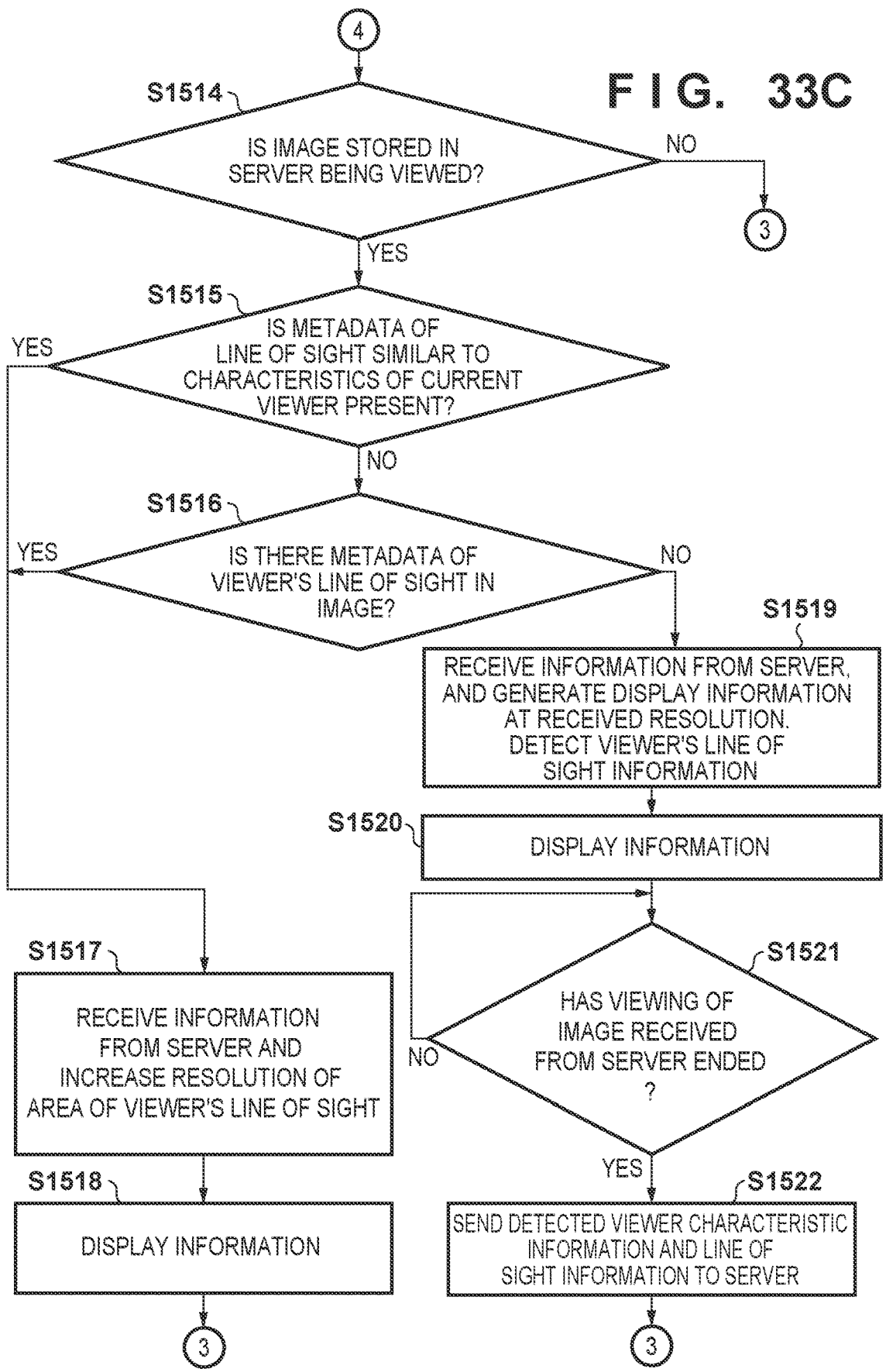

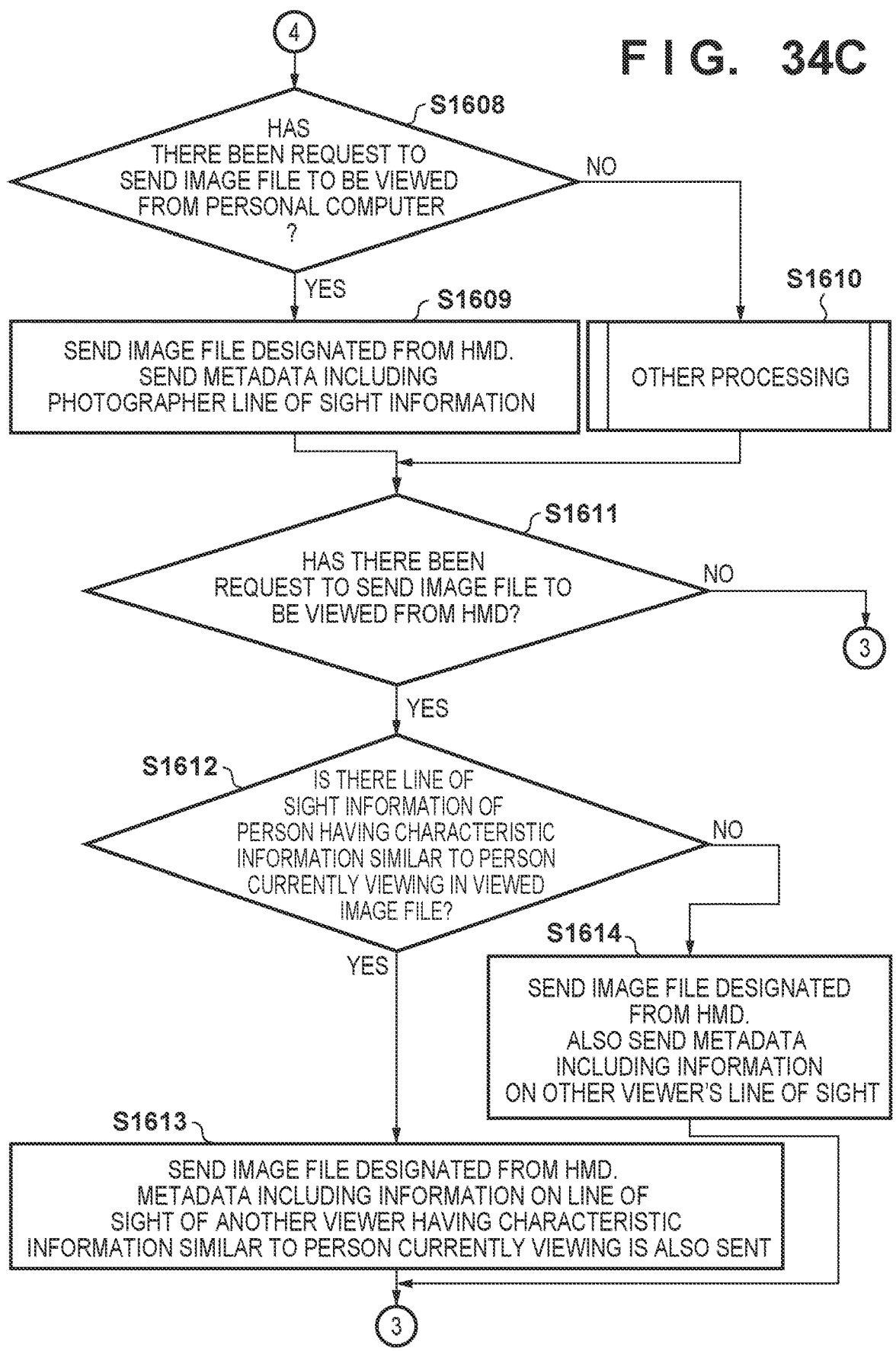

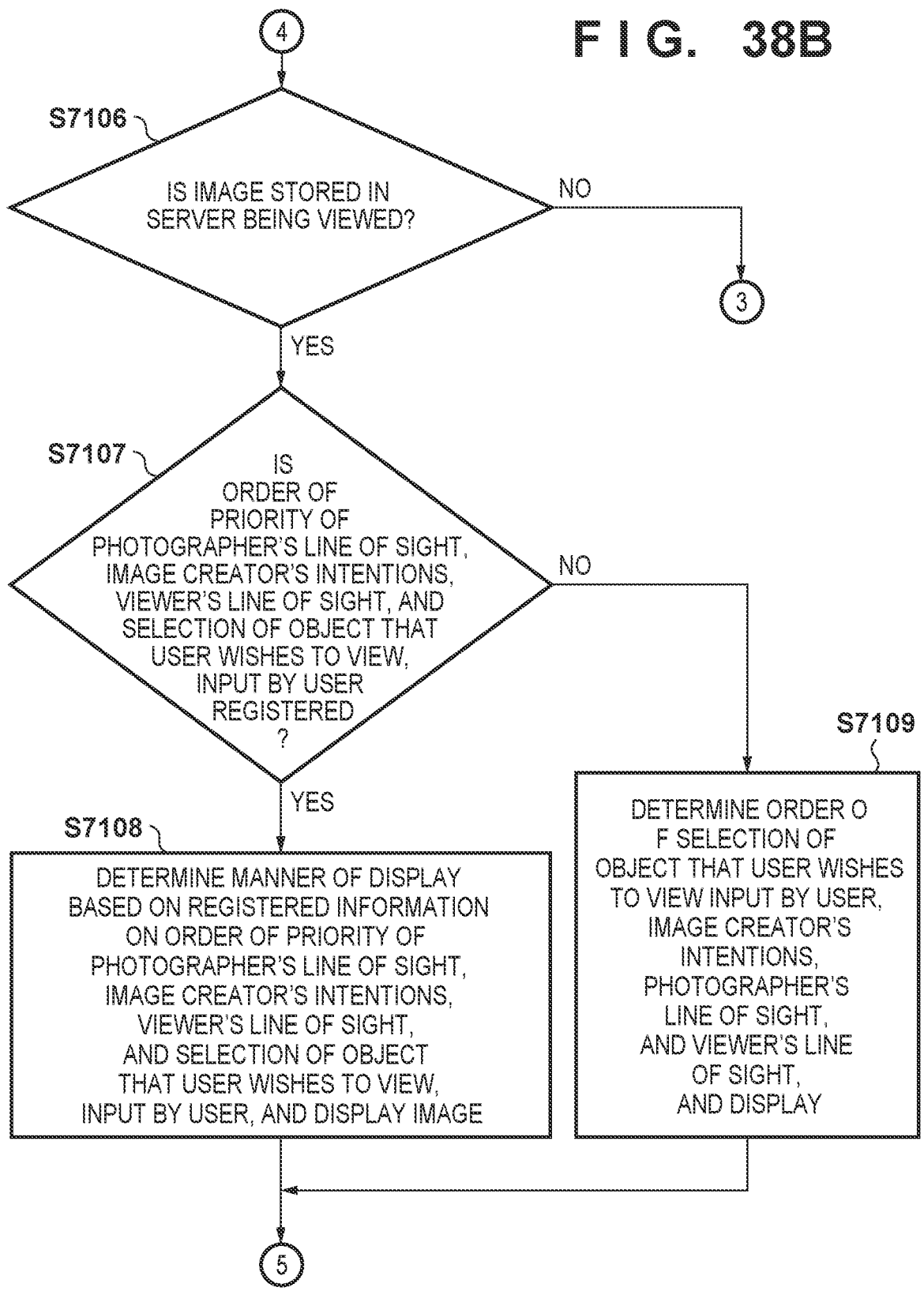

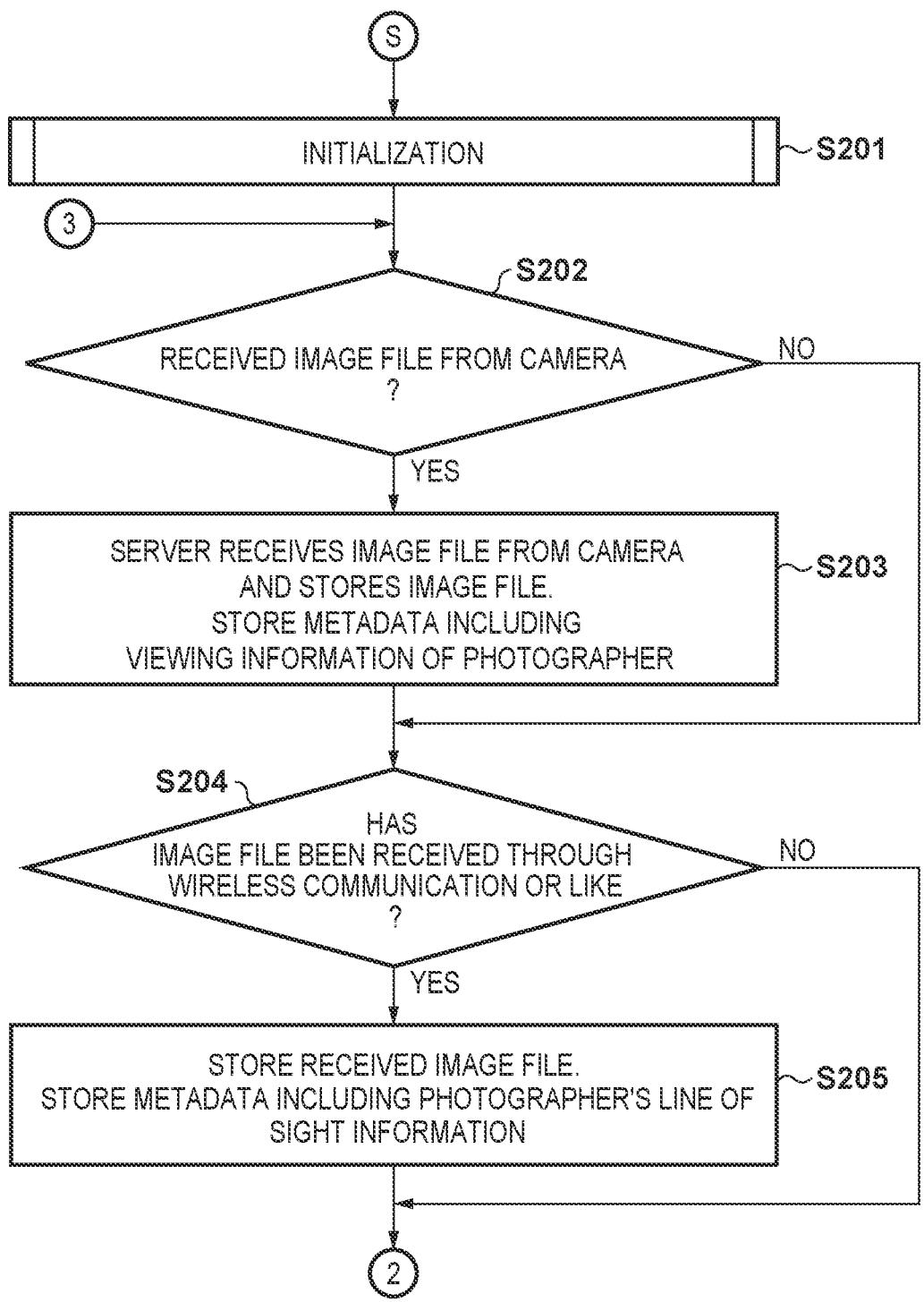

F I G. 40B
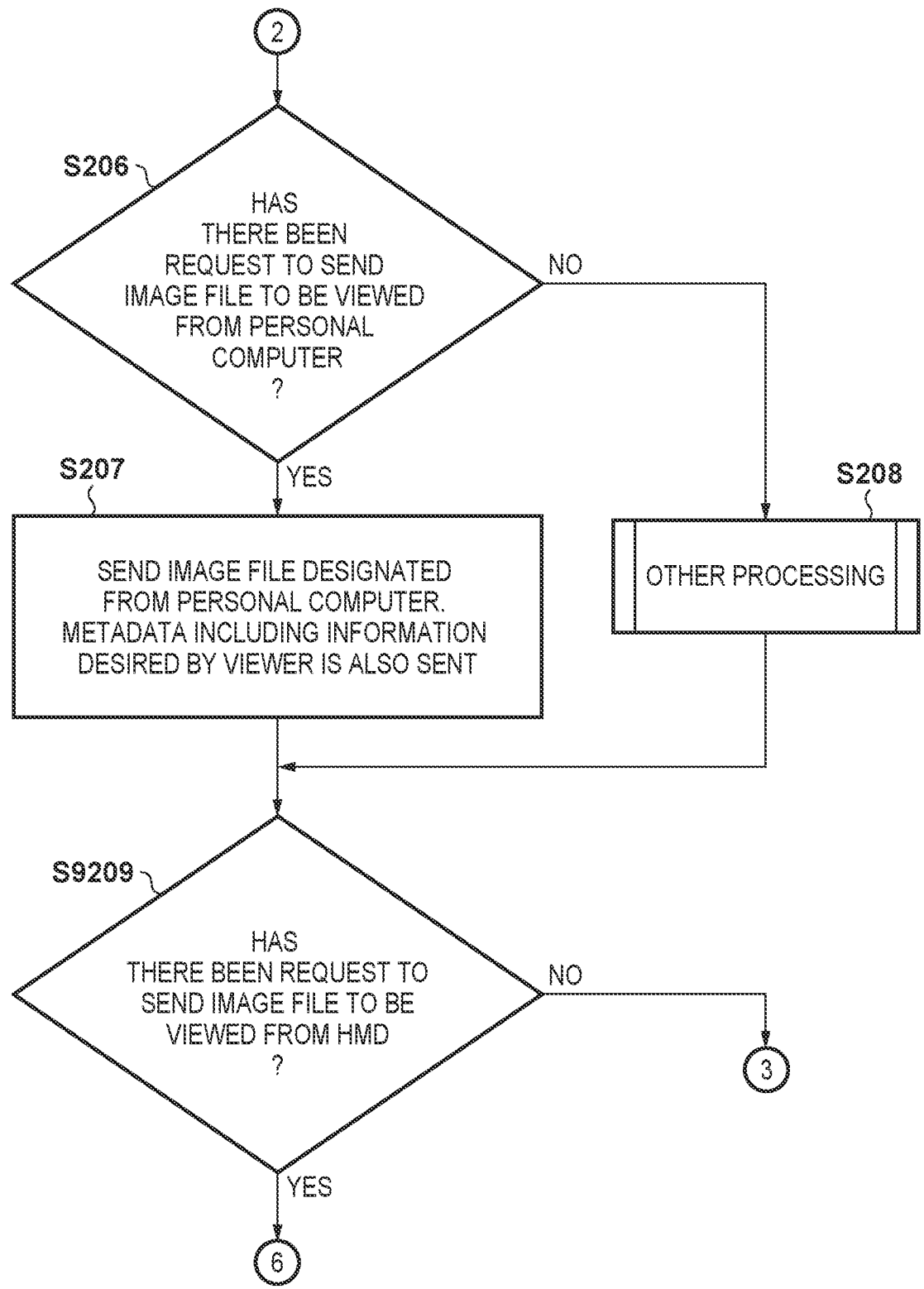

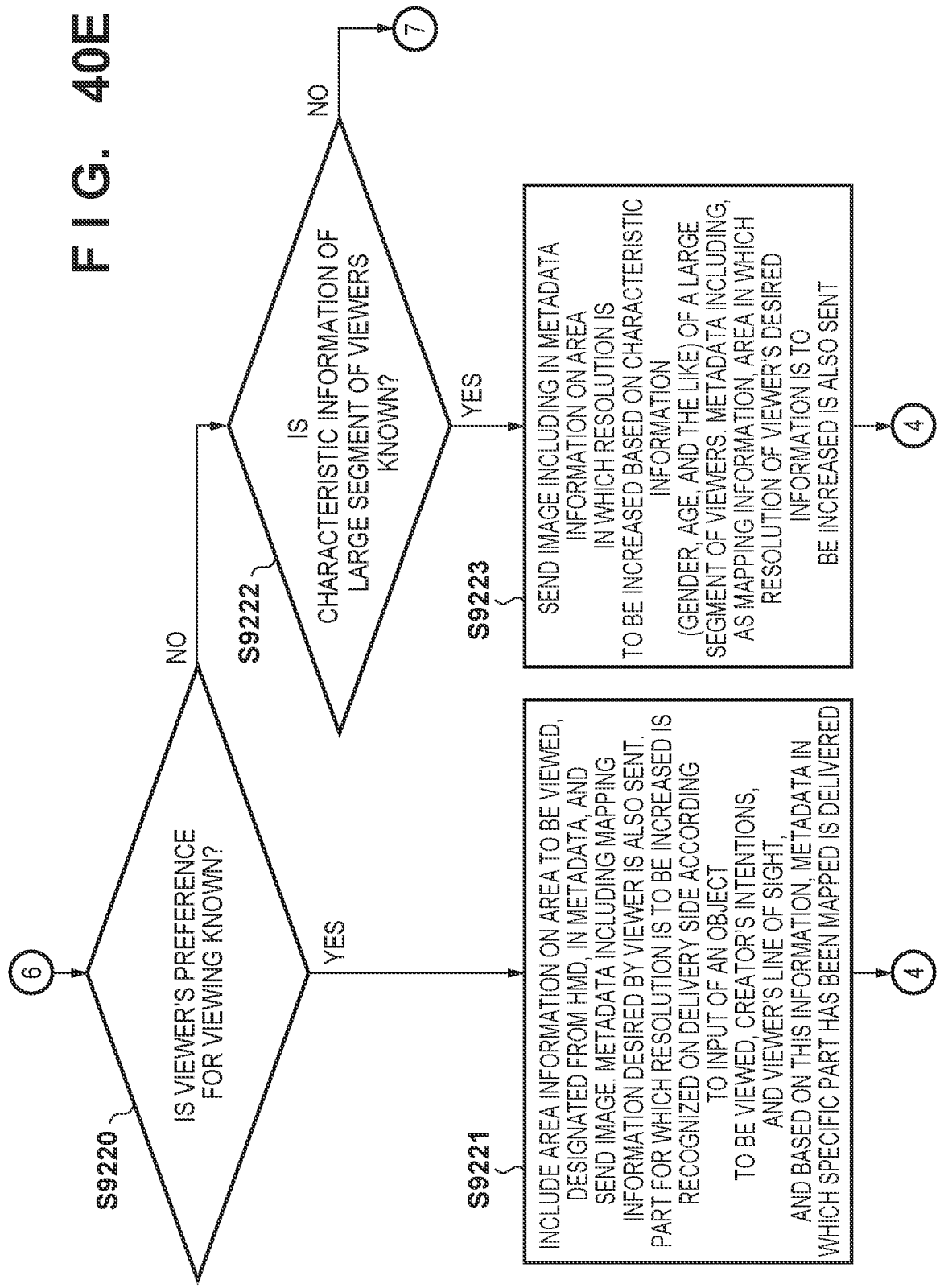

IMAGE DISPLAY SYSTEM

CROSS-REFERENCE TO RELATED APPLICATIONS

This application is a Continuation of International Patent Application No. PCT/JP2022/033557, filed Sep. 7, 2022, which claims the benefit of Japanese Patent Application No. 2021-171151, filed Oct. 19, 2021, both of which are hereby incorporated by reference herein in their entirety.

BACKGROUND OF THE INVENTION

Field of the Invention

The present invention relates to techniques for displaying images including three-dimensional images.

Background Art

When an image including a three-dimensional image is displayed for the purpose of viewing, a user normally selects a device to display the image. Recently, head-mounted displays are becoming popular for viewing three-dimensional images. When viewing an image, e.g., when viewing an image on a smartphone, the small size of the display area has been a source of complaints. Furthermore, although the impact of images can be felt when viewing the images on a display, it is difficult to reproduce three-dimensional images.

CITATION LIST

Patent Literature

PTL 1: Japanese Patent Laid-Open No. 2020-30805
PTL 2: Japanese Patent No. 6802393

Under such circumstances, using a head-mounted display has made it possible to view three-dimensional images with a sense of immersion. A head-mounted display plays back image files, displays three-dimensional images, and outputs spatial audio. In this case, higher framerates provide higher usability.

However, in head-mounted displays with limited resources, such as standalone displays, it is difficult to display high-resolution images at high framerates, and the following techniques have therefore been devised to do so.

PTL 1 discloses that a pixel sample resolution may vary from region to region in a display device, and that it may be possible to reduce the graphics processing load simply by reducing the active sample count in low-resolution regions of a display compared to high-resolution regions.

PTL 2 relates to central foveal rendering, which is configured to display a part of an image in a central fovea region having a high resolution, and a part outside the central fovea region having a lower resolution. Specifically, the image part outside the central fovea region is rendered using a light source group, and the light source group closely approximates the overall effect of each of individual light sources in a corresponding cluster of light sources.

However, even referring to these techniques, it may be difficult to display high-resolution images at high framerates with limited processor performance, as is the case with head-mounted displays and the like.

SUMMARY OF THE INVENTION

Having been achieved in light of the aforementioned issues, the present invention provides an image display system capable of displaying images at at least a predetermined framerate even with limited processor performance.

According to the present invention, there is provided an image display system having a head-mounted display capable of displaying a three-dimensional image, the image display system comprising: at least one processor or circuit configured to function as: a selection unit configured to select a viewing object desired by a viewer from the three-dimensional image; a detection unit configured to detect a part to view corresponding to the viewing object selected by the selection unit; and a resolution increasing unit configured to increase a resolution of the part to view that has been detected, wherein the head-mounted display displays the three-dimensional image in which the resolution of the part to view has been increased at at least a predetermined framerate.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 9A is a diagram illustrating a control flow of the HMD.

FIG. 9B is a diagram illustrating a control flow of the HMD.

FIG. 9C is a diagram illustrating a control flow of the HMD.

FIG. 33C is a diagram illustrating a control flow of the HMD.
FIG. 34C is a diagram illustrating a control flow of the server.
FIG. 38B is a diagram illustrating a control flow of the HMD.
FIG. 40A is a diagram illustrating a control flow of the server.
FIG. 40B is a diagram illustrating a control flow of the server.

FIG. 40E is a diagram illustrating a control flow of the server.

DESCRIPTION OF THE EMBODIMENTS

Figure 1:
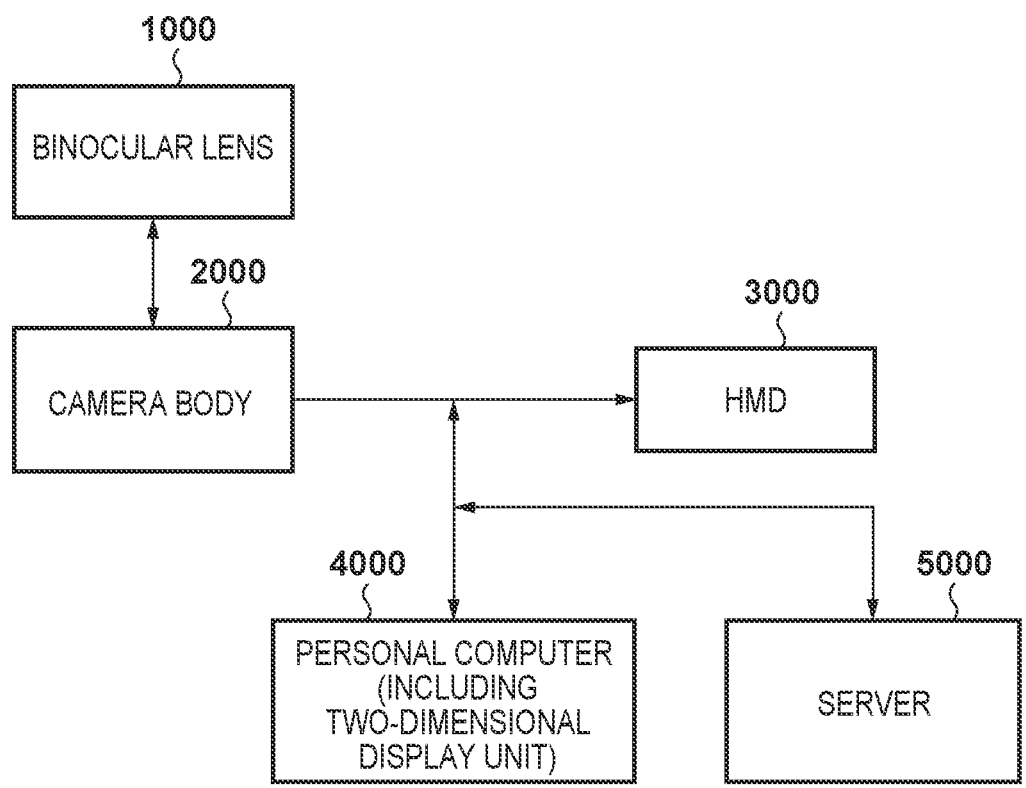
FIG. 1 is a diagram illustrating the configuration of an image capturing/viewing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First, an overview of the present invention is as follows.

In the present invention, instead of displaying the entirety of a three-dimensional image at a high resolution, the part displayed at a high resolution is limited. Specifically, first, an object that a viewer wishes to view is displayed at a high resolution. Second, a part intended by a creator is displayed at a high resolution. Third, a part of a line of sight of a photographer is displayed at a high resolution. Fourth, a part of a line of sight of another viewer is displayed at a high resolution. Fifth, these first through fourth methods are combined. Sixth, a head-mounted display receives a delivered image.

Specific embodiments will be described hereinafter.

Embodiment 1

Images such as three-dimensional images can be displayed in a display device such as a head-mounted display. In this case, the visibility may decrease if the framerate of the display is low. Motion sickness is also known to arise when the framerate of the display falls below 60 fps. It is therefore preferable that the normal framerate be a predetermined framerate or higher (at least a predetermined framerate), such as 60 fps.

When the performance of the processor of the display device is limited, it is difficult to both display the entirety of a high-resolution three-dimensional image and maintain a high framerate. Accordingly, in the present embodiment, the part of the three-dimensional image displayed at a high resolution is limited. Specifically, means through which a viewer selects the part of the three-dimensional image to display at a high resolution is provided, and the selected part is displayed at a high resolution. Although the present embodiment describes a case where the predetermined framerate is 60 fps as an example, the framerate is not limited to 60 fps as long as the framerate is effective in terms of visibility, motion sickness, and the like.

FIG. 1 is a diagram illustrating the configuration of a system that displays a three-dimensional image. The three-dimensional image is captured using a binocular lens 1000 and a camera body 2000, and the three-dimensional image is displayed using a head-mounted display ("HMD" hereinafter) 3000. Alternatively, the three-dimensional image is displayed by a personal computer 4000. An image file serving as content is stored in a server 5000. The server 5000 sends the saved image file to the HMD 3000 to be displayed, sends the saved image file to the personal computer 4000 to be displayed, and the like.

An overview of an image capturing/viewing system (an image display system) having a viewing angle of 180 degrees will be described in further detail.

In FIG. 1, the binocular lens 1000 is connected to the camera body 2000, and captures a 180-degree image. The image captured by an image sensor of the camera body 2000 through the binocular lens 1000 is a left-right inverted image. In a left-right inverted image, information indicating that the image is left-right inverted and information indicating that the image is a three-dimensional image are added to metadata of the image.

On the other hand, if a monocular lens (not shown) is attached to the camera body 2000 and an image is captured, the image captured by the image sensor of the camera body 2000 is not a left-right inverted image.

When capturing an image with the camera body 2000, the photographer's line of sight is detected, and information on the photographer's line of sight is stored as metadata in addition to the image. In an image that is not left-right inverted, information indicating that the image is not left-right inverted and information indicating that the image is a two-dimensional image are added to metadata of the image.

The image captured by the camera body 2000 is stored in a memory card within the camera body 2000 with the metadata added thereto. The stored image is sent to the HMD 3000 through wireless communication and displayed in the HMD 3000. Furthermore, the captured image is sent to the server 5000 through wireless communication and stored therein. An image captured using the monocular lens (not shown) is stored in the memory card within the camera body 2000 with the metadata added thereto. The image is also sent to the personal computer 4000 through wireless communication and is displayed thereby.

When reading out an image that is not left-right inverted, the HMD 3000 displays the image as-is without performing processing for inverting the image horizontally. If the image is left-right inverted, the HMD 3000 inverts the image horizontally and displays the image. Furthermore, if the image to be displayed includes metadata indicating that the viewer has selected a part which the viewer desires to view, the HMD 3000 displays the area of that part at a high resolution. However, if the image does not contain metadata of selection information on the part which the viewer desires to view, the information from the camera is received, and the image is displayed at the received resolution. The information on the viewer's line of sight is then detected, and the information on the line of sight is stored as metadata of the image data.

The server 5000 stores the image file, and sends a designated image file in response to a request from the HMD 3000 or the personal computer 4000.

Methods for processing an image captured by the camera body 2000 include the following:

(1) Sent to the HMD 3000 through communication
(2) Sent to the personal computer 4000 through communication
(3) Sent to the server 5000 through communication
(4) Sent to the personal computer 4000 or the HMD 3000

Figure 2:
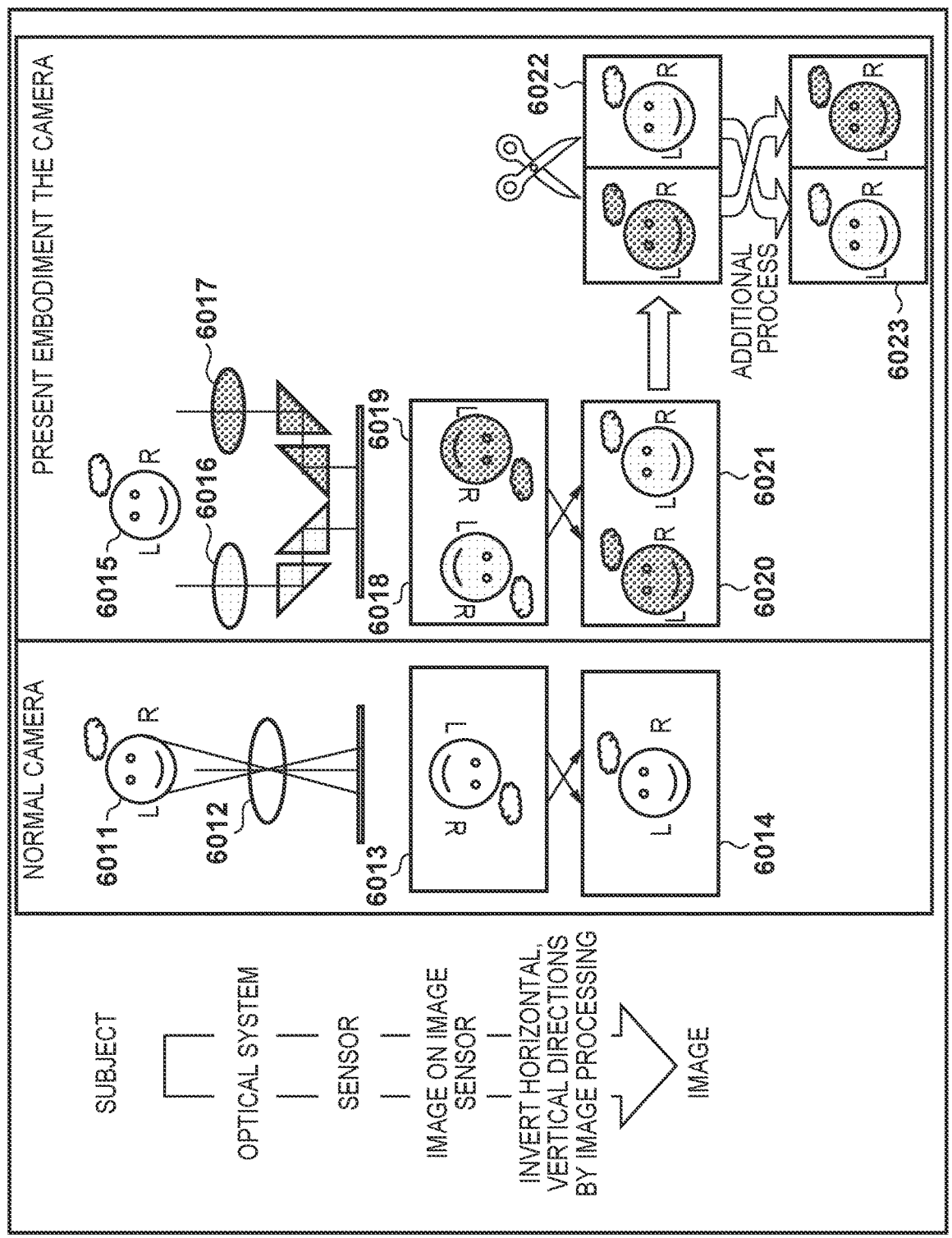
FIG. 2 is a diagram illustrating a capturing mechanism.

FIG. 2 is a diagram illustrating a method for capturing an image. The left side of FIG. 2 represents a normal camera, and the right side represents the camera according to the present embodiment.

When a subject 6011 is captured by the normal camera, a subject image inverted in the left-right and up-down directions is formed on the image sensor through an optical system 6012, forming an image 6013. Accordingly, a signal from the image sensor is inverted in the left-right and up-down directions through image processing, and an inverted image 6014 is generated.

On the other hand, when a subject 6015 is captured by the camera body 2000 of the present embodiment, an image 6018 inverted in the left-right and up-down directions is formed on a left-side image sensor through an optical system 6016. Likewise, an image 6019 inverted in the left-right and up-down directions is formed on a right-side image sensor through an optical system 6017. The images 6018 and 6019 on the image sensors are inverted in the horizontal and vertical directions through image processing, and up-down and left-right inverted images 6020 and 6021 are generated. Processing for horizontally inverting the up-down and left-right inverted images 6020 and 6021 (an image 6022) is further performed, and an image 6023 is generated.

Figure 3A:
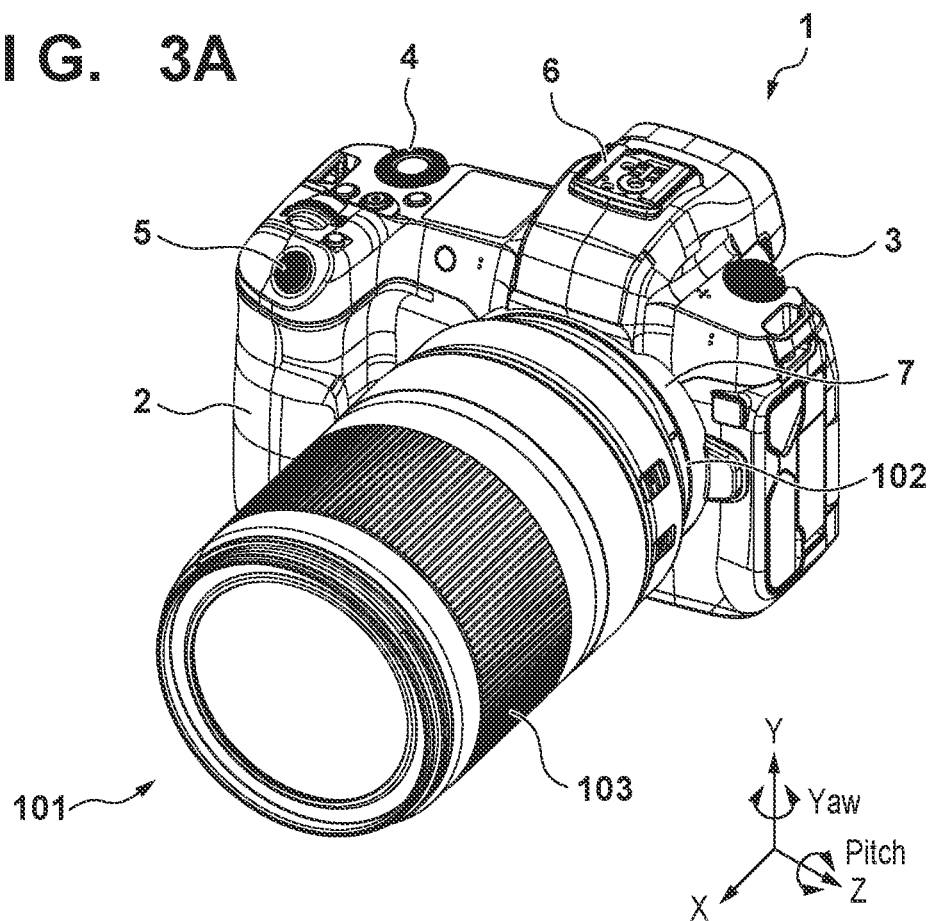
FIG. 3A is a diagram illustrating mechanisms of a camera body and a monocular lens.
Figure 3B:
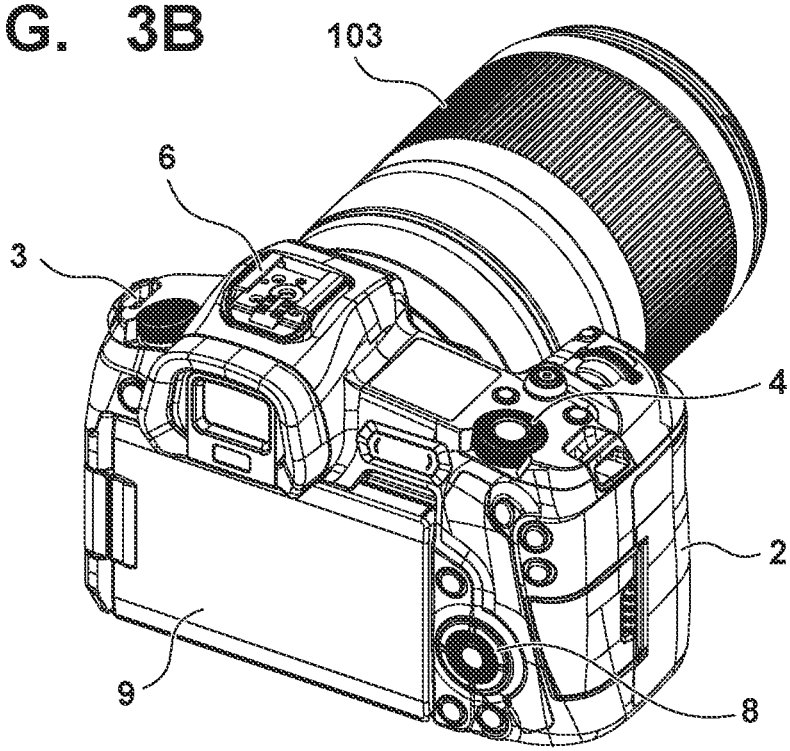
FIG. 3B is a diagram illustrating mechanisms of the camera body and the monocular lens.

FIGS. 3A and 3B are diagrams illustrating the combination of a camera body and a monocular lens. This is the normal camera illustrated in FIG. 2. FIGS. 3A and 3B illustrate the external appearance of an interchangeable lens (optical device) 101 and a digital camera ("camera body" hereinafter) 1 (corresponding to the camera body 2000 in FIG. 1) to which the interchangeable lens 101 is removably attached. FIG. 3A is a perspective view illustrating the front side, and FIG. 3B is a perspective view illustrating the rear side.

As illustrated in FIG. 3A, an optical axis direction in which an optical axis of an image capturing optical system built into the interchangeable lens 101 extends is taken as an X-axis direction, and directions orthogonal thereto are taken as a Z-axis direction (a horizontal direction) and a Y-axis direction (a vertical direction). Hereinafter, the Z-axis direction and the Y-axis direction will be referred to collectively as Z/Y-axis directions. The direction of rotation about the Z-axis is taken as a pitch direction, and the direction of rotation about the Y-axis is taken as a yaw direction. The pitch direction and the yaw direction (hereinafter collectively referred to as pitch/yaw directions) are the directions of rotation about two axes, namely the Z-axis and the Y-axis, which are orthogonal to each other.

A grip part 2 for a user to grip the camera body 1 by hand is provided on the left side of the camera body 1 as seen from the front (the subject side) (the right side, as seen from the rear). A power operation unit 3 is also provided on the upper surface of the camera body 1. When the user turns on the power operation unit 3 while the camera body 1 is powered off, the camera body 1 is powered on and becomes capable of capturing images. When the user turns off the power operation unit 3 while the camera body 1 is powered on, the camera body 1 is powered off.

A mode dial 4, a release button 5, and an accessory shoe 6 are further provided in the upper surface of the camera body 1. The user can switch an image capturing mode by rotating the mode dial 4. The image capturing mode includes a manual still image capturing mode in which the user can set image capturing conditions such as the shutter speed, aperture value, and the like as desired, an auto still image capturing mode in which an appropriate exposure amount can be obtained automatically, a moving image capturing mode for capturing moving images, and the like. Furthermore, by pressing the release button 5 halfway, the user can instruct image capturing preparation operations such as autofocus, automatic exposure control, and the like, and by pressing the release button 5 fully, the user can instruct an image to be captured. Accessories such as an external flash, an external viewfinder (EVF), and the like (not shown) are removably attached to the accessory shoe 6. An image sensor that photoelectrically converts (captures) a subject image formed by the image capturing optical system in the interchangeable lens 101 is also provided in the camera body 1.

The interchangeable lens 101 is mechanically and electrically connected to a camera mount 7 provided in the camera body 1 through a lens mount 102. As described above, an image capturing optical system that forms a subject image by forming an image of light from the subject is contained in the interchangeable lens 101. A zoom operation ring 103 capable of rotating about the optical axis when manipulated by the user is provided on the outer periphery of the interchangeable lens 101. Knurling is formed in the outer peripheral part of the zoom operation ring 103 so that the user's hand does not slip while manipulating the ring. When the zoom operation ring 103 is rotated by the user, a zoom group constituting the image capturing optical system moves to a predetermined optical position corresponding to the angle of the zoom operation ring 103. This enables the user to capture an image at a desired viewing angle.

As illustrated in FIG. 3B, a rear surface operation unit 8 and a display unit 9 are provided on the rear surface of the camera body 1. The rear surface operation unit 8 includes a plurality of buttons, dials, and the like to which various functions are assigned. When the camera 1 is powered on and a still image or moving image capturing mode is set, a through-the-lens image of the subject image being captured by the image sensor is displayed in the display unit 9. Image capturing parameters indicating image capturing conditions such as the shutter speed, aperture value, and the like are displayed in the display unit 9, and the user can change the setting values of the image capturing parameters by operating the rear surface operation unit 8 while viewing the display. The rear surface operation unit 8 includes a playback button for instructing the playback of a captured image which has been recorded, and the captured image is played back and displayed in the display unit 9 when the user operates the playback button.

Figure 4:
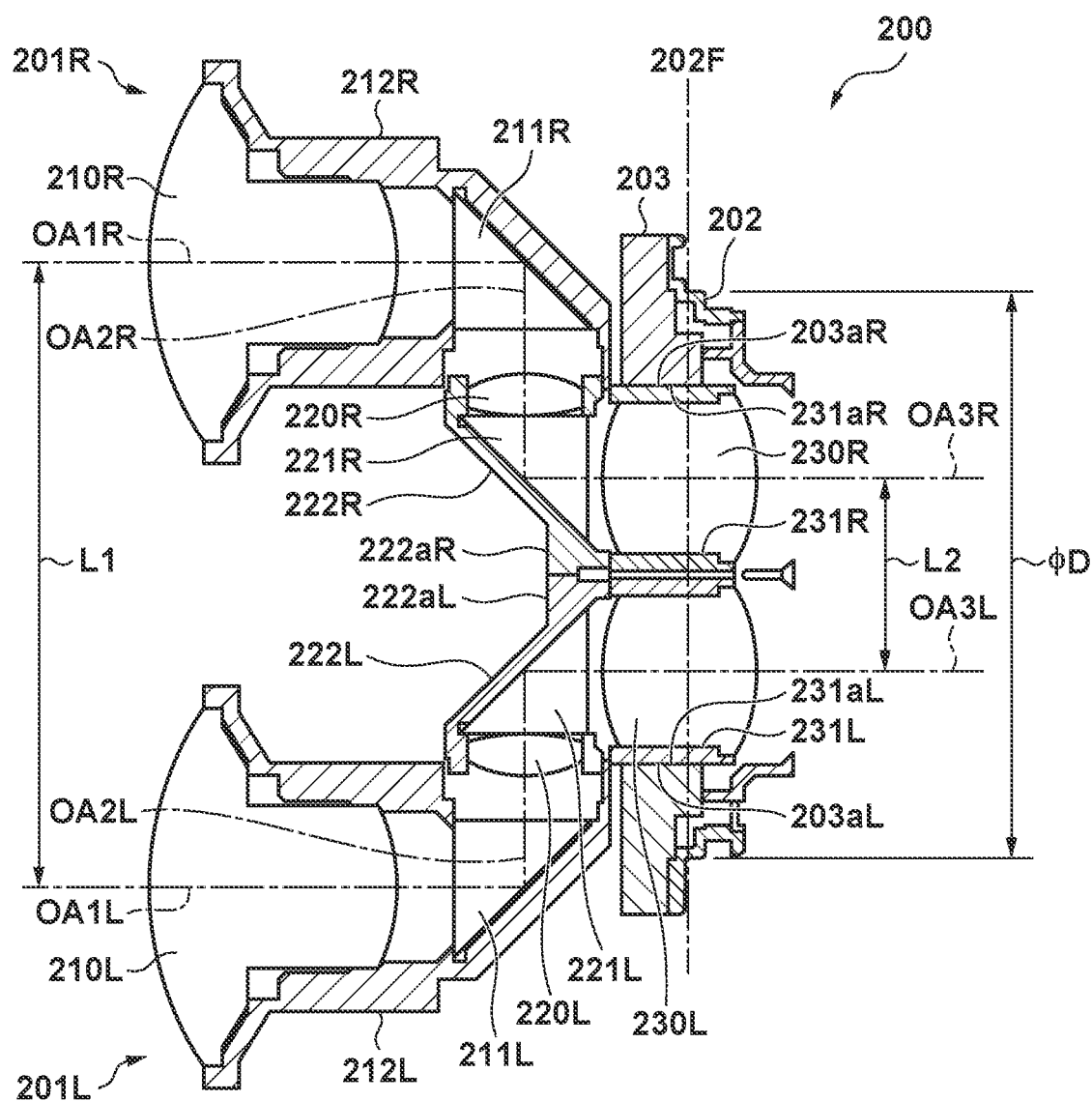
FIG. 4 is a diagram illustrating an interchangeable lens (a binocular lens).

FIG. 4 is a diagram illustrating a binocular lens serving as the interchangeable lens. A binocular lens 200 (corresponding to the binocular lens 1000 in FIG. 1) will be described with reference to FIG. 4.

FIG. 4 is a cross-sectional view of the binocular lens 200, illustrating the overall configuration of a right eye optical system 201R and a left eye optical system 201L of the binocular lens 200. The binocular lens 200 includes the right eye optical system (a first optical system) 201R and the left eye optical system (a second optical system) 201L. The right eye optical system 201R and the left eye optical system 201L are two optical systems arranged parallel (symmetrically) to each other. The right eye optical system 201R and the left eye optical system 201L respectively have first optical axes OA1R and OA1L, second optical axes OA2R and OA2L that are substantially orthogonal to the first optical axes, and third optical axes OA3R and OA3L that are substantially parallel to the first optical axes, in that order from the subject side (an object side) toward an image side. Here, the term "substantially orthogonal" or "substantially parallel" means not only a configuration which is strictly orthogonal or parallel, but also a configuration which is evaluated as being substantially orthogonal or parallel.

The right eye optical system 201R and the left eye optical system 201L have first lens groups (first lenses) 210R and 210L, second lens groups (second lenses) 220R and 220L, and third lens groups (third lenses) 230R and 230L, respectively, arranged along the respective optical axes. The first lens groups 210R and 210L are arranged along the first optical axes OA1R and OA1L, respectively; the second lens groups 220R and 220L are arranged along the second optical axes OA2R and OA2L, respectively; and the third lens groups 230R and 230L are arranged along the third optical axes OA3R and OA3L, respectively.

The right eye optical system 201R and the left eye optical system 201L have first prisms (first reflective surfaces) 211R and 211L and second prisms (second reflective surfaces) 221R and 221L, respectively. The first prisms 211R and 211L respectively bend light fluxes on the first optical axes OA1R and OA1L to guide the light fluxes to the second optical axes OA2R and OA2L. The second prisms 221R and 221L respectively bend light fluxes on the second optical axes OA2R and OA2L to guide the light fluxes to the third optical axes OA3R and OA3L. The right eye optical system 201R and the left eye optical system 201L are therefore both folded optical systems. The first prisms 211R and 211L reflect light fluxes on the first optical axes OA1R and OA1L to bend the light fluxes to the second optical axes OA2R and OA2L. The second prisms 221R and 221L reflect light fluxes on the second optical axes OA2R and OA2L to bend the light fluxes to the third optical axes OA3R and OA3L.

The right eye optical system 201R and the left eye optical system 201L have first lens group holding members 212R and 212L, second lens group holding members 222R and 222L, and third lens group holding members 231R and 231L, respectively. The first lens group holding members 212R and 212L hold the first lens groups 210R and 210L and the first prisms 211R and 211L, respectively. The second lens group holding members 222R and 222L hold the second lens groups 220R and 220L and the second prisms 221R and 221L, respectively. The third lens group holding members 231R and 231L hold the third lens groups 230R and 230L, respectively.

The right eye optical system 201R and the left eye optical system 201L are both fixed to a lens base 203. The lens base 203 is fixed to a lens mount part 202 for connecting the binocular lens 200 to the camera body 1. In the present embodiment, outer peripheral parts 231aR and 231aL of the third lens group holding members 231R and 231L are fitted to circumferential surfaces 203aR and 203aL, respectively, of the lens base 203, which are centered on the third optical axes OA3R and OA3L. The second lens group holding members 222R and 222L of the right eye optical system 201R and the left eye optical system 201L are connected to each other by connection parts 222aR and 222aL provided in the second lens group holding members 222R and 222L, respectively.

L1 represents a distance between the first optical axis OA1R of the right eye optical system 201R and the first optical axis OA1L of the left eye optical system 201L, i.e., a baseline length. The longer the baseline length L1 is, the greater the sense of three-dimensionality becomes when viewing an image. L2 represents a distance between the third optical axis OA3R of the right eye optical system 201R and the third optical axis OA3L of the left eye optical system 201L. φD represents a diameter (aperture, mount diameter) of the lens mount part 202 that can be attached to the camera body, and corresponds to an engagement diameter between the lens mount part 202 and the lens mount 102. 202F indicates a flange surface of the lens mount part 202.

Figure 5:
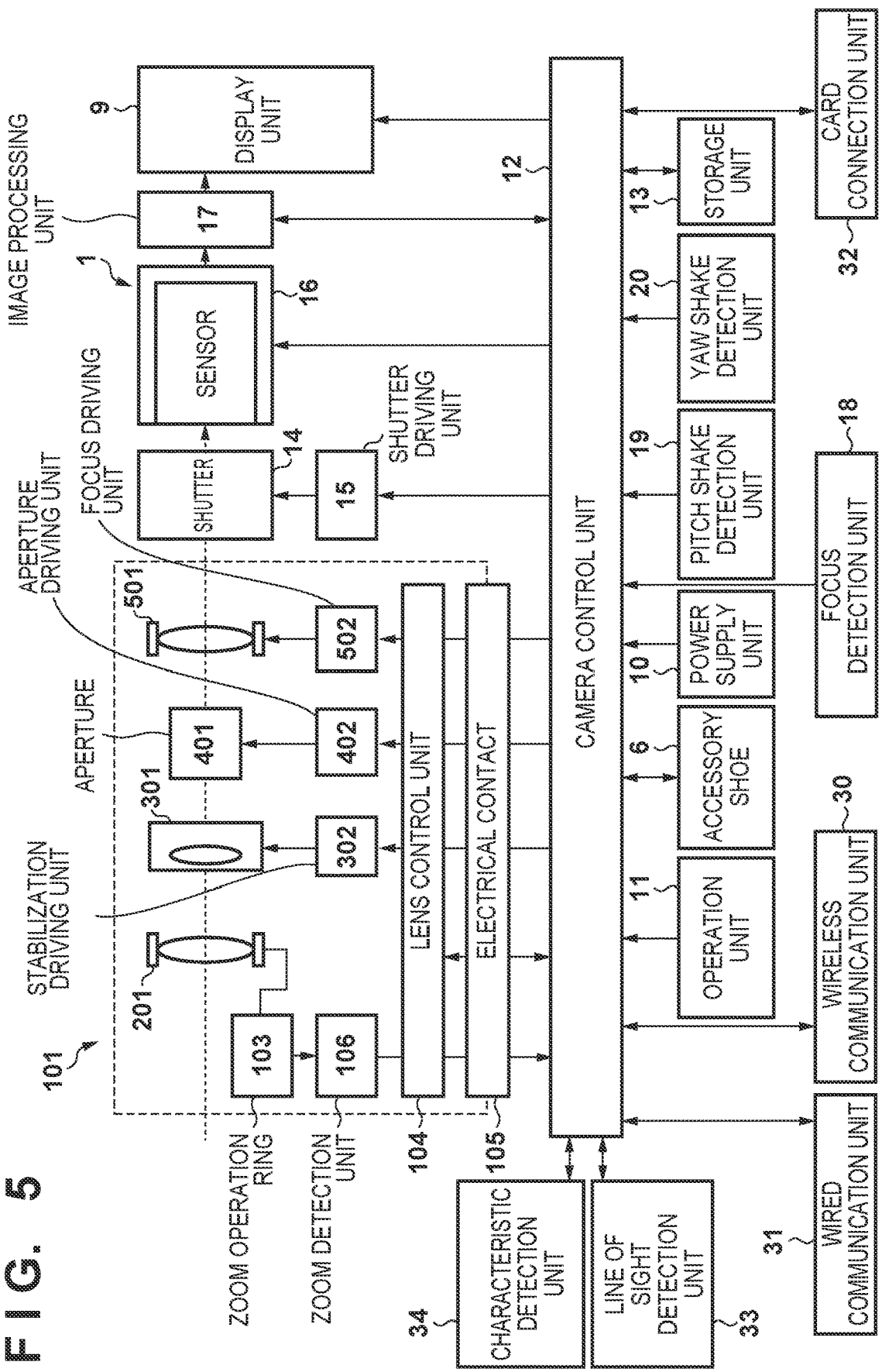
FIG. 5 is a block diagram illustrating the configurations of the interchangeable lens and the camera body.

FIG. 5 is a block diagram illustrating the electrical and optical configurations of the interchangeable lens 101 and the camera body 1. In FIG. 5, the interchangeable lens is a monocular lens. However, when the interchangeable lens is a binocular lens, the binocular interchangeable lens described with reference to FIG. 4 is assumed to be connected to the camera body 1.

The camera body 1 includes a power supply unit 10 that supplies power to the camera body 1 and the interchangeable lens 101, and an operation unit 11 that includes the aforementioned power operation unit 3, mode dial 4, release button 5, the rear surface operation unit 8, and touch panel functions of the display unit 9. The overall system of the camera body 1 and the interchangeable lens 101 is controlled by a camera control unit 12 provided in the camera body 1 and a lens control unit 104 provided in the interchangeable lens 101 interacting with each other. The camera control unit 12 reads out and executes computer programs stored in a storage unit 13. At that time, the camera control unit 12 communicates various control signals, data, and the like with the lens control unit 104 through communication terminals of an electrical contact 105 provided in the lens mount part 202. The electrical contact 105 includes a power terminal that supplies power from the aforementioned power supply unit 10 to the interchangeable lens 101.

The image capturing optical system included in the interchangeable lens 101 includes a zoom group 201 which is coupled to the zoom operation ring 103 and which changes the viewing angle by moving in the optical axis direction, and a lens stabilization group 301 which includes a shift lens as an image stabilization element that reduces image blur. The lens stabilization group 301 performs stabilization operations that reduce image blur by moving (shifting) the shift lens in the Z/Y-axis directions orthogonal to the optical axis. The image capturing optical system also includes an aperture group 401 that performs light amount adjustment operations, and a focus group 501 including a focus lens that adjusts the focus by moving in the optical axis direction. The interchangeable lens 101 further includes a stabilization driving unit 302 that drives the lens stabilization group 301 to shift the shift lens, an aperture driving unit 402 that drives the aperture group 401, and a focus driving unit 502 that drives the focus group 501 to move the focus lens.

The camera body 1 includes a shutter unit 14, a shutter driving unit 15, an image sensor 16, an image processing unit 17, and the aforementioned camera control unit 12. The shutter unit 14 controls the amount of light focused by the image capturing optical system in the interchangeable lens 101 and exposed to the image sensor 16. The image sensor 16 photoelectrically converts a subject image formed by the image capturing optical system and outputs a captured image signal. The image processing unit 17 generates an image signal after performing various types of image processing on the captured image signal. The display unit 9 displays an image signal (a through-the-lens image) output from the image processing unit 17, displays the image capturing parameters as described earlier, plays back and displays captured images recorded in the storage unit 13 or a recording medium (not shown), and the like.

The camera control unit 12 controls the driving of the aperture group 401 and the shutter unit 14 through the aperture driving unit 402 and the shutter driving unit 15 in accordance with an aperture value, a shutter speed setting value, and the like received from the operation unit 11. The camera control unit 12 also controls the driving of the focus group 501 in accordance with an image capture preparation operation (a half-pressing operation) performed on the operation unit 11 (the release button 5).

For example, when an autofocus operation has been instructed, a focus detection unit 18 determines the focus state of the subject image formed by the image sensor 16 based on the image signal generated by the image processing unit 17, generates a focus signal, and sends the focus signal to the camera control unit 12. At the same time, the focus driving unit 502 detects the current position of the focus group 501 and transmits a signal to that effect to the camera control unit 12 through the lens control unit 104. The camera control unit 12 compares the focus state of the subject image with the current position of the focus group 501, calculates a focus driving amount from an amount of deviation therebetween, and sends the focus driving amount to the lens control unit 104. The lens control unit 104 then controls the driving of the focus group 501 to a target position through the focus driving unit 502, and corrects focal deviation in the subject image.

Furthermore, when an operation of automatic exposure control has been instructed, the camera control unit 12 receives a luminance signal generated by the image processing unit 17 and performs photometry operations. The camera control unit 12 controls the driving of the aperture group 401 in accordance with an image capture instruction operation (a full-pressing operation) performed on the operation unit 11 (the release button 5) based on the result of the photometry operations. At the same time, the camera control unit 12 controls the driving of the shutter unit 14 through the shutter driving unit 15, and performs exposure processing by the image sensor 16.

The camera body 1 includes a pitch shake detection unit 19 and a yaw shake detection unit 20 as shake detection means capable of detecting image blur caused by the user's hand shaking or the like. The pitch shake detection unit 19 and the yaw shake detection unit 20 detect image blur in the pitch direction (the direction of rotation about the Z-axis) and the yaw direction (the direction of rotation about the Y-axis), respectively, using an angular velocity sensor (a vibration gyro) or an angular accelerometer, and output shake signals. The camera control unit 12 calculates a shift position of the lens stabilization group 301 (the shift lens) in the Y-axis direction using the shake signal from the pitch shake detection unit 19. Likewise, the camera control unit 12 calculates a shift position of the lens stabilization group 301 in the Z-axis direction using the shake signal from the yaw shake detection unit 20. The camera control unit 12 then controls the driving of the lens stabilization group 301 to the target position in accordance with the calculated shift position in the pitch/yaw directions, and performs stabilization operations that reduce image blur during exposure, during through-the-lens image display, and the like.

The interchangeable lens 101 includes the zoom operation ring 103 for changing the viewing angle of the image capturing optical system, and a zoom detection unit 106 that detects the angle of the zoom operation ring 103. The zoom detection unit 106 detects the angle of the zoom operation ring 103 operated by the user as an absolute value, and is configured using, for example, a resistive linear potentiometer. Information on the zoom operation ring 103 detected by the zoom detection unit 106 is sent to the lens control unit 104, and is applied to various types of control of the interchangeable lens 101, various types of control by the aforementioned camera control unit 12, and the like. Meanwhile, some of this various information is recorded in the storage unit 13 and the recording medium along with the captured image. The zoom detection unit 106 can continuously detect the angle of the zoom operation ring as an absolute value even when, for example, a zoom operation is performed while the power supply unit 10 is turned off due to a given operation by the user and the power supply unit 10 is then turned on again.

A wireless communication unit 30 wirelessly sends images captured by the camera body 1 to the HMD 3000, the personal computer 4000, or the like. Alternatively, the wireless communication unit 30 receives information from the HMD 3000, the personal computer 4000, or the like. IEEE 802.11n, or a public wireless line such as 4G or 5G, is used for the wireless communication.

A wired communication unit 31 sends images captured by the camera body 1 to the HMD 3000, the personal computer 4000, or the like over a wire. Alternatively, the wired communication unit 31 receives information from the HMD 3000, the personal computer 4000, or the like. USB 3.1 or the like is used for the wired communication. A card connection unit 32 is a connection unit for a memory card such as an SD card.

A line of sight detection unit 33 detects the photographer's line of sight when capturing an image. A characteristic detection unit 34 detects the characteristics of the person capturing images using the camera, e.g., the gender, age, and the like of the photographer capturing images using the camera. This information is sent to the server 5000 along with the images captured by the camera.

According to these configurations, information indicating whether or not the image is a left-right inverted image, information on the photographer's line of sight detected by the line of sight detection unit 33, characteristic information such as the gender and age of the photographer detected by the characteristic detection unit 34, and the like are added as metadata to the image captured by the camera body 1.

Figure 6:
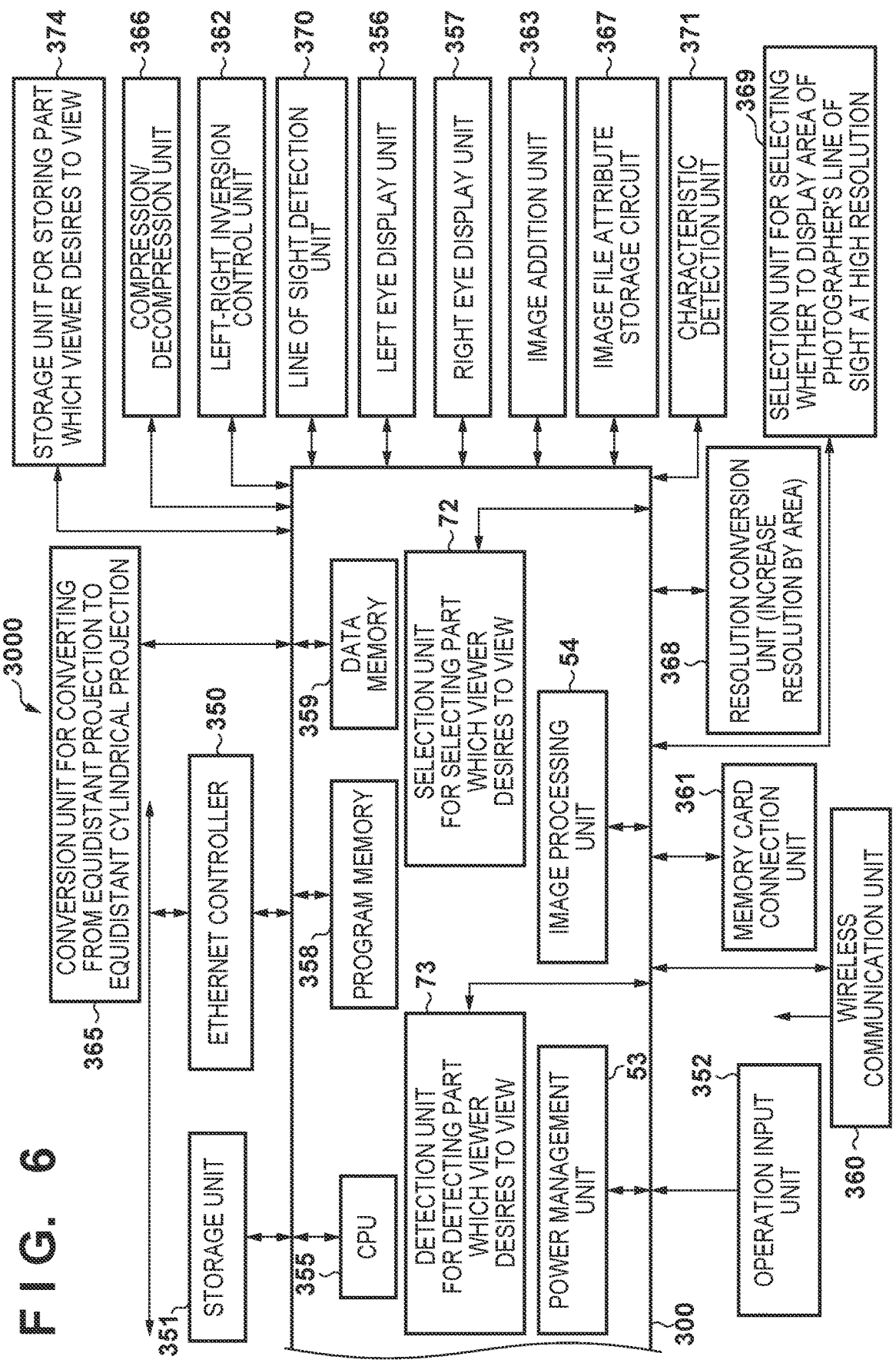
FIG. 6 is a diagram illustrating a controller of an HMD.

FIG. 6 is a block diagram illustrating the HMD (head-mounted display) 3000. The HMD 3000 enables the viewing of images having a sense of immersion.

Referring to FIG. 6, an Ethernet controller 350 controls communication among various units. Moving images and still images captured by the digital camera are formatted and stored in a storage unit 351. An operation input unit 352 accepts user operations and sets conditions for viewing using the HMD 3000. Alternatively, operations for replacing a battery or the like are performed. Information from these operations is then output to a signal line 300.

A power management unit 353 detects a state of a power source of the HMD 3000. When a power switch is off, only the pressing of a power button is detected. When the power button is pressed, power is supplied to the entire HMD 3000.

An image processing unit 354 reads a still image or a moving image, and outputs a signal subjected to image processing to the signal line 300.

A Central Processing Unit (CPU) 355 is a central arithmetic processing unit that controls the HMD 3000 as a whole based on a control program in a program memory 358 (described later). The CPU 355 also serves as display control means, and controls information displayed in a left eye display unit 356 and a right eye display unit 357 (described later).

The program memory 358 stores programs for executing control. A data memory 359 stores setting conditions of the HMD 3000 and captured still images and moving images, as well as attribute information of still images and moving images, and the like. Information indicating whether or not the image is a left-right inverted image and the information on the photographer's line of sight are added as metadata to the captured image.

The left eye display unit 356 displays left eye information captured by the digital camera or the like. The right eye display unit 357 displays right eye information captured by the digital camera or the like.

A wireless communication unit 360 has a Wi-Fi function (IEEE 802.11n) and a public wireless line function such as 4G. A memory card such as an SD card is connected to a memory card connection unit 361.

A left-right inversion control unit 362 reads out left and right images while inverting those images when displaying an image captured by a binocular lens camera. An image addition unit 363 adds information to the image and displays the information when viewing the image. Here, information such as "OK to switch to personal computer display?" is added and displayed when the playback of a two-dimensional image is selected or the like.

A resolution conversion unit 364 converts the resolution of an input image file and outputs the resulting file. A conversion unit 365 converts three-dimensional video from equidistant projection to equidistant cylindrical projection. A compression/decompression unit 366 compresses image files, decompresses compressed image files, and the like. An image file attribute storage circuit 367 stores attributes defined for an image file, and furthermore stores information necessary when converting the image file.

A resolution conversion unit 368 converts the resolution of the image. In this block, the resolution can be increased in a partial area of the image, and the resolution of an area in the direction of the photographer's line of sight is increased.

A selection unit 369 is a selection unit that selects whether or not to display the area of the photographer's line of sight at a high resolution, and a user viewing an image using the head-mounted display can select whether or not to view the area of the photographer's line of sight at a high resolution. This is a block used by the viewer.

Aline of sight information detection unit 370 detects information on the viewer's line of sight. The information on the viewer's line of sight is also sent to the server 5000. Here, the photographer's line of sight when capturing a three-dimensional image is detected from a line of sight viewed by the photographer for at least a predetermined length of time.

A characteristic detection unit 371 detects characteristic information of the viewer. The characteristic information of the viewer is, for example, age, gender, and the like, and is also sent to the server 5000.

A selection unit 372 is a block through which the viewer selects a part the viewer desires to view, and the person viewing the image using the head-mounted display selects which of images within an image to view. For example, if the image is of outdoor scenery, the viewer may choose to view an image of a mountain.

The selection of the desired image may be made through a method for selecting a desired image from a plurality of candidates displayed in the display unit, or a method through which the viewer makes the selection. In particular, in the latter case, it is important to store the image that the viewer desires to view, and that image is then taken as a candidate for selecting the image that the viewer desires to view the next and subsequent times. Information on the viewer's desired image is also sent to the server 5000.

A detection unit 373 is a block that detects the part of the image which the viewer desires to view, and detects the part which the viewer desires to view within the image. This block may be implemented in the HMD 3000, but is basically implemented in the server 5000.

A storage unit 374 is a block that stores the part which the viewer desires to view, and stores the area of the image that the viewer desires to view as metadata along with the image. The storage unit 374 stores the information on the plurality of parts to view input as parts which the viewer wishes to view. An individual person is specified from a group of a plurality of people, and a viewing selection is made. This information is also stored in the server.

Figure 7:
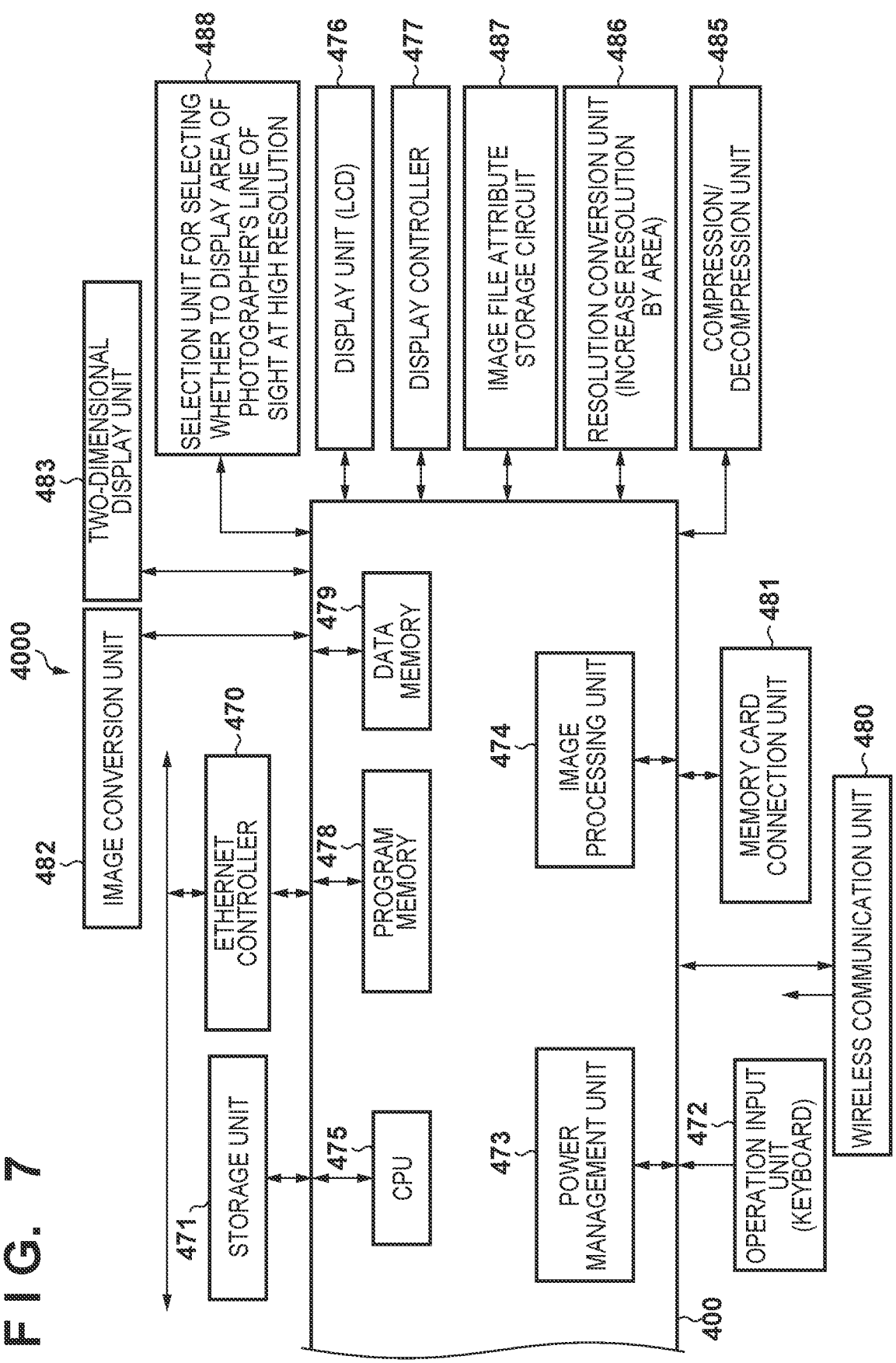
FIG. 7 is a diagram illustrating a controller of a personal computer.

FIG. 7 is a block diagram illustrating the personal computer 4000. The user makes operations through a keyboard, and the personal computer 4000 performs processing based on the operations and displays information in a display unit.

Referring to FIG. 7, an Ethernet controller 470 controls communication among various units. Moving images and still images captured by the digital camera are formatted and stored in a storage unit 471. Alternatively, images sent over a network are stored. Metadata is added to these images. Information indicating whether or not the image is a left-right inverted image and information on the photographer's line of sight are added as the metadata. This information is displayed in the display unit of the personal computer.

A keyboard is typically used as an operation input unit 472. A power management unit 473 detects a state of a power source of the personal computer 4000. When a power switch is off, only the pressing of a power button is detected. When the power button is pressed, power is supplied to the entire personal computer 4000.

An image processing unit 474 reads a still image or a moving image, and outputs a signal subjected to image processing to a signal line 400.

A Central Processing Unit (CPU) 475 is a central arithmetic processing unit that controls the personal computer 4000 as a whole based on a control program in a program memory 478 (described later). The CPU 475 also serves as display control means, and controls information displayed in a display unit 476 (described later). The display unit 476 displays images captured by the digital camera or the like, images received from the server, or the like.

A display controller 477 controls displays made in the display unit 476. The program memory 478 stores programs for executing control. A data memory 479 stores setting conditions of the personal computer and captured still images and moving images, as well as attribute information of still images and moving images, and the like. A wireless communication unit 480 has a Wi-Fi function (IEEE 802.11n) and a public wireless line function such as 4G. A memory card such as an SD card is connected to a memory card connection unit 81.

An image conversion unit 482 converts attributes of image files and the like. Images that cannot be handled by other blocks are converted here as well. A two-dimensional display unit 483 displays two-dimensional images and the like. A compression/decompression unit 485 compresses image files, decompresses compressed image files, and the like.

A resolution conversion unit 486 outputs an image file obtained by converting the resolution of an input image file. The resolution conversion unit 486 can increase the resolution in a partial area of the image, and the resolution of an area in the direction of the photographer's line of sight is increased.

An image file attribute storage circuit 487 stores attributes defined for an image file, and furthermore stores information necessary when converting the image file. A selection unit 488 is a selection unit that selects whether or not to display the area of the photographer's line of sight at a high resolution, and a user viewing an image using the personal computer 4000 can select whether or not to view the area of the photographer's line of sight at a high resolution. This is a block used by the viewer.

Figure 8:
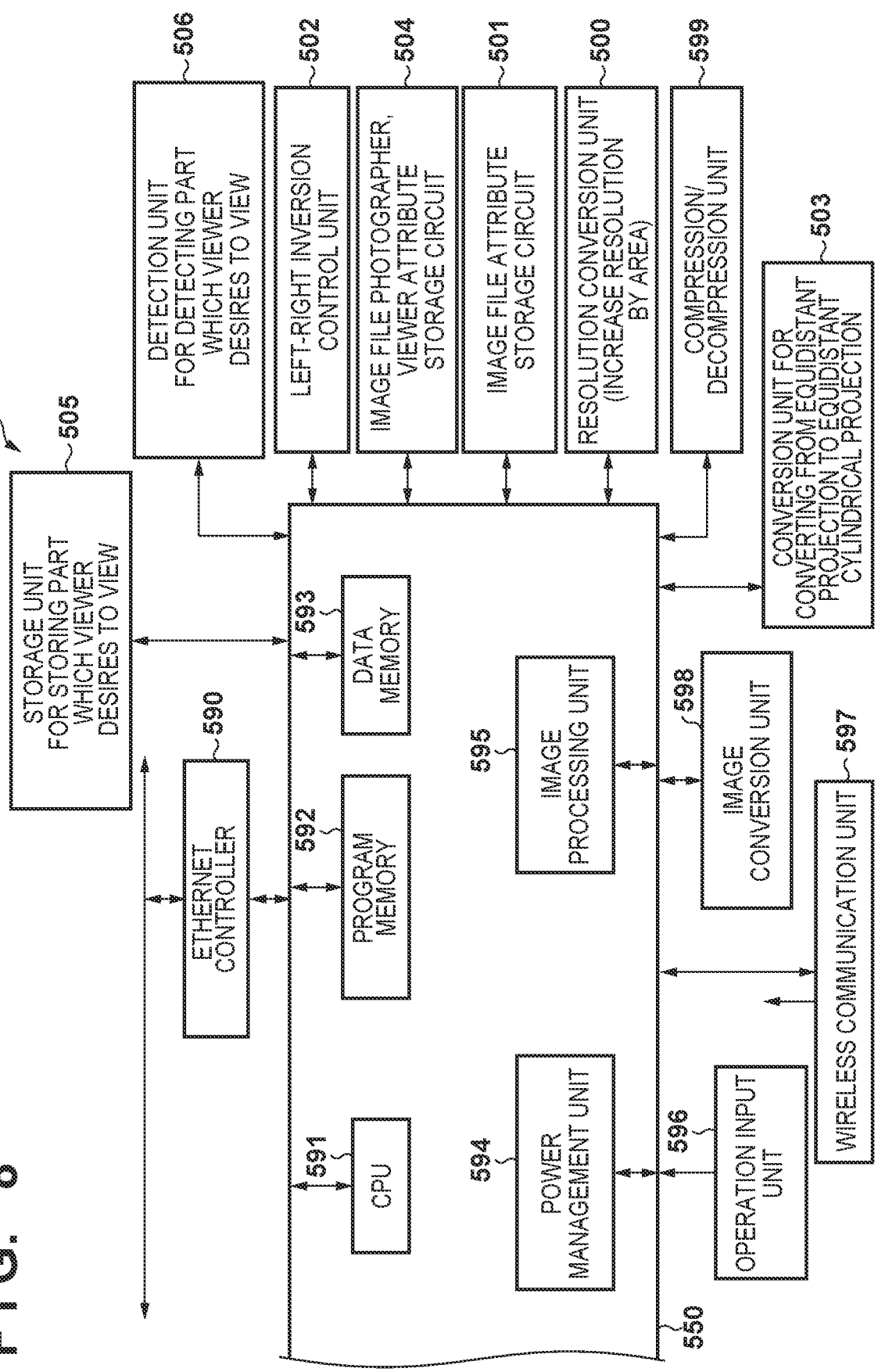
FIG. 8 is a diagram illustrating a controller of a server.

FIG. 8 is a block diagram of the server 5000. The user makes operations through a keyboard, and the server 5000 performs processing based on the operations and displays information in a display unit.

Referring to FIG. 8, an Ethernet controller 590 controls communication among various units. A Central Processing Unit (CPU) 591 is a central arithmetic processing unit that controls the server 5000 as a whole based on a control program in a program memory 592 (described later).

The program memory 592 stores programs for executing control. A data memory 593 stores setting conditions of the server and captured still images and moving images, as well as attribute information of still images and moving images, and the like. Here, information indicating whether or not the image is a left-right inverted image and information on the photographer's line of sight are added as the metadata. A power management unit 594 manages a power source. The server requires a large amount of power, and thus unit therefore monitors the operating state and executes power management.

An image processing unit 595 reads a still image or a moving image, and outputs a signal subjected to image processing to a signal line 550.

A keyboard is typically used as an operation input unit 596. A wireless communication unit 597 has a Wi-Fi function (IEEE 802.11n) and a public wireless line function such as 4G. An image conversion unit 598 converts attributes of image files and the like. Images that cannot be handled by other blocks are converted here as well. A compression/decompression unit 599 compresses image files, decompresses compressed image files, and the like.

A resolution conversion unit 500 outputs an image file obtained by converting the resolution of an input image file. The resolution conversion unit 500 can increase the resolution in a partial area of the image, and the resolution of an area in the direction of the photographer's line of sight is increased.

An image file attribute storage circuit 501 stores attributes defined for an image file, and furthermore stores information necessary when converting the image file. Here, information indicating whether or not the image is a left-right inverted image and information on the photographer's line of sight are also added as the metadata.

A left-right inversion control unit 502 reads out left and right images while inverting those images when displaying an image captured by a binocular lens camera. A conversion unit 503 converts three-dimensional video from equidistant projection to equidistant cylindrical projection.

A storage circuit 504 is a block that stores attributes of the photographer of the image file and attributes of the viewer, and stores information on the photographer's line of sight and information on the viewer's line of sight as metadata corresponding to the image file. Characteristic information such as the gender and age of the photographer and line of sight information, and characteristic information such as the gender and age of the viewer and line of sight information, are also added as the metadata.

A storage unit 505 is a block that stores the part which the viewer desires to view, and stores the area of the image which the viewer desires to view as metadata along with the image. This information is sent from the HMD 3000 and stored in the server.

A detection unit 506 is a block that detects the part which the viewer desires to view, and detects the part which the viewer desires to view within the image. This block may be implemented in the HMD 3000, but is basically implemented in the server.

Flowcharts illustrating the control of the head-mounted display (HMD) 3000, the server 5000, the camera body 2000, and the personal computer 4000, according to Embodiment 1, will be described next.

In the present embodiment, an object that the viewer wishes to view in an image can be selected for display at a high resolution. Specifically, the head-mounted display 3000 capable of displaying a three-dimensional image includes means for selecting a part which the viewer desires to view; means for detecting the part to view which the viewer has selected; and means for increasing the resolution of the detected part to view. An image in which the resolution of the part which the viewer desires to view is increased is then displayed.

Here, there may be a plurality of parts which the viewer desires to view. Accordingly, means for inputting an object that the viewer wishes to view, and means for registering the object that the viewer wishes to view, input by the viewer, and enabling the object to be selected the next time, are also provided. An area that is registered as the object that the viewer wishes to view is then displayed, and furthermore, the object that the viewer wishes to view is newly registered.

As a standalone type head-mounted display, the HMD 3000 converts only the area desired by the viewer to a high resolution, at a framerate of at least 60 fps, for display.

FIGS. 9A to 9C are flowcharts illustrating control of the HMD for performing the operations described above.

In FIG. 9A, S101 represents initialization.

In S102, the CPU 355 of the HMD 3000 determines whether or not a viewing mode in the HMD 3000 has been selected. If the viewing mode in the HMD has been selected, the sequence moves to S103, and if not, the sequence moves to S110, where other processing is executed.

In S103, the CPU 355 determines whether or not an image captured by the camera and currently being sent is being viewed. If an image captured by the camera is being viewed, the sequence moves to S104, and if not, the sequence moves to S111.

In S104, the CPU 355 receives an image captured by the camera and sent through wireless communication or the like, and obtains the metadata thereof.

In S105, the CPU 355 determines whether or not metadata of the photographer's line of sight is present in the image captured by the camera and being sent. If metadata of the photographer's line of sight is present in the image captured by the camera and being sent, the sequence moves to S106, whereas if not, the sequence moves to S108.

In S106, the CPU 355 increases the resolution of the area of the photographer's line of sight. In S107, the image obtained by increasing the resolution of the area of the photographer's line of sight is displayed.

In S108, the CPU 355 generates display information at the received resolution. In S109, the information at the received resolution is displayed.

Moving to FIG. 9B, in S111, the CPU 355 determines whether or not an image stored in the server is being viewed. If an image stored in the server is being viewed, the sequence moves to S112, and if not, the sequence moves to S102.

In S112, the CPU 355 determines whether a part which the viewer desires to view has been selected. If the part which the viewer desires to view has been selected, the sequence moves to S113, and if not, the sequence moves to S125.

The selection of the desired image may be made through a method for selecting a desired image from a plurality of candidates displayed in the display unit, or a method through which the viewer makes the selection. In particular, in the latter case, it is important to store the image that the viewer desires to view, and that image is then taken as a candidate for selecting the image that the viewer desires to view the next and subsequent times. Information on the viewer's desired image is also sent to the server 5000.

In S113, the CPU 355 displays a plurality of candidates for the part which the viewer desires to view. In S114, the viewer selects the part which the viewer desires to view.

In S115, the CPU 355 determines whether the selection has been made from among the candidates for the part which the viewer desires to view being displayed. If the selection has been made from among the candidates for the part which the viewer desires to view being displayed, the sequence moves to S116, and if not, the sequence moves to S118.

In S116, the CPU 355 stores the selection of the image desired by the viewer. In S117, the CPU 355 requests the server to send an image with metadata, designating the desired image.

In S118, the CPU 355 determines whether or not the part which the viewer desires to view has been newly selected. If the part which the viewer desires to view has been newly selected, the sequence moves to S119, and if not, the sequence moves to S102.

In S119, the CPU 355 stores the part newly selected in S114 as a candidate for the part which the viewer desires to view.

Moving to FIG. 9C, in S120, the CPU 355 determines whether or not metadata for the desired image area is present in the image. If metadata for the desired image area is present in the image, the sequence moves to S121, and if not, the sequence moves to S123.

In S121, the CPU 355 receives information from the server 5000, and increases the resolution of the desired image area. In S122, the image obtained by increasing the resolution of the desired image area is displayed.

In S123, the CPU 355 receives information from the server 5000, and generates display information at the received resolution. In S124, the CPU 355 displays the display information at the received resolution.

In S125, the CPU 355 determines whether or not metadata of the photographer's line of sight is present in the image. If metadata of the photographer's line of sight is present in the image, the sequence moves to S126, and if not, the sequence moves to S128.

In S126, the CPU 355 receives information from the server 5000, and increases the resolution of the area of the photographer's line of sight. In S127, the CPU 355 displays the image obtained by increasing the resolution of the area of the photographer's line of sight.

In S128, the CPU 355 receives information from the server 5000, and generates display information at the received resolution. In S129, the CPU 355 displays the display information at the received resolution.

FIGS. 10A to 10D are flowcharts illustrating control of the server for performing the operations described above.

Figure 10A:
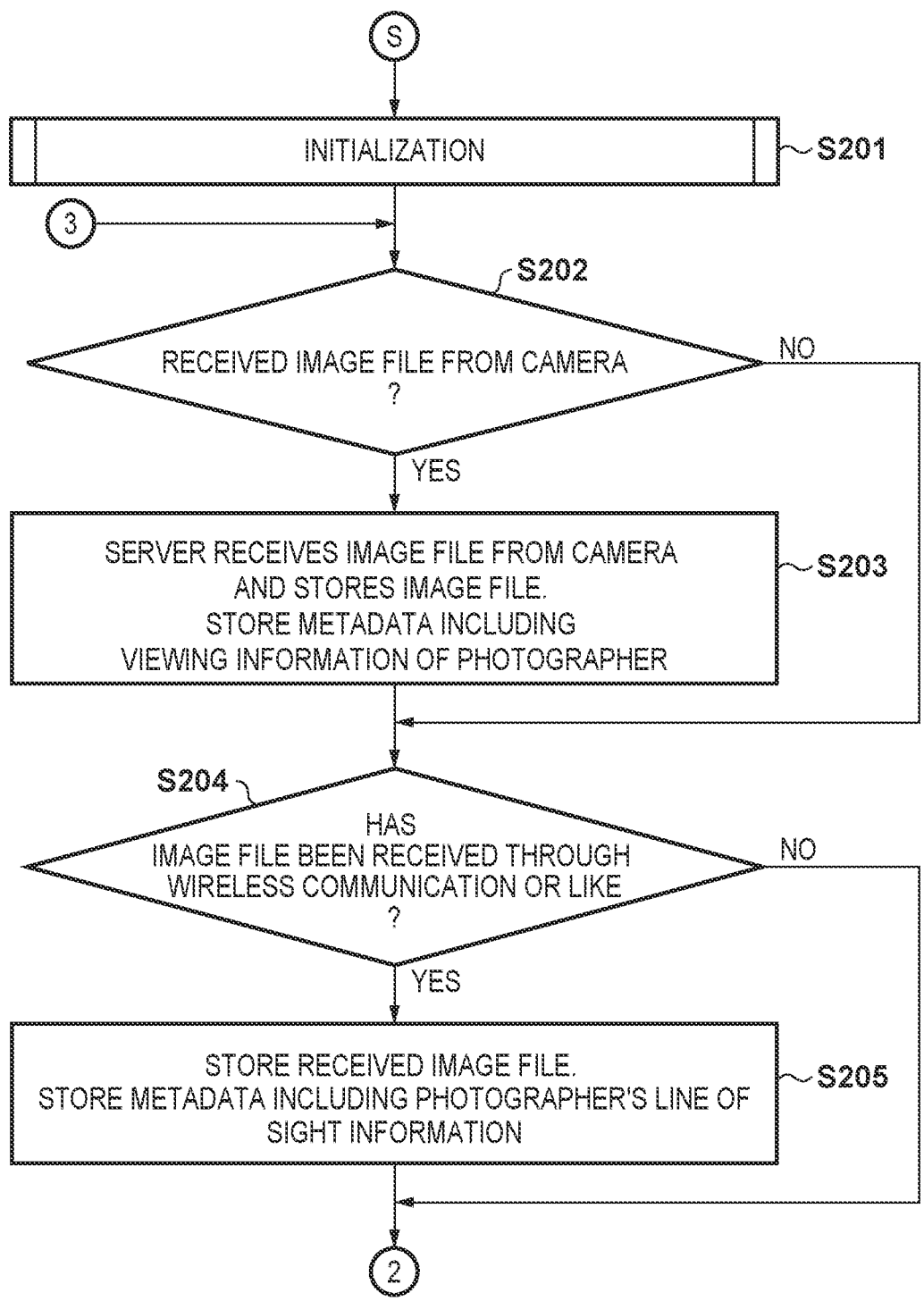
FIG. 10A is a diagram illustrating a control flow of the server.

In FIG. 10A, S201 represents initialization.

In S202, the CPU 591 of the server 5000 determines whether or not an image file has been received from the camera. If an image file has been received from the camera, the sequence moves to S203, and if not, the sequence moves to S204.

In S203, the CPU 591 receives the image file from the camera and stores the image file. Furthermore, the CPU 591 stores metadata including the viewing information of the photographer.

In S204, the CPU 591 determines whether or not an image file has been received through wireless communication or the like from a source other than the camera. If an image file is received through wireless communication or the like from a source other than the camera, the sequence moves to S205, and if not, the sequence moves to S206.

In S205, the CPU 591 stores the received image file. At the same time, metadata including information on the photographer's line of sight is also stored.

Figure 10B:
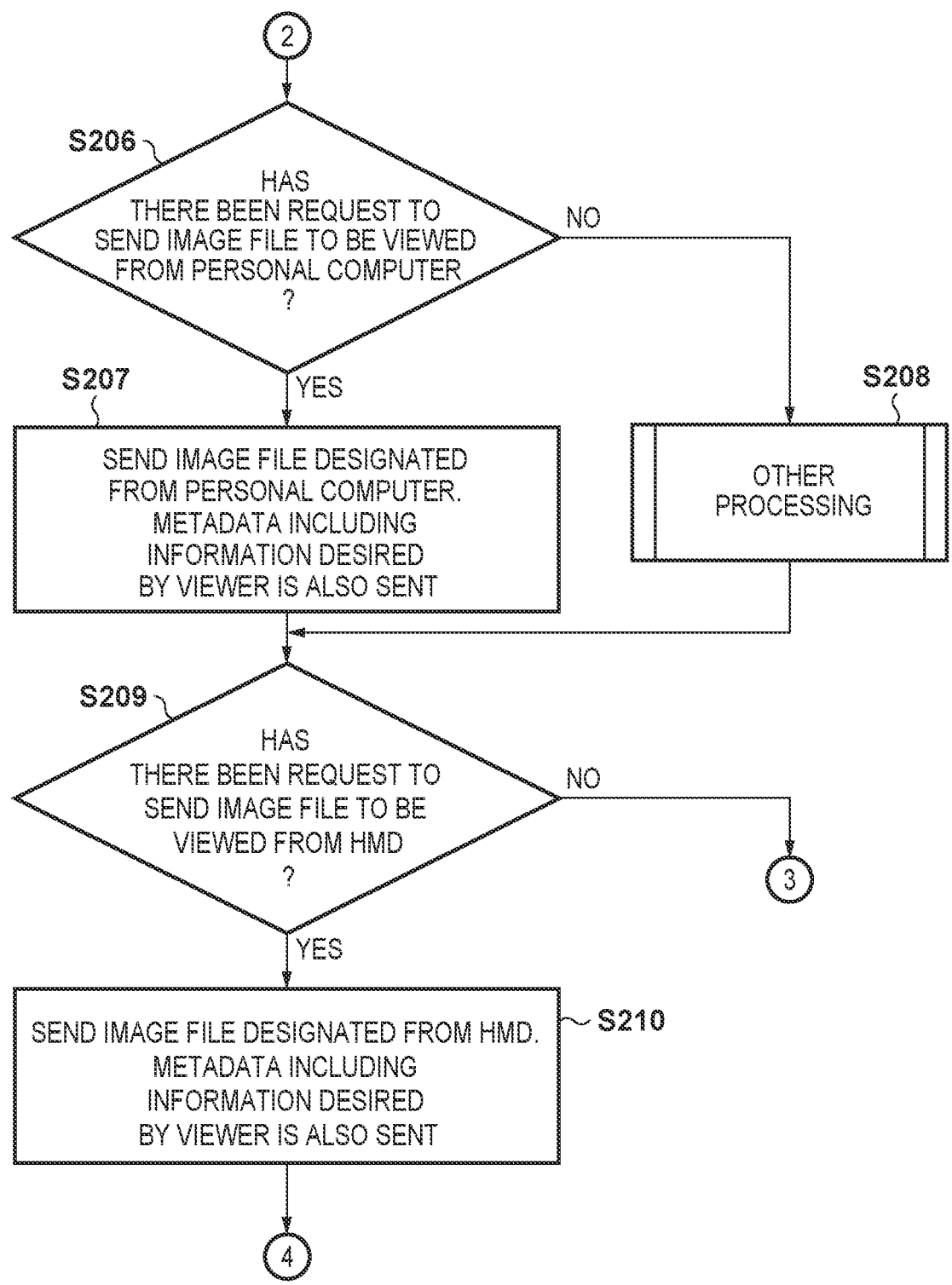
FIG. 10B is a diagram illustrating a control flow of the server.

Moving to FIG. 10B, in S206, the CPU 591 determines whether or not there has been a request to send an image file to be viewed from the personal computer. If there has been a request to send an image file to be viewed from the personal computer, the sequence moves to S207, and if not, the sequence moves to S208, where other processing is executed.

In S207, the CPU 591 sends the image file designated from the personal computer. At the same time, metadata including information desired by the viewer is also sent.

In S209, the CPU 591 determines whether or not there has been a request to send an image file to be viewed from the HMD. If there has been a request to send an image file to be viewed from the HMD, the sequence moves to S210, and if not, the sequence moves to S202.

In S210, the CPU 591 sends the image file designated from the HMD. At the same time, metadata including information desired by the viewer is also sent.

Figure 10C:
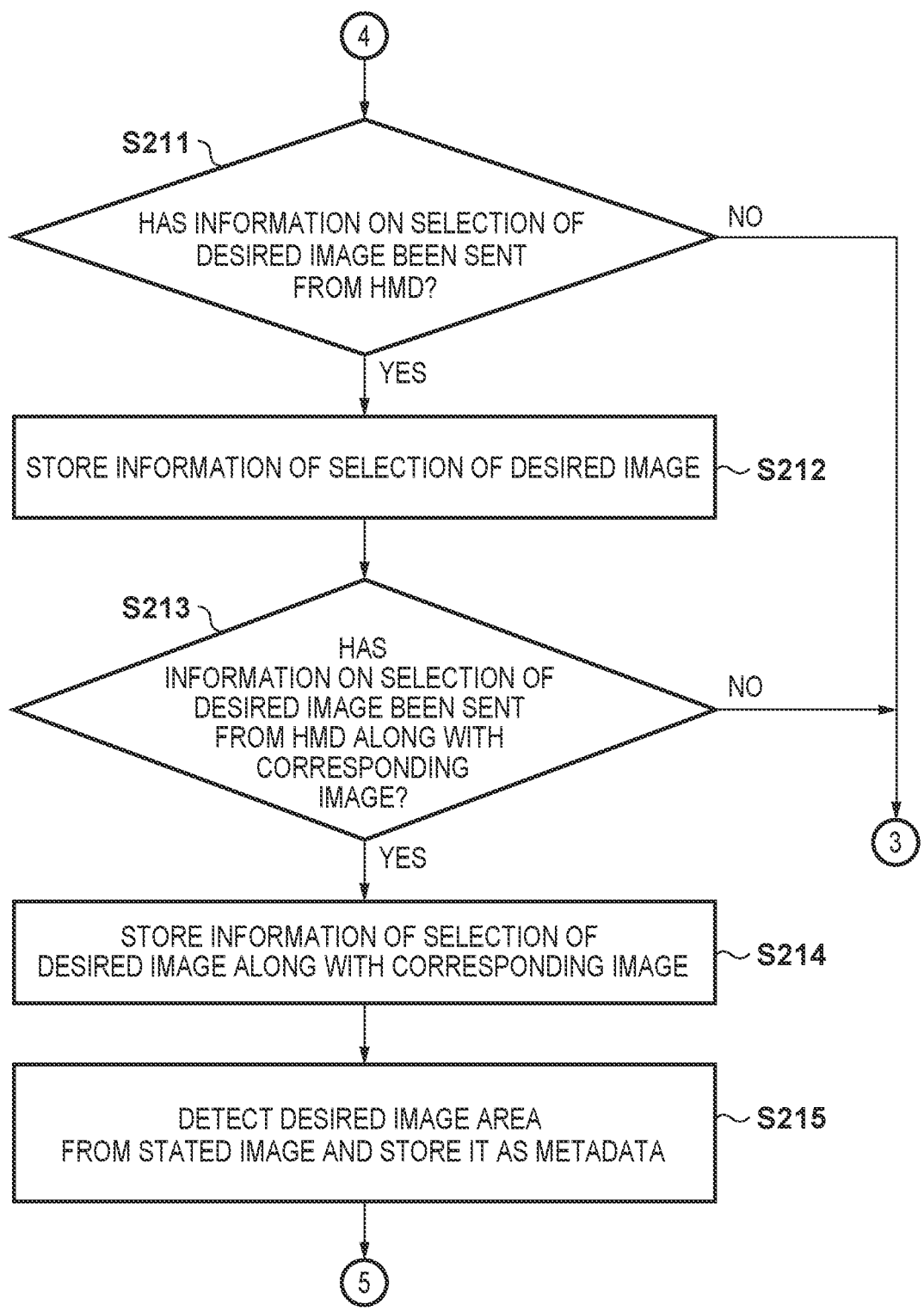
FIG. 10C is a diagram illustrating a control flow of the server.

Moving to FIG. 10C, in S211, the CPU 591 determines whether or not information on the selection of a desired image has been sent from the HMD. If information on the selection of a desired image has been sent from the HMD, the sequence moves to S212, and if not, the sequence returns to S202.

In S212, the CPU 591 stores the information on the selection of the desired image.

In S213, the CPU 591 determines whether or not the corresponding image has been sent along with the information on the selection of the desired image from the HMD. If the corresponding image has been sent along with the information on the selection of the desired image from the HMD, the sequence moves to S214, and if not, the sequence returns to S202.

In S214, the CPU 591 stores the corresponding image along with the information on the selection of the desired image.

In S215, the CPU 591 detects the desired image area from the stated image and stores the image area as the metadata.

Figure 10D:
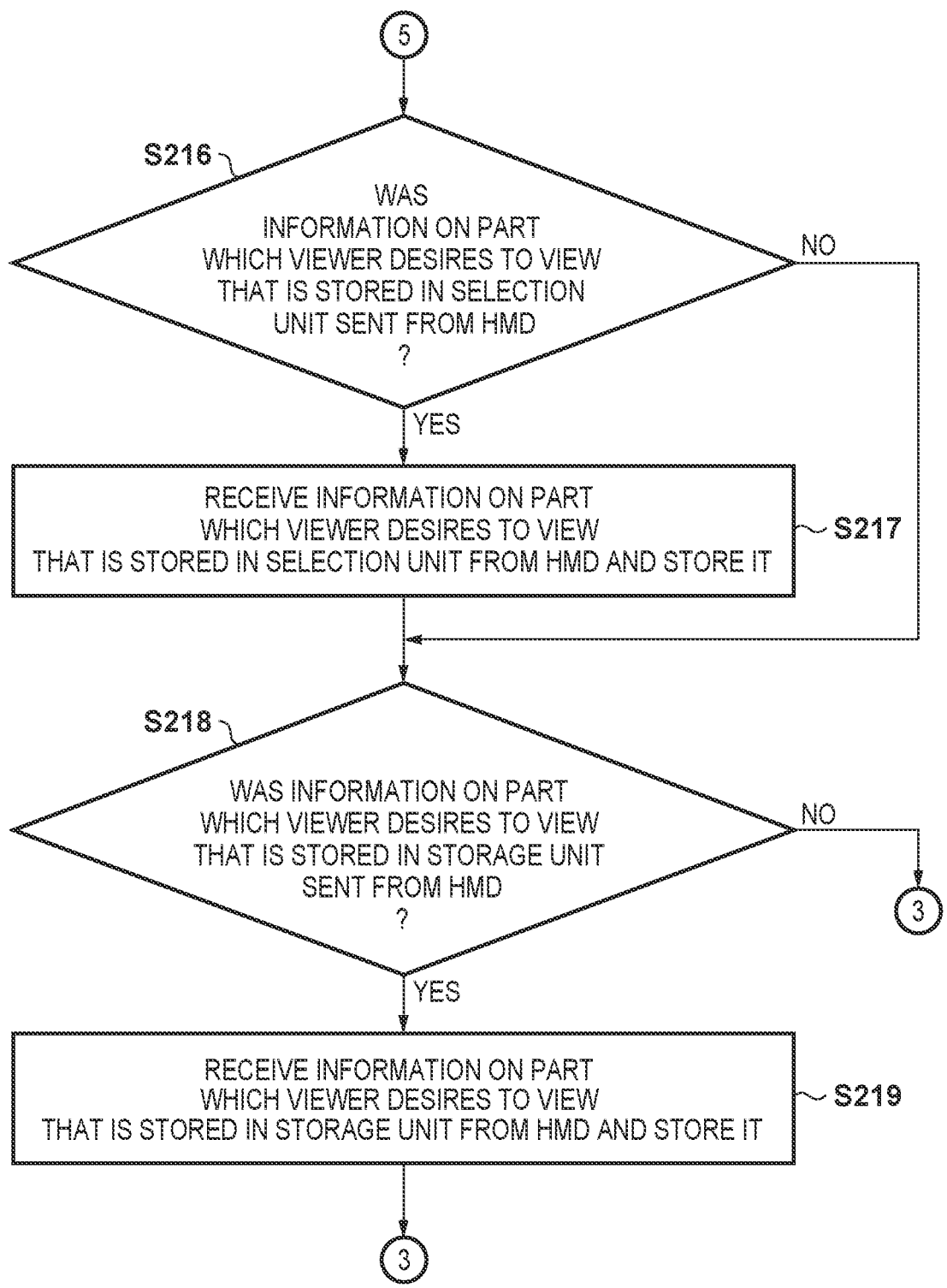
FIG. 10D is a diagram illustrating a control flow of the server.

Moving to FIG. 10D, in S216, the CPU 591 determines whether or not information on the part which the viewer desires to view, stored in the selection unit, has been sent from the HMD. If the information on the part which the viewer desires to view, stored in the selection unit, has been sent from the HMD, the sequence moves to S217, and if not, the sequence moves to S218.

In S217, the CPU 591 receives the information on the part which the viewer desires to view, stored in the selection unit, from the HMD, and stores that information.

In S218, the CPU 591 determines whether or not information on the part which the viewer desires to view, stored in the storage unit, has been sent from the HMD. If the information on the part which the viewer desires to view, stored in the storage unit, has been sent from the HMD, the sequence moves to S219, and if not, the sequence returns to S202.

Figure 11:
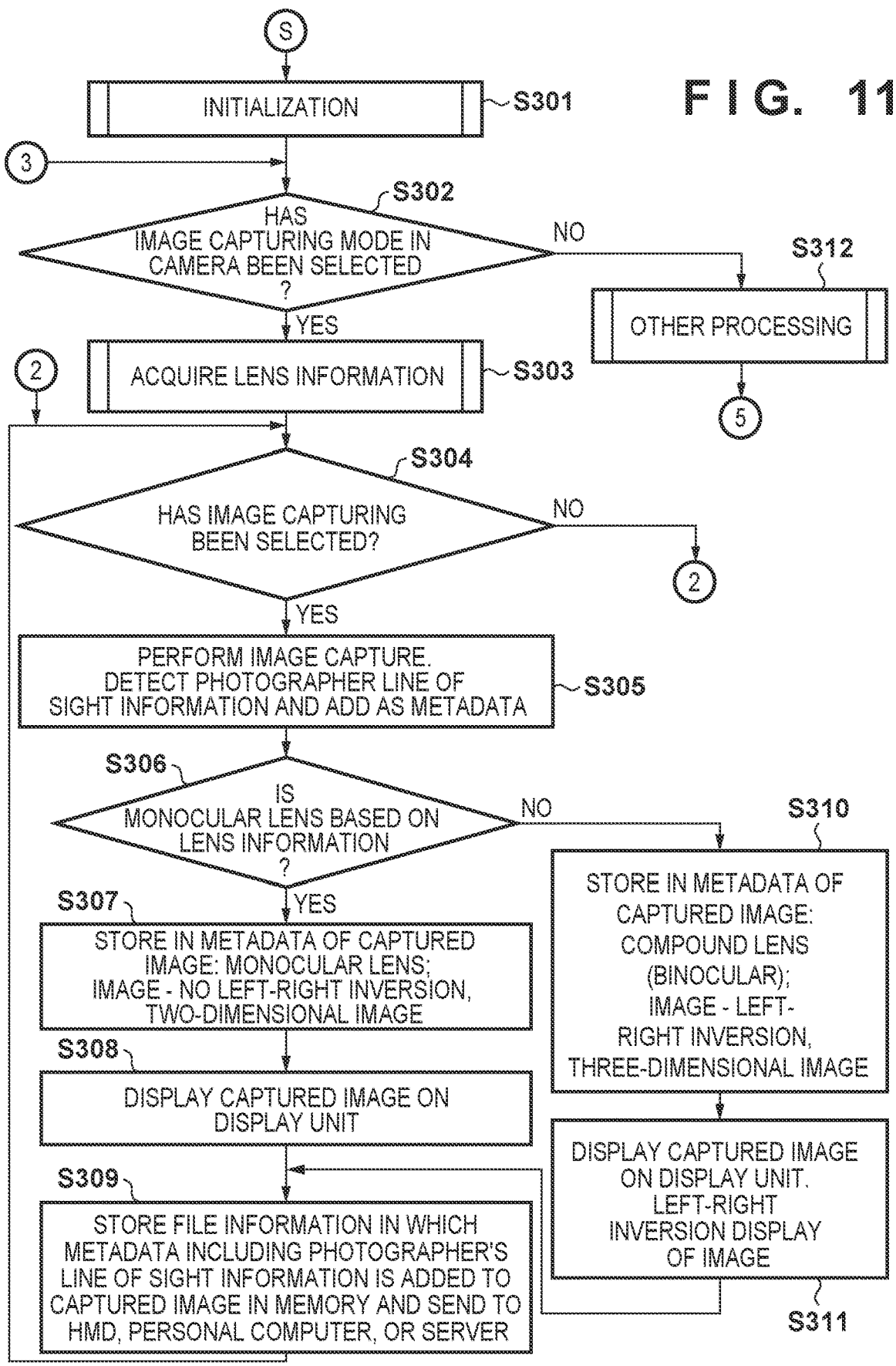
FIG. 11 is a diagram illustrating a control flow of the camera body.

FIG. 11 is a flowchart illustrating control of the camera body for performing the operations described above.

The basic idea is that the camera should, to the greatest extent possible, emphasize continuous shooting without performing left-right inversion in the camera itself, and furthermore, reduce consumption of power from the battery.

Furthermore, the photographer's line of sight is detected, and information on the photographer's line of sight is stored as metadata.

In FIG. 11, S301 represents initialization.

In S302, the camera control unit 12 of the camera body 1 determines whether or not an image capturing mode in the camera has been selected. If an image capturing mode in the camera has been selected, the sequence moves to S303, and if not, the sequence moves to S312, where other processing is executed.

In S303, the camera control unit 12 executes communication with the lens, and obtains information from the lens, such as the model number of the lens, the date of manufacture of the lens, the focal length of the lens, the aberration of the lens, the configuration of the lens (monocular, binocular, tri-lens, or quad-lens), the need to perform left-right inversion on the image, and the like.

In S304, the camera control unit 12 determines whether or not image capturing has been selected. If image capturing has been selected, the sequence moves to S305, and if not, the sequence moves to S304.

In S305, the camera control unit 12 captures an image. In addition, information on the photographer's line of sight is detected and added to the captured image as metadata.

In S306, the camera control unit 12 determines whether or not the lens is a monocular lens from the information obtained from the lens. If the lens is a monocular lens, the sequence moves to S307, and if not, the sequence moves to S310.

In S307, the camera control unit 12 stores, in the metadata of the captured image, an indication that the lens is a monocular lens, that the image is not left-right inverted, and that the image is a two-dimensional image.

In S308, the camera control unit 12 displays the captured image in the display unit.

In S309, the camera control unit 12 stores file information, in which metadata including the information on the photographer's line of sight has been added to the captured image, in a memory, and sends the file information to the HMD, the personal computer, or the server.

In S310, the camera control unit 12 stores an indication that the lens is a compound lens (distinguishing between binocular, tri-lens, and quad-lens), that it is necessary to perform left-right inversion, and that the image is a three-dimensional image, in the metadata of the captured image.

In S311, the camera control unit 12 displays the captured image in the display unit. "Image is inverted left-right" is displayed in the display unit of the camera body 1. With this step, the user can recognize that the image which has been captured and displayed is left-right inverted.

Figure 12A:
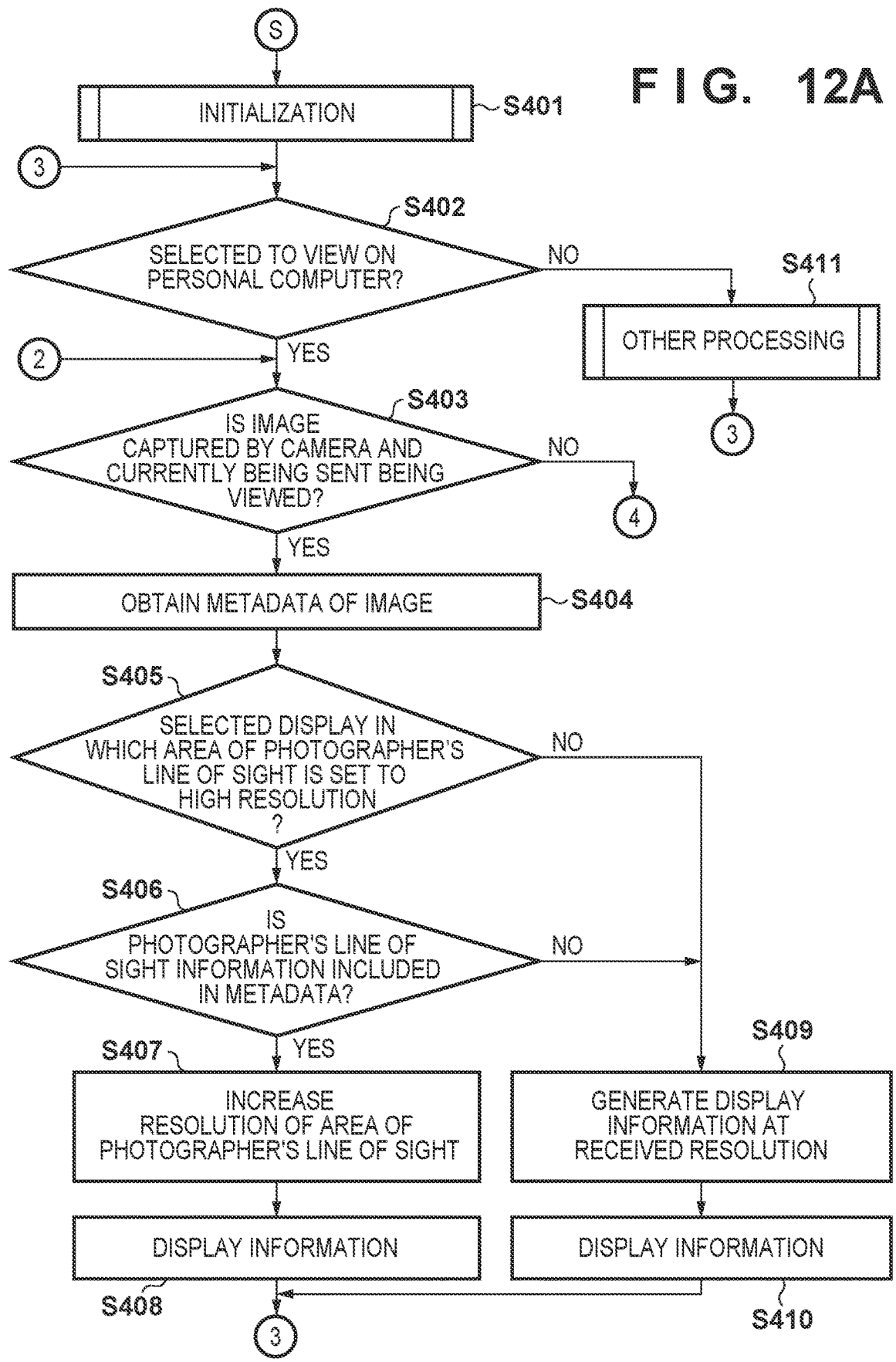
FIG. 12A is a diagram illustrating a control flow of the personal computer.
Figure 12B:
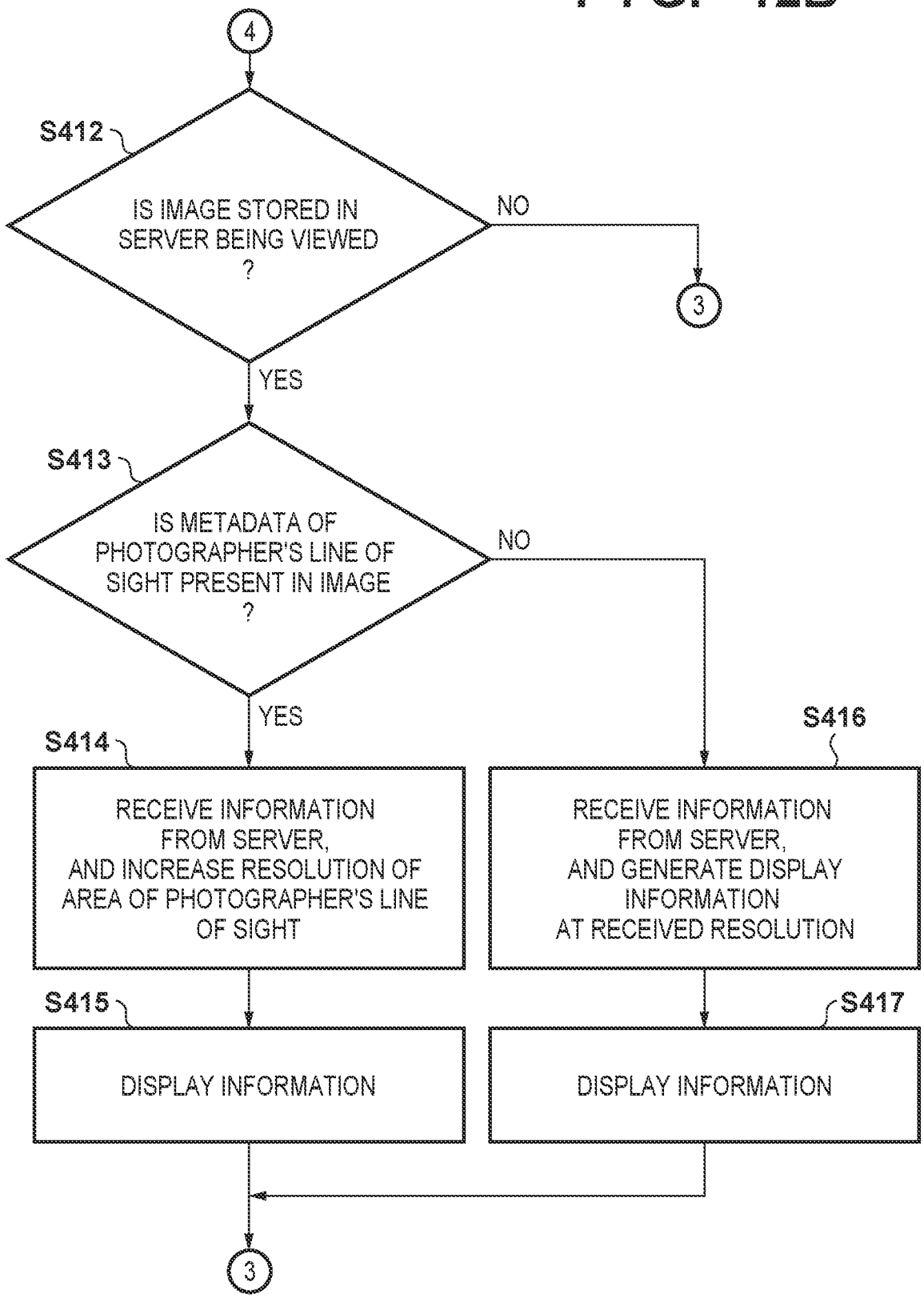
FIG. 12B is a diagram illustrating a control flow of the personal computer.

FIGS. 12A and 12B are flowcharts illustrating control of the personal computer for performing the operations described above.

In FIG. 12A, S401 represents initialization.

In S402, the CPU 475 of the personal computer 4000 determines whether or not a viewing mode in the personal computer has been selected. If a viewing mode in the personal computer has been selected, the sequence moves to S403, and if not, the sequence moves to S410, where other processing is executed.

In S403, the CPU 475 determines whether or not an image captured by the camera and currently being sent is being viewed. If an image captured by the camera is being viewed, the sequence moves to S404, and if not, the sequence moves to S412.

In S404, the CPU 475 receives an image captured by the camera and sent through wireless communication or the like, and obtains the metadata thereof.

In S405, the CPU 475 determines whether or not a display in which the area of the photographer's line of sight is set to a high resolution has been selected. If a display in which the area of the photographer's line of sight is set to a high resolution has been selected, the sequence moves to S406, and if not, the sequence moves to S409.

In S406, the CPU 475 determines whether or not the metadata includes information on the photographer's line of sight. If the metadata includes information on the photographer's line of sight, the sequence moves to S407, and if not, the sequence moves to S409.

In S407, the CPU 475 increases the resolution of the area of the photographer's line of sight.

In S408, the CPU 475 displays the information described above.

In S409, the CPU 475 generates display information at the received resolution.

In S410, the CPU 475 displays the information described above.

Moving to FIG. 12B, in S412, the CPU 475 determines whether or not an image stored in the server is being viewed. If an image stored in the server is being viewed, the sequence moves to S413, and if not, the sequence moves to S402.

In S413, the CPU 475 determines whether or not metadata of the photographer's line of sight is present in the image. If metadata of the photographer's line of sight is present in the image, the sequence moves to S414, and if not, the sequence moves to S416.

In S414, the CPU 475 receives information from the server, and increases the resolution of the area of the photographer's line of sight.

In S415, the CPU 475 displays the information described above.

In S416, the CPU 475 receives the information from the server, and generates display information at the received resolution.

In S417, the CPU 475 displays the information described above.

In the foregoing embodiment, the head-mounted display capable of displaying a three-dimensional image includes means for selecting a part which the viewer desires to view; means for detecting the part to view which the viewer has selected; and means for increasing the resolution of the detected part to view. The image obtained by increasing the resolution of the stated part can then be displayed.

Through this, in addition to viewing a recommended image, an object which the viewer wishes to view can be detected when the viewer wishes to view that object, and the image quality can be increased for that object, which enables the user to view a three-dimensional image in line with their intentions.

It is also possible to set a plurality of parts which the viewer desires to view. As a result, with outdoor scenery, it is possible to focus on viewing images of mountains, as well as focusing on viewing images of oceans. With training materials, e.g., with sports training materials, it is possible to focus on viewing foot movement, as well as focusing on viewing hand movement. In this manner, selecting a plurality of objects which the viewer desires to view makes it possible to display images in line with the viewer's desires.

In addition, the stated system includes means for inputting an object the viewer wishes to view, and means for registering the input object the viewer wishes to view and enabling the object to be selected the next time. Through this, the object selected by the viewer to be viewed can be selected from among the viewing candidates the next and subsequent times.

Additionally, an object that is registered as the object that the viewer wishes to view can be displayed, and furthermore, the object that the viewer wishes to view can be newly registered. This enables the viewer to add a new object that they wish to view, in addition to selecting from objects that others wish to view.

Embodiment 2

In Embodiment 1, specifying an individual person from a group of a plurality of people is conceivable as a method for selecting an object that the viewer wishes to view. In the present embodiment, an individual person is specified from a group of a plurality of people as a response to the question "whose fan are you?".

Figure 13:
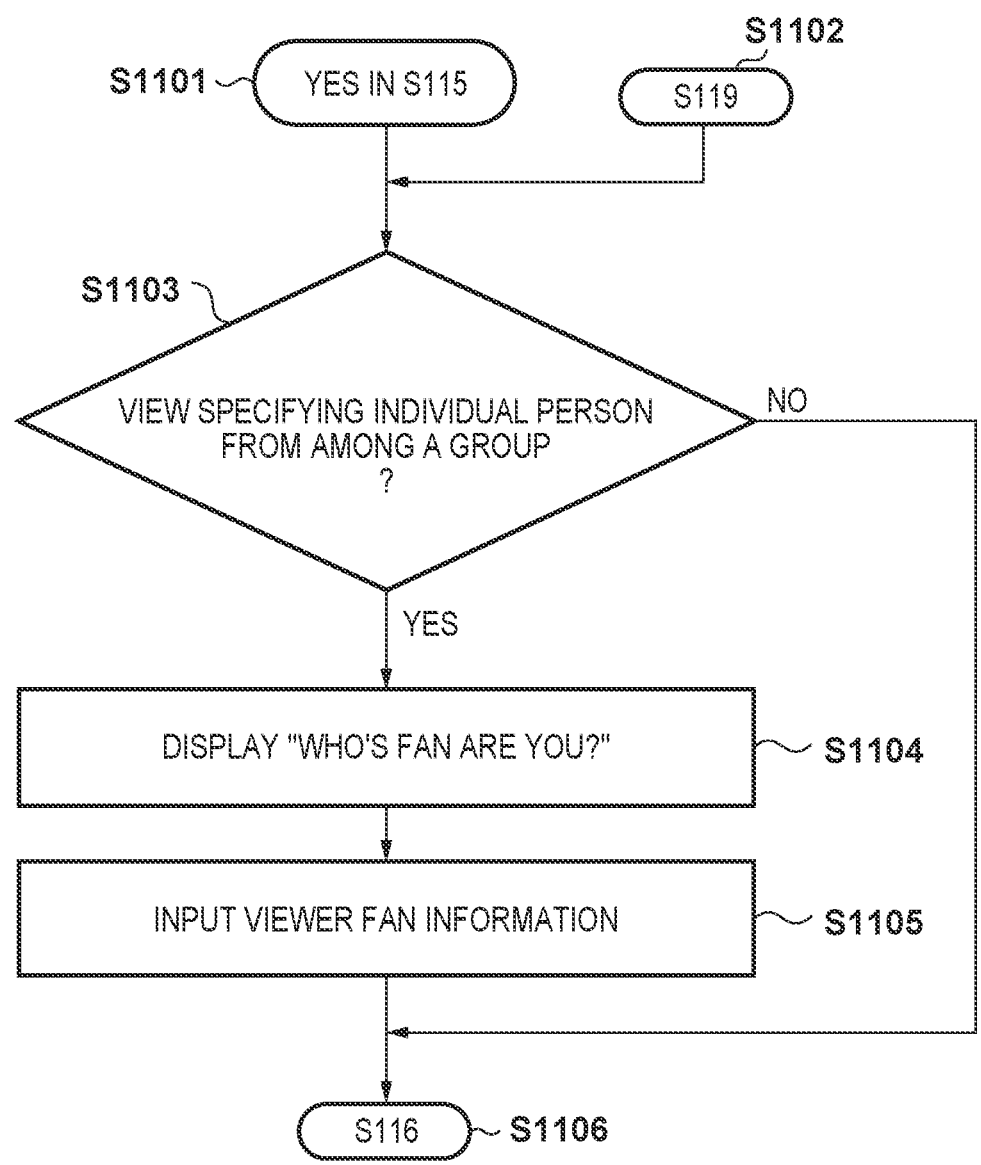
FIG. 13 is a diagram illustrating a control flow of the HMD.

FIG. 13 is a flowchart illustrating parts different from those in FIGS. 9A to 9C, in control of the HMD according to Embodiment 2.

In FIG. 13, S1101 represents "Yes" in S115 of FIG. 9B.

S1102 represents S119 of FIG. 9B.

In S1103, the CPU 355 of the HMD 3000 determines whether or not the viewing is viewing having specified an individual person from a group of a plurality of people. If the viewing is viewing having specified an individual person from a group of a plurality of people, the sequence moves to S1104, and if not, the sequence moves to S1106.

In S1104, the CPU 355 displays "whose fan are you?".

In S1105, the viewer inputs fan information.

S1106 represents S116 of FIG. 9B.

According to the present embodiment, an individual person can be specified from a group of a plurality of people as a method for selecting an object that the viewer wishes to view.

In addition, an individual person can be specified from a group of a plurality of people as a response to the question {whose fan are you?".

Through this, when there are a plurality of people in a group, a person who the viewer prefers can be displayed at high resolution, which makes it possible to increase the viewer's satisfaction.

Embodiment 3

In Embodiment 1, a performer of choice can be designated in advance as a method for specifying an individual person from a group of a plurality of people. In the present embodiment, an individual person is specified as a response to the message "a service for broadcasting your performer of choice at high quality is available".

Figure 14:
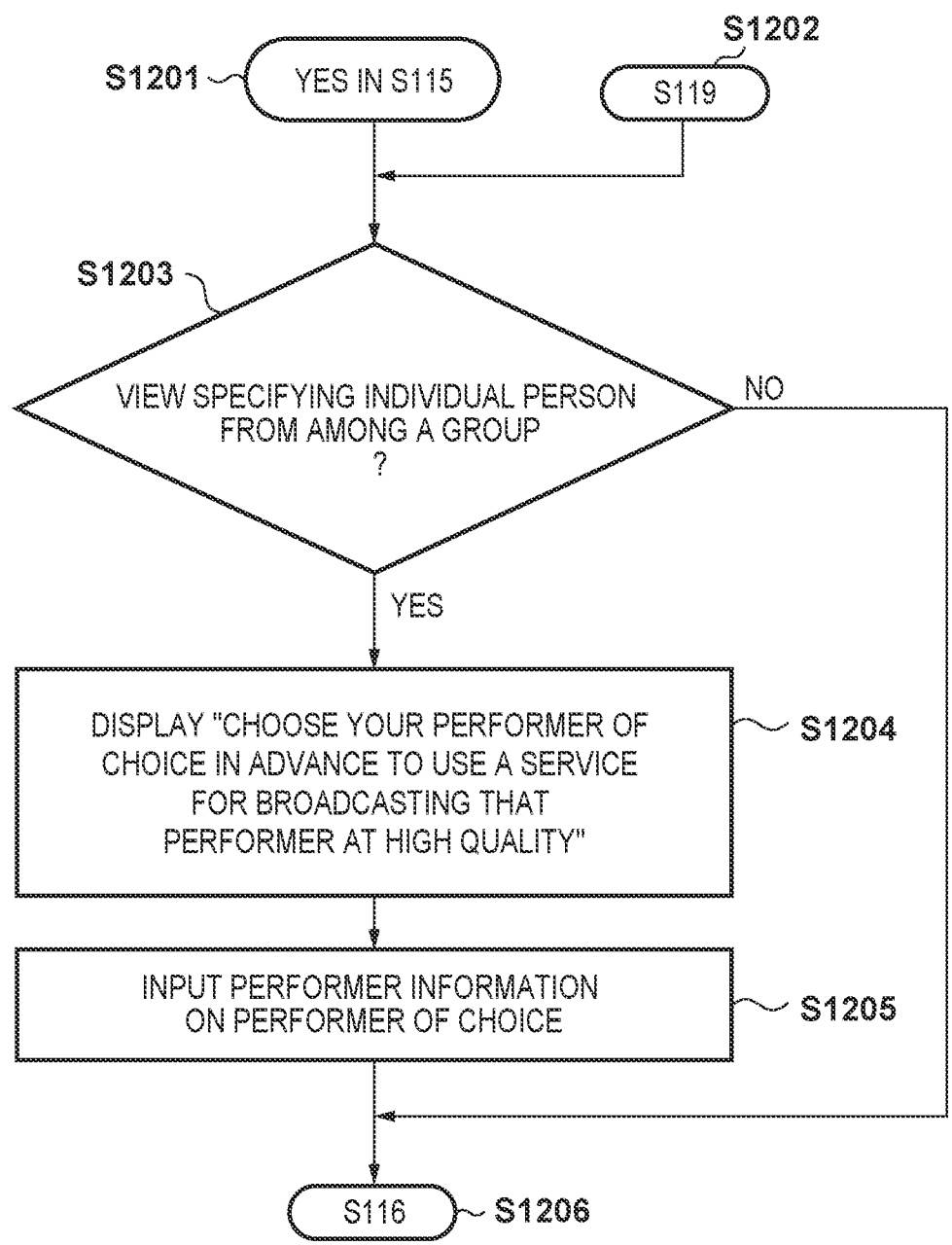
FIG. 14 is a diagram illustrating a control flow of the HMD.

FIG. 14 is a flowchart illustrating parts different from those in FIGS. 9A to 9C, in control of the HMD according to Embodiment 3.

In FIG. 14, S1201 represents "Yes" in S115 of FIG. 9B.

S1202 represents S119 of FIG. 9B.

In S1204, the CPU 355 displays "choose your performer of choice in advance to use a service for broadcasting that performer at high quality".

In S1205, the viewer inputs performer information on their performer of choice.

S1206 represents S116 of FIG. 9B.

According to the present embodiment, an individual person can be specified from a group of a plurality of people as a response to the message "choose your performer of choice in advance to use a service for broadcasting that performer at high quality".

This makes it possible to select a performer of choice from a group of a plurality of people and display that performer at a high resolution, which in turn makes it possible to increase the viewer's satisfaction.

Embodiment 4

Specifying an object that the viewer wishes to view from a plurality of body parts during physical training is conceivable as a method for selecting an image that the viewer wishes to view. In the present embodiment, an object the viewer wishes to view is specified from a plurality of body parts as a response to the message "specify a part of interest in advance to view that part in greater detail".

Figure 15:
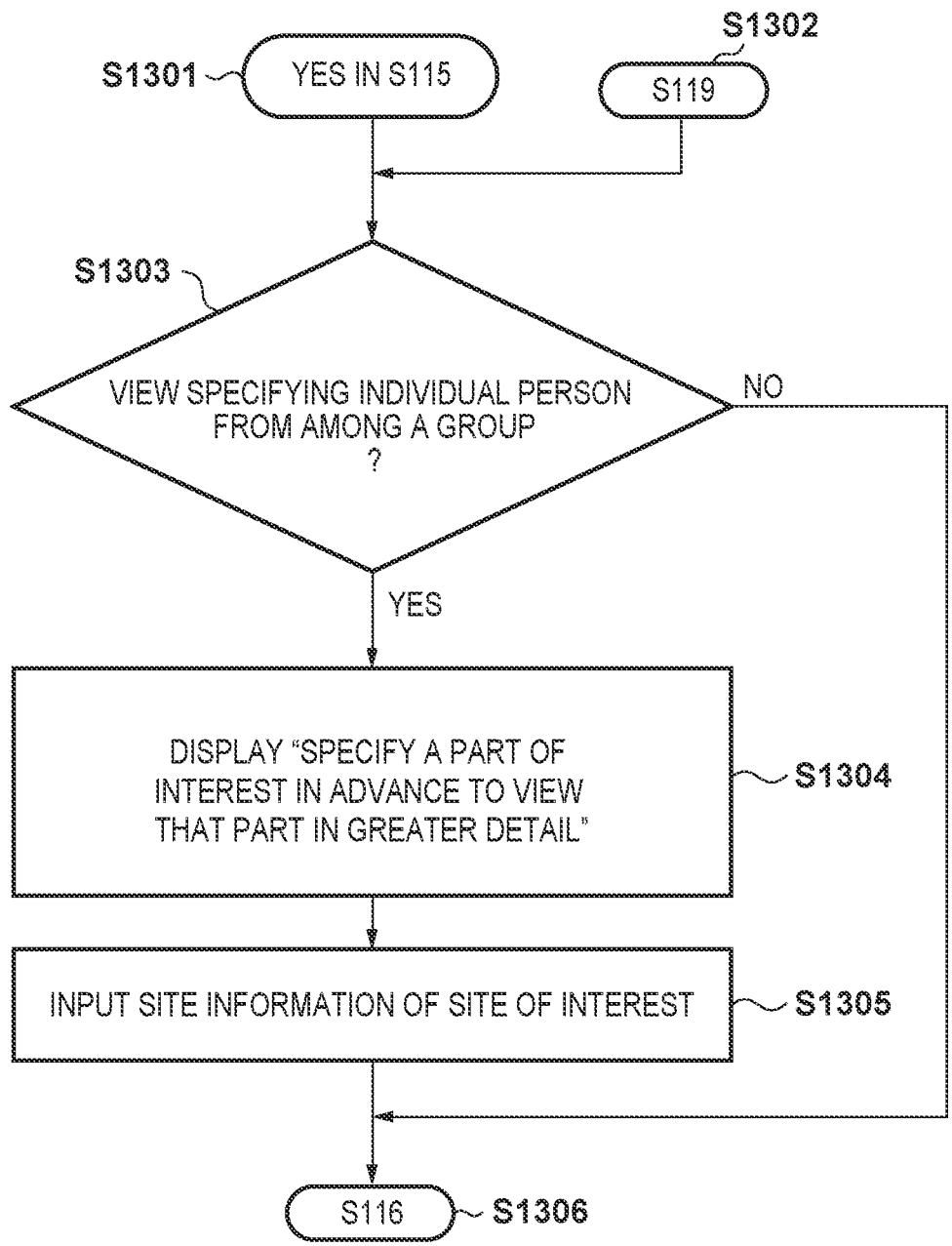
FIG. 15 is a diagram illustrating a control flow of the HMD.

FIG. 15 is a flowchart illustrating parts different from those in FIGS. 9A to 9C, in control of the HMD according to Embodiment 4.

In FIG. 15, S1301 represents "Yes" in S115 of FIG. 9B.

S1302 represents S119 of FIG. 9B.

In S1304, the CPU 355 displays "specify a part of interest in advance to view that part in greater detail".

In S1305, the viewer inputs site information of a site of interest.

S1306 represents S116 of FIG. 9B.

According to the present embodiment, an object the viewer wishes to view in physical training can be specified from a plurality of body parts as a response to the message "specify a part of interest in advance to view that part in greater detail".

This makes it possible to select and view parts of the body that are of interest to the viewer in training content or the like. For example, it is possible to view content with a focus on how one should move their legs or the like.

Embodiment 5

In the present embodiment, the purpose of an image in high demand from viewers is recognized, and viewing for that purpose is added to the viewing selections. Specifically, means for detecting a viewer's level of satisfaction after viewing is provided. Then, the viewing is recognized as viewing of an image in high demand from viewers and that a predetermined percentage of viewers are satisfied after viewing, and viewing for that purpose is added to the viewing selections. Other head-mounted displays are then notified of information in which the viewing for the given purpose is added to the viewing selections. Then, a head-mounted display notified of the information in which the viewing for the given purpose is added to the viewing selections, adds viewing for that purpose to the viewing selections.

FIGS. 16A to 16E are flowcharts illustrating control of the HMD for performing the operations described above. In FIGS. 16A to 16E, steps different from those in FIG. 9 are given step numbers in the S2100 series of numbers.

Figure 16A:
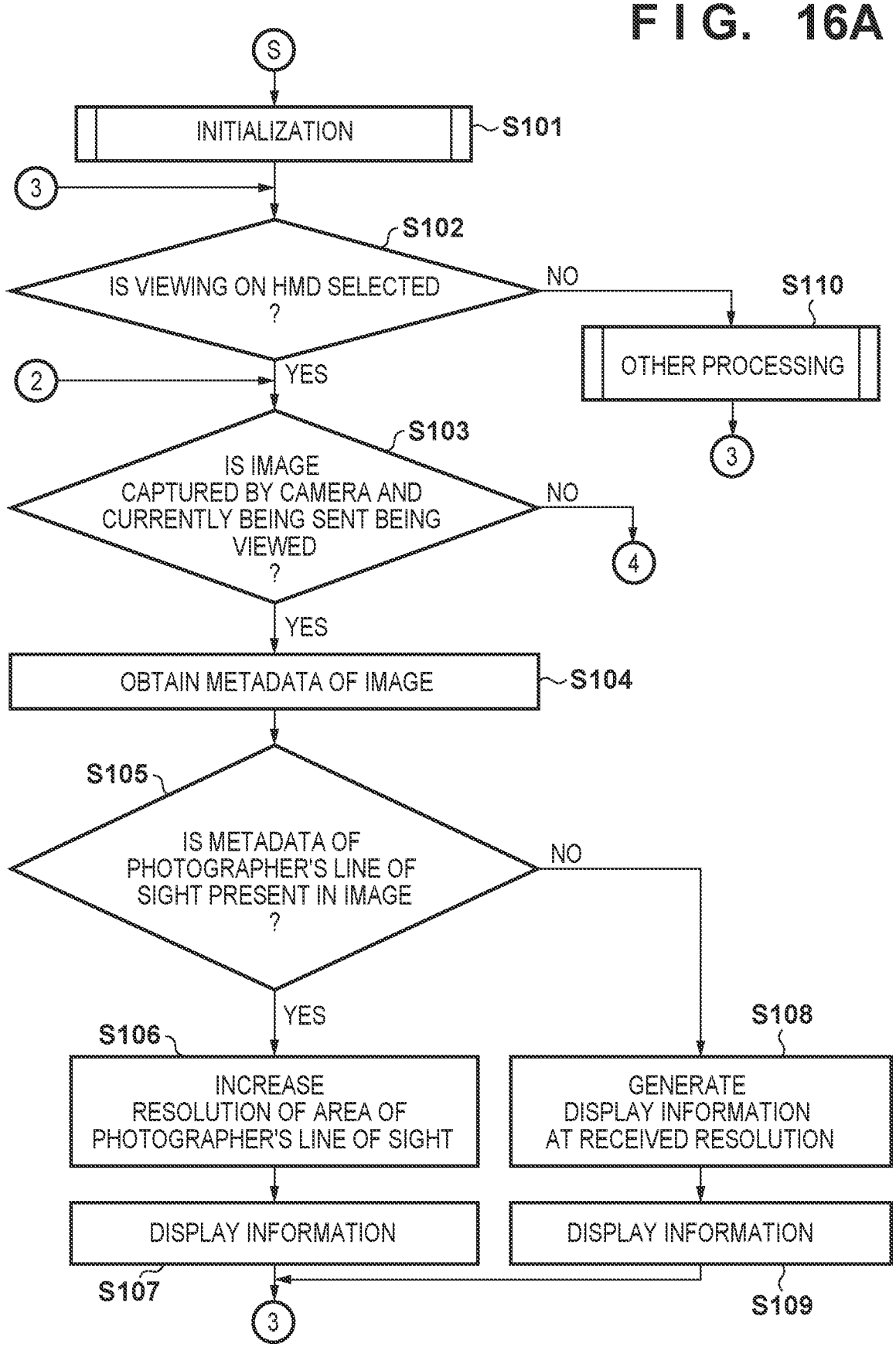
FIG. 16A is a diagram illustrating a control flow of the HMD.
Figure 16B:
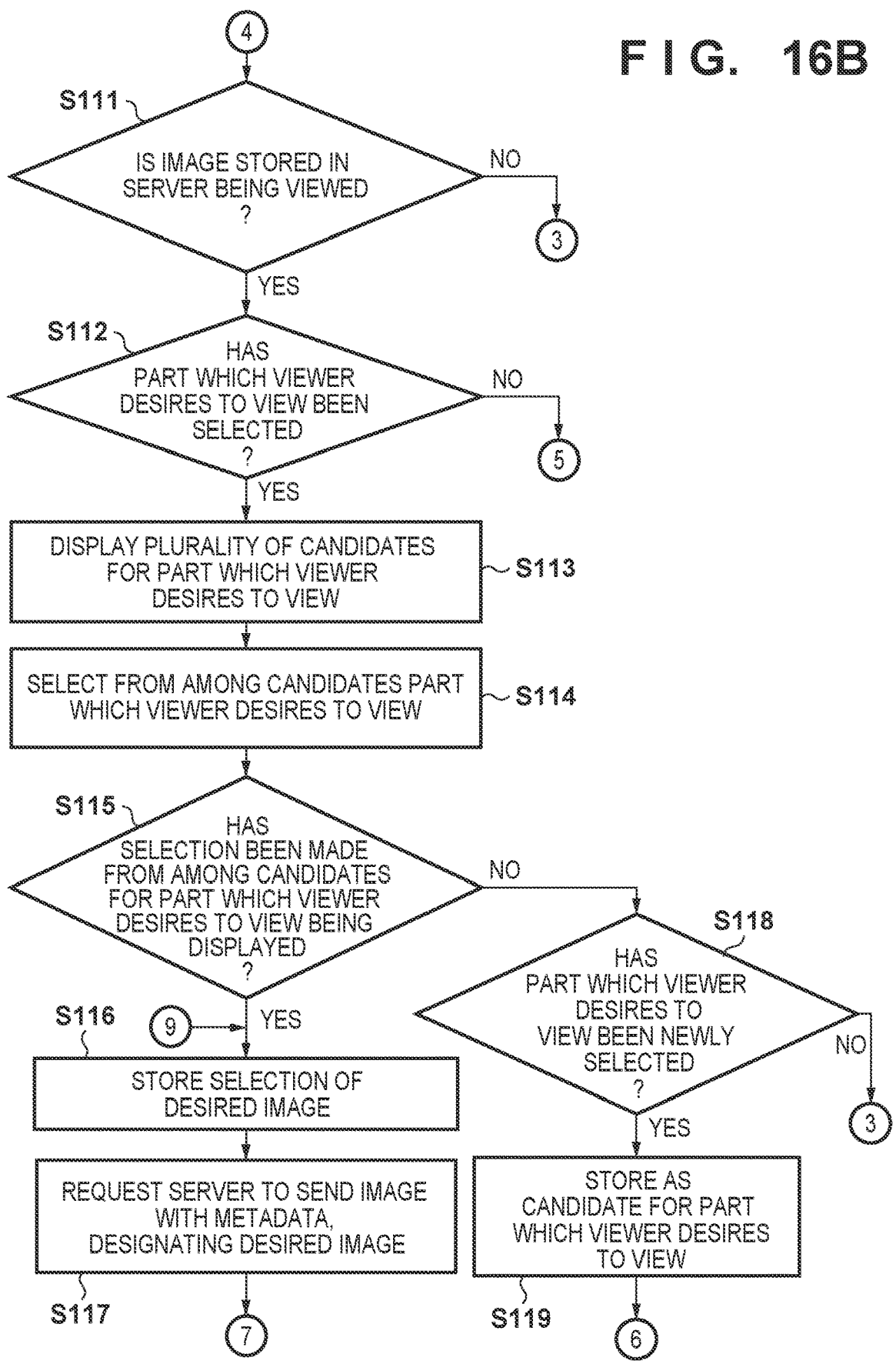
FIG. 16B is a diagram illustrating a control flow of the HMD.
Figure 16C:
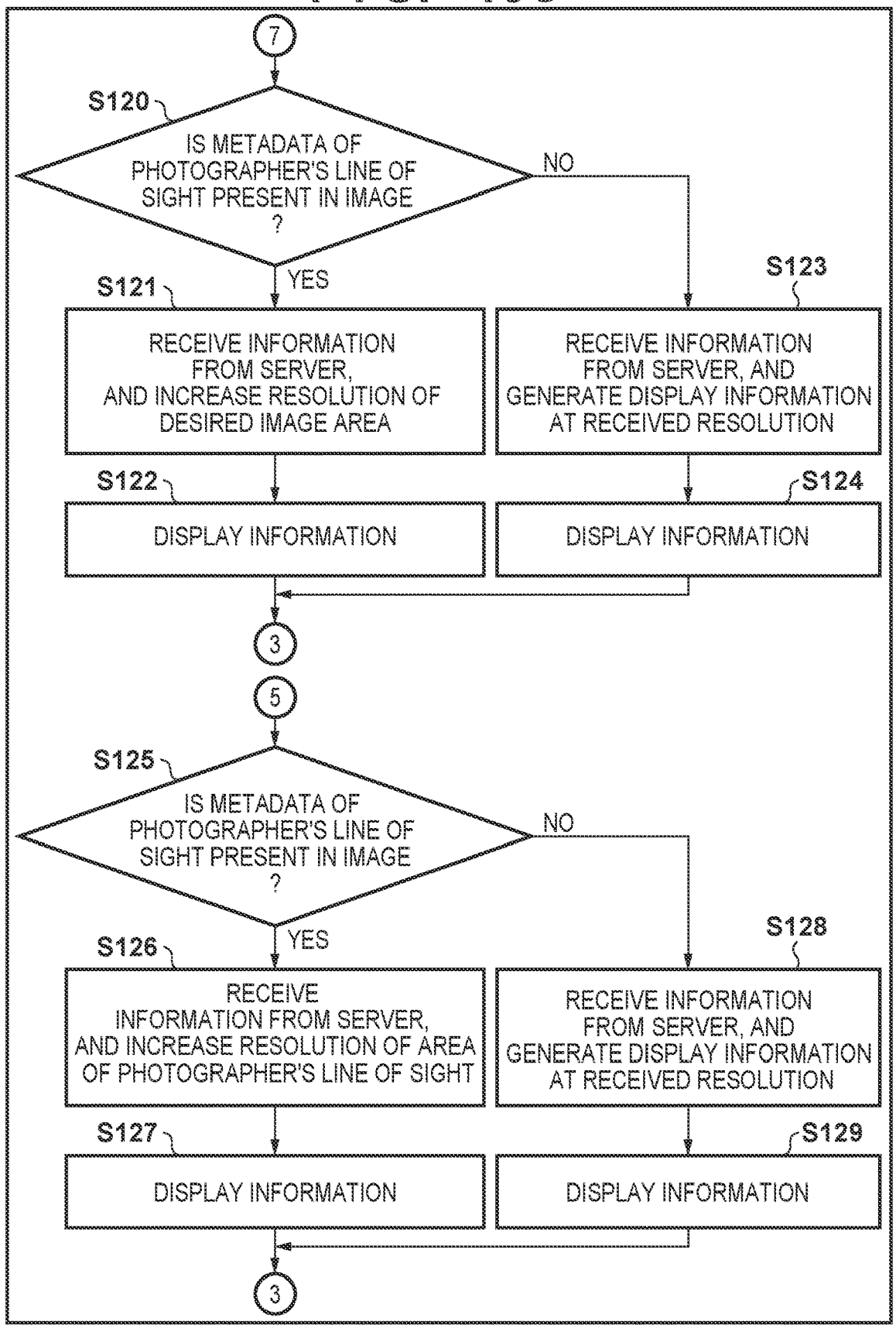
FIG. 16C is a diagram illustrating a control flow of the HMD.
Figure 16D:
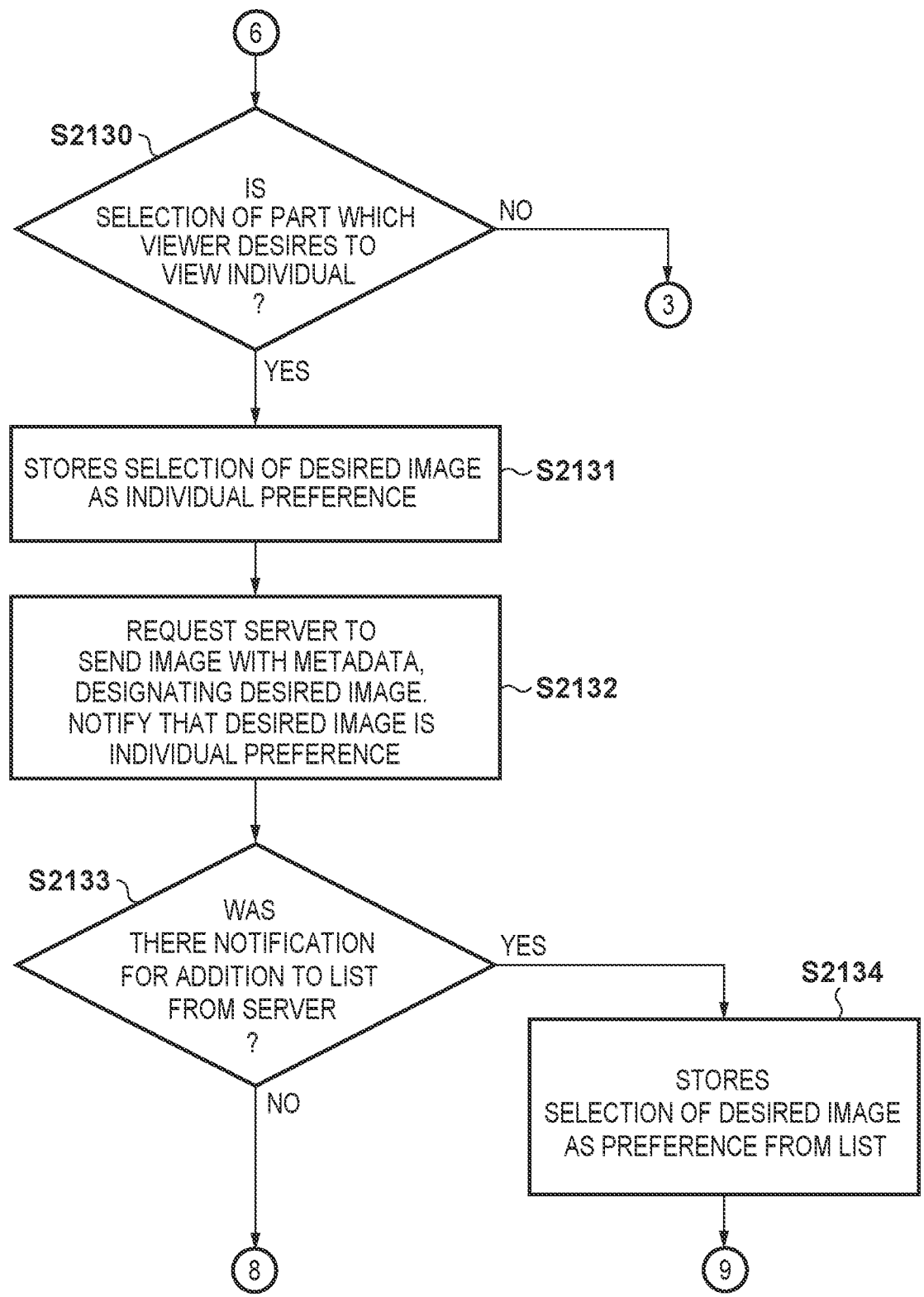
FIG. 16D is a diagram illustrating a control flow of the HMD.

In FIG. 16D, in S2130, the CPU 355 determines whether or not the selection of the part which the viewer desires to view is an individual selection. If the selection of the part which the viewer desires to view is an individual selection, the sequence moves to S2131, and if not, the sequence moves to S102.

In S2131, the CPU 355 stores the selection of the desired image as an individual preference.

In S2132, the CPU 355 requests the server to send an image with metadata, designating the desired image. A notification is made indicating that the desired image is an individual preference.

In S2133, the CPU 355 determines whether or not a notification for an addition to a list has been made from the server. If a notification for an addition to the list has been received from the server, the sequence moves to S2134, and if not, the sequence moves to S2135.

In S2134, the CPU 355 stores the selection of the desired image as a preference from the list.

Figure 16E:
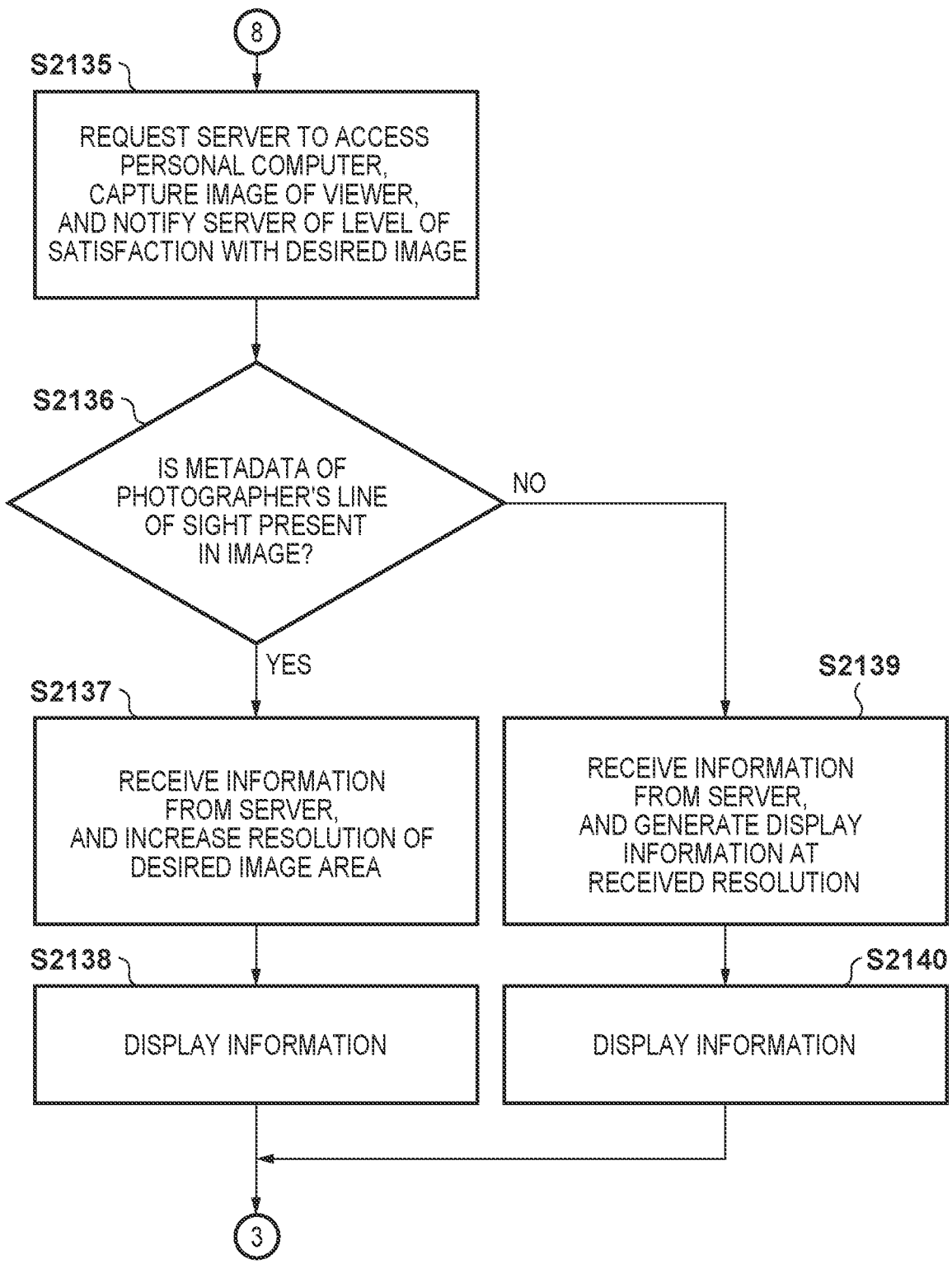
FIG. 16E is a diagram illustrating a control flow of the HNMD.

Moving to FIG. 16E, in S2135, the CPU 355 requests the server to access the personal computer 4000, capture an image of the viewer, and notify the server of the level of satisfaction with the desired image.

In S2136, the CPU 355 determines whether or not metadata for the desired image area is present in the image. If metadata for the desired image area is present in the image, the sequence moves to S2137, and if not, the sequence moves to S2139.

In S2137, the CPU 355 receives information from the server, and increases the resolution of the desired image area.

In S2138, the CPU 355 displays the information described above.

In S2139, the CPU 355 receives the information from the server, and generates display information at the received resolution.

In S2140, the CPU 355 displays the information described above.

Figure 17A:
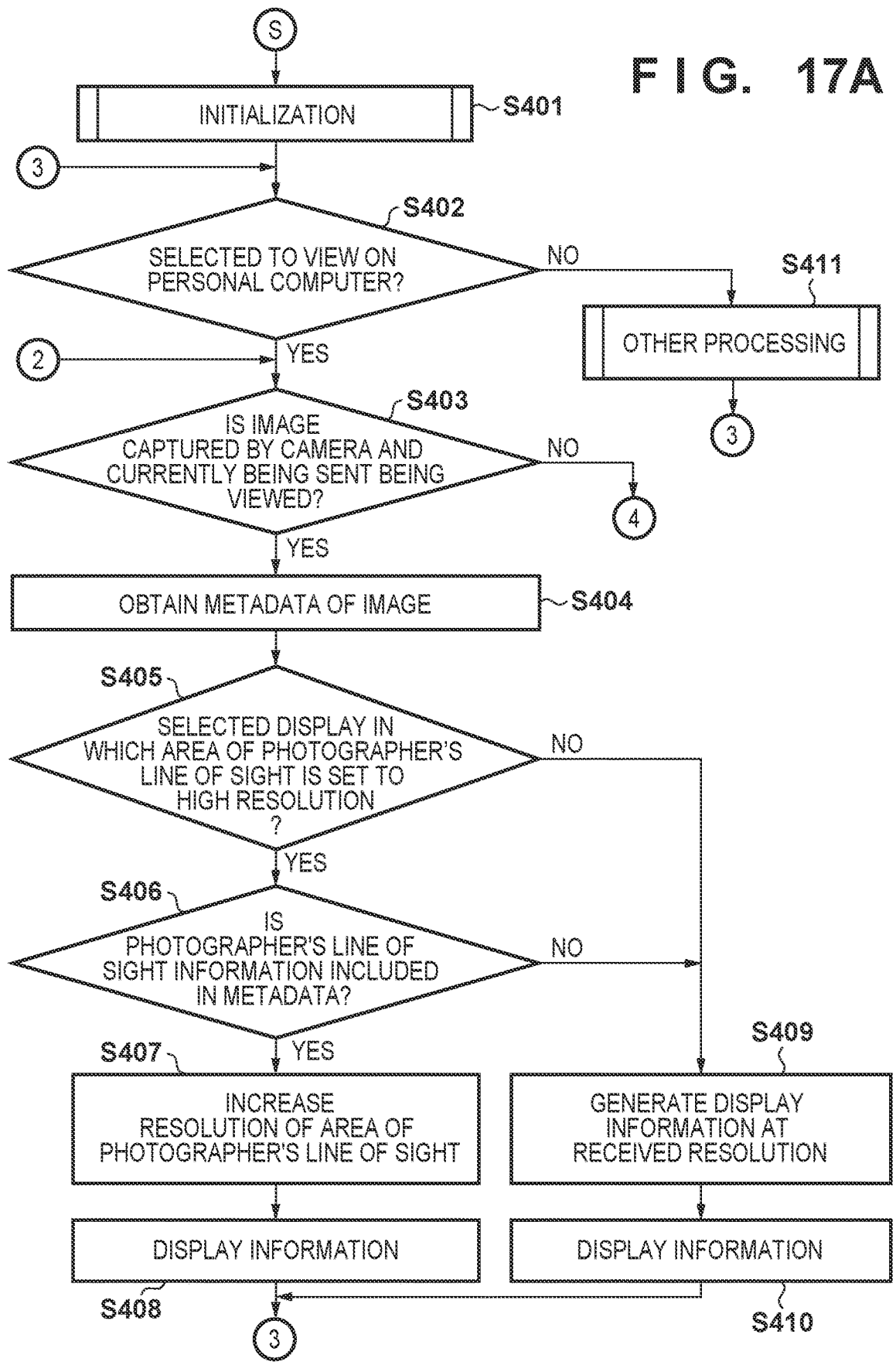
FIG. 17A is a diagram illustrating a control flow of the personal computer.
Figure 17B:
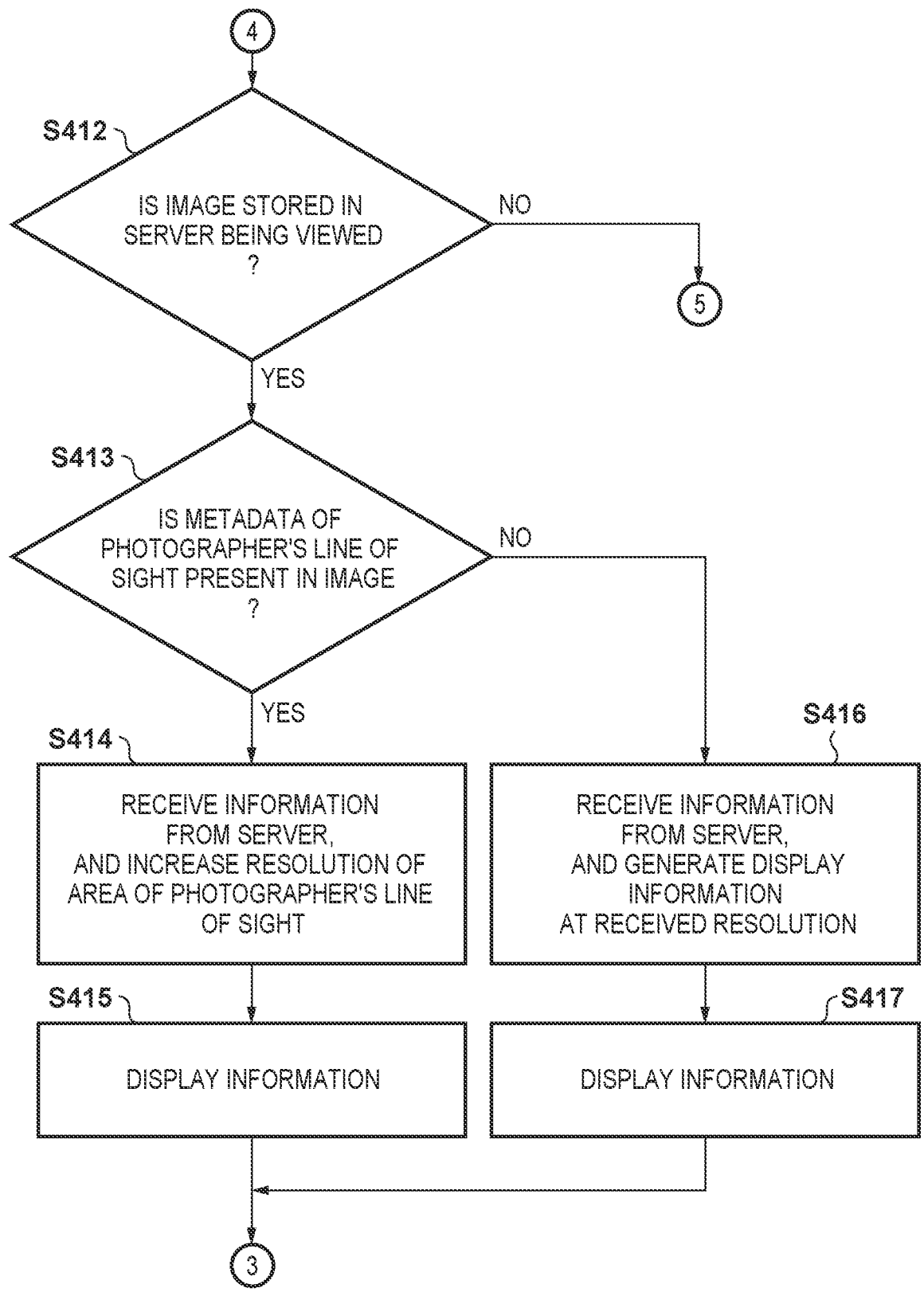
FIG. 17B is a diagram illustrating a control flow of the personal computer.
Figure 17C:
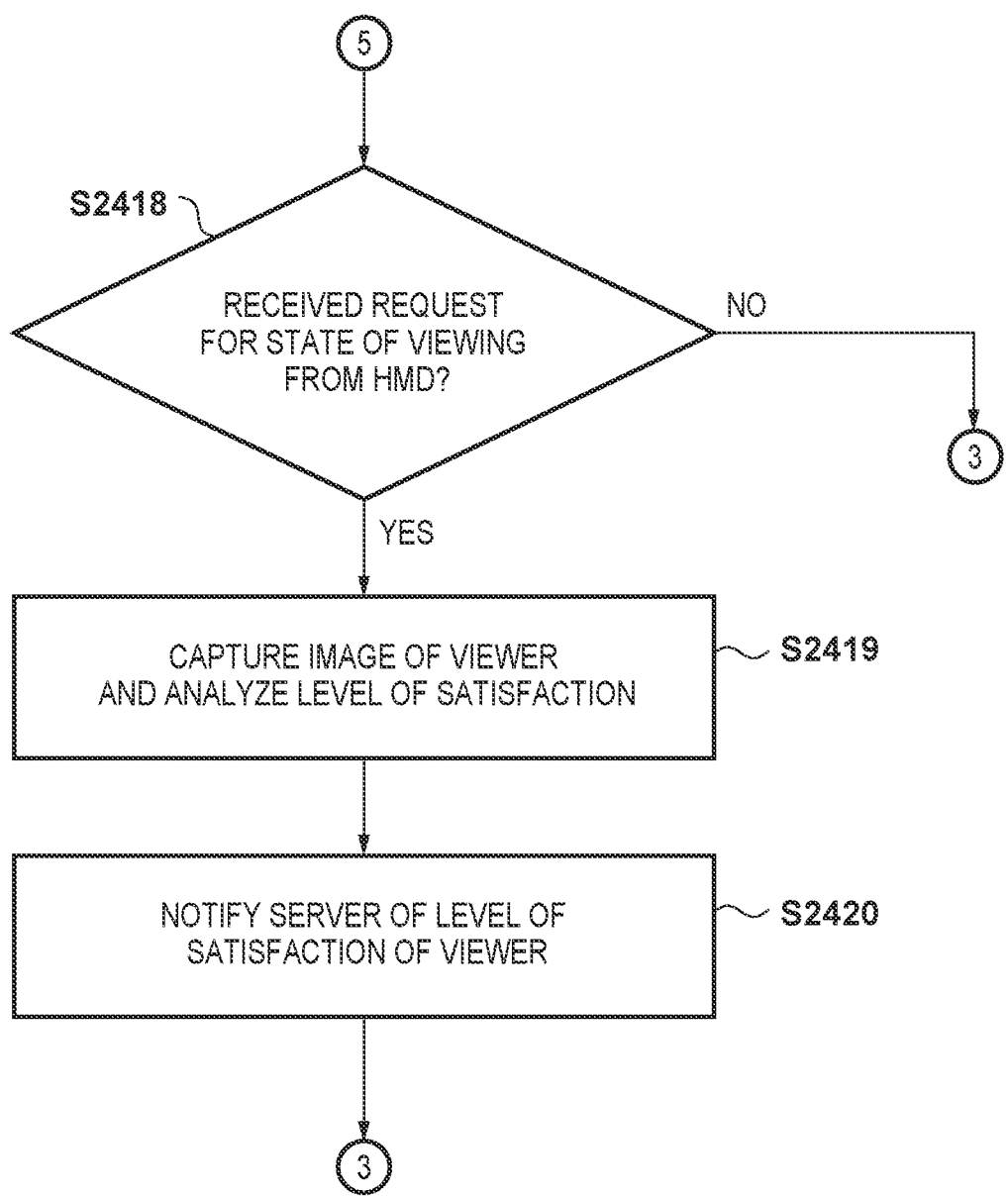
FIG. 17C is a diagram illustrating a control flow of the personal computer.

FIGS. 17A to 17C are flowcharts illustrating control of the personal computer that performs the control described above. In FIGS. 17A to 17C, steps different from those in FIGS. 12A and 12B are given step numbers in the S2400 series of numbers.

In FIG. 17C, in S2418, the CPU 475 of the personal computer 4000 determines whether or not a request for the state of viewing has been received from the HMD. If a request for the state of viewing has been received from the HMD, the sequence moves to S2419, and if not, the sequence moves to S402.

In S2419, the CPU 475 captures an image of the viewer and analyzes the level of satisfaction.

In S2420, the CPU 475 notifies the server of the viewer's level of satisfaction.

FIGS. 18A to 18G are flowcharts illustrating control of the server that performs the control described above. In FIGS. 18A to 18G, steps different from those in FIGS. 10A to 10D are given step numbers in the S2200 series of numbers.

Figure 18A:
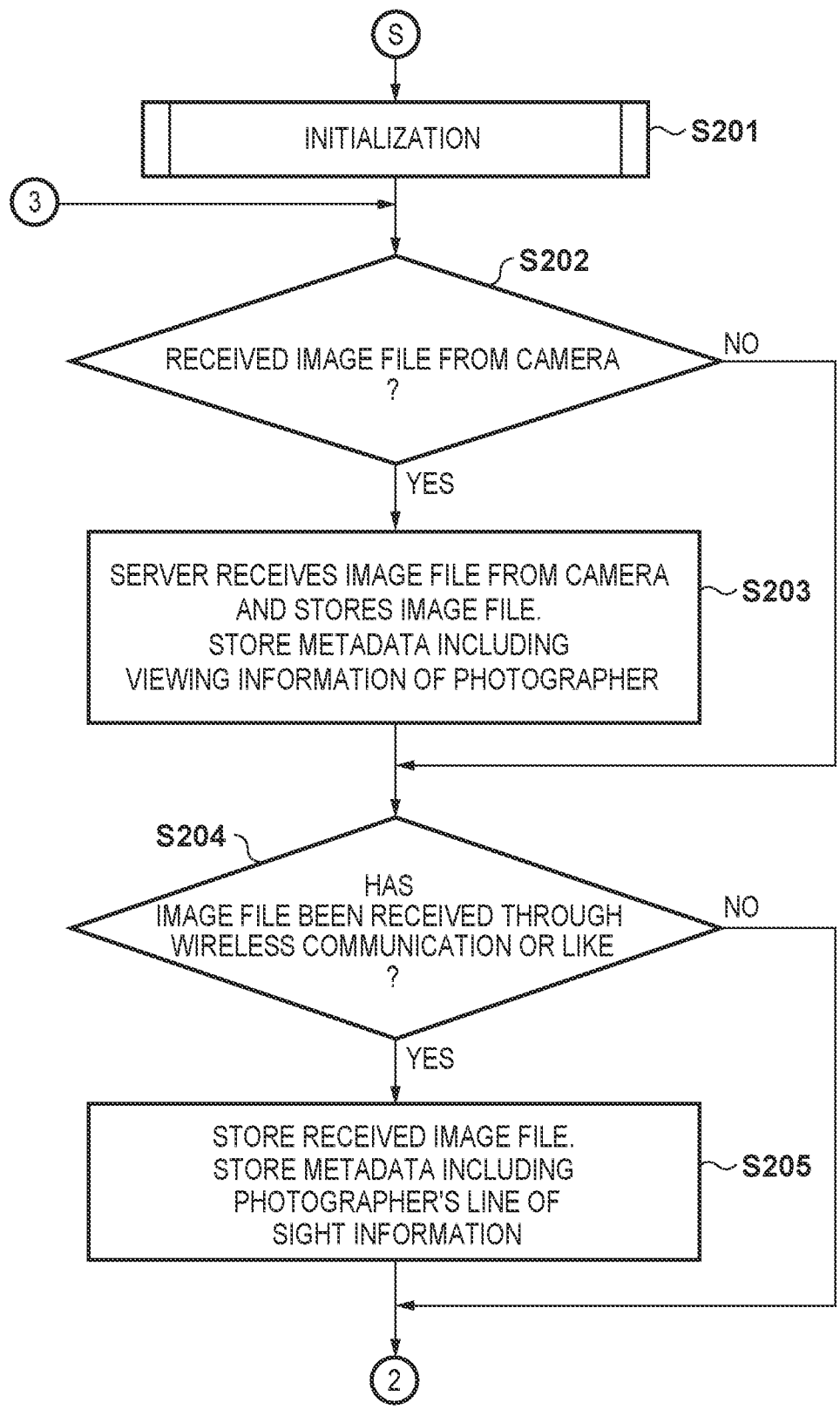
FIG. 18A is a diagram illustrating a control flow of the server.
Figure 18B:
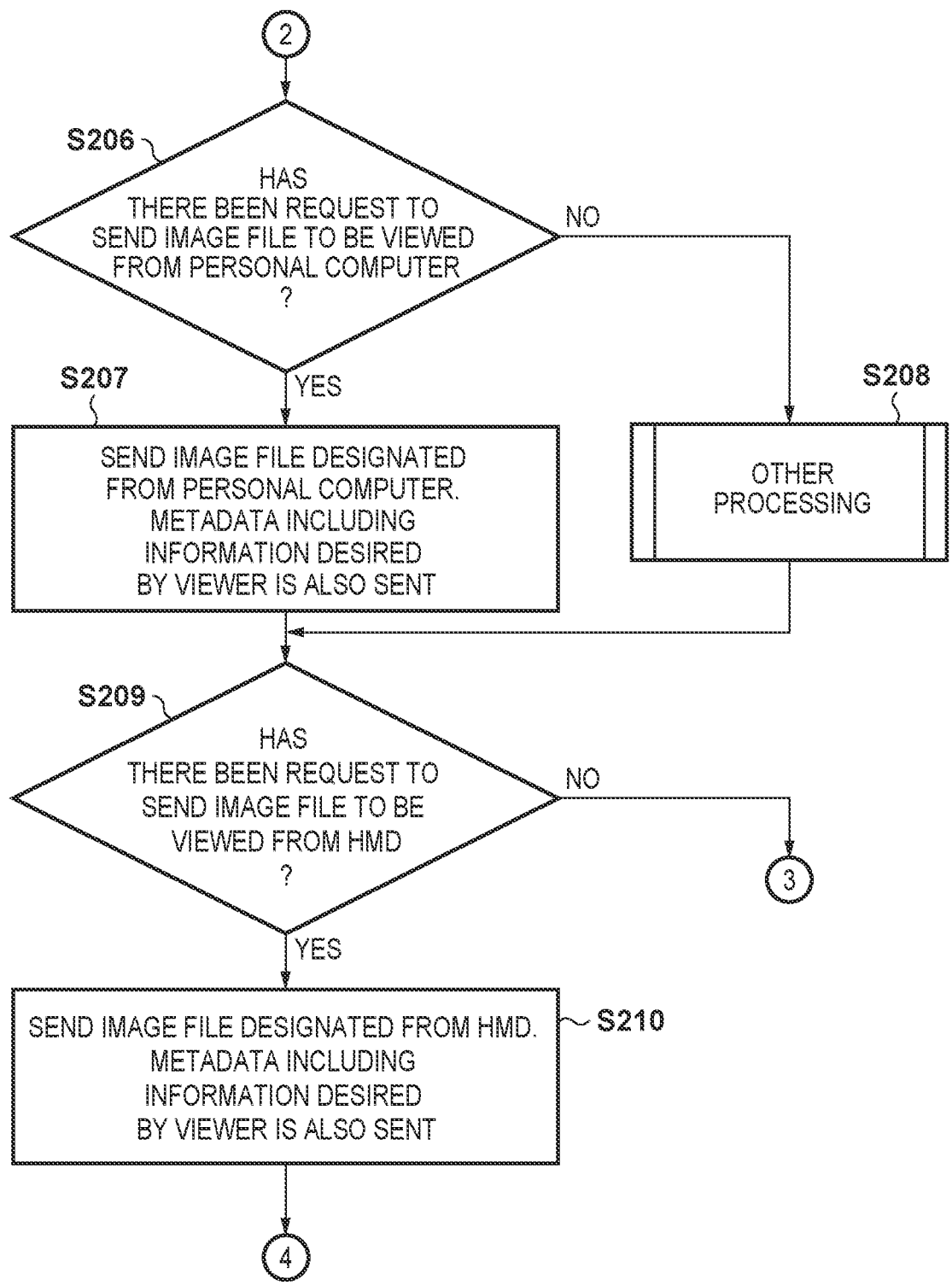
FIG. 18B is a diagram illustrating a control flow of the server.
Figure 18C:
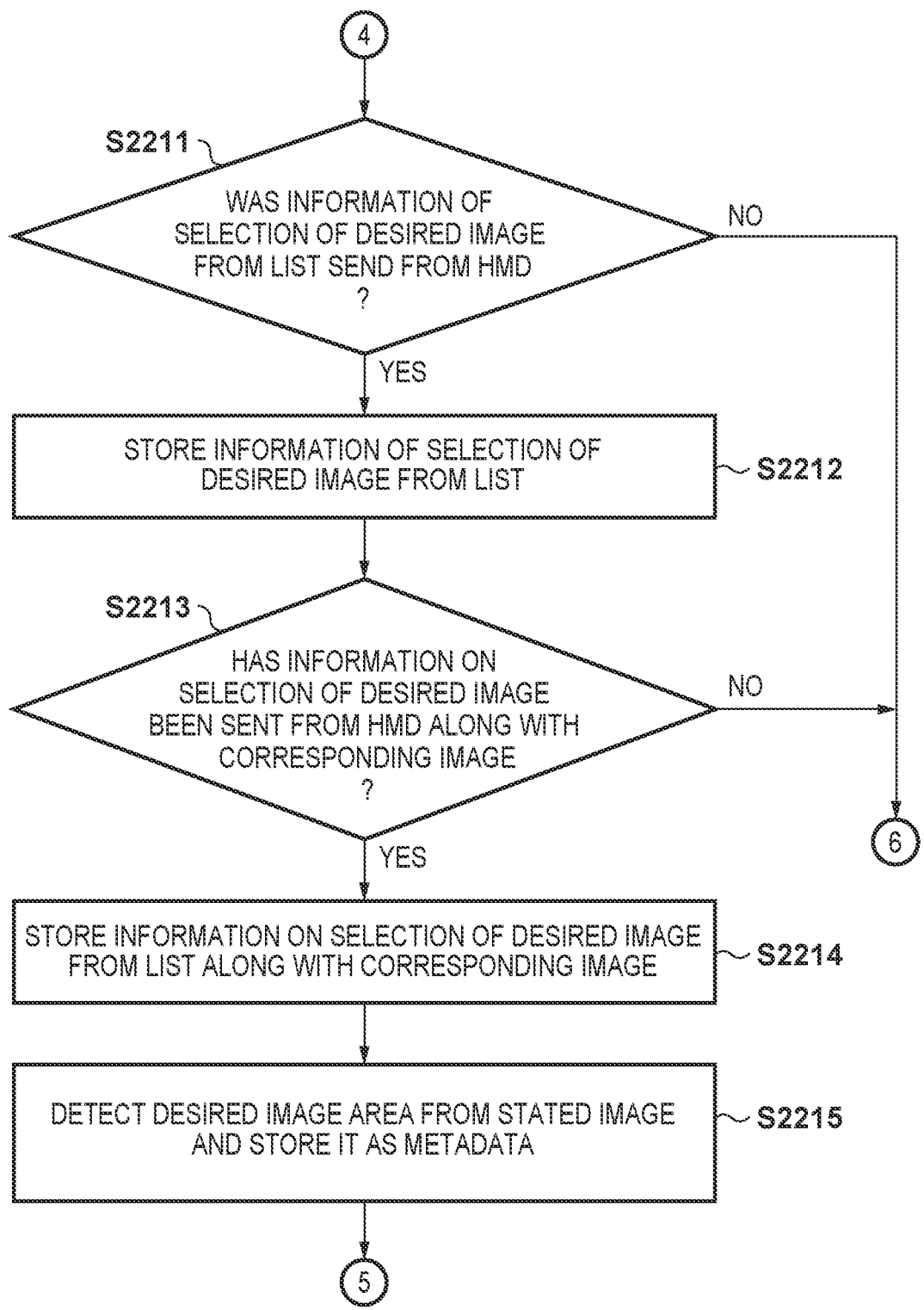
FIG. 18C is a diagram illustrating a control flow of the server.

In FIG. 18C, in S2211, the CPU 591 of the server 5000 determines whether or not information on the selection of a desired image from the list has been sent from the HMD. If information on the selection of a desired image from the list has been sent from the HMD, the sequence moves to S2212, and if not, the sequence moves to S2218.

In S2212, the CPU 591 stores the information on the selection of the desired image from the list.

In S2213, the CPU 591 determines whether or not the information on the selection of the desired image has been sent from the HMD along with the corresponding image. If the information on the selection of the desired image has been sent from the HMD along with the corresponding image, the sequence moves to S2214, and if not, the sequence moves to S2218.

In S2214, the CPU 591 stores the information on the selection of the desired image from the list along with the corresponding image.

In S2215, the CPU 591 detects a desired image area in the stated image and stores the image area as metadata.

Figure 18D:
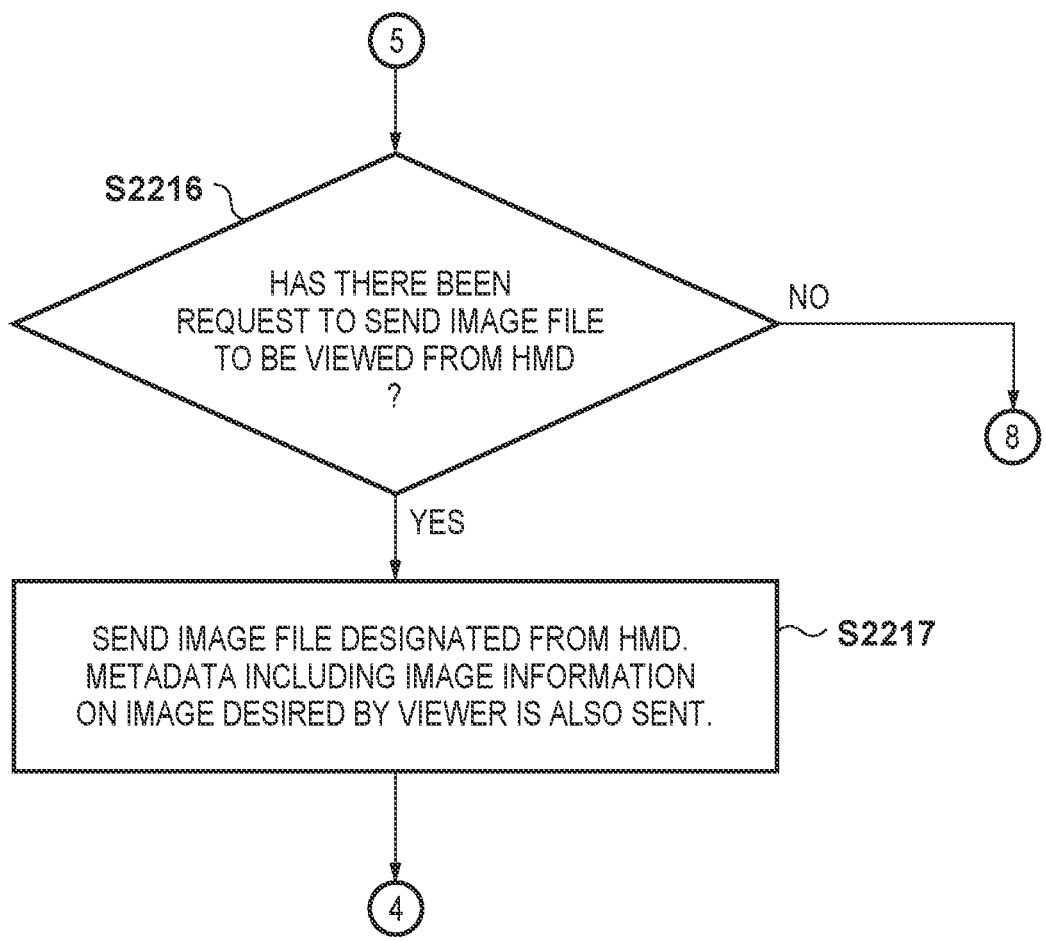
FIG. 18D is a diagram illustrating a control flow of the server.

Moving to FIG. 18D, in S2216, the CPU 591 determines whether or not there has been a request, from the HMD, to send an image file corresponding to the image desired to be viewed. If there has been a request, from the HMD, to send an image file corresponding to the image desired to be viewed, the sequence moves to S2217, and if not, the sequence moves to S216.

In S2217, the CPU 591 sends the image file designated from the HMD. Metadata including image information on the image desired by the viewer is also sent.

Figure 18E:
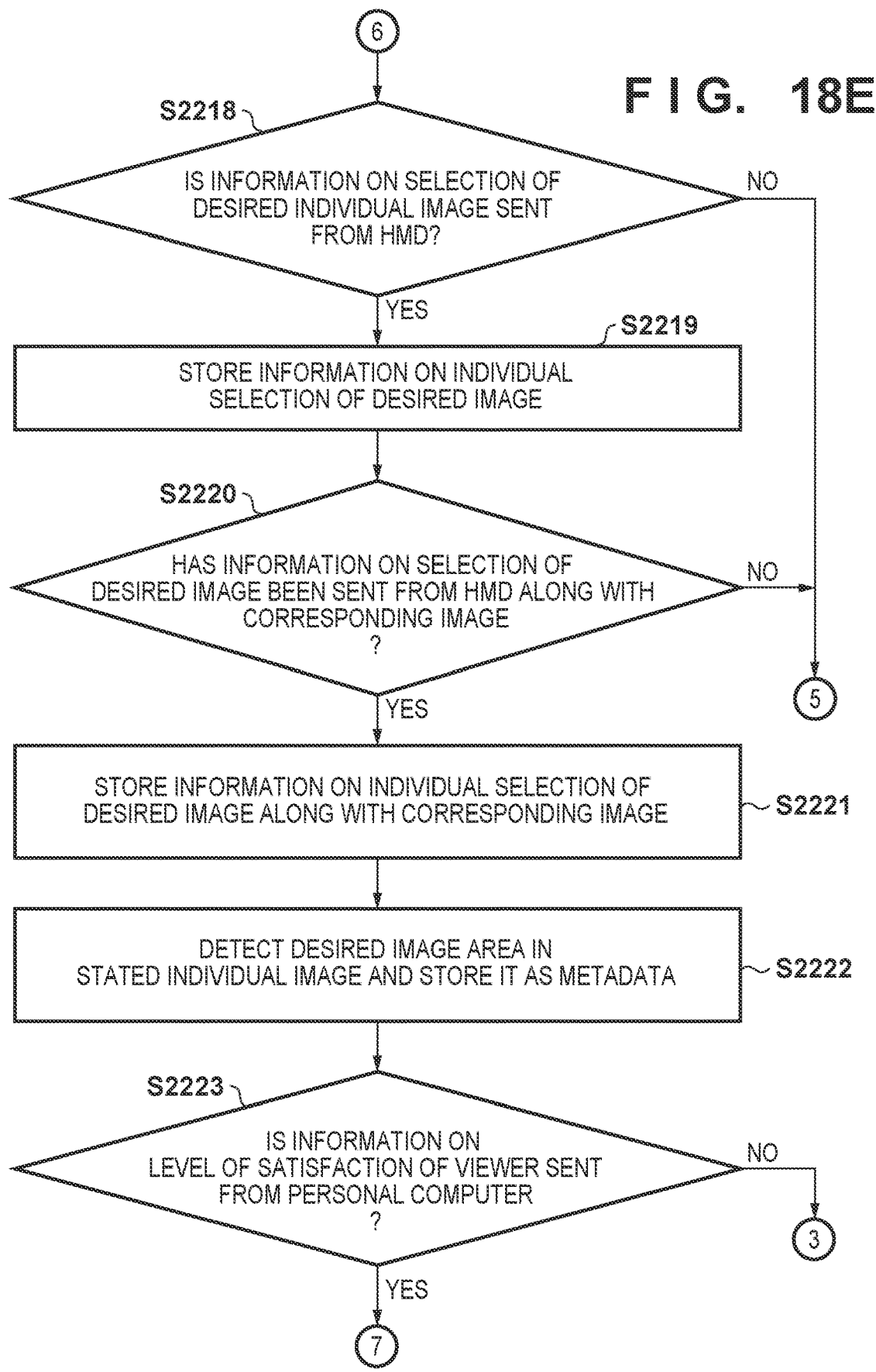
FIG. 18E is a diagram illustrating a control flow of the server.

Moving to FIG. 18E, in S2218, it is determined whether or not information on the individual selection of a desired image has been sent from the HMD. If information on the individual selection of a desired image has been sent from the HMD, the sequence moves to S2219, and if not, the sequence moves to S2216.

In S2219, the CPU 591 stores the information on the individual selection of the desired image.

In S2220, the CPU 591 determines whether or not the information on the selection of the desired image has been sent from the HMD along with the corresponding image. If the information on the selection of the desired image has been sent from the HMD along with the corresponding image, the sequence moves to S2221, and if not, the sequence moves to S2216.

In S2221, the CPU 591 stores the information on the individual selection of the desired image along with the corresponding image.

In S2222, the CPU 591 detects a desired image area in the stated individual image and stores the image area as metadata.

In S2223, the CPU 591 determines whether or not information on the viewer's level of satisfaction has been sent from the personal computer. If information on the viewer's level of satisfaction has been sent from the personal computer, the sequence moves to S2224, and if not, the sequence moves to S202.

Figure 18F:
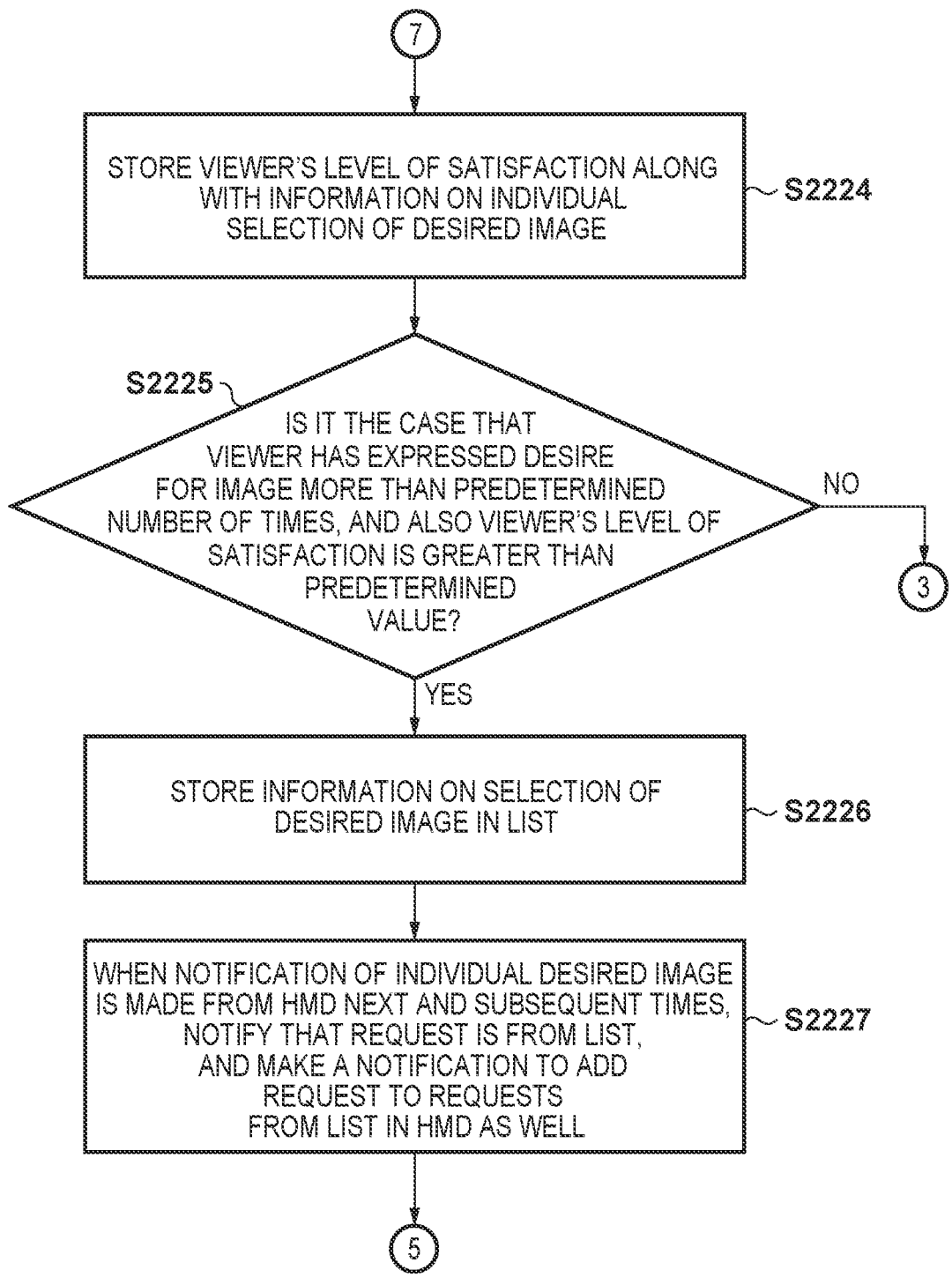
FIG. 18F is a diagram illustrating a control flow of the server.
Figure 18G:
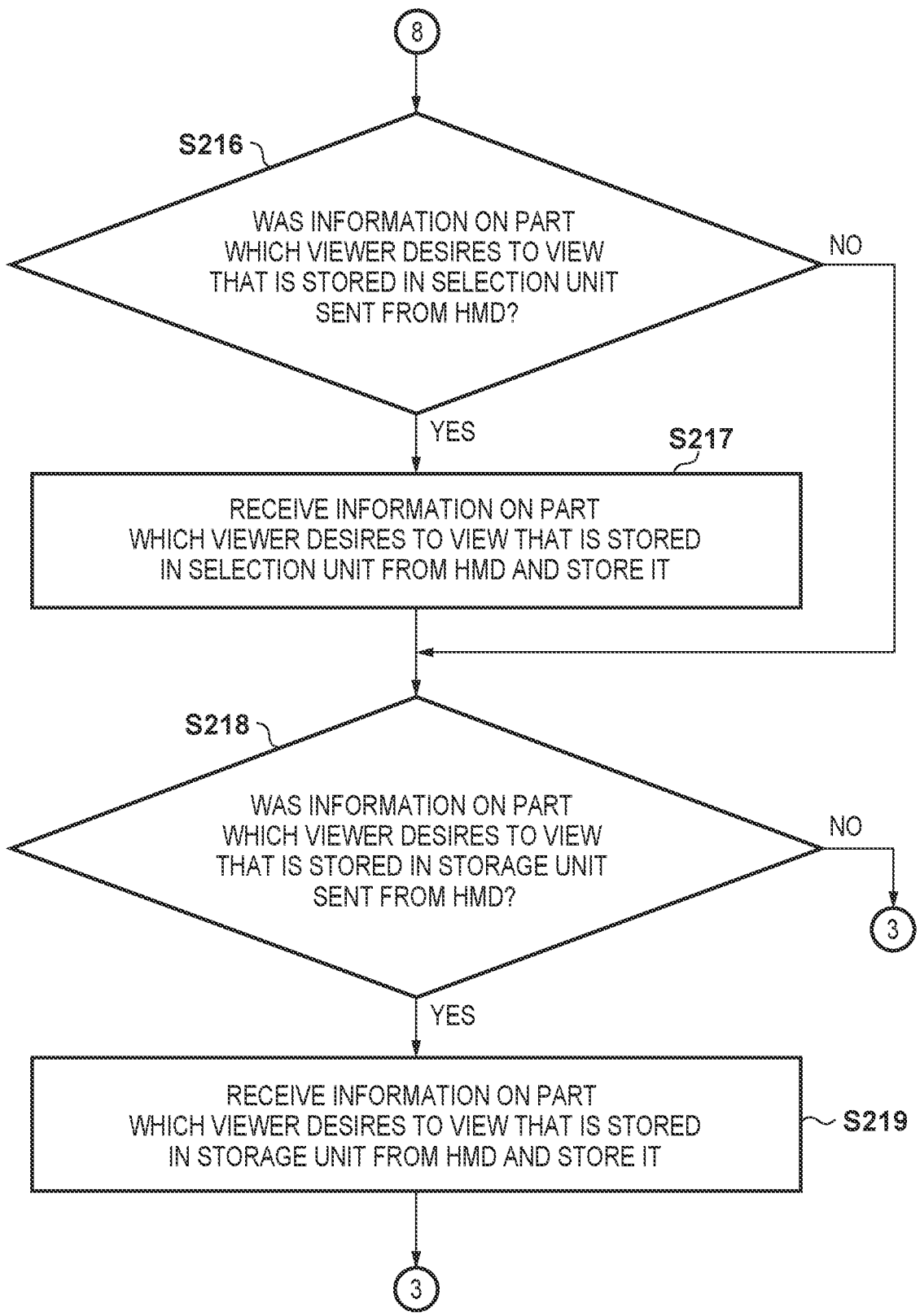
FIG. 18G is a diagram illustrating a control flow of the server.

Moving to FIG. 18F, in S2224, the CPU 591 stores the viewer's level of satisfaction along with the information on the individual selection of the desired image.

In S2225, the CPU 591 determines whether the viewer has expressed desire for the image more than a predetermined number of times, and furthermore, whether the viewer's level of satisfaction is greater than a predetermined value. If the viewer has expressed desire for the image more than the predetermined number of times, and furthermore, the viewer's level of satisfaction is greater than the predetermined value, the sequence moves to S2226, and if not, the sequence moves to S202.

In S2226, the CPU 591 stores the information on the selection of the desired image in the list.

In S2227, when a notification of an individual desired image is made from the HMD the next and subsequent times, the CPU 591 makes a notification indicating that the request is from the list, and makes a notification to add that request to requests from the list in the HMD as well.

In the present embodiment, the purpose of an image for which viewing is in high demand from viewers is recognized, and viewing for that purpose is added to the viewing selections.

This makes it possible to select a plurality of types of images desired to be viewed by a plurality of viewers, and makes it easy for the viewers to select their desired image.

In addition, means for detecting the viewers' level of satisfaction after viewing is provided, the viewing is recognized as viewing of an image in high demand from viewers and that a predetermined percentage of viewers are satisfied after viewing, and viewing for that purpose is added to the viewing selections.

Then, if the image is an image in high demand from viewers and the viewers' level of satisfaction is high, the image is added to the viewing selections. This makes it possible to select a desired image, which improves the convenience for the viewer.

Additionally, other head-mounted displays are then notified of information in which the viewing for the given purpose is added to the viewing selections.

Through this, the head-mounted display is notified of the desired image added to general selections, which improves the convenience of selecting the desired image.

In addition, a head-mounted display notified of the information in which the viewing for the given purpose is added to the viewing selections adds viewing for that purpose to the viewing selections.

Through this, the head-mounted display is notified of the desired image added to general selections, which improves the convenience of selecting the desired image.

Embodiment 6

In Embodiment 6, the server adds metadata to the image and sends the image. Here, the metadata sent by the server includes attribute information indicating that the resolution is to be increased. Then, in the head-mounted display, the attribute information sent by the server is recognized, an area in the attribute information is detected from the received image, and the area is displayed at an increased resolution.

On the server side, characteristic information for increasing the resolution is added to the image as metadata. Then, an area in the characteristic information is detected in the HMD, and that part is displayed at an increased resolution.

In other words, the server adds the metadata including the attribute information to the image and sends the image, and the head-mounted display displays the part of the attribute information included in the metadata at an increased resolution.

Operations in Embodiment 6 will be described next. Server-side operations are illustrated in FIGS. 18C and 18D.

In S2214, the CPU 591 of the server 5000 stores the information on the selection of the desired image from the list along with the corresponding image.

In S2215, the CPU 591 detects a desired image area in the stated image and stores the image area as metadata.

In S2217, the CPU 591 sends the image file designated from the HMD. Metadata including image information on the image desired by the viewer is also sent.

Head-mounted display-side operations are illustrated in FIG. 16E.

In S2137, the CPU 355 of the HMD 3000 receives information from the server, and increases the resolution of the desired image area. Here, based on the attribute information included in the metadata sent from the server, the head-mounted display recognizes this area from the image and displays the area at a high resolution.

In the present embodiment, the server adds metadata to the image and sends the image. The metadata includes attribute information for which the resolution is to be increased.

In other words, the server notifies the head-mounted display of the attribute information for which the resolution is to be increased. Then, the head-mounted display detects an area of the attribute information from the received image, converts the area of that attribute into a high-resolution image, and displays the area of the attribute information selected by the viewer at the high resolution.

Embodiment 7

In Embodiment 6, the attribute information for which the resolution is to be increased was sent from the server to the head-mounted display.

However, the part for which the resolution is to be increased may be added as metadata of map information and sent from the server to the head-mounted display. In the HMD, an area designated in the map information in the metadata is displayed at an increased resolution.

Specifically, the image sent by the server is at a low resolution, but an area in the metadata which the receiving side wishes to convert to a high resolution is included in the metadata and sent. The metadata includes map information on the area for which the resolution is to be increased.

In the present embodiment, S2217 is changed on the server side, as illustrated in FIG. 18D.

In S2217, the CPU 591 of the server 5000 sends the image file designated from the HMD. Metadata including map information (taking a specific area as a map) of image information desired by the viewer is also sent.

S2137 is changed on the head-mounted display side, as illustrated in FIG. 16E.

In S2137, the CPU 355 of the HAMID 3000 receives the information from the server, and displays the area designated in the map information at a high resolution based on the map information for increasing the resolution, included in the metadata sent from the server.

Figure 19:
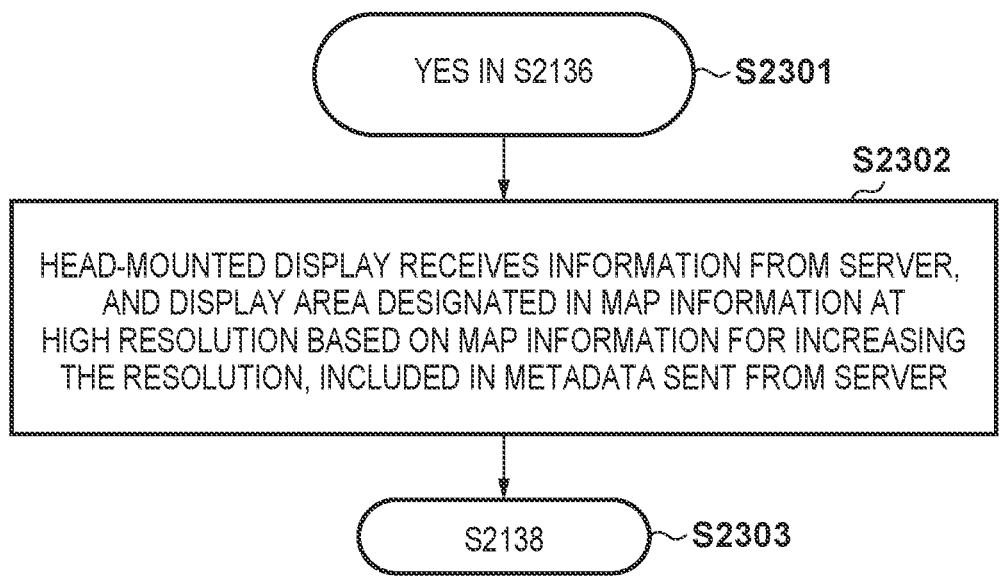
FIG. 19 is a diagram illustrating a control flow of the HMD.

FIG. 19 is a flowchart illustrating parts different from those in FIGS. 16A to 16E, in control of the HMD according to Embodiment 7.

In FIG. 19, S2301 represents "Yes" in S2136 of FIG. 16E.

In S2302, the CPU 355 receives the information from the server, and displays the area designated in the map information at a high resolution based on the map information for increasing the resolution, included in the metadata sent from the server.

S2303 represents S2138 of FIG. 16E.

Figure 20:
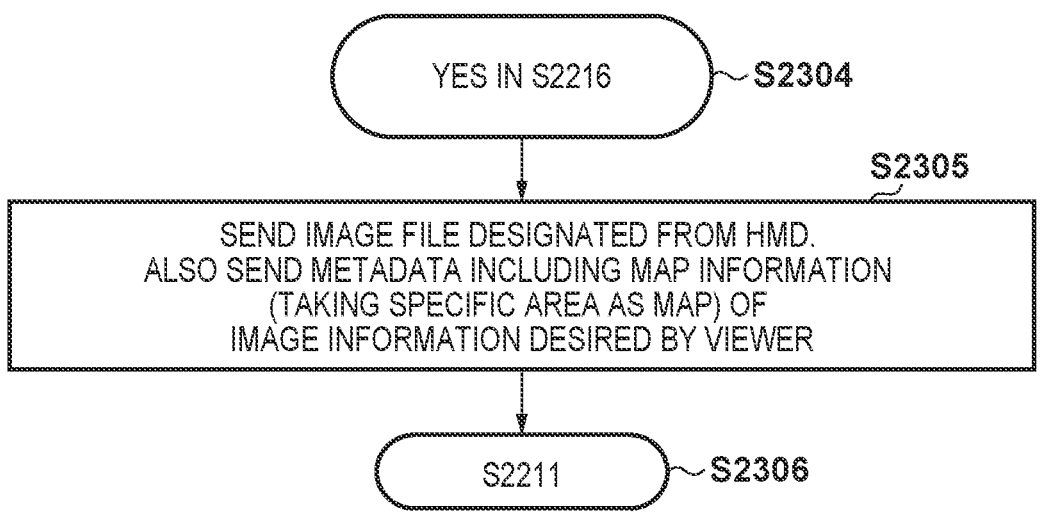
FIG. 20 is a diagram illustrating a control flow of the server.

FIG. 20 is a flowchart illustrating parts different from those in FIGS. 18A to 18G, in control of the server according to Embodiment 7.

In FIG. 20, S2304 represents "Yes" in S2216 of FIG. 18D.

In S2305, the CPU 591 of the server 5000 sends the image file designated from the HMD. Metadata including map information (taking a specific area as a map) of image information desired by the viewer is also sent.

S2306 represents S2211 of FIG. 18C.

In the present embodiment, the image sent by the server is at a low resolution, but an area in the metadata which the receiving side wishes to convert to a high resolution is included in the metadata and sent. The metadata includes map information on the area for which the resolution is to be increased.

This makes it possible for the head-mounted display to display an object a viewer wishes to view at a high resolution.

Embodiment 8

In Embodiment 6 and Embodiment 7, the image sent from the server to the head-mounted display is entirely low-resolution.

However, the resolution of the image may be increased on the server side, an indication that an image already increased in resolution on the server side is being sent may be added as metadata, and the image may be sent.

On the head-mounted display side, the part for which the resolution is increased can be recognized from characteristic information in the metadata. Additionally, because an area of interest in the received image has already been sent at a high resolution, the data is displayed as-is. In other words, the file to be viewed and the image to be viewed are input, that information is sent to the server, and from the file to be viewed, the server delivers the object to be viewed as a high-resolution image.

In the present embodiment, S2217 is changed on the server side, as illustrated in FIG. 18D.

In S2217, the CPU 591 of the server 5000 sends the image file designated from the HMD. An image in which the area of the image information desired by the viewer has been converted to high resolution on the server side is sent. Metadata including attribute information selected by the viewer is also sent.

S2137 is changed on the head-mounted display side, as illustrated in FIG. 16E.

In S2137, the CPU 355 of the HMD 3000 receives the information from the server, and displays the information sent from the server as-is. This is because the part selected by the viewer has been converted to a high resolution on the server side.

Figure 21:
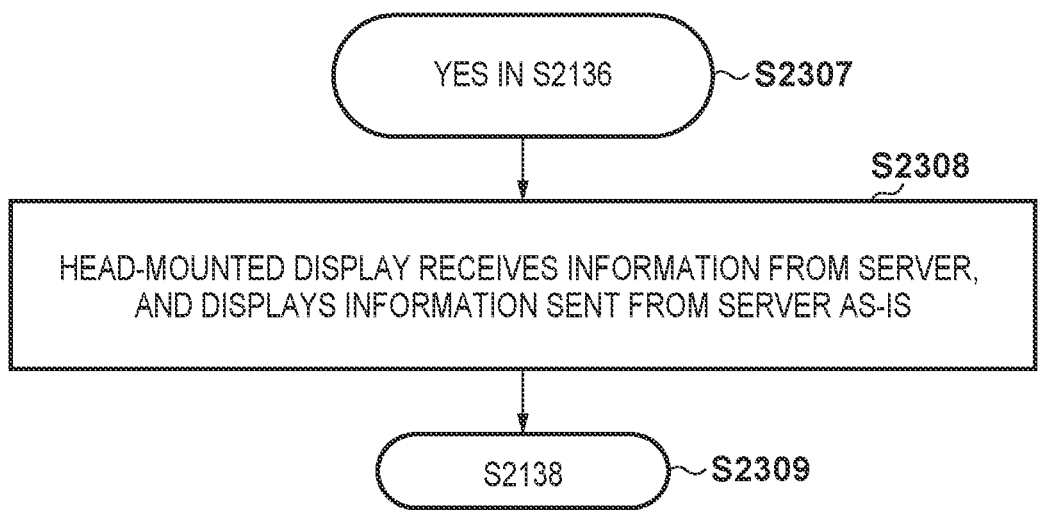
FIG. 21 is a diagram illustrating a control flow of the HMD.

FIG. 21 is a flowchart illustrating parts different from those in FIGS. 16A to 16E, in control of the HMD according to Embodiment 8.

In FIG. 21, S2307 represents "Yes" in S2136 of FIG. 16E.

In S2308, the CPU 355 of the HMD 3000 receives the information from the server, and displays the information sent from the server as-is.

S2309 represents S2138 of FIG. 16E.

Figure 22:
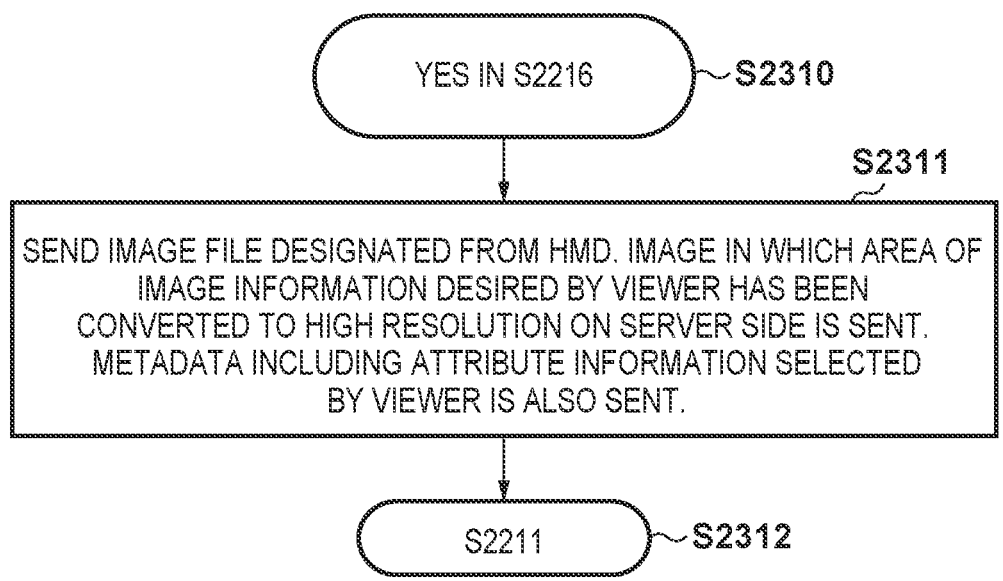
FIG. 22 is a diagram illustrating a control flow of the server.

FIG. 22 is a flowchart illustrating parts different from those in FIGS. 18A to 18G, in control of the server according to Embodiment 8.

In FIG. 22, S2310 represents "Yes" in S2216 of FIG. 18D.

In S2306, the CPU 591 of the server 5000 sends the image file designated from the HMD. An image in which the area of the image information desired by the viewer has been converted to high resolution on the server side is sent. Metadata including attribute information selected by the viewer is also sent.

S2312 represents S2211 of FIG. 18C.

In the present embodiment, the file to be viewed and the object to be viewed are input, that information is sent to the server, and from the file to be viewed, the server delivers an image in which the resolution of the object to be viewed is increased.

This makes it possible to send the object to be viewed through delivery from the server at a high resolution, which makes it possible to lighten the load on the head-mounted display.

Embodiment 9

As specific low-resolution and high-resolution values, the low resolution is set to 30 ppd, and the designated area is converted to a high resolution of 60 ppd for display.

The image displayed in the head-mounted display is assumed to have an angular pixel density of about 30 ppd (pixels per degree) for the low-resolution area, and an angular pixel density of about 60 ppd for the high-resolution area.

As an actual embodiment, the head-mounted display has a display unit capable of displaying an angular pixel density of 60 ppd, where an area selected for viewing by the viewer is displayed at the high resolution of 60 ppd, and the other areas are displayed at the angular pixel density of 30 ppd.

In the present embodiment, the image displayed in the head-mounted display is assumed to have an angular pixel density of about 30 ppd for the low-resolution area, and an angular pixel density of about 60 ppd for the high-resolution area.

Embodiment 10

The attribute information set to a high resolution may be attribute information indicating an individual person specified from a group of a plurality of people.

The viewer selects an object they wish to view, but may designate attribute information indicating an individual person specified from a group of a plurality of people. Through this, attribute information indicating an individual person specified from a group of a plurality of people can be used as the attribute information for which the resolution is increased.

In the present embodiment, the attribute information set to a high resolution is attribute information indicating an individual person specified from a group of a plurality of people.

This enables the viewer to select a specific person to view at a high resolution from, for example, an idle group.

Embodiment 11

The attribute information set to a high resolution may be attribute information indicating a part specified from a plurality of parts.

The viewer selects an object they wish to view, but may designate attribute information indicating a part specified from a plurality of body parts. Through this, attribute information indicating a part specified from a plurality of parts can be used as the attribute information for which the resolution is increased.

In the present embodiment, attribute information indicating a part specified from a plurality of parts is used as the attribute information for which the resolution is increased.

This makes it possible to perform physical training while observing the movement of the legs during training, for example.

Embodiment 12

The foregoing embodiments have described control for selecting a part to be viewed, and displaying an object to be viewed, in an image received from the server, at a high resolution. However, the head-mounted display need not be limited to receiving images from the server. Images may be received from a terminal, for example.

In the present embodiment, an image is sent from a terminal rather than from the server. Through this, the head-mounted display is not limited to receiving images from the server, and can perform the same control even when receiving images from a terminal.

Embodiment 13

The selection of the part which the viewer desires to view may be determined based on other information without directly designating the part. For example, the selection of the part which the viewer desires to view may be determined based on operation information in a personal computer or smartphone, without directly designating the part. The foregoing embodiments described selecting an object that the viewer wishes to view from an operation unit of the head-mounted display. However, a method aside from directly designating the object through operations from the head-mounted display may be used.

For example, the communication unit of the head-mounted display communicates with a personal computer, a smartphone, or the like, and analyzes the preferences of the person operating the head-mounted display from an operation history of the personal computer, the smartphone, or the like. The object to be viewed when viewing with the head-mounted display may then be determined based on those preferences, and the object to be viewed may be displayed at a high resolution.

In the present embodiment, the selection of the part which the viewer desires to view is determined based on other information without directly designating the part. Additionally, the selection of the part which the viewer desires to view is determined based on operation information in a personal computer or smartphone, without directly designating the part.

This makes it possible to simplify the operations for the person viewing the head-mounted display, which improves the convenience.

Embodiment 14

The selection of the part which the viewer desires to view may be determined based on setting information of the head-mounted display, without directly designating the part.

In Embodiment 13, rather than directly designating the object from the head-mounted display, selecting the object by operating a personal computer or a smartphone is considered as the method for selecting the object to be viewed. However, the object to be viewed when viewing with the head-mounted display may be determined based on what kind of image the viewer is interested in according to the setting information of the head-mounted display, and the object to be viewed may be displayed at a high resolution.

In the present embodiment, the selection of the part which the viewer desires to view is determined based on setting information of the head-mounted display, without directly designating the part. This makes it possible to simplify the operations for the person viewing the head-mounted display, which improves the convenience.

Embodiment 15

In the present embodiment, the head-mounted display capable of displaying a three-dimensional image includes means for selecting a part which the viewer desires to view; means for detecting the part to view which the viewer has selected; and means for increasing the framerate of the detected part to view. An image obtained by increasing the resolution of the viewing portion is then displayed.

The embodiments up to Embodiment 14 described increasing the resolution of an image of a part corresponding to a selected attribute by the viewer selecting the part to view. However, the framerate may also basically be set to 60 frames per second (fps), and two images of the parts other than the attribute selected by the viewer may be set to the same 30 fps.

In the present embodiment, the head-mounted display capable of displaying a three-dimensional image includes means for selecting a part which the viewer desires to view; means for detecting the part to view which the viewer has selected; and means for increasing the framerate of the detected part to view. An image obtained by increasing the resolution of the part to view by the viewer can then be displayed.

This makes it possible to increase the compression rate of the information in the image, and makes it possible to conserve bandwidth when delivering the image from a server or the like.

Embodiment 16

In Embodiment 16, the resolution of a part intended by a creator of the image is increased.

The system for the head-mounted display includes means for an image creator to designate a part to be displayed at a high resolution in a three-dimensional image, and means for storing, as metadata, the part to be displayed at a high resolution in the three-dimensional image as designated by the image creator. Then, an image created by the image creator is input, a part for which the resolution is to be increased is detected, and that area is displayed at a high resolution. When displaying the three-dimensional image, the part designated by the image creator to be displayed at a high resolution in the three-dimensional image is displayed at a high resolution based on the metadata.

More specifically, the system for the head-mounted display includes means for an image creator to designate a part to be displayed at a high resolution in a three-dimensional image, and means for storing, as metadata, the part to be displayed at a high resolution in the three-dimensional image as designated by the image creator. When displaying the three-dimensional image, the part designated by the image creator to be displayed at a high resolution in the three-dimensional image is displayed at a high resolution based on the metadata.

The image creator designates the part to be displayed at a high resolution in the three-dimensional image, stores the part of the three-dimensional image designated by the image creator at a high resolution, and displays this information as a three-dimensional image. Furthermore, attribute information indicating the image quality has been increased is stored in the image as metadata.

Figure 23A:
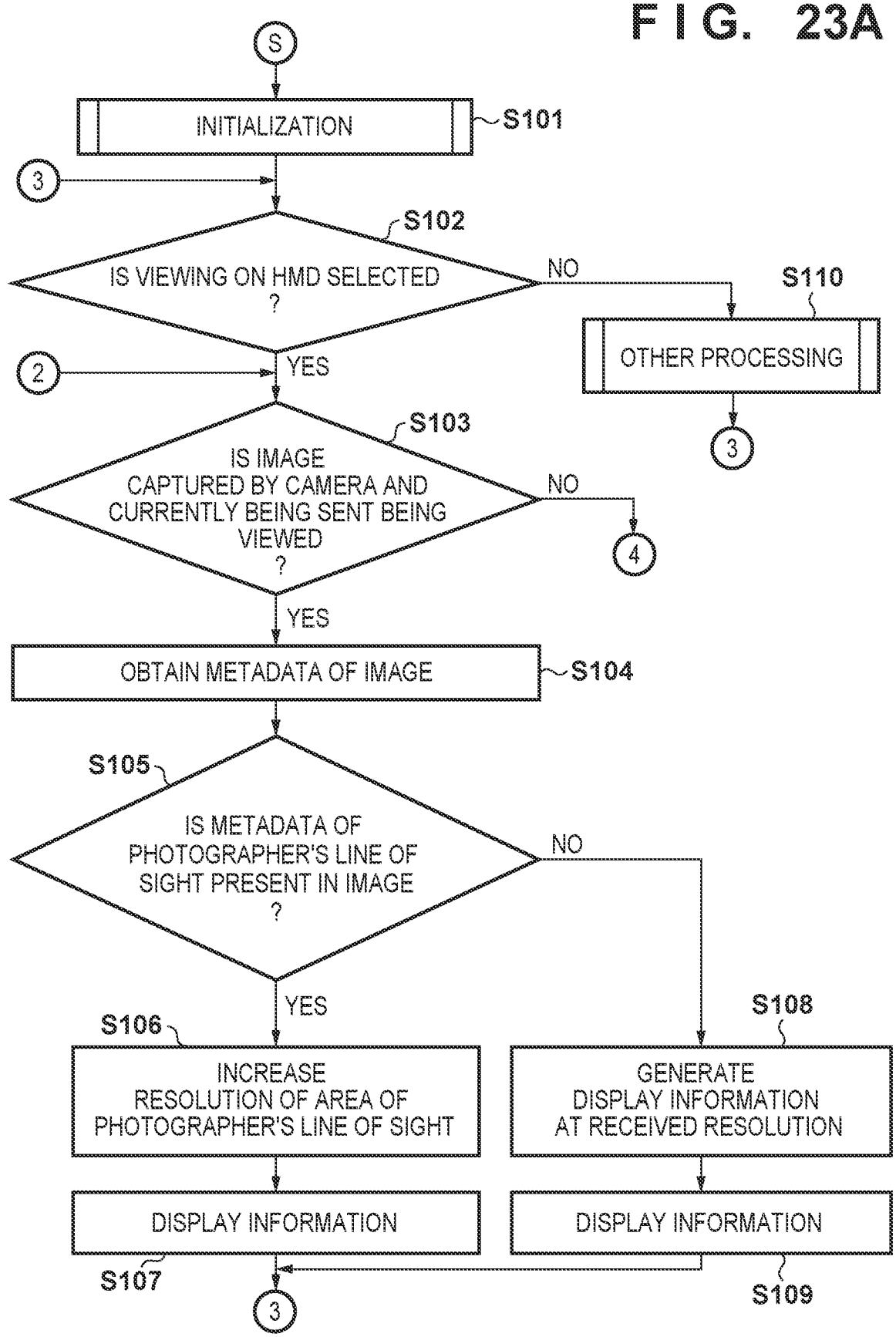
FIG. 23A is a diagram illustrating a control flow of the HMD.
Figure 23B:
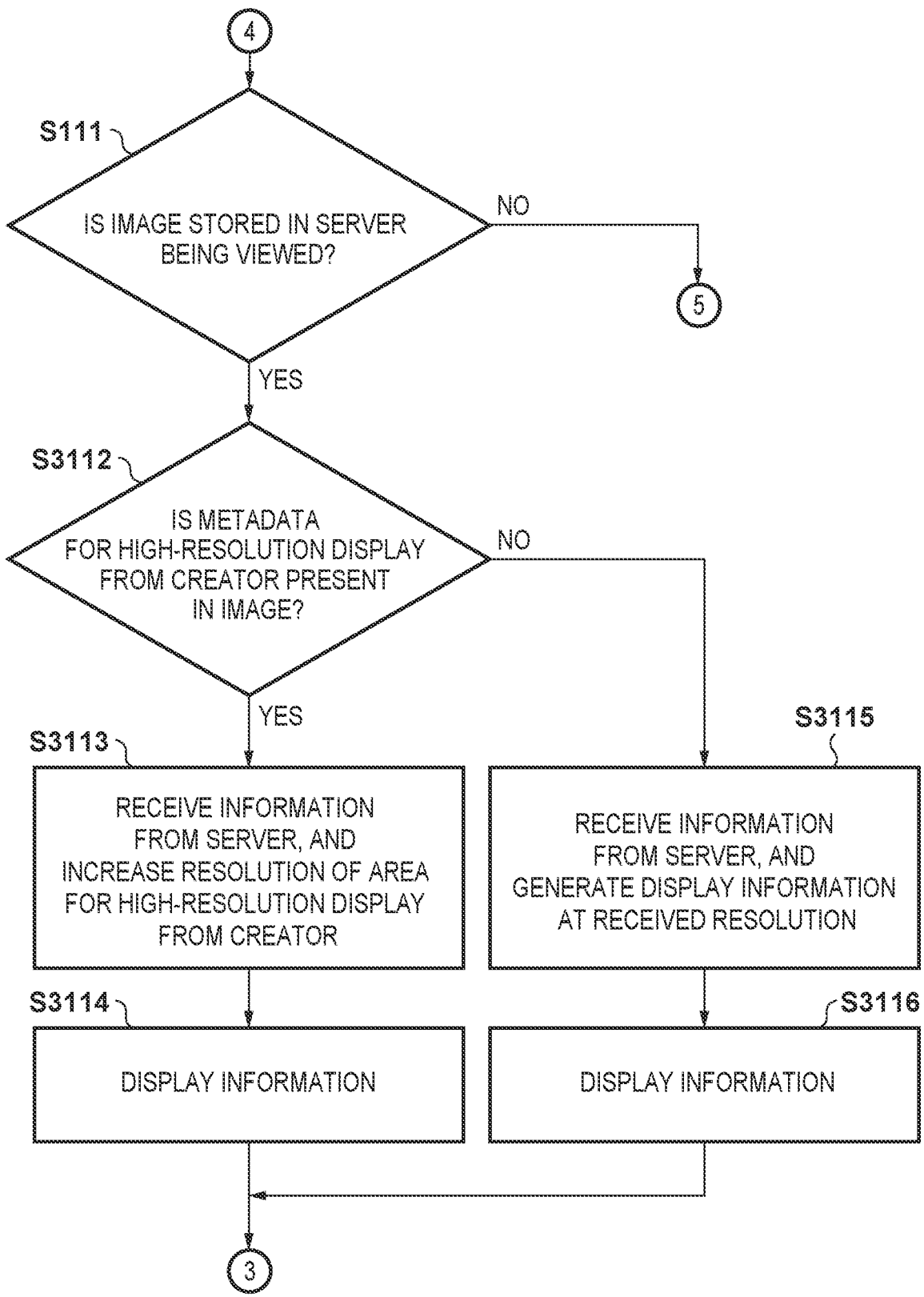
FIG. 23B is a diagram illustrating a control flow of the HMD.
Figure 23C:
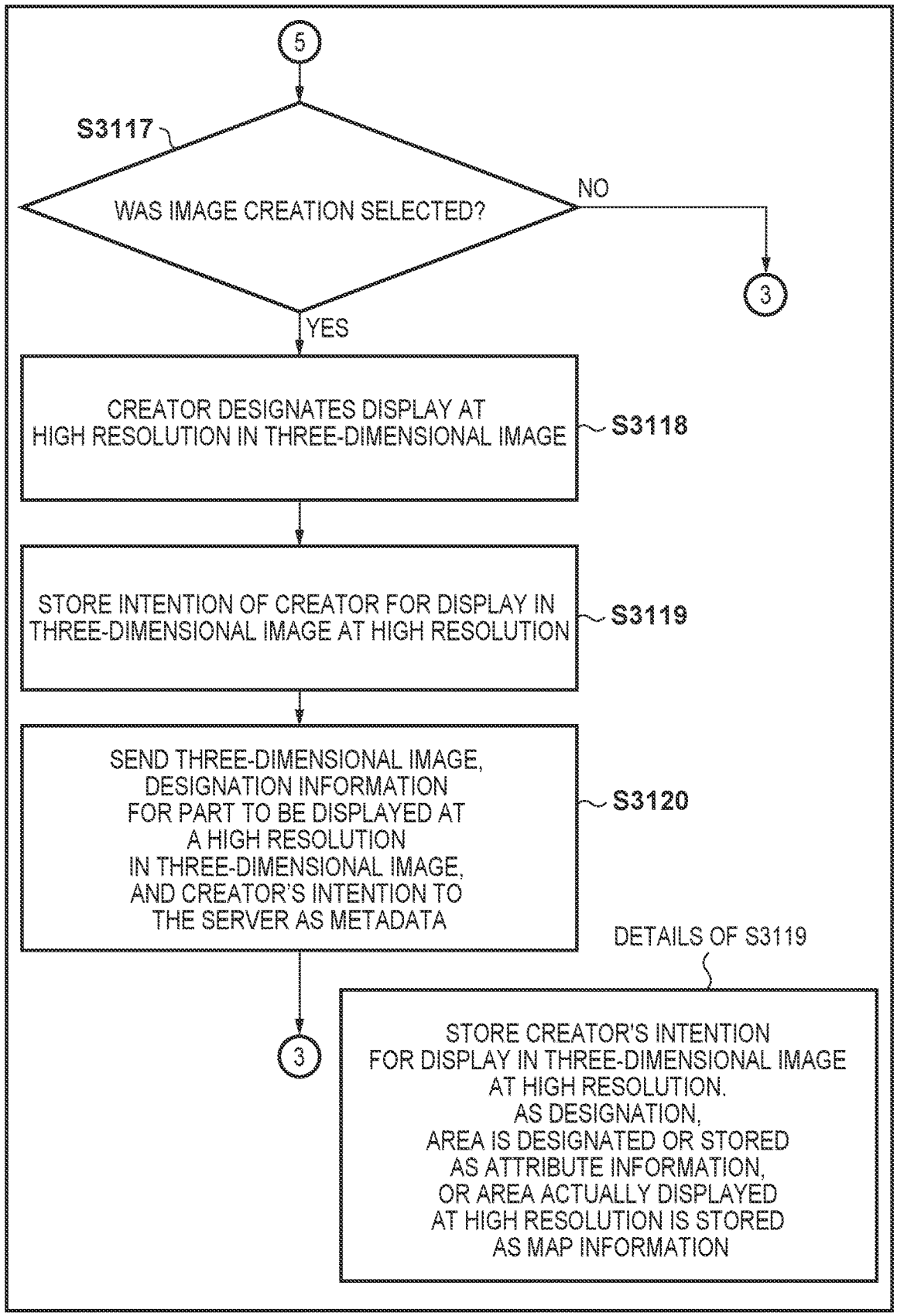
FIG. 23C is a diagram illustrating a control flow of the UMD.

FIGS. 23A to 23C are flowcharts illustrating the flow of control of the head-mounted display in Embodiment 16.

In FIGS. 23A to 23C, step numbers in the 100 series are the same as in the flow of the control of the head-mounted display in FIG. 9 described in Embodiment 1, and will therefore not be described.

In FIG. 23B, in S3112, the CPU 355 of the HMD 3000 determines whether or not metadata for high-resolution display from the creator is present in the image. If metadata for high-resolution display from the creator is present in the image, the sequence moves to S3113, and if not, the sequence moves to S3115.

In S3113, the CPU 355 receives the information from the server, and increases the resolution of the area for high-resolution display from the creator.

In S3114, the CPU 355 displays the information described above.

In S3115, the CPU 355 receives the information from the server, and generates display information at the received resolution.

In S3116, the CPU 355 displays the information described above.

Moving to FIG. 23C, in S3117, the CPU 355 determines whether or not image creation has been selected. If image creation has been selected, the sequence moves to S3118, and if not, the sequence moves to S102.

In S3118, the CPU 355 designates the part the creator wishes to display at a high resolution in the three-dimensional image.

In S3119, the CPU 355 stores the creator's intention for the part to be displayed at a high resolution in the three-dimensional image. As a designation, an area is designated or stored as attribute information, or an area actually displayed at a high resolution is designated or stored as map information.

In S3120, the CPU 355 sends the three-dimensional image, designation information for the part to be displayed at a high resolution in the three-dimensional image, and the creator's intention to the server as metadata.

Figure 24A:
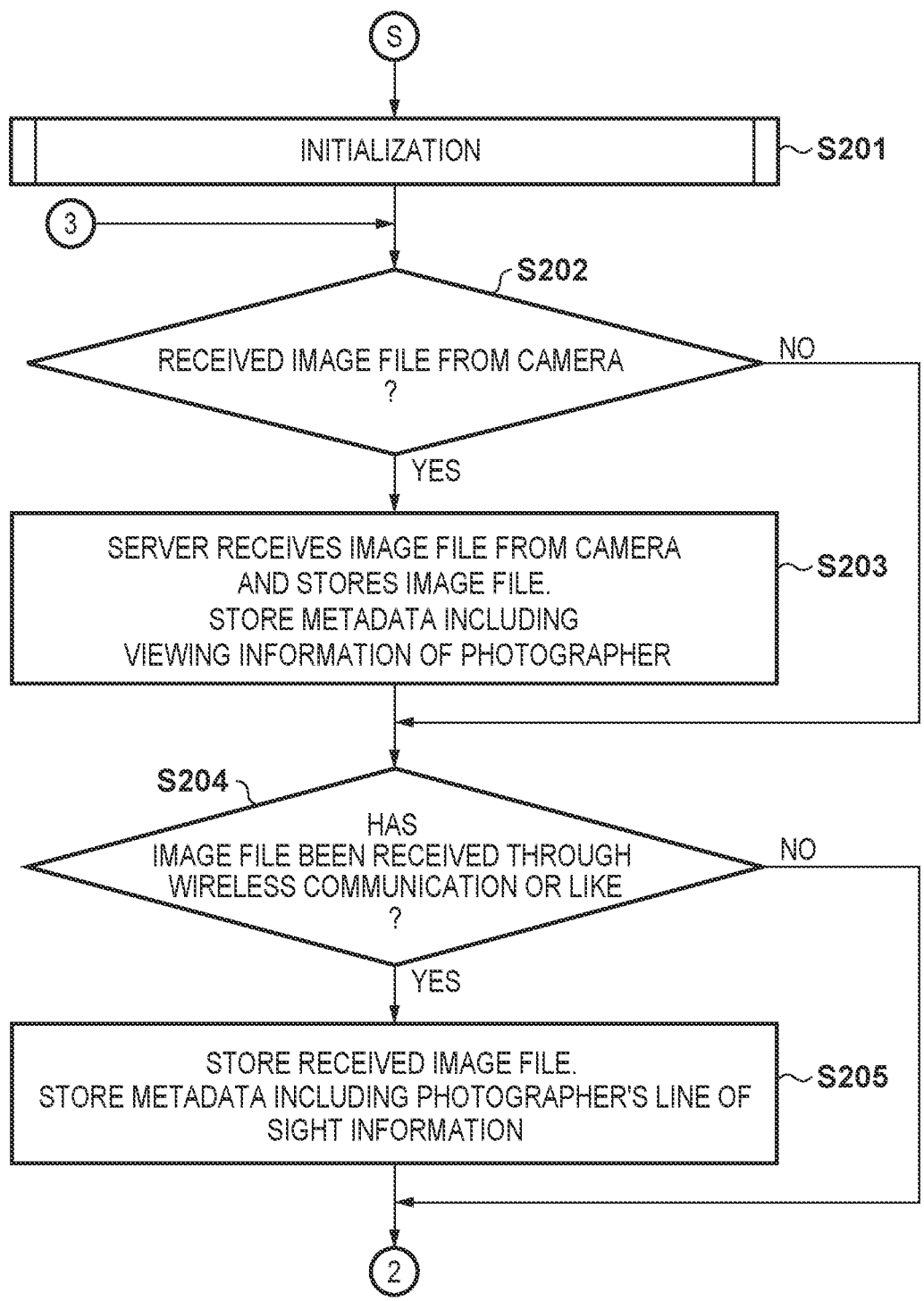
FIG. 24A is a diagram illustrating a control flow of the server.
Figure 24B:
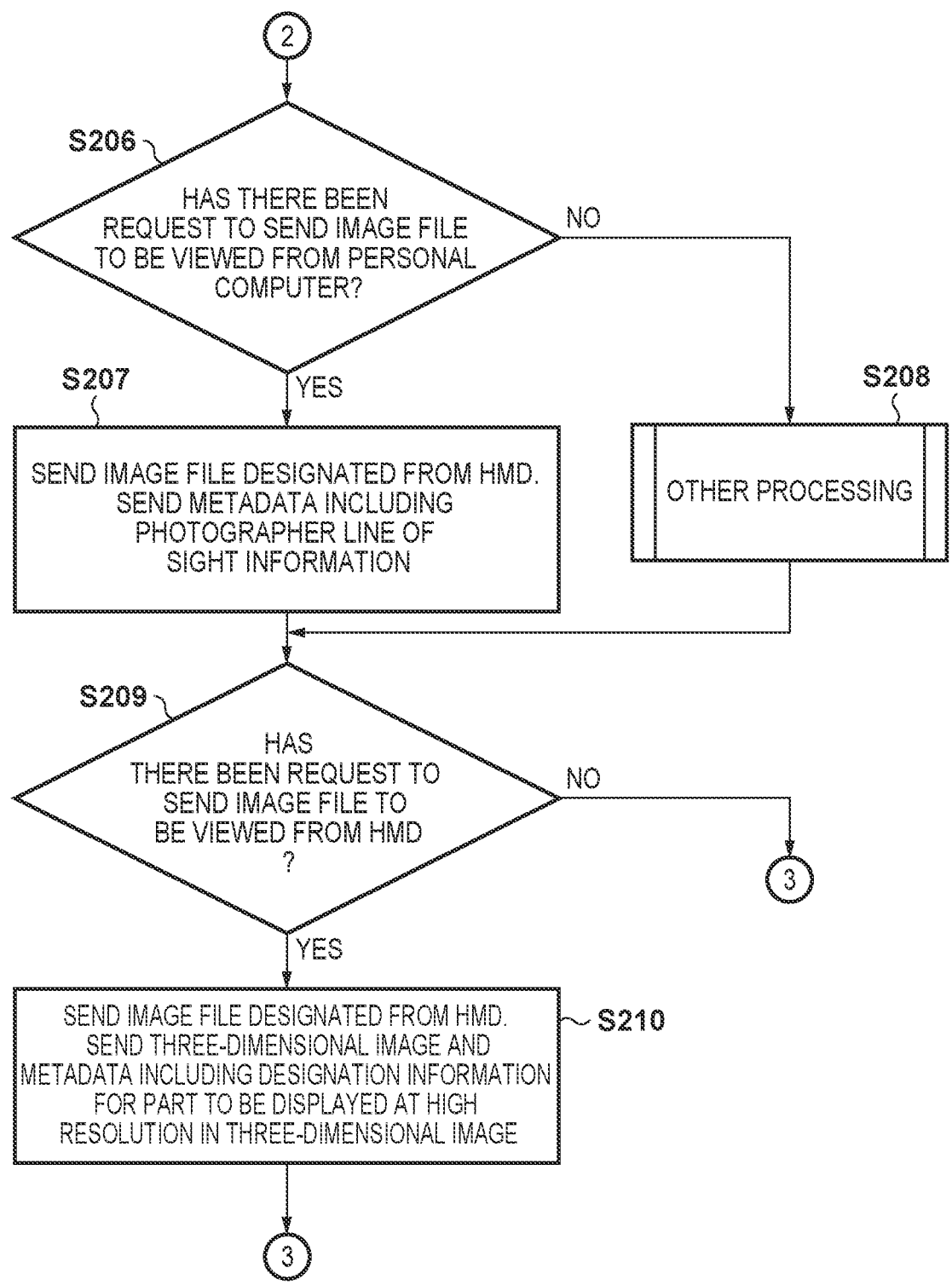
FIG. 24B is a diagram illustrating a control flow of the server.
Figure 24C:
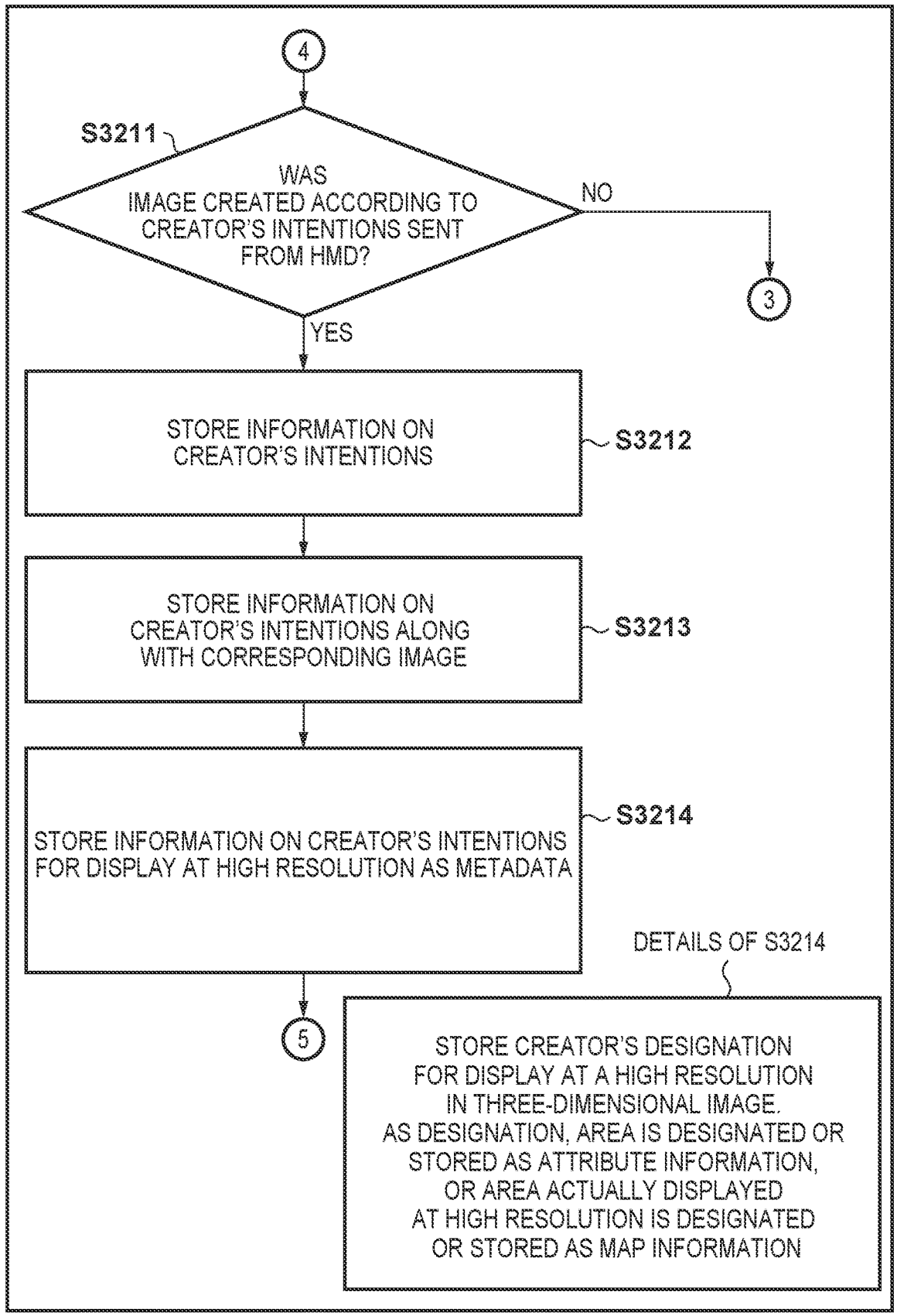
FIG. 24C is a diagram illustrating a control flow of the server.

FIGS. 24A to 24C are flowcharts illustrating the flow of control of the server according to Embodiment 16. In FIGS. 24A to 24C, step numbers in the 200 series are the same as in the flow of the control of the server in FIG. 10 described in Embodiment 1, and will therefore not be described.

In FIG. 24C, in S3211, the CPU 591 of the server 5000 determines whether or not an image created according to a creator's intentions has been sent from the HMD. If an image created according to the creator's intentions has been sent from the HMD, the sequence moves to S3212, and if not, the sequence moves to S202.

In S3212, the CPU 591 stores information on the creator's intentions.

In S3213, the CPU 591 stores the information on the creator's intentions along with the corresponding image.

In S3214, the CPU 591 stores the information on the creator's intentions for display at a high resolution as the metadata. As a designation, an area is designated or stored as attribute information, or an area actually displayed at a high resolution is stored as map information.

The present embodiment includes means for an image creator to designate a part to be displayed at a high resolution in a three-dimensional image, and means for storing, as metadata, the part to be displayed at a high resolution in the three-dimensional image as designated by the image creator.

Additionally, an image to be displayed, created by the image creator, is input, a part for which the resolution is to be increased is detected, and that area is displayed at a high resolution.

When displaying the three-dimensional image, the part designated by the image creator is displayed at a high resolution based on the metadata.

Additionally, the present embodiment includes means for an image creator to designate a part to be displayed at a high resolution in a three-dimensional image, and means for storing, as metadata, the part to be displayed at a high resolution in the three-dimensional image as designated by the image creator. When displaying the three-dimensional image, the area designated by the image creator is displayed at a high resolution based on the metadata.

Means for the image creator to designate the part to be displayed at a high resolution in the three-dimensional image is included, and the part designated by the image creator is displayed as a three-dimensional image.

Additionally, attribute information indicating the image quality has been increased is stored in the image as metadata.

This makes it possible to represent the creator's intentions at a high resolution, and the viewer can recognize the image creator's intentions in a natural manner and view the image.

Embodiment 17

The attribute information set to a high resolution may be attribute information indicating an individual person specified from a group of a plurality of people.

In the present embodiment, attribute information indicating an individual person specified from a group of a plurality of people is used as the attribute information set to a high resolution.

Through this, the resolution can be increased using an individual person specified from a group of a plurality of people, which was one of the selections the viewer wishes to view, as the attribute information, even as the creator's intentions.

Embodiment 18

The attribute information set to a high resolution may be attribute information indicating a part specified from a plurality of parts.

In the present embodiment, attribute information indicating a part specified from a plurality of parts is used as the attribute information for which the resolution is increased.

Through this, the resolution can be increased using the part specified from a plurality of parts, which was one of the selections the viewer wishes to view, as the attribute information, even as the creator's intentions.

Embodiment 19

As the creator's intention, in video game production, a part where an enemy appears may be designated as the part to be displayed at a high resolution in the three-dimensional image, to increase the sense of immersion of the video game.

In the present embodiment, the image creator designates, when producing a video game, a part where an enemy appears as a part to be displayed at a high resolution in the three-dimensional image.

Through this, in video game production, a part where an enemy appears can be designated as a part to be displayed at a high resolution in the three-dimensional image, and the viewer can therefore feel a sense of immersion in the video game.

Embodiment 20

In the present embodiment, the part for which the resolution is to be increased is designated according to the photographer's line of sight.

In the present embodiment, the device includes means for capturing a three-dimensional image; means for detecting the photographer's line of sight when capturing the three-dimensional image; and means for storing the photographer's line of sight together with the image as metadata. Then, when displaying the three-dimensional image, a part corresponding to the photographer's line of sight is displayed at a high resolution based on the metadata. A line of sight viewed for at least a predetermined length of time is detected as the photographer's line of sight when capturing the three-dimensional image. Here, in the display of the three-dimensional image, when metadata information on the photographer's line of sight is not included in the image, the resolution of the image data is displayed without being changed. The display control described above is executed when receiving the three-dimensional image from the means for capturing the three-dimensional image, or when receiving the three-dimensional image from the server. The device displaying the three-dimensional image operates in a standalone state without using processing from another processor.

Head-mounted displays include standalone types, and types that focus on displaying while using the resources of a server or the like to operate. Here, a standalone type head-mounted display will be taken as an HMD 1, and a head-mounted display that focuses on displaying while using the resources of a server or the like to operate will be taken as an HMD 2. The HMD 1 converts only the area of the photographer's line of sight to a high resolution and displays the image, at a framerate of 60 fps.

Figure 25A:
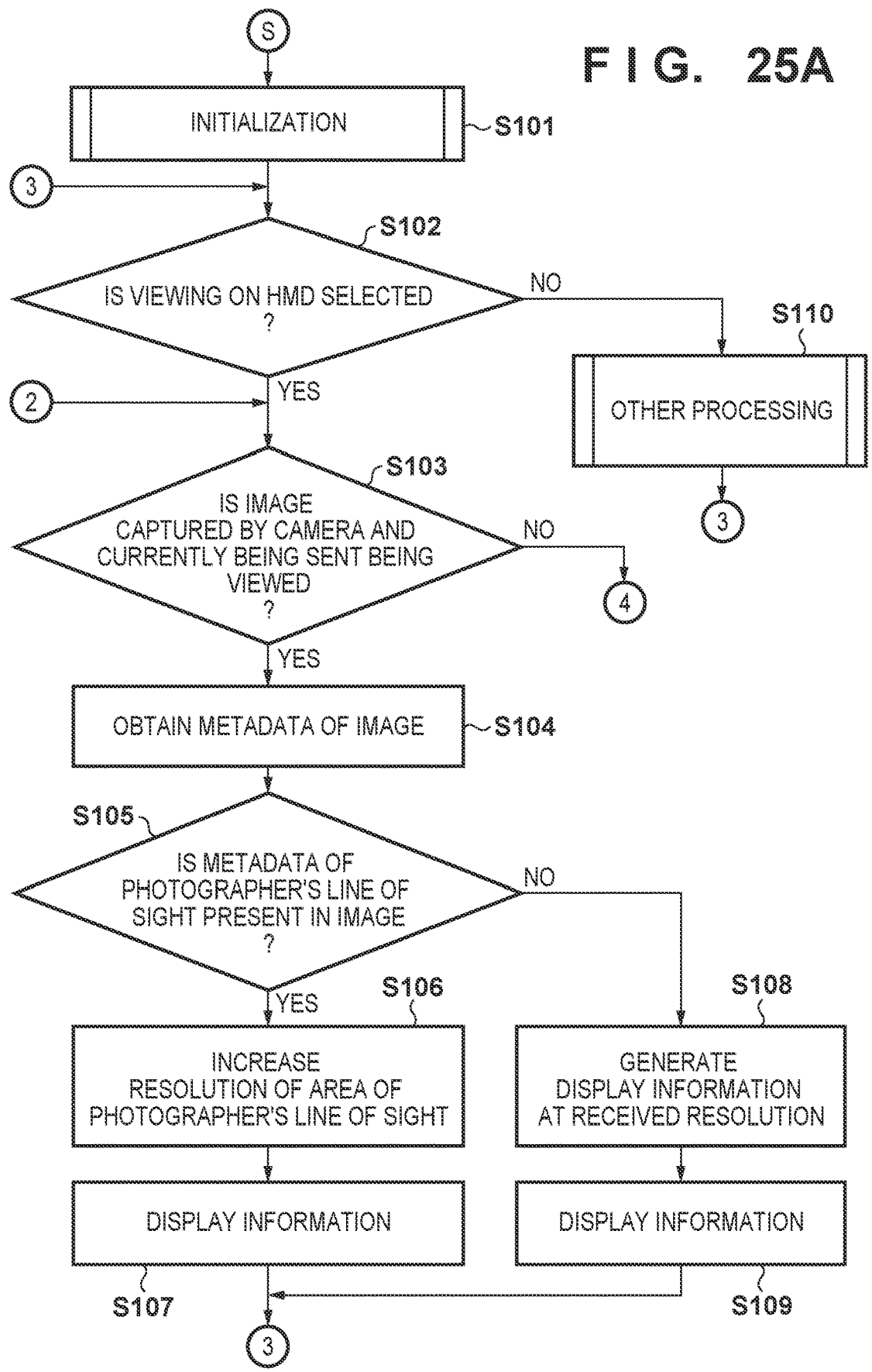
FIG. 25A is a diagram illustrating a control flow of the UMD.
Figure 25B:
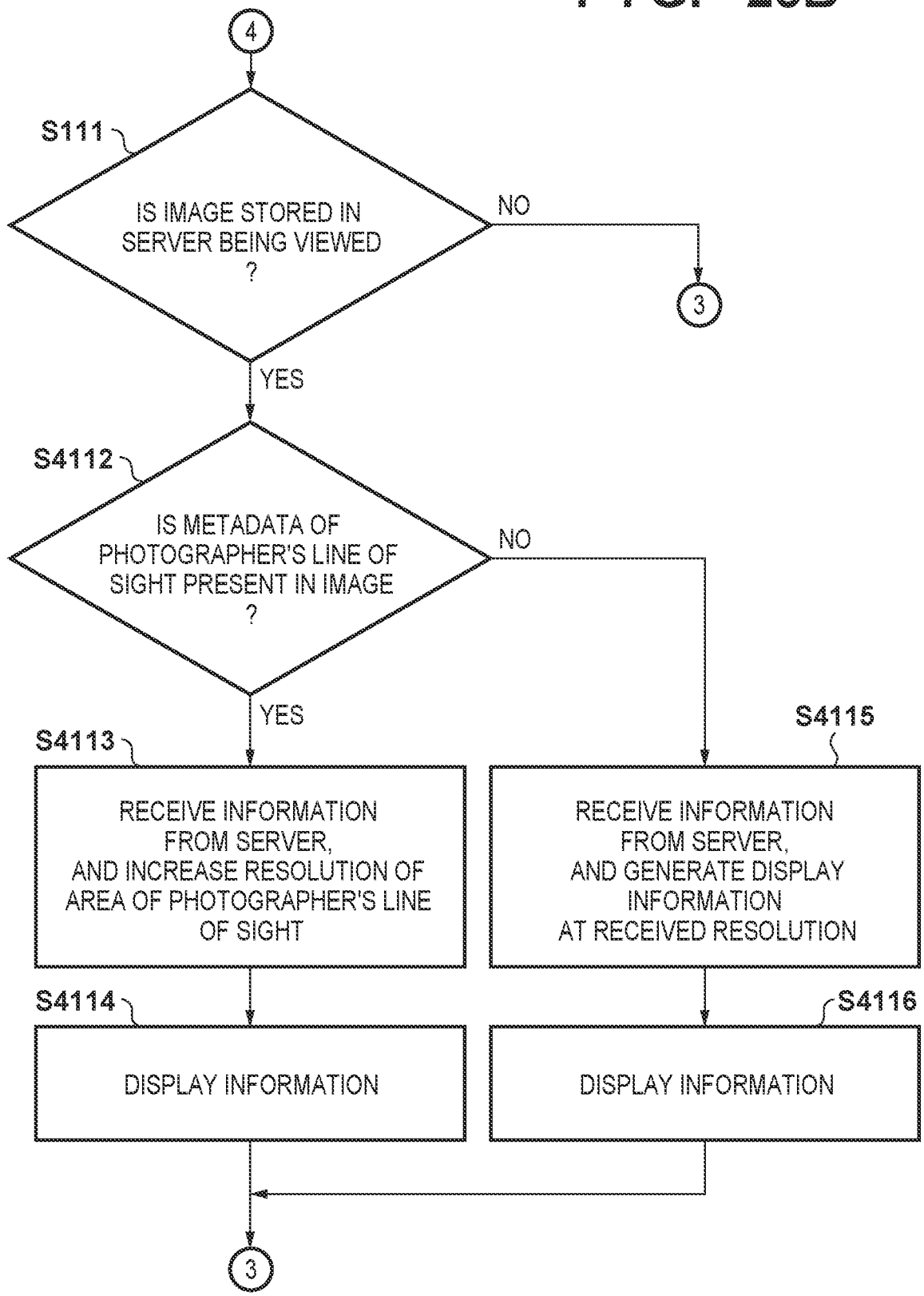
FIG. 25B is a diagram illustrating a control flow of the UMD.

FIGS. 25A and 25B are flowcharts illustrating control of the HMD that performs the operations described above. In FIGS. 25A and 25B, control that is the same as that illustrated in FIGS. 9A to 9C is given the same step numbers, and will not be described.

In FIG. 25B, in S4112, the CPU 355 of the HMD 3000 determines whether or not metadata of the photographer's line of sight is present in the image. If metadata of the photographer's line of sight is present in the image, the sequence moves to S4113, and if not, the sequence moves to S4115.

In S4113, the CPU 355 receives information from the server, and increases the resolution of the area of the photographer's line of sight.

In S4114, the CPU 355 displays the information described above.

In S4115, the CPU 355 receives the information from the server, and generates display information at the received resolution.

In S4116, the CPU 355 displays the information described above.

Figure 26A:
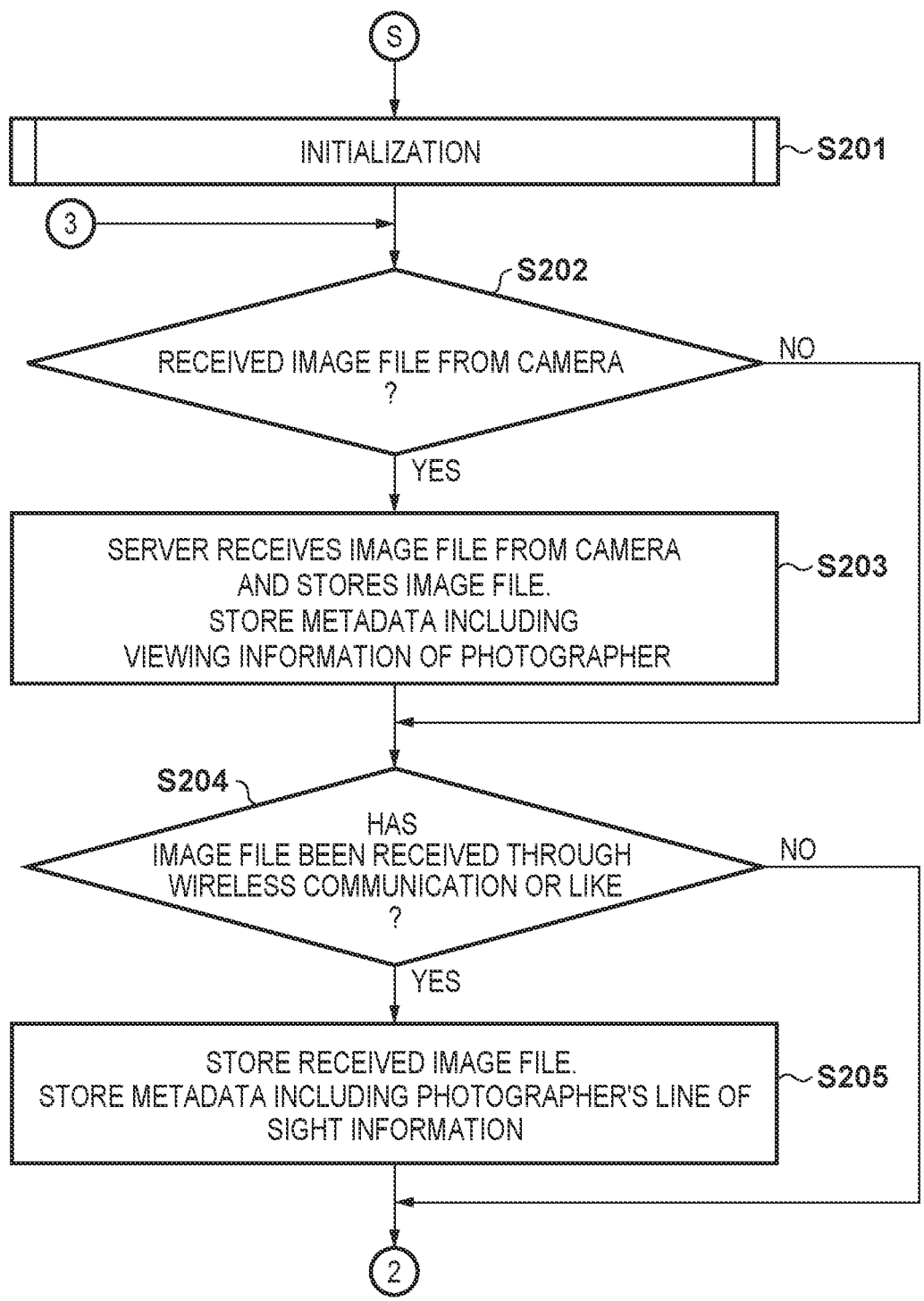
FIG. 26A is a diagram illustrating a control flow of the server.
Figure 26B:
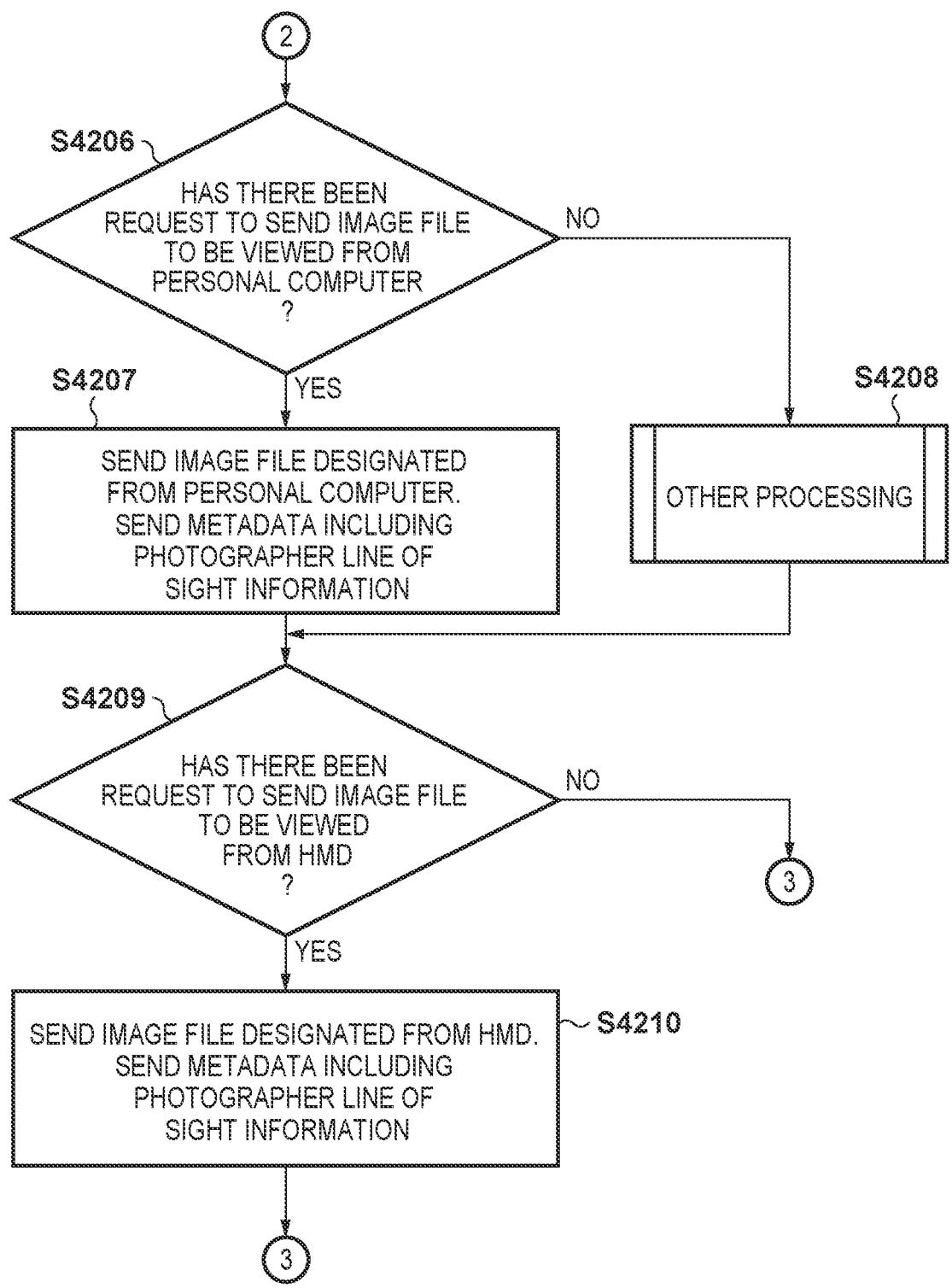
FIG. 26B is a diagram illustrating a control flow of the server.

FIGS. 26A and 26B are flowcharts illustrating control of the server that performs the operations described above. In FIGS. 26A and 26B, control that is the same as that illustrated in FIGS. 10A to 10D is given the same step numbers, and will not be described.

In FIG. 26B, in S4206, the CPU 591 of the server 5000 determines whether or not there has been a request to send an image file to be viewed from the personal computer. If there has been a request to send an image file to be viewed from the personal computer, the sequence moves to S4207, and if not, the sequence moves to S4208, where other processing is executed.

In S4207, the CPU 591 sends the image file designated from the personal computer. At the same time, metadata including information on the photographer's line of sight is also sent.

In S4209, the CPU 591 determines whether or not there has been a request to send an image file to be viewed from the HMD. If there has been a request to send an image file to be viewed from the HMD, the sequence moves to S4210, and if not, the sequence moves to S202.

In S4210, the CPU 591 sends the image file designated from the HMD. At the same time, metadata including information on the photographer's line of sight is also sent.

The flowchart illustrating the control of the camera body 1 and the flowchart illustrating the control of the personal computer 4000 are the same as those in FIGS. 11, 12A, and 12B.

In the present embodiment, the device includes means for capturing a three-dimensional image; means for detecting the photographer's line of sight when capturing the three-dimensional image; and means for storing the photographer's line of sight together with the image as metadata. Then, when displaying the three-dimensional image, a part corresponding to the photographer's line of sight is displayed at a high resolution based on the metadata.

This makes it possible to increase the resolution of the part corresponding to the photographer's line of sight, and to view the image while understanding the photographer's intentions, when viewing a three-dimensional image Additionally, a line of sight viewed for at least a predetermined length of time is detected as the photographer's line of sight when capturing the three-dimensional image.

The viewer's line of sight is detected by the line of sight detection unit 33. This line of sight information is sent by accessing the server. Here, a line of sight viewed for at least a predetermined length of time is detected as the photographer's line of sight when capturing the three-dimensional image.

Through this, the photographer's line of sight can be reliably detected even when there is a large amount of movement in the photographer's line of sight.

Additionally, in the display of the three-dimensional image, when metadata information on the photographer's line of sight is not included in the image, the resolution of the image data is displayed without being changed.

Through this, when displaying at a high resolution, the image can be recognized as the image intended by the photographer, which improves the convenience for the user.

The display control described above is executed when receiving the three-dimensional image from the means for capturing the three-dimensional image, or when receiving the three-dimensional image from the server.

This makes it possible to view the part corresponding to the photographer's line of sight at a high resolution, even when receiving an image captured by a camera capable of capturing three-dimensional images, or when viewing a three-dimensional image stored in the server.

Additionally, the device displaying the three-dimensional image operates in a standalone state without using processing from another processor.

Through this, the standalone-type head-mounted display, which is user-friendly, increases the resolution of the area of the photographer's line of sight, which makes it possible to enjoy the photographer's line of sight in a system with limited processing performance.

Embodiment 21

In the present embodiment, the device for displaying the three-dimensional image includes means for selecting, when operating using processing performed by another processor, whether to display the entire image at a high resolution and at a predetermined framerate, or display the image, in which the resolution is increased only for the part corresponding to the photographer's line of sight, at a higher framerate. The control selected from these is executed in the server based on a request from the viewing device.

In the present embodiment, a head-mounted display that focuses on displaying while using the resources of a server or the like to operate will be described as the HMD 2. The HMD 2 is a type of head-mounted display that connects to a server, and when displaying an image at a framerate of 75 fps, data obtained by increasing the resolution of only the area of the photographer's line of sight is received and displayed. On the other hand, when displaying an image at a framerate of 60 fps, high-resolution data is received for the entire image, and the HMD displays that data.

The flowchart of the control of the head-mounted display in Embodiment 21 is as illustrated in FIG. 26.

Figure 27:
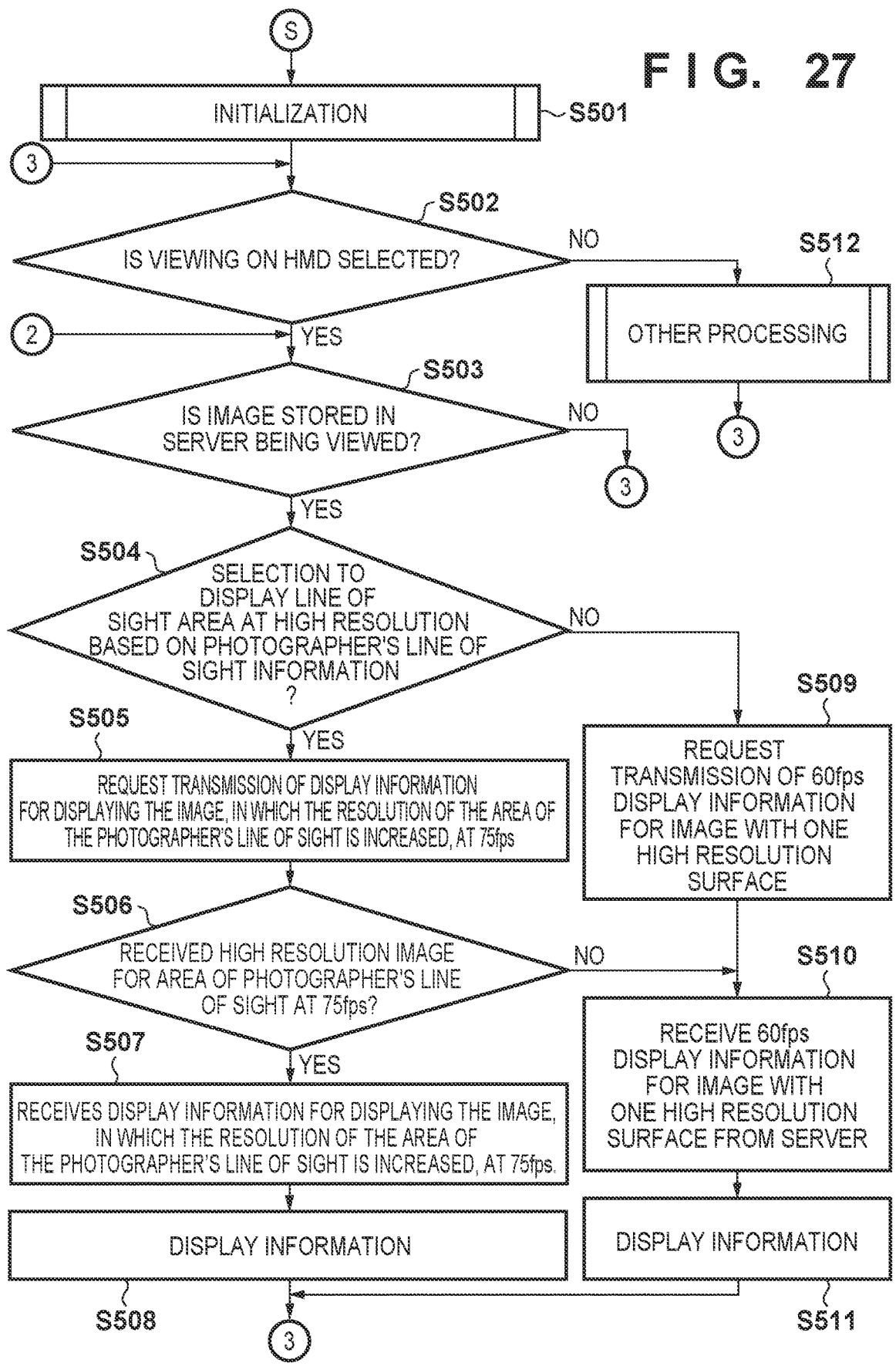
FIG. 27 is a diagram illustrating a control flow of the HMD.

FIG. 27 is a flowchart illustrating control of the HMD that performs the operations described above.

In FIG. 27, S501 represents initialization.

In S502, the CPU 355 of the HMD 3000 determines whether or not a viewing mode in the HMD has been selected. If a viewing mode in the HMD has been selected, the sequence moves to S503, and if not, the sequence moves to S512, where other processing is executed.

In S503, the CPU 355 determines whether or not an image stored in the server is being viewed. If an image stored in the server is being viewed, the sequence moves to S504, and if not, the sequence moves to S502.

In S504, the CPU 355 determines whether or not a selection is made to display the area of the photographer's line of sight at a high resolution. If a selection is made to display the area of the photographer's line of sight at a high resolution, the sequence moves to S505, and if not, the sequence moves to S509.

In S505, the CPU 355 requests the server to send data for displaying the image, in which the resolution of the area of the photographer's line of sight is increased, at 75 fps.

In S506, the CPU 355 determines, based on the information sent from the server, whether or not an image, in which the resolution of the area of the photographer's line of sight is increased, is received at 75 fps. If an image, in which the resolution of the area of the photographer's line of sight is increased, is received at 75 fps, the sequence moves to S507, and if not, the sequence moves to S510.

In S507, the CPU 355 receives data for displaying the image, in which the resolution of the area of the photographer's line of sight is increased, at 75 fps.

In S508, the CPU 355 displays the information described above.

In S509, the CPU 355 requests the server to send data for displaying the entire image at a high resolution at 60 fps.

In S510, the CPU 355 receives data from the server for displaying the entire image at a high resolution at 60 fps.

In S511, the CPU 355 displays the information described above.

Figure 28A:
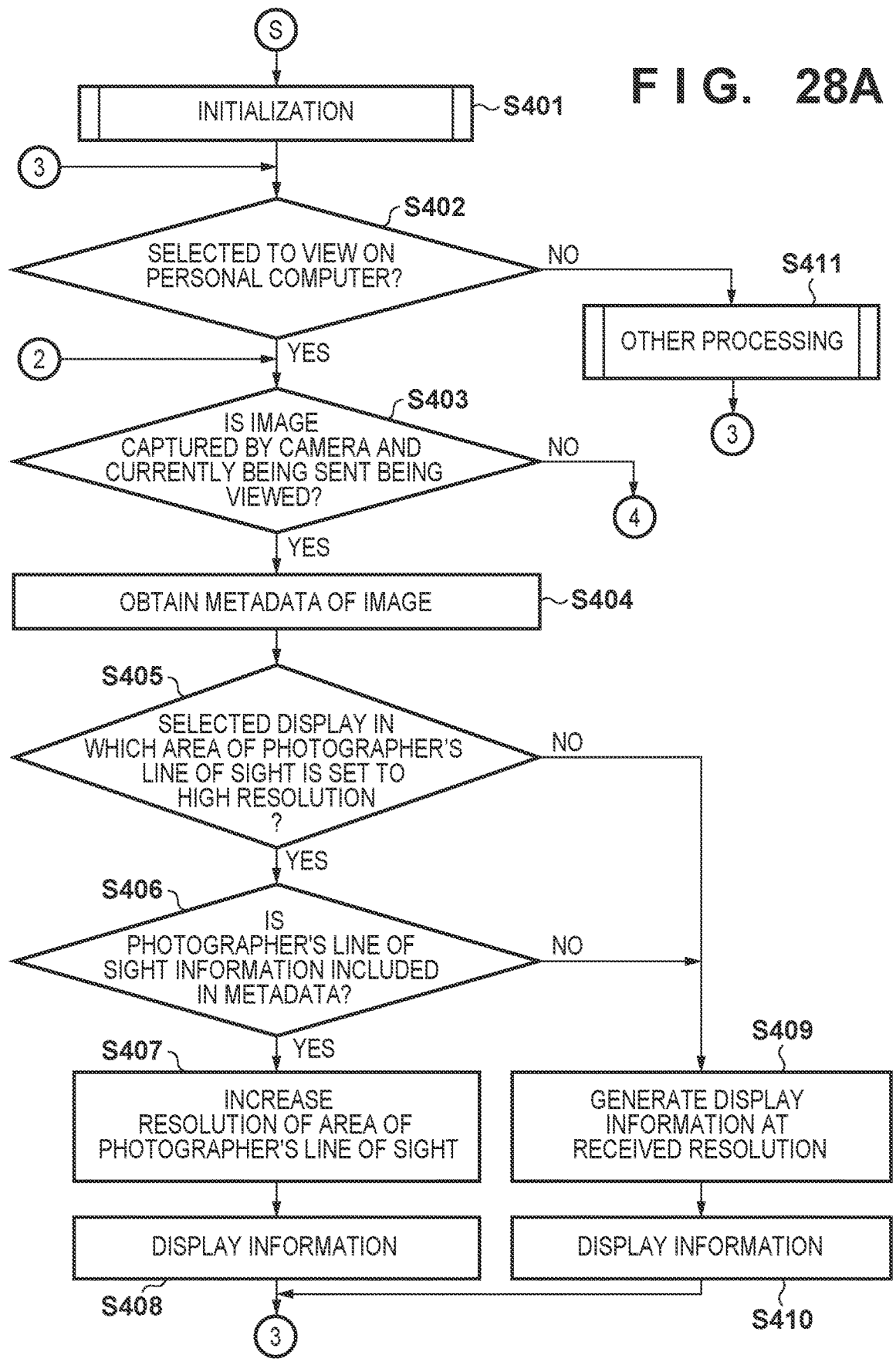
FIG. 28A is a diagram illustrating a control flow of the personal computer.
Figure 28B:
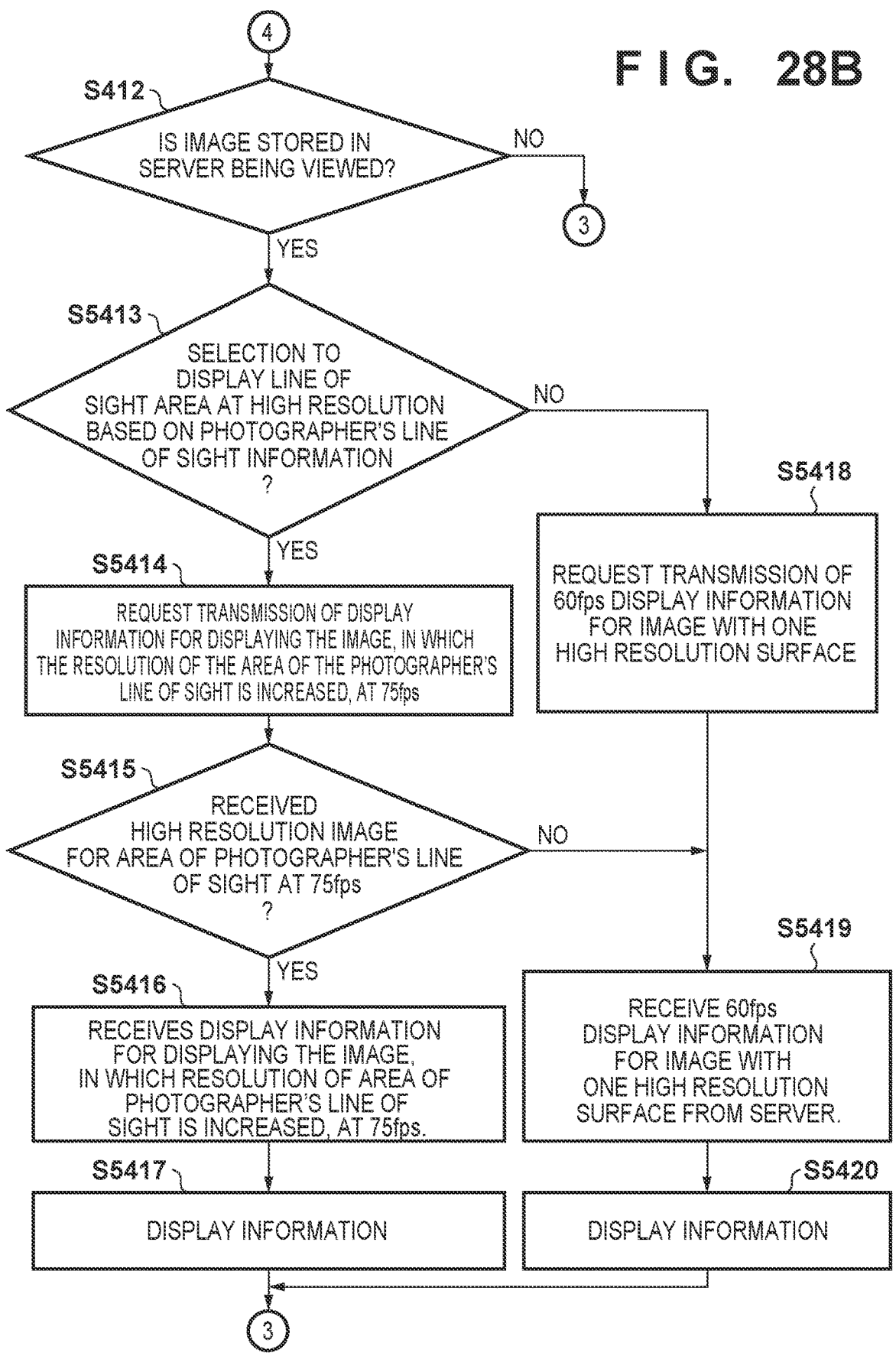
FIG. 28B is a diagram illustrating a control flow of the personal computer.

FIGS. 28A and 28B are flowcharts illustrating control of the personal computer that performs the operations described above. In FIGS. 28A and 28B, control that is the same as that illustrated in FIGS. 12A and 12B is given the same step numbers, and will not be described.

In FIG. 28B, in S5413, the CPU 475 of the personal computer 4000 determines whether or not metadata of the photographer's line of sight is present in the image. If metadata of the photographer's line of sight is present in the image, the sequence moves to S5414, and if not, the sequence moves to S5418.

In S5414, the CPU 475 requests the server to send data for displaying the image, in which the resolution of the area of the photographer's line of sight is increased, at 75 fps.

In S5415, the CPU 475 determines, based on the information sent from the server, whether or not an image, in which the resolution of the area of the photographer's line of sight is increased, is received at 75 fps. If an image, in which the resolution of the area of the photographer's line of sight is increased, is received at 75 fps, the sequence moves to S5416, and if not, the sequence moves to S5419.

In S5416, the CPU 475 receives data for displaying the image, in which the resolution of the area of the photographer's line of sight is increased, at 75 fps.

In S5417, the CPU 475 displays the information described above.

In S5418, the CPU 475 requests data for displaying the entire image at a high resolution at 60 fps to be sent.

In S5419, the CPU 475 receives data from the server for displaying the entire image at a high resolution at 60 fps.

In S5420, the CPU 475 displays the information described above.

Figure 29A:
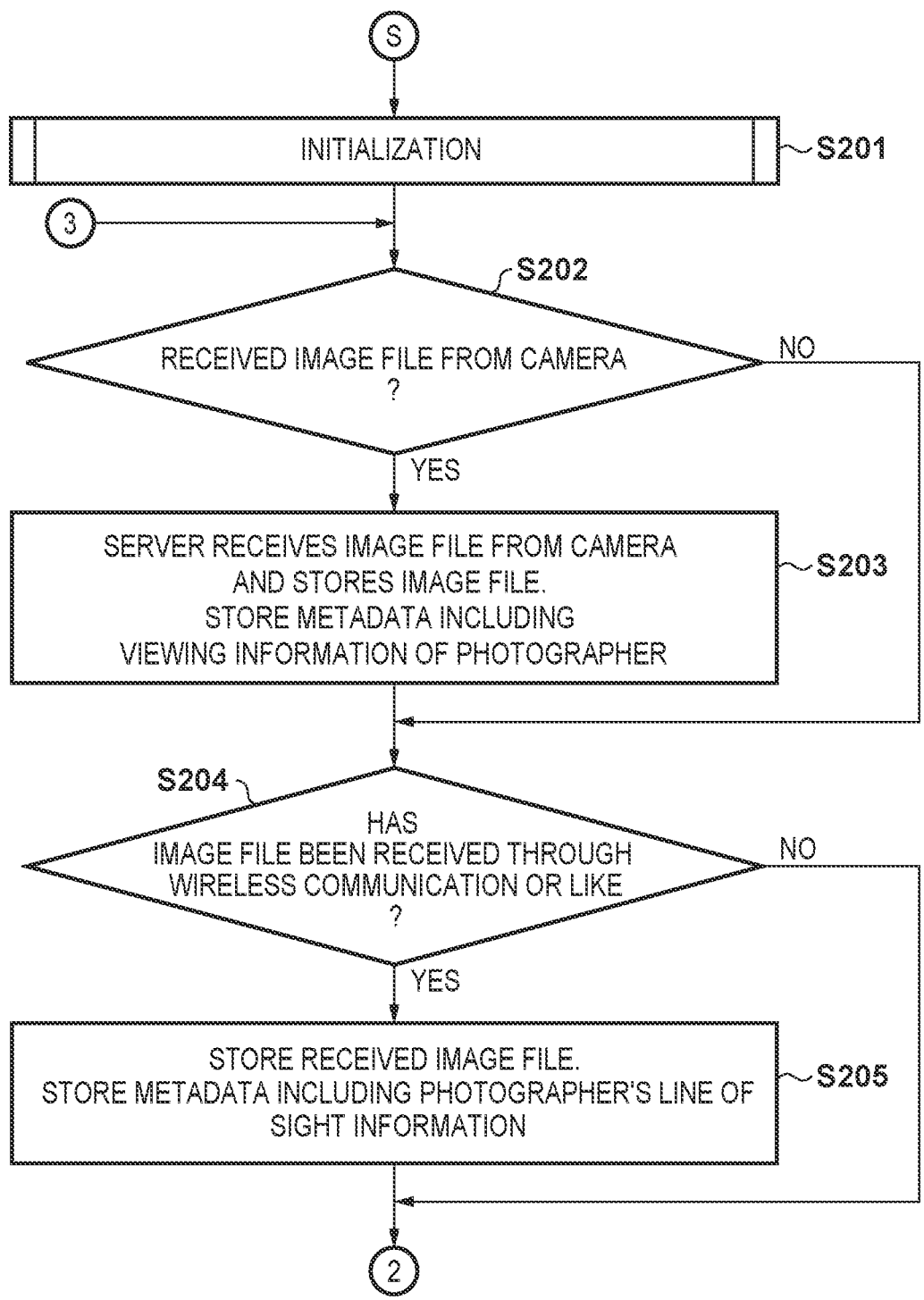
FIG. 29A is a diagram illustrating a control flow of the server.
Figure 29B:
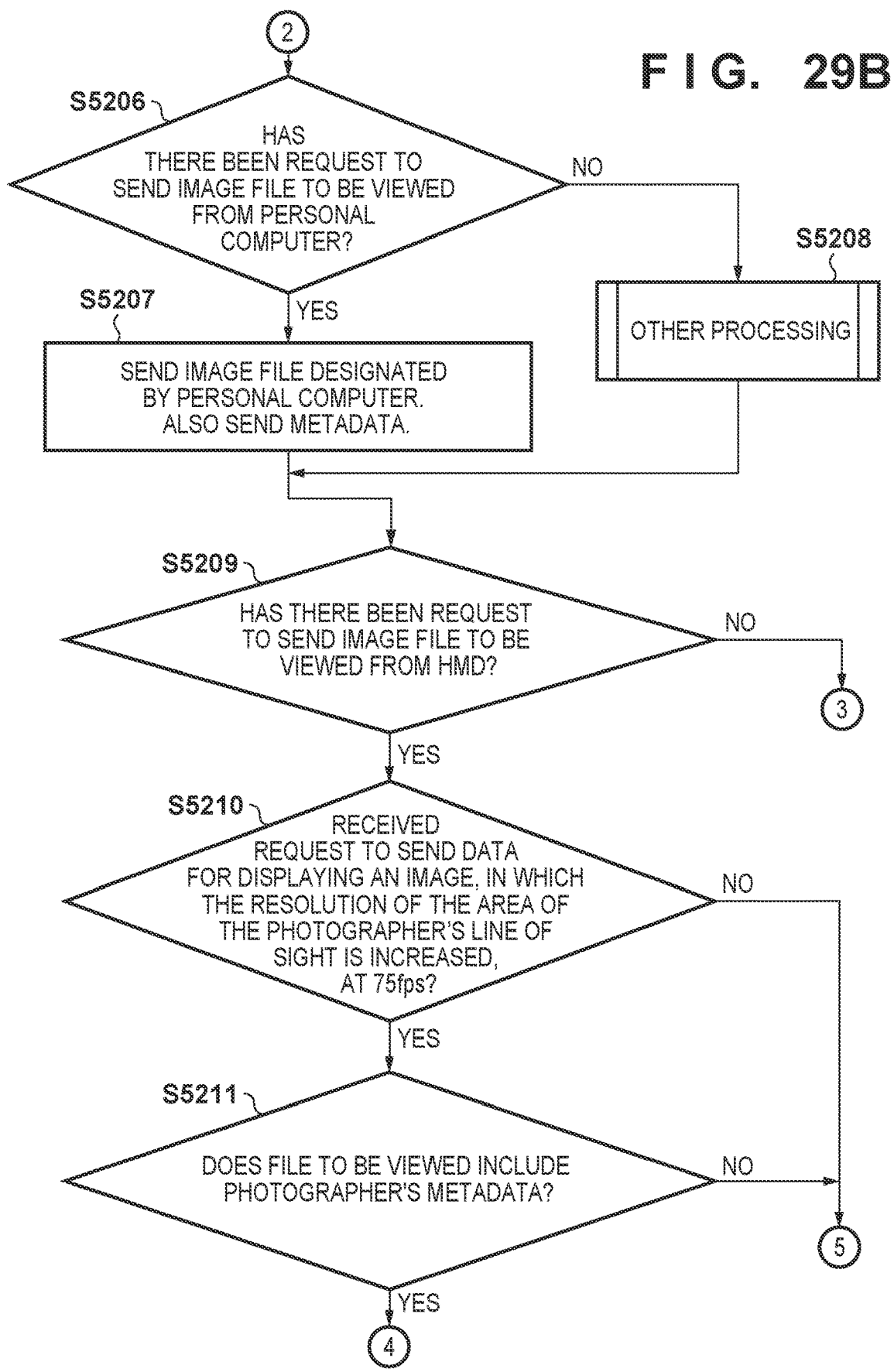
FIG. 29B is a diagram illustrating a control flow of the server.
Figure 29C:
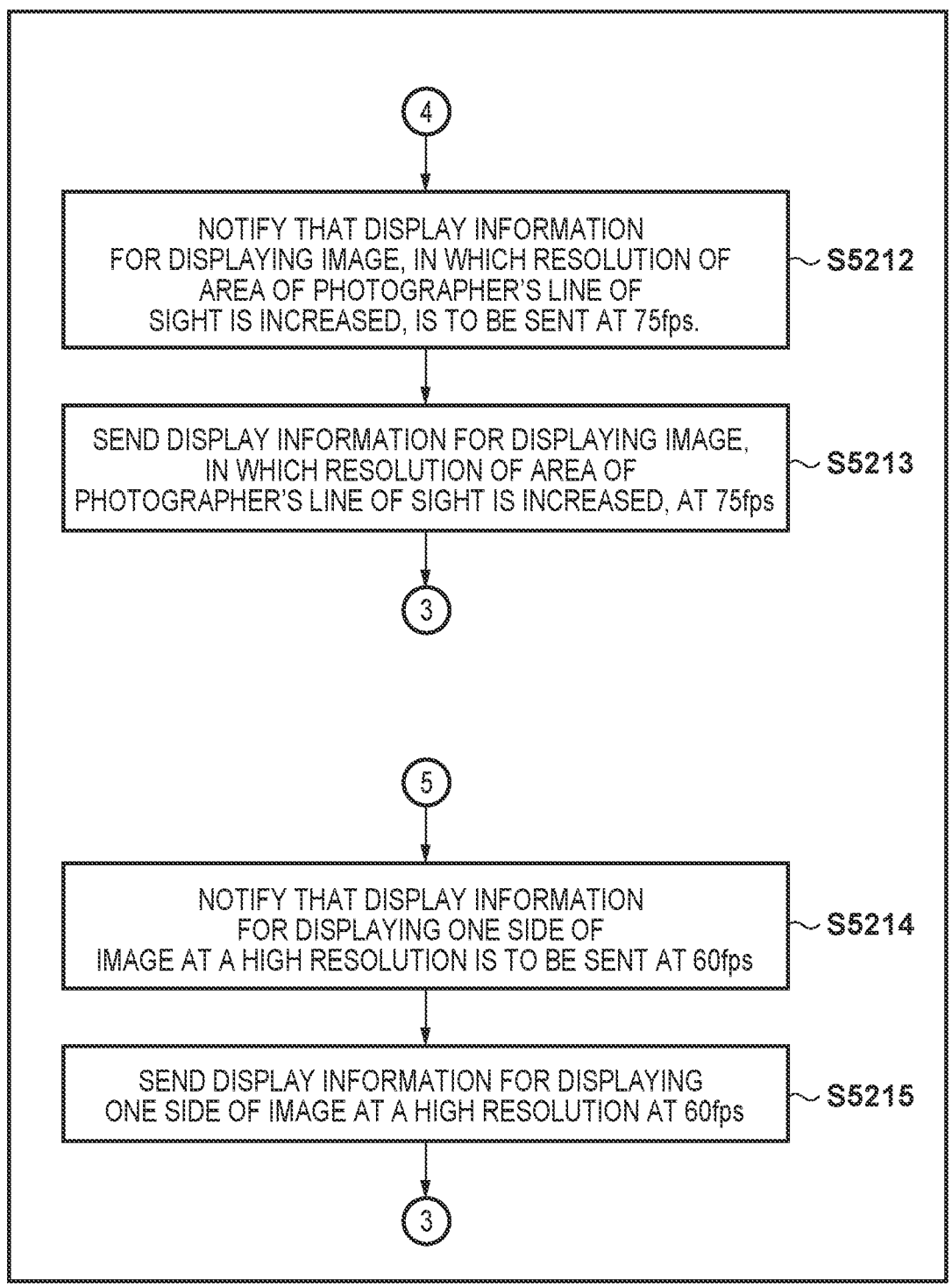
FIG. 29C is a diagram illustrating a control flow of the server.

FIGS. 29A to 29C are flowcharts illustrating control of the server that performs the operations described above. In FIG. 29, control that is the same as that illustrated in FIGS. 10A to 10D is given the same step numbers, and will not be described.

In FIG. 29B, in S5206, the CPU 591 of the server 5000 determines whether or not there has been a request to send an image file to be viewed from the personal computer. If there has been a request to send an image file to be viewed from the personal computer, the sequence moves to S5207, and if not, the sequence moves to S5208, where other processing is executed.

In S5207, the CPU 591 sends the image file designated from the personal computer. At the same time, metadata including information on the photographer's line of sight is also sent.

In S5209, the CPU 591 determines whether or not there has been a request to send an image file to be viewed from the HMD. If there has been a request to send an image file to be viewed from the HMD, the sequence moves to S5210, and if not, the sequence returns to S202.

In S5210, the CPU 591 determines whether or not a request has been received to send data for displaying an image, in which the resolution of the area of the photographer's line of sight is increased, at 75 fps. If a request to send data for displaying an image, in which the resolution of the area of the photographer's line of sight is increased, at 75 fps is received, the sequence moves to S5211, and if not, the sequence moves to S5214.

In S5211, the CPU 591 determines whether or not the file to be viewed contains metadata of the photographer. If the file to be viewed contains the metadata of the photographer, the sequence moves to S5212, and if not, the sequence moves to S5214.

Moving to FIG. 29C, in S5212, the CPU 591 makes a notification indicating that data for displaying the image, in which the resolution of the area of the photographer's line of sight is increased, is to be sent at 75 fps.

In S5213, the CPU 591 sends data for displaying the image, in which the resolution of the area of the photographer's line of sight is increased, at 75 fps.

In S5214, the CPU 591 makes a notification indicating that data for displaying the entire image at a high resolution is to be sent at 60 fps.

In S5215, the CPU 591 sends the data for displaying the entire image at a high resolution at 60 fps.

In the present embodiment, the device for displaying the three-dimensional image includes means for selecting, when operating using processing performed by another processor, whether to display the entire image at a high resolution and at a predetermined framerate, or increase the resolution of only the part corresponding to the photographer's line of sight and display the image at a higher framerate.

Through this, when displaying a three-dimensional image, whether to display the entire image at a high resolution and at a predetermined framerate, or display only the part corresponding to the photographer's line of sight at a high resolution and at a higher framerate, can be selected when executing processing using the processing resources of a server or the like rather than a standalone terminal. This enables the user to view a three-dimensional image according to their preferences.

The selection of the two methods described above is executed in the server based on a request from the viewing device.

Embodiment 22

In the present embodiment, the device includes means for capturing a three-dimensional image; means for detecting a viewer's line of sight when viewing the three-dimensional image; and means for storing the viewer's line of sight together with the image as metadata. Then, when displaying the three-dimensional image, a part corresponding to the viewer's line of sight is displayed at a high resolution based on the metadata.

Here, in the display of the three-dimensional image, when metadata information on the viewer's line of sight is not included in the image, the resolution of the image data is displayed without being changed. This is executed when receiving the three-dimensional image from the server.

Figure 30A:
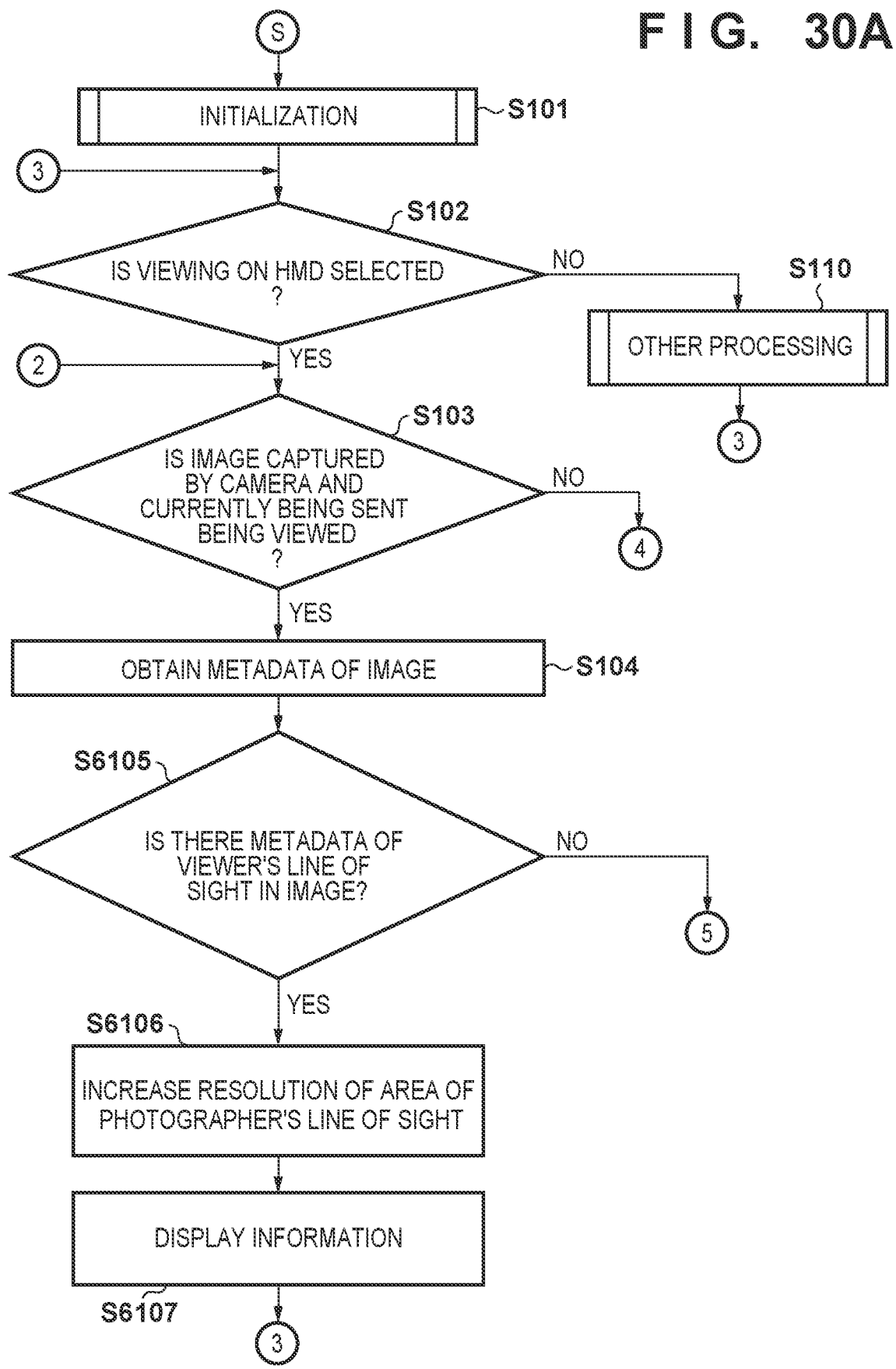
FIG. 30A is a diagram illustrating a control flow of the HMD.
Figure 30B:
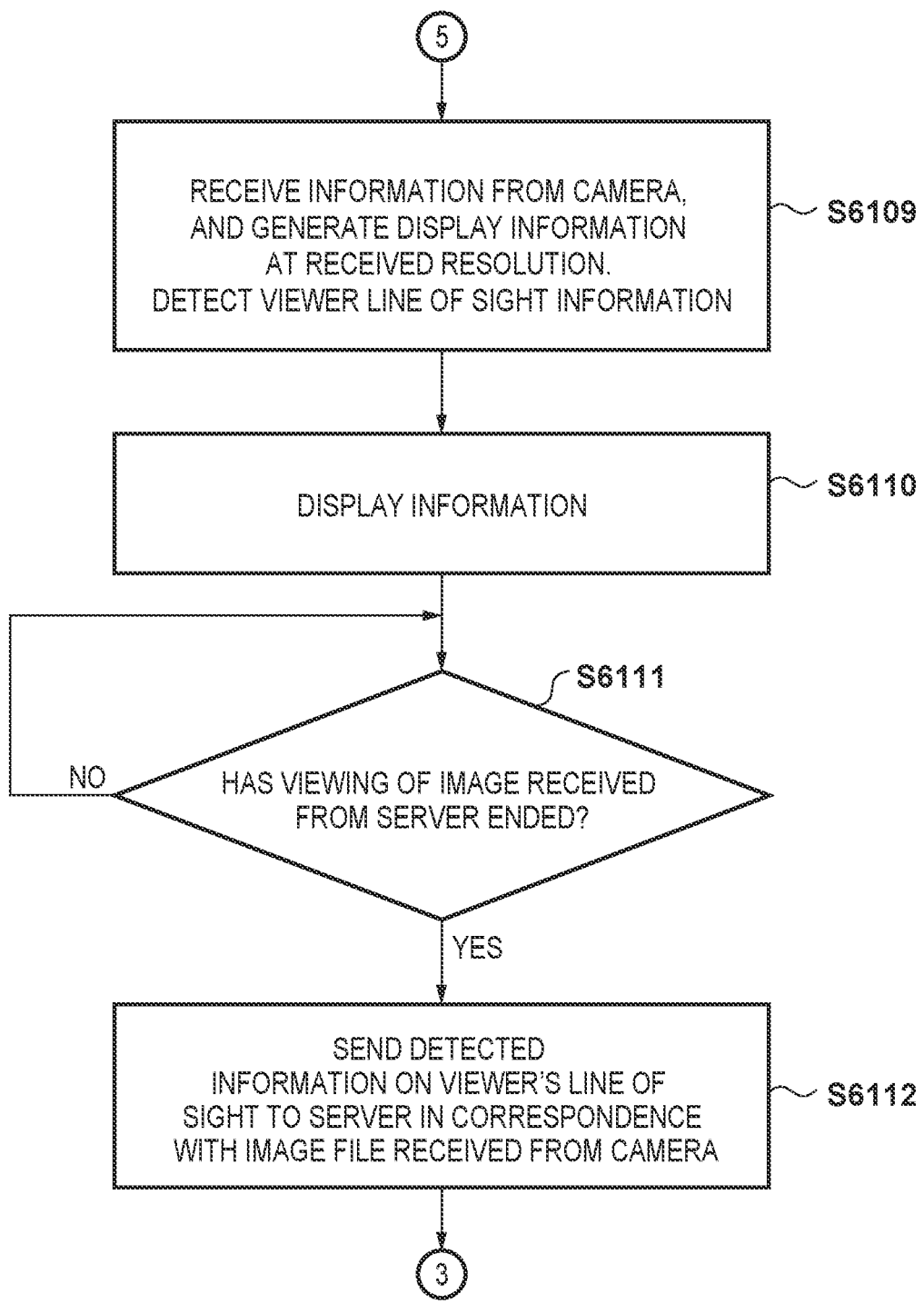
FIG. 30B is a diagram illustrating a control flow of the HMD.
Figure 30C:
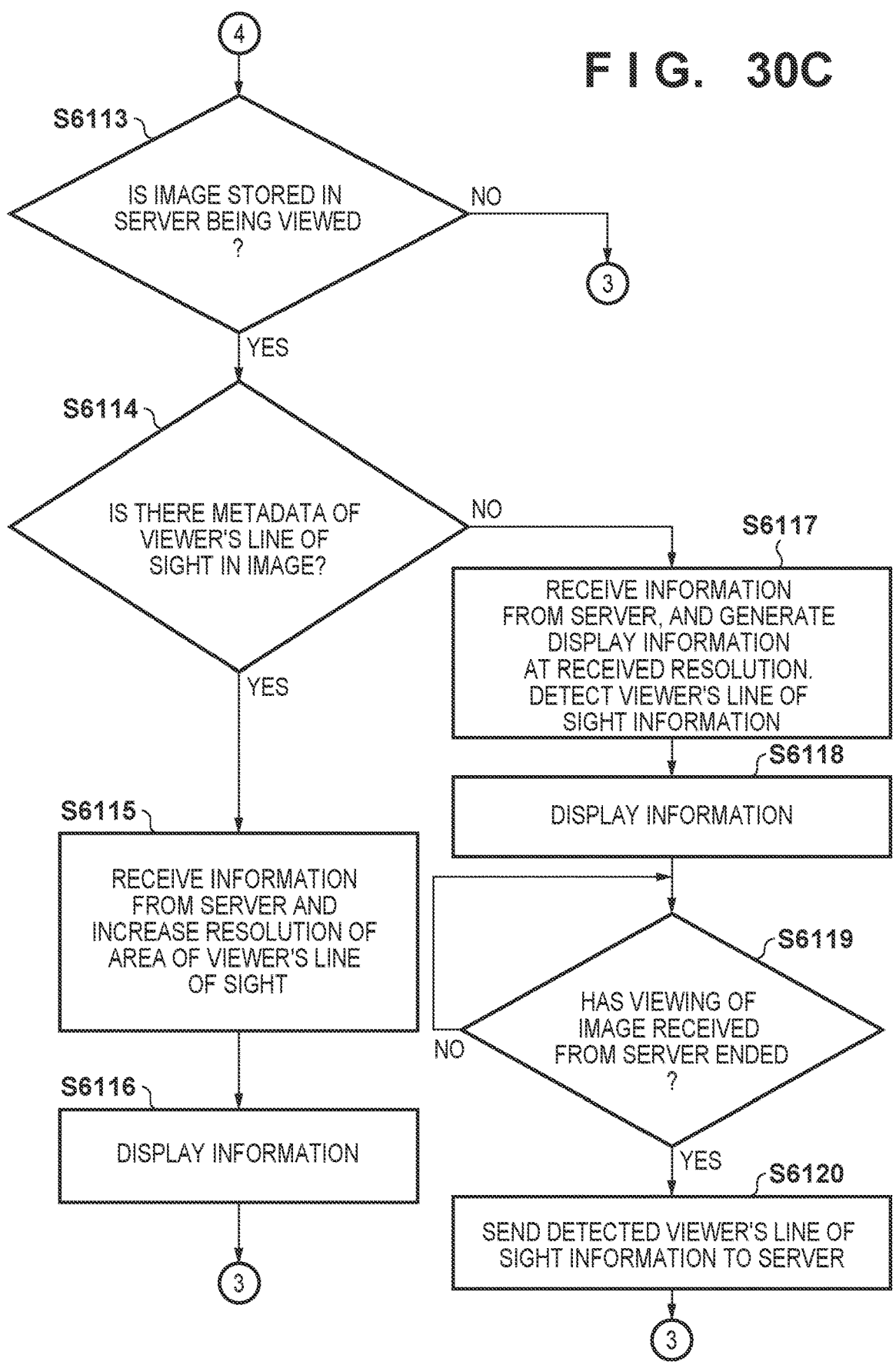
FIG. 30C is a diagram illustrating a control flow of the HMD.

FIGS. 30A to 30C are flowcharts illustrating control of the HMD that performs the operations described above. In FIGS. 30A to 30C, control that is the same as that illustrated in FIGS. 9A to 9C is given the same step numbers, and will not be described.

In FIG. 30A, in S6105, the CPU 355 of the HMD 3000 determines whether or not metadata of the photographer's line of sight is present in the image captured by the camera and being sent. If metadata of the photographer's line of sight is present in the image captured by the camera and being sent, the sequence moves to S6106, whereas if not, the sequence moves to S6109.

In S6106, the CPU 355 increases the resolution of the area of the photographer's line of sight.

In S6107, the CPU 355 displays the information described above.

Moving to FIG. 30B, in S6109, the CPU 355 receives the information from the camera, and generates display information at the received resolution. Information on the viewer's line of sight is detected.

In S6110, the CPU 355 displays the information described above.

In S6111, the CPU 355 determines whether or not the viewing of the image received from the server has ended. If the viewing of the image received from the server has ended, the sequence moves to S6112, and if not, the sequence moves to S6111.

In S6112, the CPU 355 sends the information on the viewer's line of sight which has been detected to the server in correspondence with the image file received from the camera.

Moving to FIG. 30C, in S6113, the CPU 355 determines whether or not an image stored in the server is being viewed. If an image stored in the server is being viewed, the sequence moves to S6114, and if not, the sequence moves to S102.

In S6114, the CPU 355 determines whether or not metadata of the viewer's line of sight is present in the image. If metadata of the viewer's line of sight is present in the image, the sequence moves to S6115, and if not, the sequence moves to S6117.

In S6115, the CPU 355 receives information from the server, and increases the resolution of the area of the viewer's line of sight.

In S6116, the CPU 355 displays the information described above.

In S6117, the CPU 355 receives the information from the server, and generates display information at the received resolution. Information on the viewer's line of sight is also detected.

In S6118, the CPU 355 displays the information described above.

In S6119, the CPU 355 determines whether or not the viewing of the image received from the server has ended. If the viewing of the image received from the server has ended, the sequence moves to S6120, and if not, the sequence moves to S6119.

In S6120, the CPU 355 sends the information on the viewer's line of sight which has been detected to the server in correspondence with the image file received from the camera.

Figure 31A:
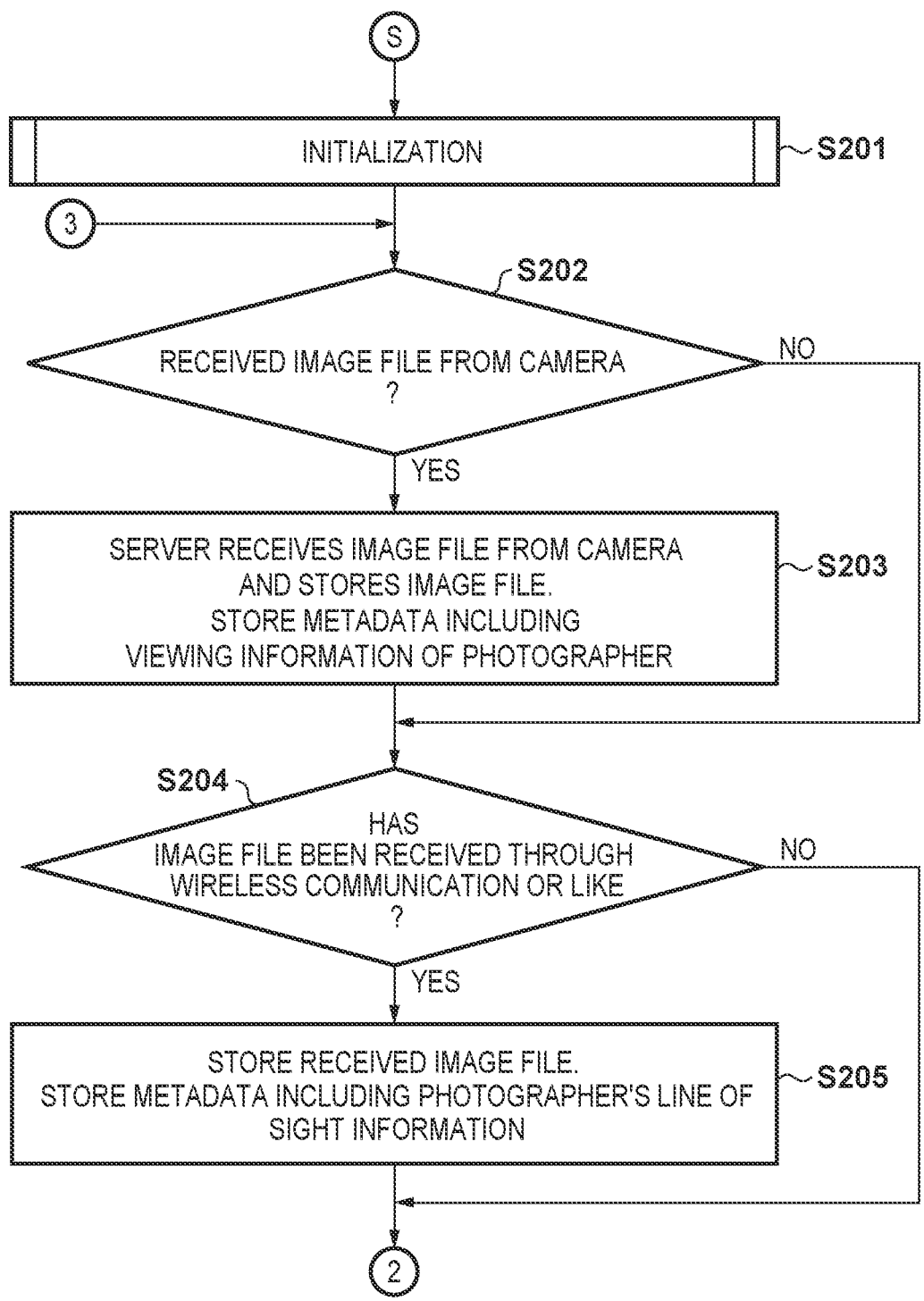
FIG. 31A is a diagram illustrating a control flow of the server.
Figure 31B:
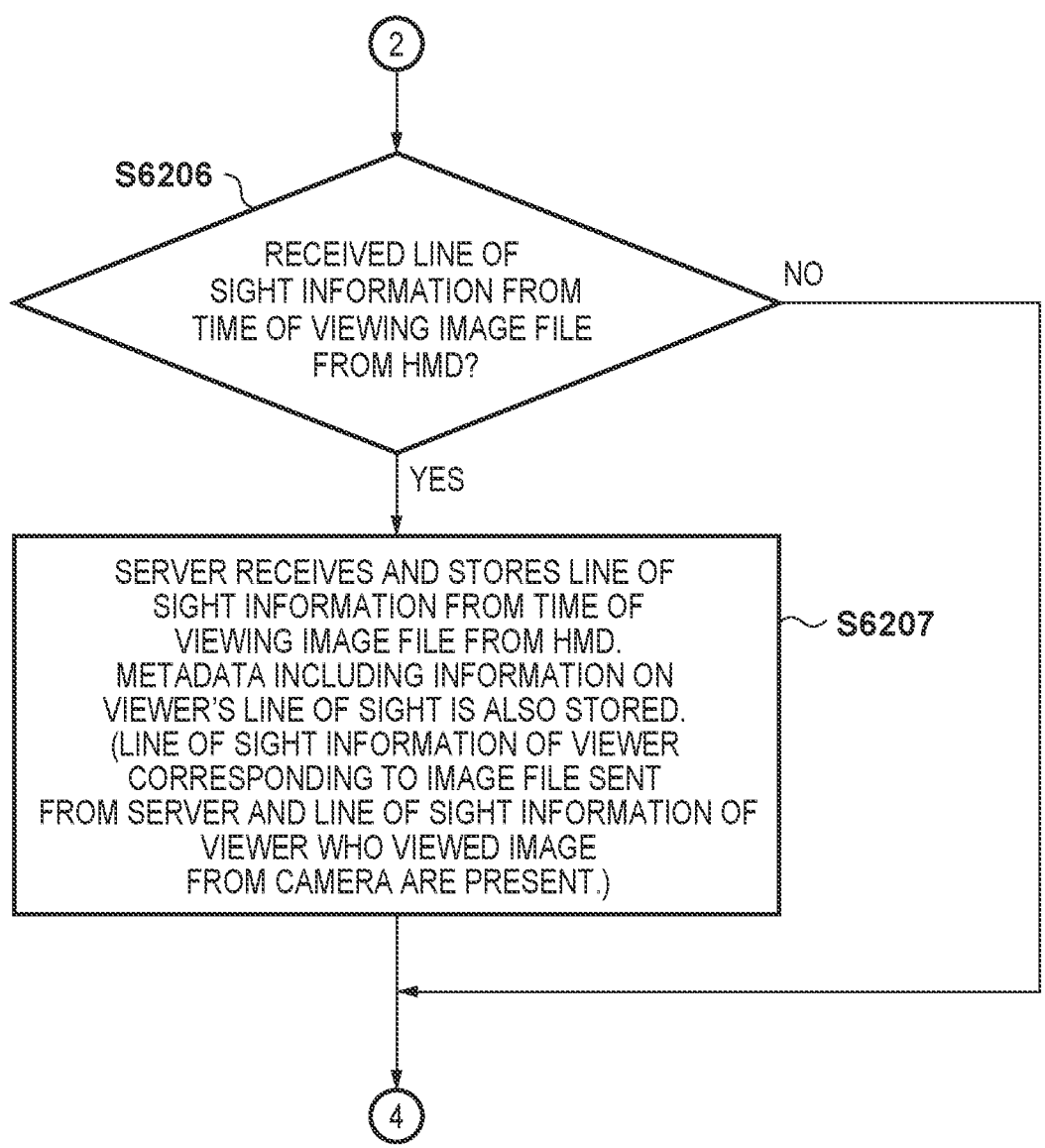
FIG. 31B is a diagram illustrating a control flow of the server.
Figure 31C:
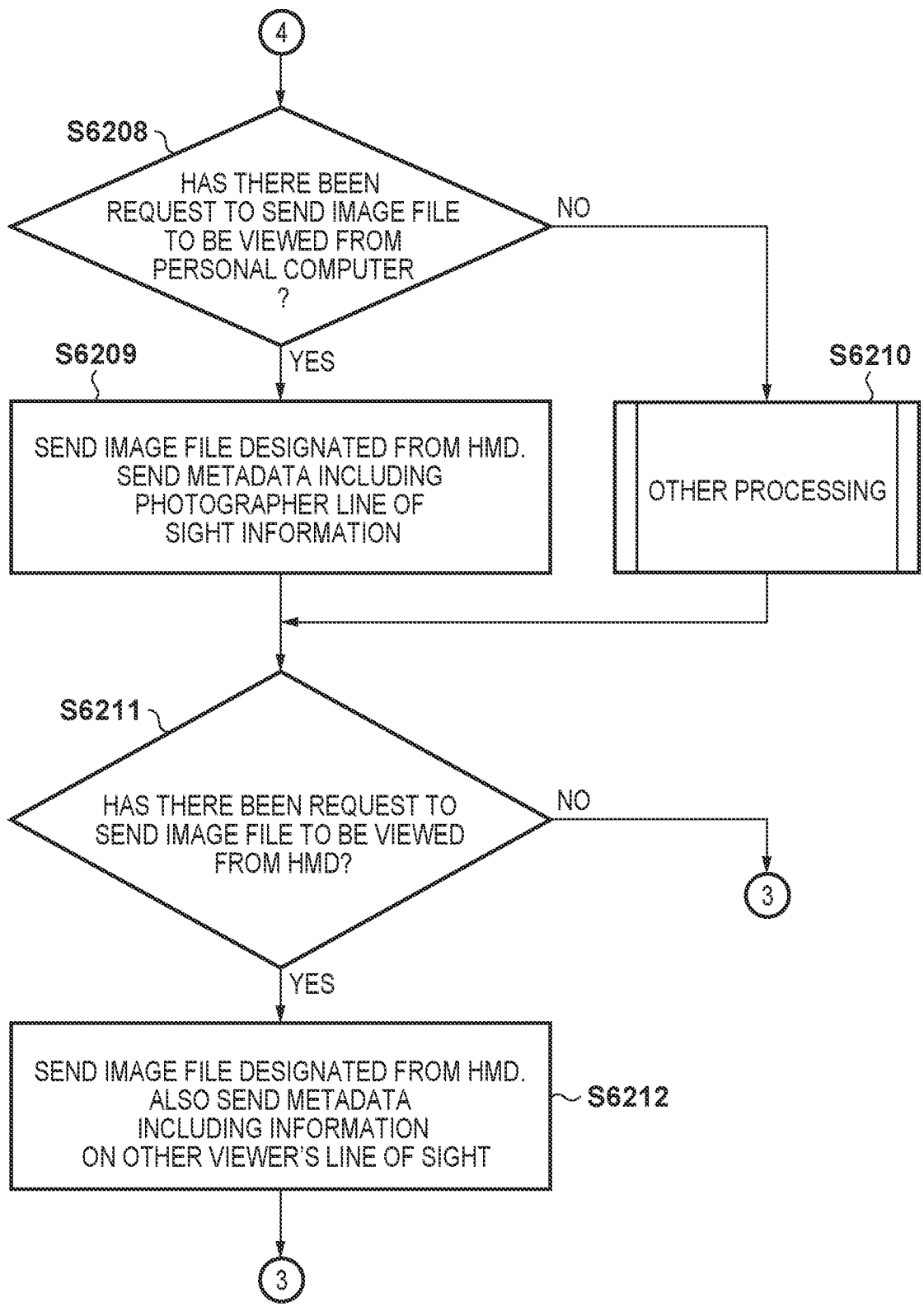
FIG. 31C is a diagram illustrating a control flow of the server.

FIGS. 31A to 31C are flowcharts illustrating control of the server that performs the operations described above. In FIGS. 31A to 31C, control that is the same as that illustrated in FIGS. 10A to 10D is given the same step numbers, and will not be described.

In FIG. 31B, in S6206, the CPU 591 of the server 5000 determines whether or not line of sight information from the time of viewing the image file has been received from the HMD. If line of sight information from the time of viewing the image file has been received from the HMD, the sequence moves to S6207, and if not, the sequence moves to S6208.

In S6207, the CPU 591 receives and stores the line of sight information from the time of viewing the image file from the HMD. Metadata including information on the viewer's line of sight is also stored. Here, information on the viewer's line of sight corresponding to the image file sent from the server, and information on the line of sight of the viewer who viewed the image from the camera, are present.

Moving to FIG. 31C, in S6208, the CPU 591 determines whether or not there has been a request to send an image file to be viewed from the personal computer. If there is a request to send an image file to be viewed from the personal computer, the sequence moves to S6209, and if not, the sequence moves to S6210, where other processing is executed.

In S6209, the CPU 591 sends the image file designated from the personal computer. At the same time, metadata including information on the photographer's line of sight is also sent.

In S6211, the CPU 591 determines whether or not there has been a request to send an image file to be viewed from the HMD. If there has been a request to send an image file to be viewed from the HMD, the sequence moves to S6212, and if not, the sequence moves to S202.

In S6212, the CPU 591 sends the image file designated from the HMD. At the same time, metadata including information on another viewer's line of sight is also sent.

The flow of control of the camera is the same as that illustrated in FIG. 11.

Figure 32A:
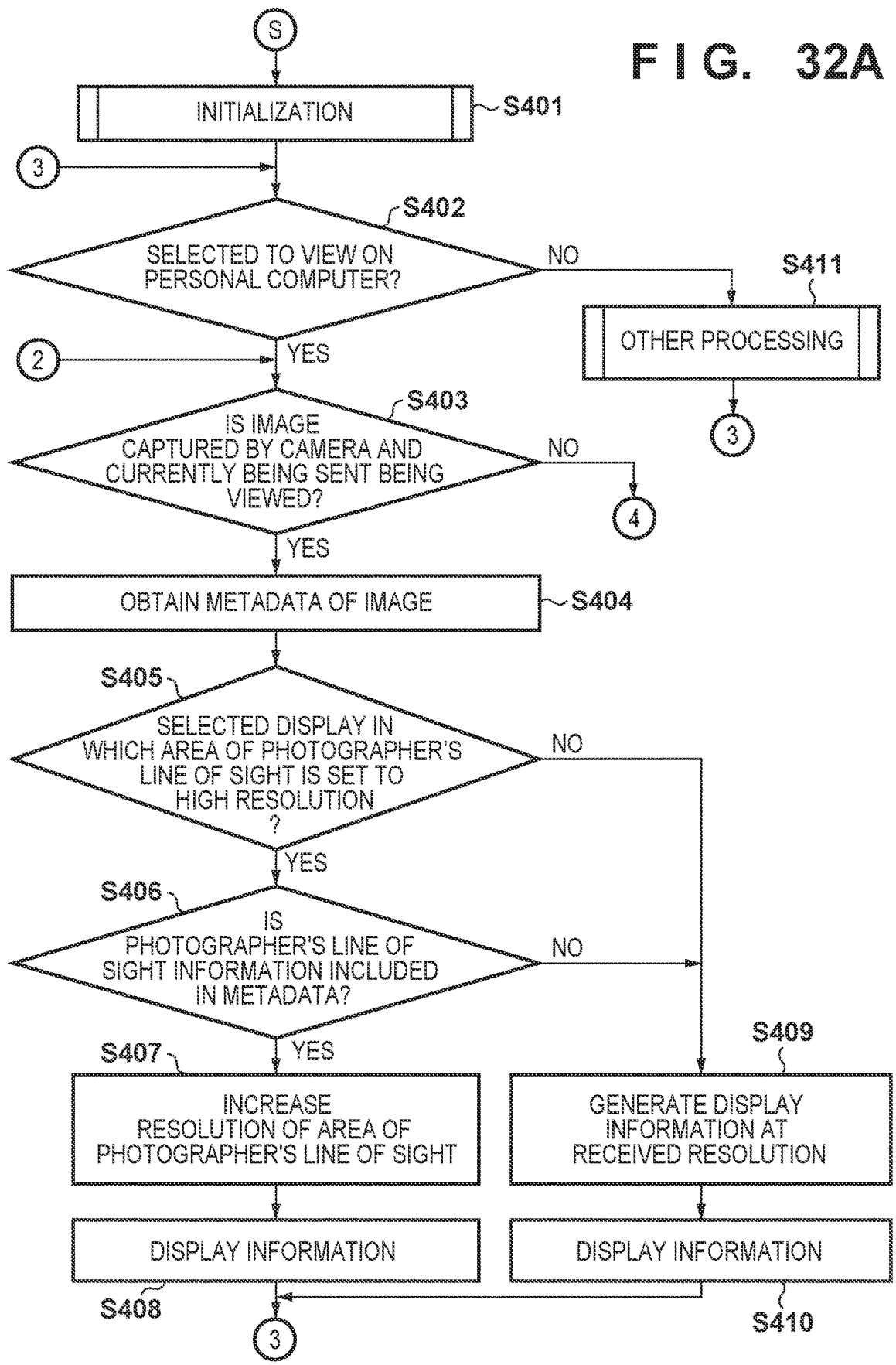
FIG. 32A is a diagram illustrating a control flow of the personal computer.
Figure 32B:
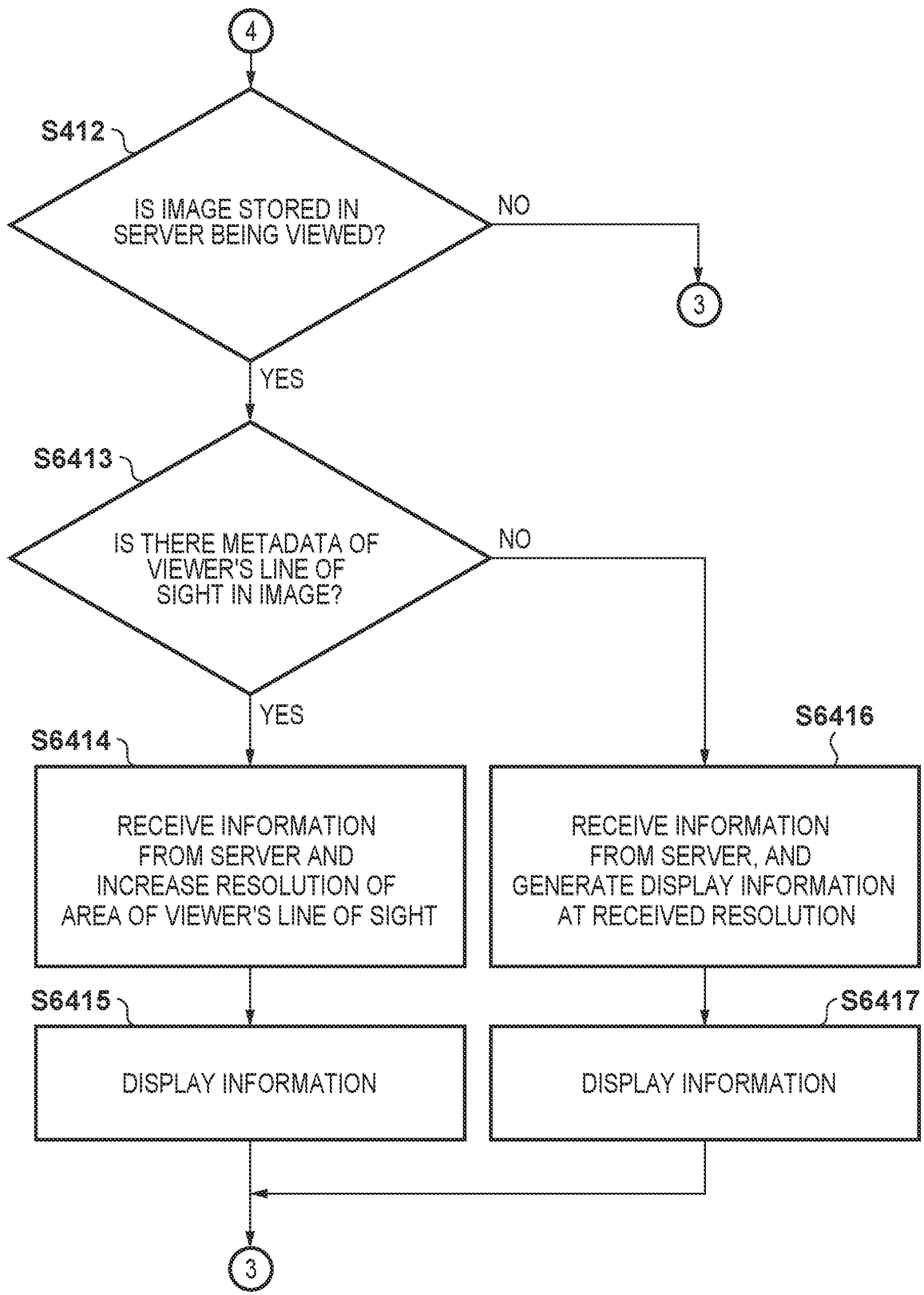
FIG. 32B is a diagram illustrating a control flow of the personal computer.

FIGS. 32A and 32B are flowcharts illustrating control of the personal computer that performs the operations described above. In FIGS. 32A and 32B, control that is the same as that illustrated in FIGS. 12A and 12B is given the same step numbers, and will not be described.

In FIGS. 32A and 32B, S401 to S412 are the same as the control illustrated in FIGS. 12A and 12B, and will therefore not be described.

In FIG. 32B, in S6413, the CPU 475 of the personal computer 4000 determines whether or not metadata of the viewer's line of sight is present in the image. If metadata of the viewer's line of sight is present in the image, the sequence moves to S6414, and if not, the sequence moves to S6416.

In S6414, the CPU 475 receives information from the server, and increases the resolution of the area of the viewer's line of sight.

In S6415, the CPU 475 displays the information described above.

In S6416, the CPU 475 receives the information from the server, and generates display information at the received resolution.

In S6417, the CPU 475 displays the information described above.

In the present embodiment, the device includes means for capturing a three-dimensional image; means for detecting a viewer's line of sight when viewing the three-dimensional image; and means for storing the viewer's line of sight together with the image as metadata. Then, when displaying the three-dimensional image, a part corresponding to the viewer's line of sight is displayed at a high resolution based on the metadata.

This makes it possible to increase the resolution of the viewer's line of sight when viewing the three-dimensional image, and to view the image while understanding another viewer's line of sight. The viewer can view the image centered on the other viewer's line of sight, and can therefore view the image while learning from the other viewer's line of sight. This makes the viewing easier.

Additionally, in the display of the three-dimensional image, when metadata information on the viewer's line of sight is not included in the image, the resolution of the image data is displayed without being changed.

Through this, when displaying at a high resolution, the image matches the viewer's intentions, which improves the convenience for the user.

The display control described above is executed when receiving the three-dimensional image from the server. This makes it possible to view the part corresponding to the photographer's line of sight at a high resolution when viewing a three-dimensional image stored in the server.

Embodiment 23

In the present embodiment, the device includes means for capturing a three-dimensional image; means for detecting a viewer's line of sight when viewing the three-dimensional image; means for detecting the viewer's characteristics when viewing the three-dimensional image; means for storing the viewer's line of sight as metadata together with the image when viewing the three-dimensional image; and means for storing the viewer's characteristics as metadata. Then, when displaying the three-dimensional image, the viewer's characteristics are detected, and an area of the line of sight of a viewer similar to the viewer is displayed at a high resolution based on the metadata. The part to be displayed at a high resolution is changed based on the viewer's characteristic information. Here, the characteristic information of the viewer is assumed to be the viewer's gender and age.

Figure 33A:
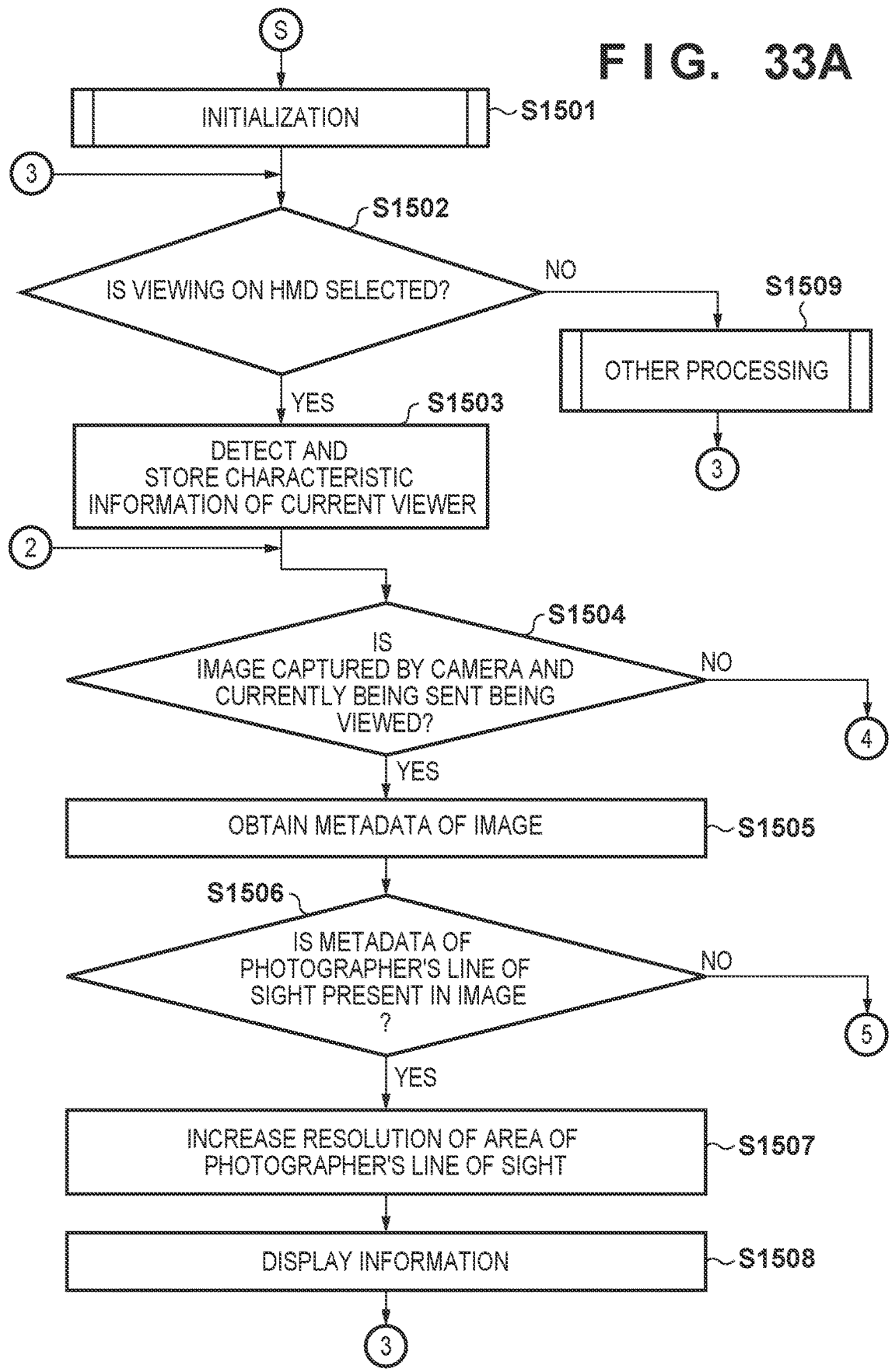
FIG. 33A is a diagram illustrating a control flow of the HMD.
Figure 33B:
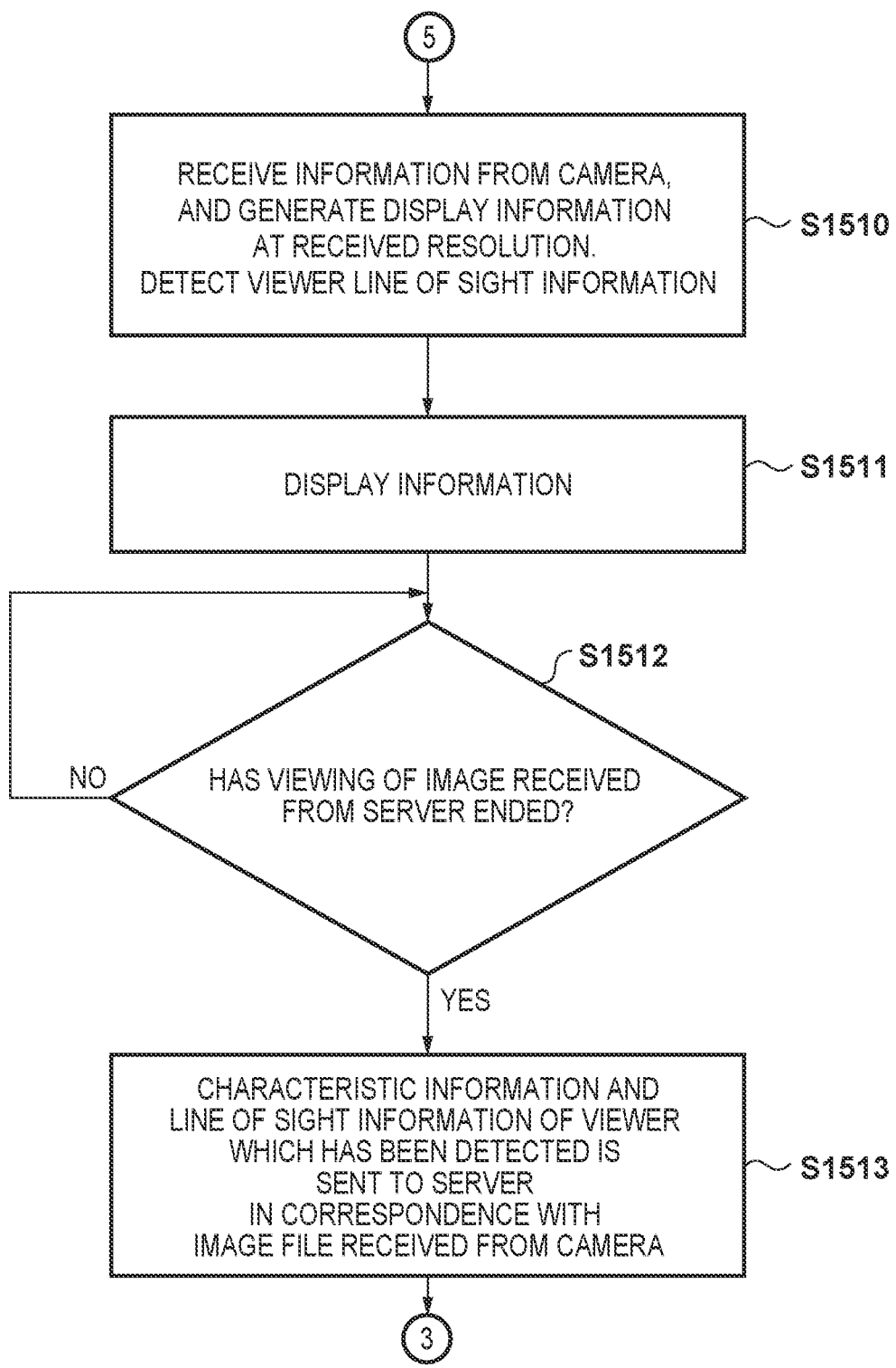
FIG. 33B is a diagram illustrating a control flow of the HMD.

FIGS. 33A to 33C are flowcharts illustrating control of the HMD that performs the operations described above.

In FIG. 33A, S1501 represents initialization.

In S1502, the CPU 355 of the HMD 3000 determines whether or not a viewing mode in the HMD has been selected. If the viewing mode in the HMD has been selected, the sequence moves to S1503, and if not, the sequence moves to S1509, where other processing is executed.

In S1503, the CPU 355 detects and stores characteristic information of the current viewer. Here, the characteristic information is age, gender, and the like.

In S1504, the CPU 355 determines whether or not an image captured by the camera and currently being sent is being viewed. If an image captured by the camera and currently being sent is being viewed, the sequence moves to S1505, and if not, the sequence moves to S1515.

In S1505, the CPU 355 receives an image captured by the camera and sent through wireless communication or the like, and obtains the metadata thereof.

In S1506, the CPU 355 determines whether or not metadata of the photographer's line of sight is present in the image captured by the camera and being sent. If metadata of the photographer's line of sight is present in the image captured by the camera and being sent, the sequence moves to S1507, whereas if not, the sequence moves to S1510.

In S1507, the CPU 355 increases the resolution of the area of the photographer's line of sight.

In S1508, the CPU 355 displays the information described above.

Moving to FIG. 33B, in S1510, the CPU 355 receives the information from the camera, and generates display information at the received resolution. Information on the viewer's line of sight is also detected.

In S1511, the CPU 355 displays the information described above.

In S1512, the CPU 355 determines whether or not the viewing of the image received from the server has ended. If the viewing of the image received from the server has ended, the sequence moves to S1512, and if not, the sequence moves to S1511.

In S1513, the characteristic information and line of sight information of the viewer which has been detected is sent to the server in correspondence with the image file received from the camera.

Moving to FIG. 33C, in S1514, the CPU 355 determines whether or not an image stored in the server is being viewed. If an image stored in the server is being viewed, the sequence moves to S1515, and if not, the sequence moves to S1502.

In S1515, the CPU 355 determines whether or not metadata of a line of sight similar to the characteristics of the current viewer is present. If metadata of a line of sight similar to the characteristics of the current viewer is present, the sequence moves to S1517, and if not, the sequence moves to S1516.

In S1516, the CPU 355 determines whether or not metadata of the viewer's line of sight is present in the image. If metadata of the viewer's line of sight is present in the image, the sequence moves to S1517, and if not, the sequence moves to S1519.

In S1517, the CPU 355 receives information from the server, and increases the resolution of the area of the viewer's line of sight.

In S1518, the CPU 355 displays the information described above.

In S1519, the CPU 355 receives the information from the server, and generates display information at the received resolution. Information on the viewer's line of sight is also detected.

In S1520, the CPU 355 displays the information described above.

In S1521, the CPU 355 determines whether or not the viewing of the image received from the server has ended. If the viewing of the image received from the server has ended, the sequence moves to S1522, and if not, the sequence moves to S1521.

In S1522, the CPU 355 sends the detected detection information and line of sight information of the viewer to the server.

The flow of control of the camera is the same as that illustrated in FIG. 11.

Figure 34A:
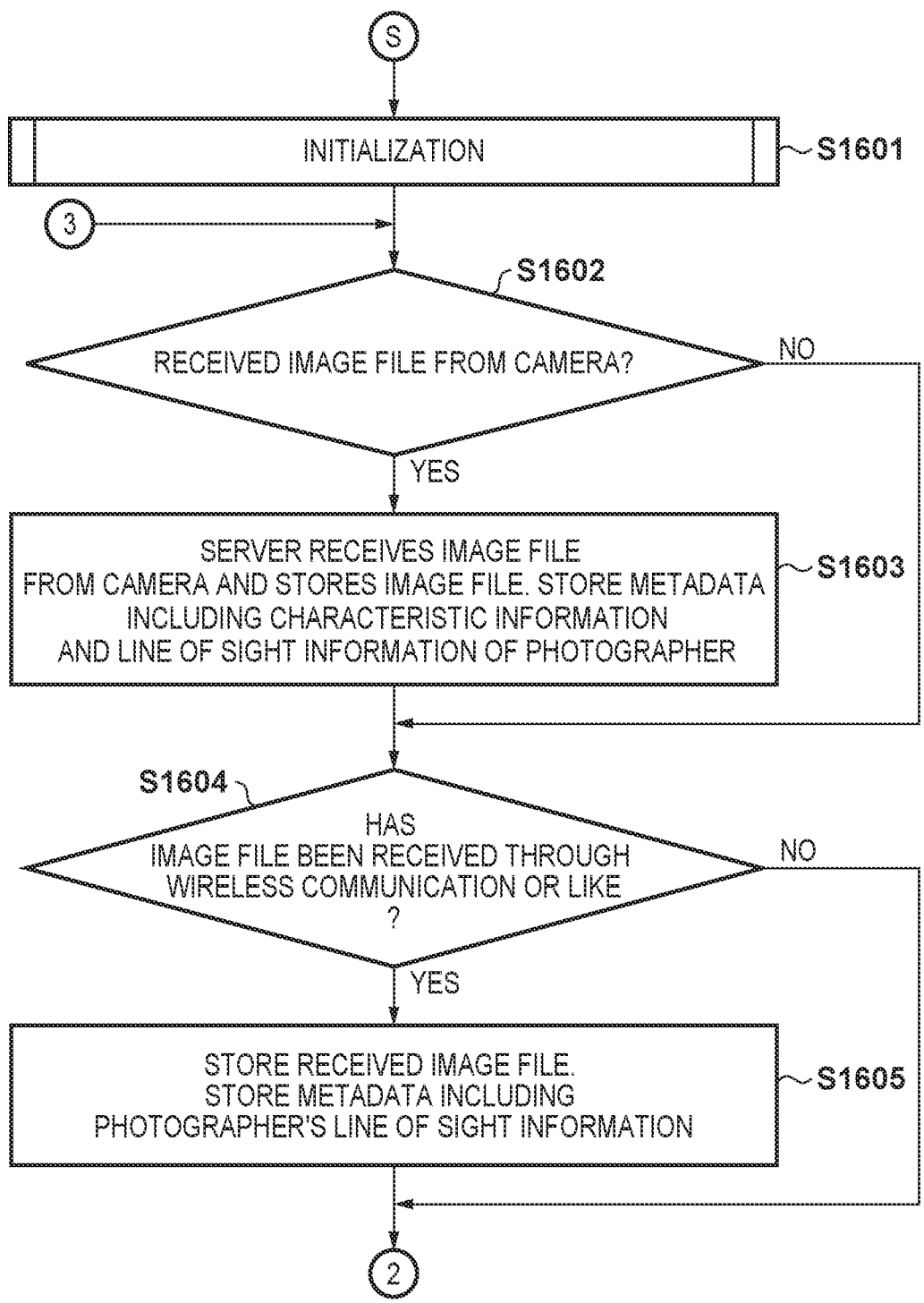
FIG. 34A is a diagram illustrating a control flow of the server.
Figure 34B:
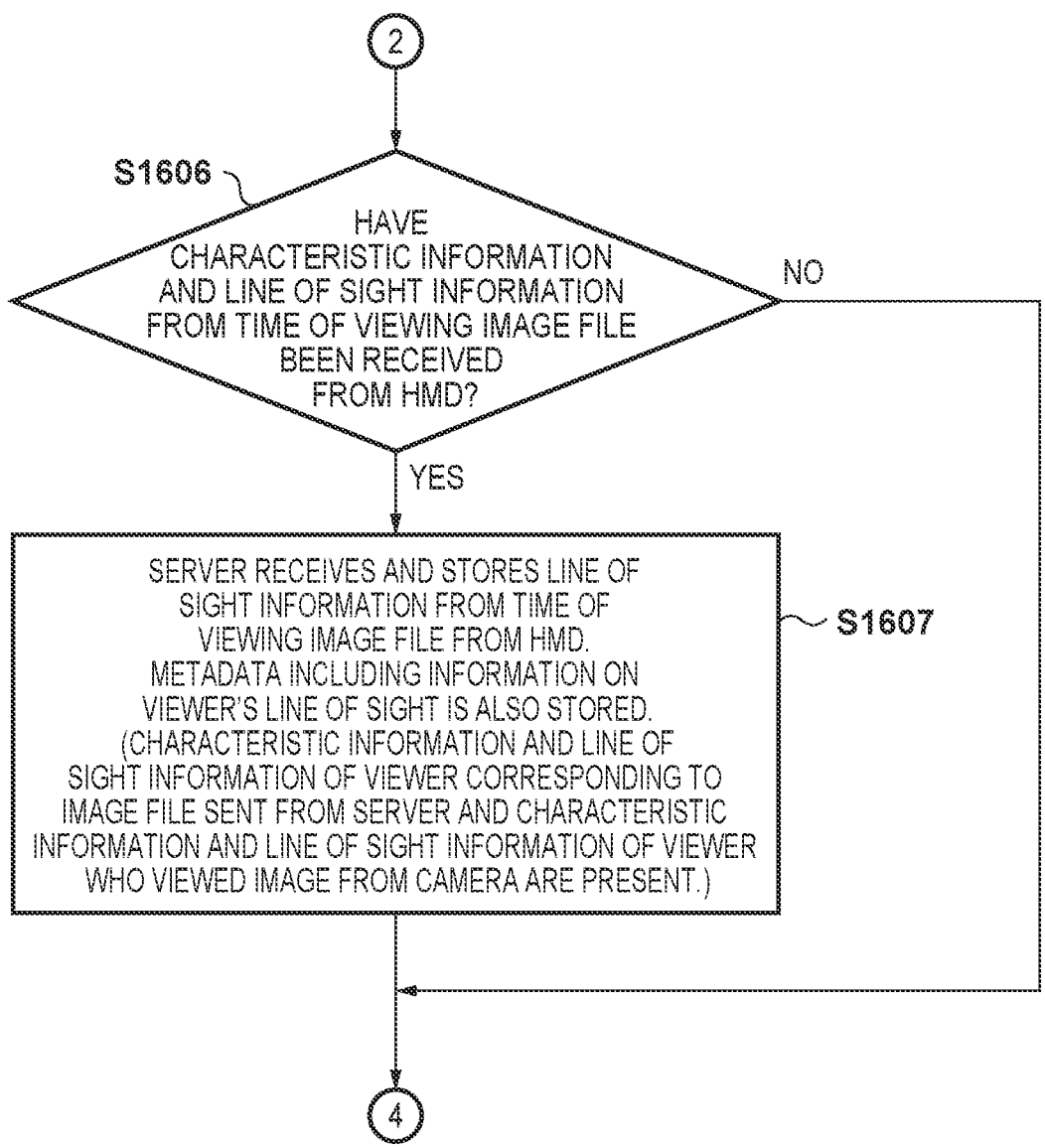
FIG. 34B is a diagram illustrating a control flow of the server.

FIGS. 34A to 34C are flowcharts illustrating control of the server that performs the operations described above.

In FIG. 34A, S1601 represents initialization.

In S1602, the CPU 591 of the server 5000 determines whether or not an image file has been received from the camera. If an image file has been received from the camera, the sequence moves to S1603, and if not, the sequence moves to S1604.

In S1603, the CPU 591 receives the image file from the camera and stores the image file. At the same time, metadata including the photographer's characteristic information and viewing information is stored.

In S1604, the CPU 591 determines whether or not an image file has been received through wireless communication or the like from a source other than the camera. If an image file is received through wireless communication or the like from a source other than the camera, the sequence moves to S1605, and if not, the sequence moves to S1606.

In S1605, the CPU 591 stores the received image file. At the same time, metadata including information on the photographer's line of sight is also stored.

Moving to FIG. 34B, in S1606, the CPU 591 determines whether or not characteristic information and line of sight information from the time of viewing the image file have been received from the HMD. If characteristic information and line of sight information from the time of viewing the image file have been received from the HMD, the sequence moves to S1607, and if not, the sequence moves to S1608.

In S1607, the CPU 591 receives and stores the line of sight information from the time of viewing the image file from the HMD. Metadata including the viewer's characteristic information (specifically, information on the viewer's gender, age, and the like) and line of sight information is also stored. Here, the characteristic information and line of sight information of the viewer corresponding to the image file sent from the server, and the characteristic information and line of sight information of the viewer who viewed the image from the camera, are present.

The characteristic information of the viewer may be input from the operation unit, or an image of the viewer may be captured using a camera or the like and the characteristic information estimated from the captured image information. A large amount of line of sight information based on the characteristic information, such as the information on the viewer's gender and age, is collected as big data, a line of sight that matches the characteristics of the person currently viewing is recognized from this information, and a high-resolution image is displayed based on that line of sight information.

Moving to FIG. 34C, in S1608, the CPU 591 determines whether or not there has been a request to send an image file to be viewed from the personal computer. If there has been a request to send an image file to be viewed from the personal computer, the sequence moves to S1609, and if not, the sequence moves to S1610, where other processing is executed.

In S1609, the CPU 591 sends the image file designated from the personal computer. Here, metadata including information on the photographer's line of sight is also sent.

In S1611, the CPU 591 determines whether or not there has been a request to send an image file to be viewed from the HMD. If there has been a request to send an image file to be viewed from the HMD, the sequence moves to S1612, and if not, the sequence moves to S1602.

In S1612, the CPU 591 determines whether or not the image file being viewed includes line of sight information of a person having characteristic information similar to the person currently viewing. If the image file being viewed includes line of sight information of a person having characteristic information similar to the person currently viewing, the sequence moves to S1613, and if not, the sequence moves to S1614.

In S1613, the CPU 591 sends the image file designated from the HMD. Metadata including information on the line of sight of another viewer having characteristic information similar to the person currently viewing is also sent.

In S1614, the CPU 591 sends the image file designated from the HMD. Metadata including information on another viewer's line of sight is also sent.

Figure 35A:
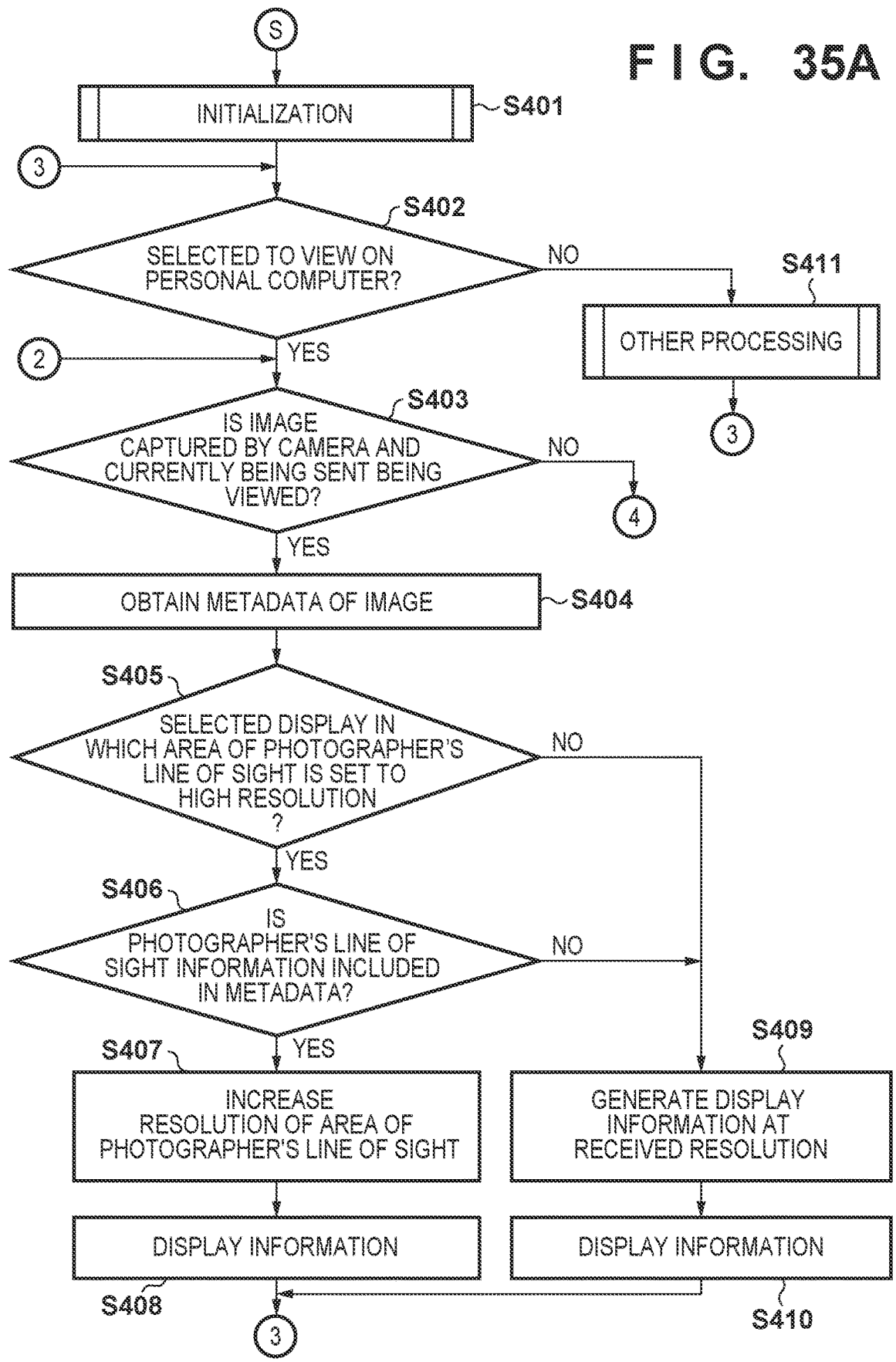
FIG. 35A is a diagram illustrating a control flow of the personal computer.
Figure 35B:
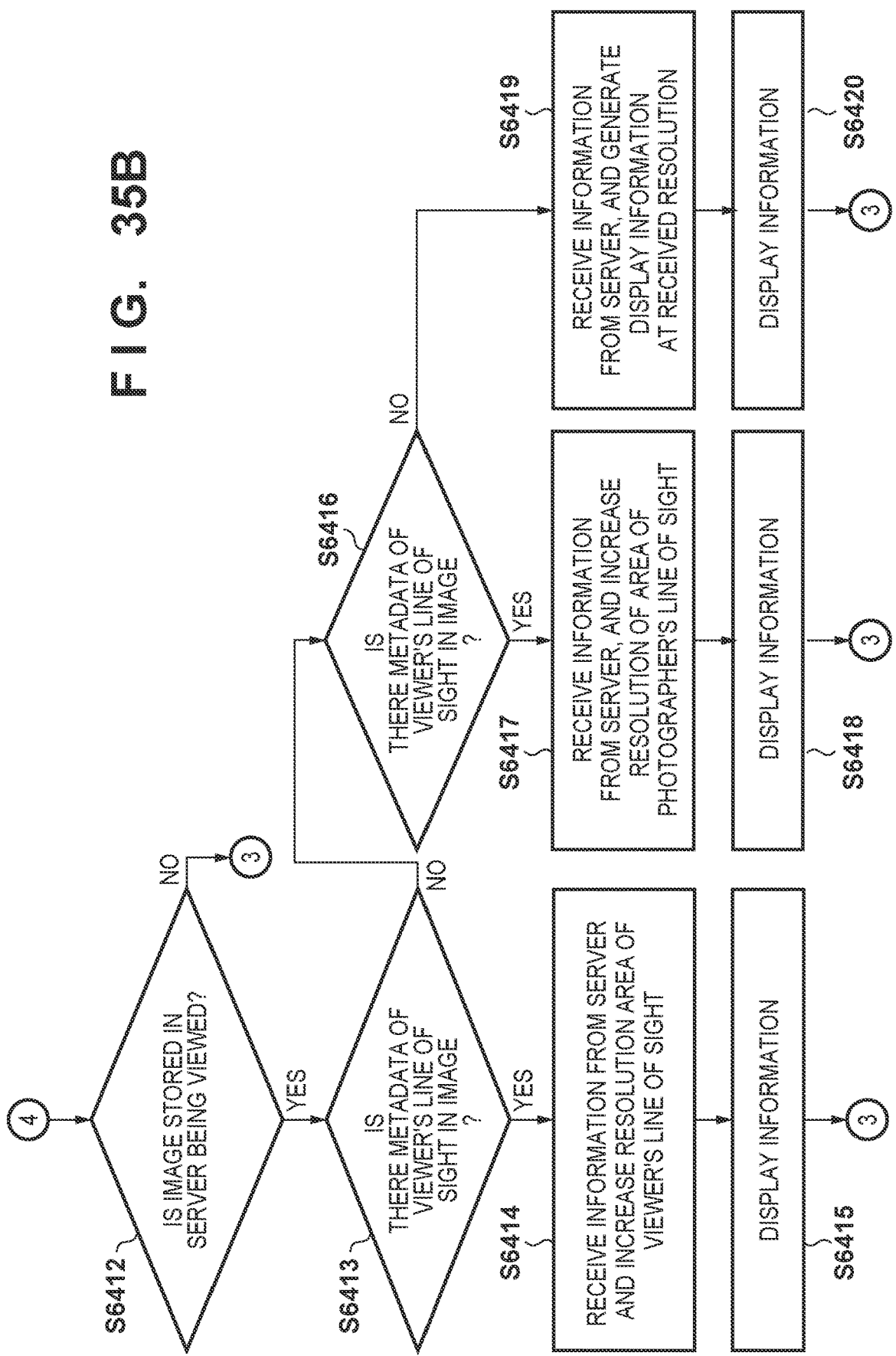
FIG. 35B is a diagram illustrating a control flow of the personal computer.

FIGS. 35A and 35B are flowcharts illustrating control of the personal computer that performs the operations described above. In FIGS. 35A and 35B, control that is the same as that illustrated in FIGS. 12A and 12B is given the same step numbers, and will not be described.

In FIG. 35B, in S6412, the CPU 475 of the personal computer 4000 determines whether or not an image stored in the server is being viewed. If an image stored in the server is being viewed, the sequence moves to S6413, and if not, the sequence returns to S402.

In S6413, the CPU 475 determines whether or not metadata of the viewer's line of sight is present in the image. If metadata of the viewer's line of sight is present in the image, the sequence moves to S6414, and if not, the sequence moves to S6416.

In S6414, the CPU 475 receives information from the server, and increases the resolution of the area of the viewer's line of sight.

In S6415, the CPU 475 displays the information described above.

In S6416, the CPU 475 determines whether or not metadata of the photographer's line of sight is present in the image. If metadata of the photographer's line of sight is present in the image, the sequence moves to S6417, and if not, the sequence moves to S6419.

In S6417, the CPU 475 receives information from the server, and increases the resolution of the area of the photographer's line of sight.

In S6418, the CPU 475 displays the information described above.

In S6419, the CPU 475 receives the information from the server, and generates display information at the received resolution.

In S6420, the CPU 475 displays the information described above.

Unlike an HMD, it is assumed that a personal computer will have a plurality of viewers. The characteristics of the people who will view are therefore not detected.

In the present embodiment, the device includes means for capturing a three-dimensional image; means for detecting a viewer's line of sight when viewing the three-dimensional image; means for detecting the viewer's characteristics when viewing the three-dimensional image; means for storing the viewer's line of sight as metadata together with the image when viewing the three-dimensional image; and means for storing the viewer's characteristics as metadata. Then, when displaying the three-dimensional image, the viewer's characteristics are detected, and a part corresponding to the line of sight of a viewer similar to the viewer is displayed at a high resolution based on the metadata.

This makes it possible to increase the resolution of the area in the line of sight information of a viewer having characteristics similar to those of the viewer, and a viewer can therefore view an image in accordance with the line of sight information of a person having characteristics similar to those of that viewer themselves.

Additionally, the part to be displayed at a high resolution is changed based on the viewer's characteristic information. The characteristic information of the viewer is assumed to be the viewer's gender and age.

This makes it possible to increase the resolution in accordance with the person currently viewing the head-mounted display while taking into account information such as the gender, age, and the like of another viewer.

Embodiment 24

In the present embodiment, the device includes means for capturing a three-dimensional image; means for viewing the three-dimensional image; means for detecting information on the photographer's line of sight when capturing the three-dimensional image; means for detecting the viewer's line of sight when viewing the three-dimensional image; means for storing the photographer's line of sight information together with the image when capturing the three-dimensional image; and means for storing the viewer's line of sight of the three-dimensional image together with the image as metadata. The information on the photographer's line of sight when capturing the three-dimensional image is compared with the information on the viewer's line of sight when viewing the three-dimensional image, and the subsequent control is then changed. Here, if the information on the photographer's line of sight when capturing the three-dimensional image is highly similar to the information on the viewer's line of sight when viewing the three-dimensional image, the information on the viewer's line of sight when viewing the three-dimensional image is not detected in the subsequent control.

Figure 36:
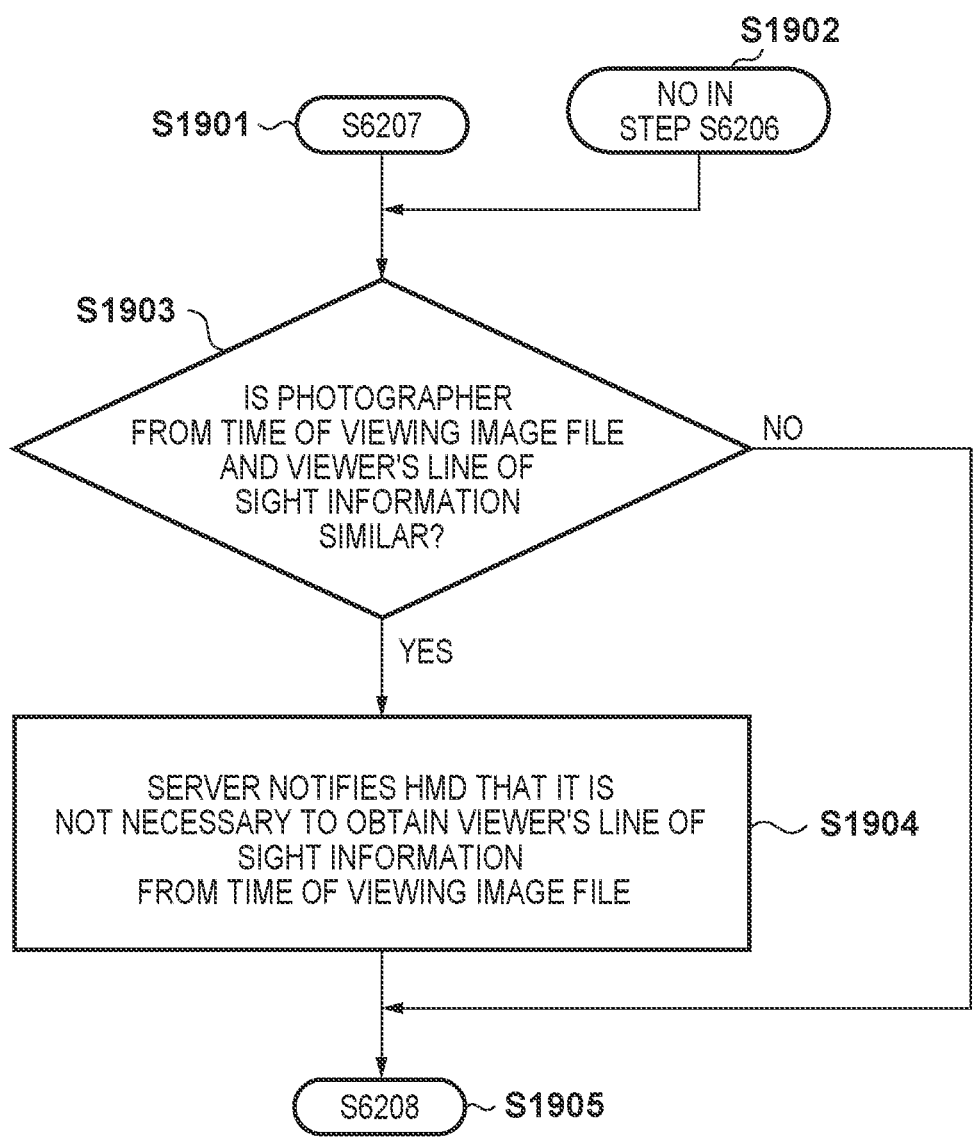
FIG. 36 is a diagram illustrating a control flow of the server.

FIG. 36 is a flowchart illustrating control of the server. FIG. 36 illustrates differences from the flowchart of the control of the server described in Embodiment 22.

In FIG. 36, S1901 represents S6207 of FIG. 31B.

S1902 represents "NO" in S6206.

In S1903, the CPU 591 of the server 5000 determines whether or not the information on the photographer's line of sight and the information on the viewer's line of sight from time of viewing the image file are similar. If the information on the photographer's line of sight and the information on the viewer's line of sight from time of viewing the image file are similar, the sequence moves to S1904, and if not, the sequence moves to S1905.

In S1904, the CPU 591 notifies the HMD that it is not necessary to obtain the information on the viewer's line of sight from time of viewing the image file.

S1905 represents S6208 of FIG. 31C.

In the present embodiment, the device includes means for capturing a three-dimensional image; means for viewing the three-dimensional image; means for detecting information on the photographer's line of sight when capturing the three-dimensional image; means for detecting the viewer's line of sight when viewing the three-dimensional image; means for storing the photographer's line of sight information together with the image when capturing the three-dimensional image; and means for storing the viewer's line of sight of the three-dimensional image together with the image as metadata. The information on the photographer's line of sight when capturing the three-dimensional image is compared with the information on the viewer's line of sight when viewing the three-dimensional image, and the subsequent control is then changed.

This makes it possible to allocate resources to important processing by changing the control when the information on the photographer's line of sight and the information on the viewer's line of sight are similar.

Additionally, if the information on the photographer's line of sight when capturing the three-dimensional image is highly similar to the information on the viewer's line of sight when viewing the three-dimensional image, the information on the viewer's line of sight when viewing the three-dimensional image is not detected in the control performed thereafter.

As a result, when the information on the photographer's line of sight and the information on the viewer's line of sight are similar, control can be performed so as not to detect the information on the viewer's line of sight thereafter, which makes it possible to allocate resources to important processing.

Embodiment 25

In the present embodiment, the device includes means for capturing a three-dimensional image; means for viewing the three-dimensional image; means for detecting information on the photographer's line of sight when capturing the three-dimensional image; means for detecting characteristics of the photographer when capturing the three-dimensional image; means for storing the photographer's characteristics as metadata; means for detecting the viewer's line of sight when viewing the three-dimensional image; means for detecting the viewer's characteristics when viewing the three-dimensional image; means for storing the viewer's characteristics as metadata; means for storing information on the photographer's line of sight together with the image when capturing the three-dimensional image; and means for storing the line of sight of viewer of the three-dimensional image together with the image as metadata. The information on the line of sight of a photographer that has characteristics similar to those of the photographer when capturing the three-dimensional image is compared with the information on the line of sight of a viewer that has characteristics similar to those of the viewer when viewing the three-dimensional image, and the subsequent control is then changed. Here, if the information on the line of sight of a photographer that has characteristics similar to those of the photographer when capturing the three-dimensional image is highly similar to the information on the line of sight of a viewer that has characteristics similar to those of the viewer when viewing the three-dimensional image, the characteristic information and line of sight information of the viewer viewing the three-dimensional image are then detected. If the information on the line of sight is similar regardless of the characteristics of the viewer, control is performed so as not to detect the characteristic information and line of sight information of the viewer viewing the three-dimensional image thereafter.

Figure 37:
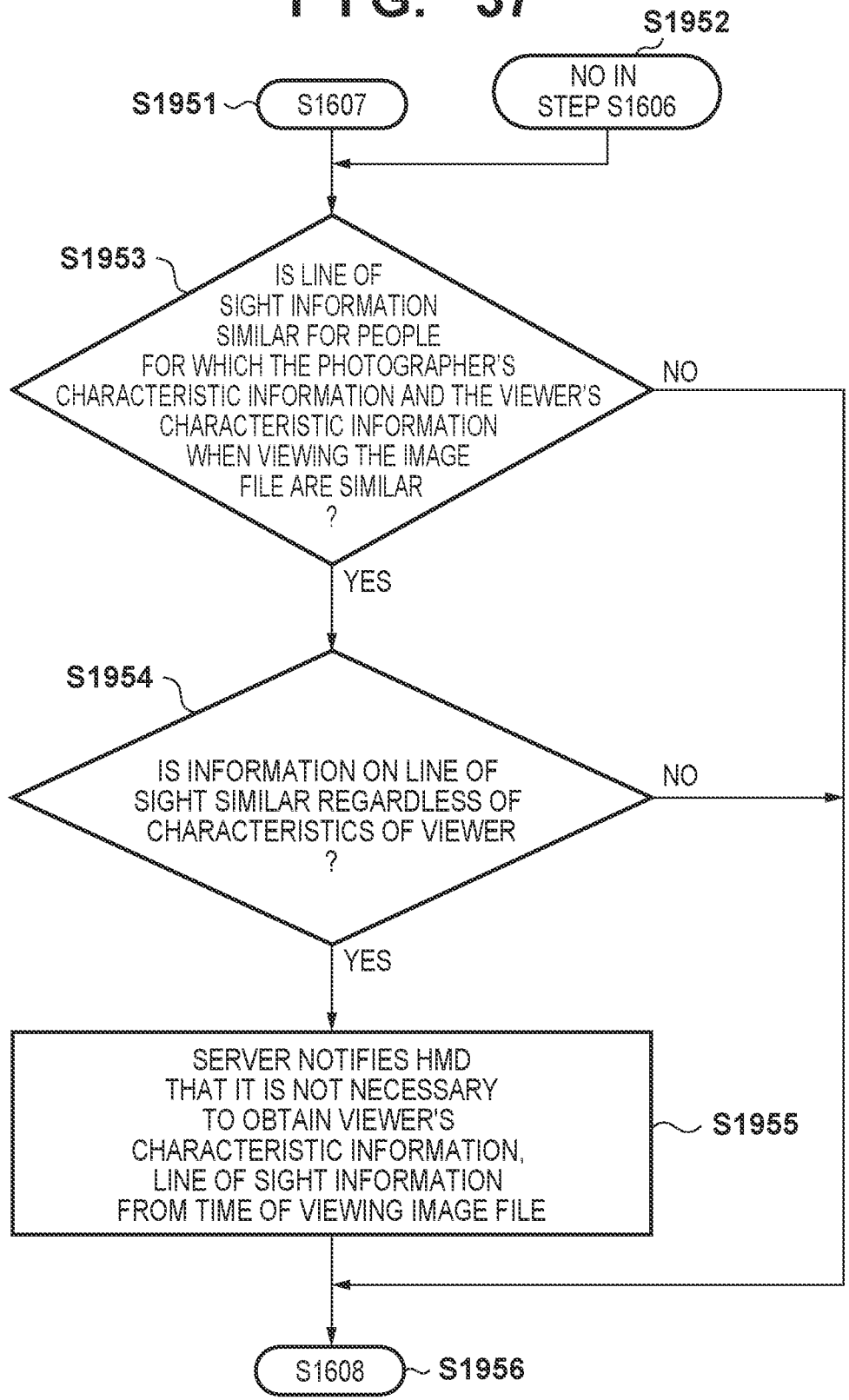
FIG. 37 is a diagram illustrating a control flow of the server.

FIG. 37 is a flowchart illustrating control of the server. FIG. 37 illustrates differences from the flowchart of the control of the server described in Embodiment 23.

In FIG. 37, S1951 represents S1607 of FIG. 34B.

S1952 represents "NO" in S1606 of FIG. 34B.

In S1953, the CPU 591 of the server 5000 determines whether or not the line of sight information is similar for people for which the photographer's characteristic information and the viewer's characteristic information when viewing the image file are similar. If the line of sight information is similar for people for which the photographer's characteristic information and the viewer's characteristic information when viewing the image file are similar, the sequence moves to S1954, and if not, the sequence moves to S1955.

In S1954, the CPU 591 determines whether or not the line of sight information is similar regardless of the viewer's characteristics. If the line of sight information is similar regardless of the viewer's characteristics, the sequence moves to S1955, and if not, the sequence moves to S1956.

In S1955, the CPU 591 notifies the HMD that it is not necessary to obtain the characteristic information and line of sight information of the viewer when viewing the image file.

S1956 represents S1608.

In the present embodiment, the device includes means for capturing a three-dimensional image; means for viewing the three-dimensional image; means for detecting information on the photographer's line of sight when capturing the three-dimensional image; means for detecting characteristics of the photographer when capturing the three-dimensional image; means for storing the photographer's characteristics as metadata; means for detecting the viewer's line of sight when viewing the three-dimensional image; means for detecting the viewer's characteristics when viewing the three-dimensional image; means for storing the viewer's characteristics as metadata; means for storing information on the photographer's line of sight together with the image when capturing the three-dimensional image; and means for storing the line of sight of viewer of the three-dimensional image together with the image as metadata. The information on the line of sight of a photographer that has characteristics similar to those of the photographer when capturing the three-dimensional image is compared with the information on the line of sight of a viewer that has characteristics similar to those of the viewer when viewing the three-dimensional image, and the subsequent control is then changed.

This makes it possible to allocate resources to important processing.

Additionally, if the information on the line of sight of a photographer that has characteristics similar to those of the photographer when capturing the three-dimensional image is highly similar to the information on the line of sight of a viewer that has characteristics similar to those of the viewer when viewing the three-dimensional image, the characteristic information and line of sight information of the viewer viewing the three-dimensional image are then detected. If the information on the line of sight is similar regardless of the characteristics of the viewer, control is performed so as not to detect the characteristic information and line of sight information of the viewer viewing the three-dimensional image thereafter.

This makes it possible to allocate resources to important processing.

Embodiment 26

In the present embodiment, the device includes means for capturing a three-dimensional image; means for detecting the photographer's line of sight when capturing the three-dimensional image; means for storing the photographer's line of sight together with the image as metadata, or means for detecting the intentions of an image creator, or means for detecting the viewer's line of sight; means for storing the viewer's line of sight together with the image as metadata, or means for inputting an object that a user wishes to view; and means for registering the object which the user wishes to view, input by the user, and enabling the selection of the object the next time. Then, when displaying the three-dimensional image, that area is displayed at a high resolution based on the metadata.

The device also includes means for inputting a part the viewer wishes to view; means for designating the intentions of the creator; and means for designating the part corresponding to the line of sight of the viewer, who is part of the general public. An order of priority is established when a plurality of selection means conflict. The order of priority is changed according to the content displayed. The selection method is then switched according to the situation even while the image is being displayed.

The control performed determines the part to be displayed at a high resolution from the photographer's line of sight, the image creator's intentions, the viewer's line of sight, and the selection of an object that the user (viewer) wishes to view. This is a combination of the embodiments described thus far.

Figure 38A:
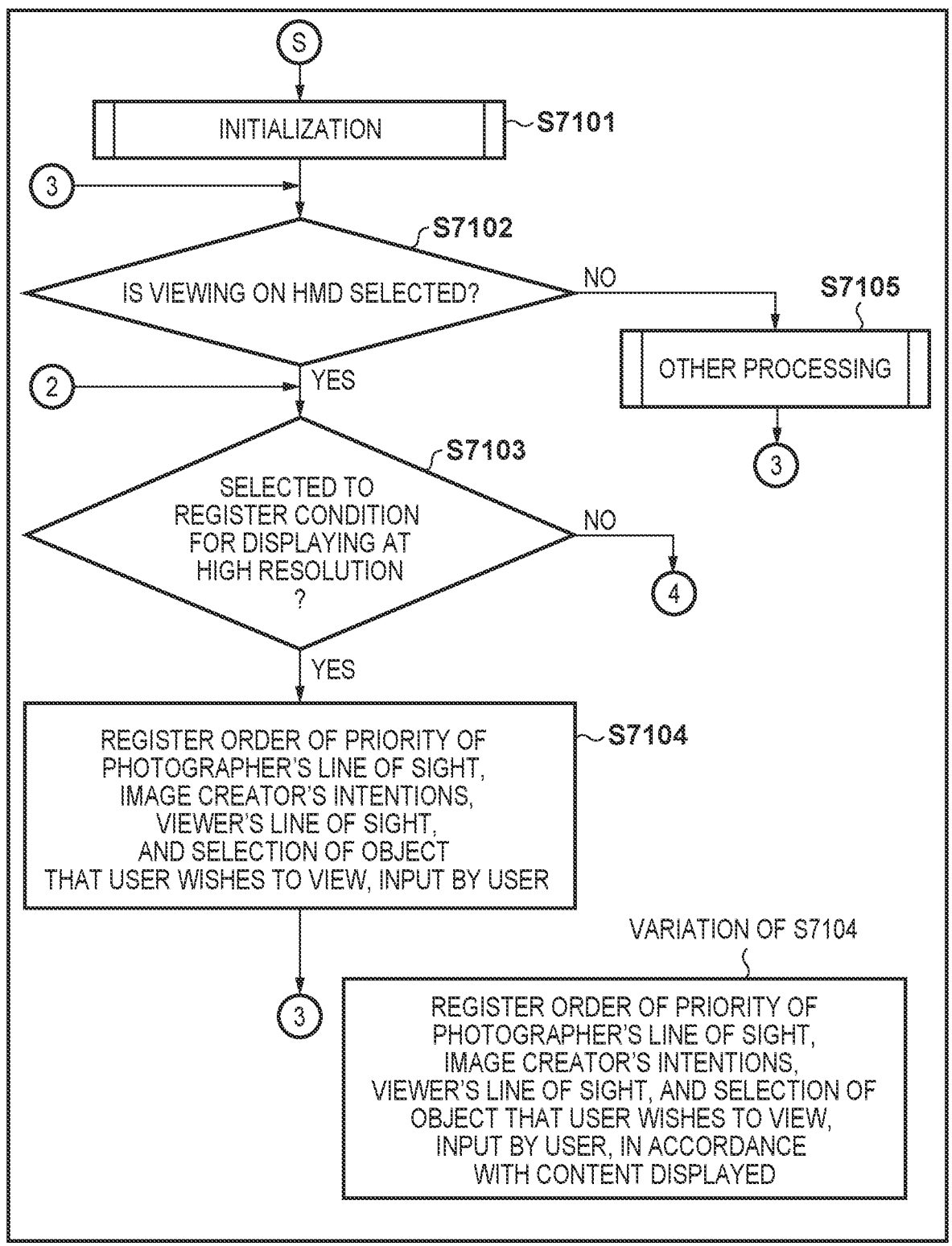
FIG. 38A is a diagram illustrating a control flow of the HID.
Figure 38C:
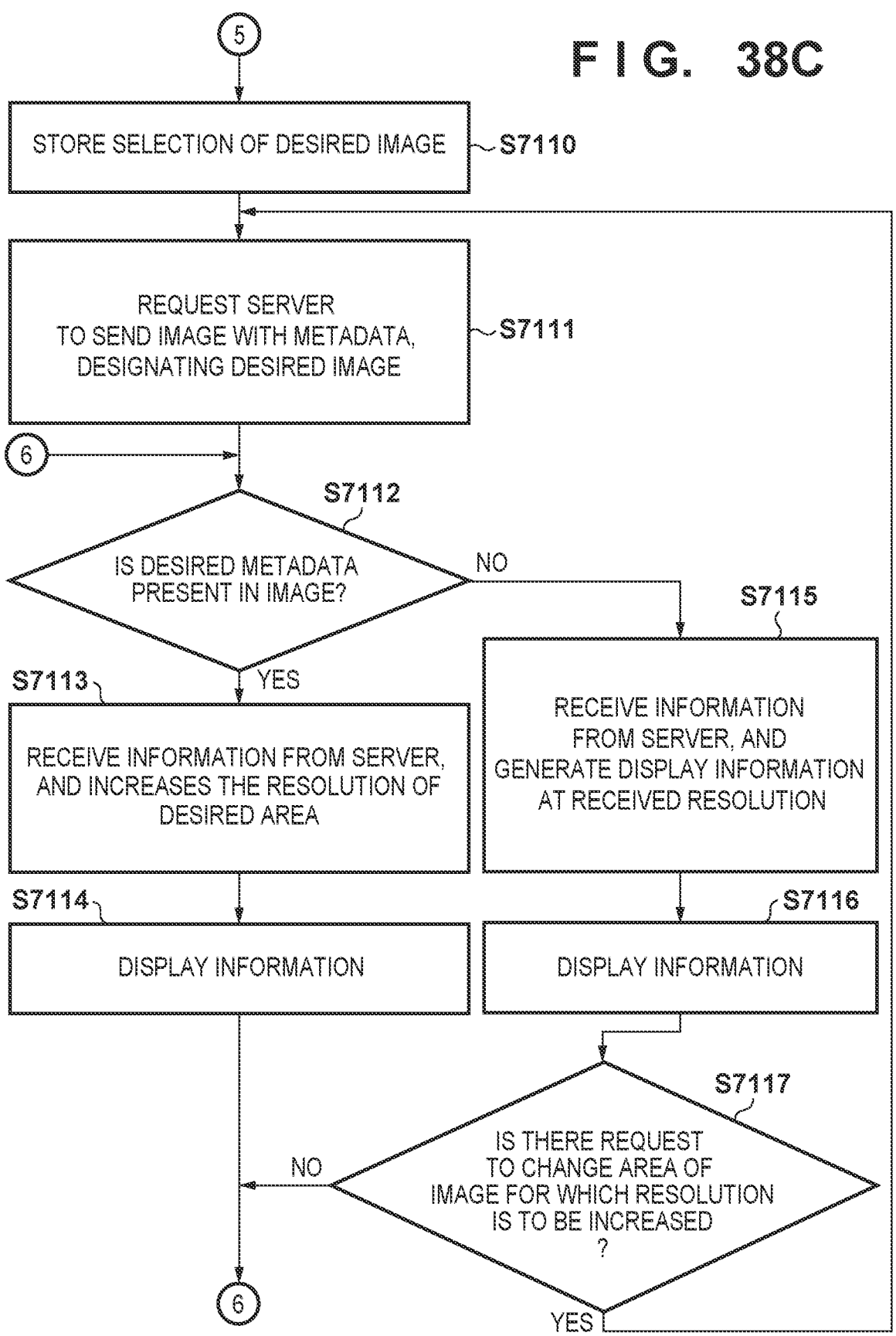
FIG. 38C is a diagram illustrating a control flow of the HMD.

FIGS. 38A to 38C are flowcharts illustrating control of the HMD that performs the operations described above.

In FIG. 38A, S7101 represents initialization.

In S7102, the CPU 355 of the HMD 3000 determines whether or not viewing in the HMD has been selected. If viewing in the HMD has been selected, the sequence moves to S7103, and if not, the sequence moves to S7105, where other processing is executed.

In S7103, the CPU 355 of the HMD 3000 determines whether or not registration of a condition for displaying in high resolution has been selected. If registration of a condition for displaying in high resolution has been selected, the sequence moves to S7104, and if not, the sequence moves to S7106.

In S7104, the CPU 355 registers the order of priority of the photographer's line of sight, the image creator's intentions, the viewer's line of sight, and the selection of the object that the user wishes to view, input by the user.

As a variation on the control in S7104 described above, the control may be performed so as to register the order of priority of the photographer's line of sight, the image creator's intentions, the viewer's line of sight, and the selection of the object that the user wishes to view, input by the user, in accordance with the content displayed.

Moving to FIG. 38B, in S7106, the CPU 355 determines whether or not an image stored in the server is being viewed. If an image stored in the server is being viewed, the sequence moves to S7107, and if not, the sequence moves to S7102.

In S7107, the CPU 355 determines whether or not the order of priority of the photographer's line of sight, the image creator's intentions, the viewer's line of sight, and the selection of the object that the user wishes to view, input by the user, is registered. If the order of priority of the photographer's line of sight, the image creator's intentions, the viewer's line of sight, and the selection of the object that the user wishes to view, input by the user, is registered, the procedure moves to S7108, and if not, the procedure moves to S7109.

In S7108, the CPU 355 determines a manner of display based on the registered information on the order of priority of the photographer's line of sight, the image creator's intentions, the viewer's line of sight, and the selection of the object that the user wishes to view, input by the user, and displays the image.

In S7109, the CPU 355 displays the images in the order of the object that the user wishes to view, input by the user, the image creator's intentions, the photographer's line of sight, and the viewer's line of sight.

Moving to FIG. 38C, in S7110, the CPU 355 stores the selection of the desired image.

In S7111, the CPU 355 requests the server to send an image with metadata, designating the desired image.

In S7112, the CPU 355 determines whether or not desired metadata is present in the image. If the desired metadata is present in the image, the sequence moves to S7113, and if not, the sequence moves to S7115.

In S7113, the CPU 355 receives information from the server, and increases the resolution of the desired area.

In S7114, the CPU 355 displays the information described above.

In S7115, the CPU 355 receives the information from the server, and generates display information at the received resolution.

In S7116, the CPU 355 displays the information described above.

In S7117, the CPU 355 determines whether or not there is a request to change the area of the image for which the resolution is to be increased. If there is a request to change the area of the image for which the resolution is to be increased, the sequence moves to S7114, and if not, the sequence moves to S7112.

In the present embodiment, the device also includes means for inputting an object the viewer wishes to view; means for designating the creator's intentions; and means for designating a part corresponding to the line of sight of the viewer, who is part of the general public. An order of priority is established when a plurality of selection means conflict. Additionally, the order of priority is changed according to the content displayed.

Additionally, in the present embodiment, the device includes means for capturing a three-dimensional image; means for detecting the photographer's line of sight when capturing the three-dimensional image; means for storing the photographer's line of sight together with the image as metadata, or means for detecting the intentions of an image creator, or means for detecting the viewer's line of sight; means for storing the viewer's line of sight together with the image as metadata, or means for inputting an object that a user wishes to view; and means for registering the object which the user wishes to view, input by the user, and enabling the selection of the object the next time. Then, when displaying the three-dimensional image, that area is displayed at a high resolution based on the metadata.

Through this, the part to be displayed at a high resolution can be selected from the photographer's line of sight, the image creator's intentions, the viewer's line of sight, and the selection of an object that the user (viewer) wishes to view. This makes it possible to make the selection according to the preferences of the viewer, and selections according to the person who is viewing can be made in a use environment in which the head-mounted display is used by a plurality of people. Additionally, the selection method is switched according to the situation even while the image is being displayed.

In addition, when the device of the present embodiment also includes means for inputting a part the viewer wishes to view, means for designating the creator's intentions, and means for designating a part corresponding to the line of sight of the viewer, who is part of the general public, control can be performed which enables the selection of the condition under which the resolution is to be increased. Furthermore, the area for which the resolution is to be increased can be changed even while the image is being viewed.

Embodiment 27

When delivering an image, the head-mounted display implements the selection of an image by a viewer and displays that image. The head-mounted display sends the viewer's selection to a server or a terminal. The server or the terminal sends an image corresponding to the viewer's selection, and the image is then displayed in the head-mounted display. Here, at the time of delivery, information in which the resolution is increased is included as metadata. There are two points to this delivery method. One is that in this method, an image in which the resolution of a part of interest is increased is sent, and attributes of the image sent at a high resolution are communicated as the metadata. The other is that in this method, the server or the terminal sends the image at a low resolution, an area for which the resolution is to be increased is designated in the metadata, and the designated area is converted to a high resolution and displayed in the head-mounted display.

In addition, the server or the terminal may deliver the image, or send the part that the content creator or the photographer wishes to be viewed at a high resolution, without receiving a request from a viewer.

In the present embodiment, the device includes means for delivering a three-dimensional image, and means for receiving and displaying the delivered three-dimensional image; and the part for which the resolution is increased is recognized on the delivery side according to the input of an object to be viewed, the creator's intentions, and the viewer's line of sight, and based on this information, an image in which the resolution of a specific part is increased is delivered. Here, in delivery (broadcast) for the general public, determines an area in which the resolution is to be increased is determined based on the creator's intentions or the line of sight of a general viewer, and that area is then converted to a high resolution and delivered. Meanwhile, in delivery where the characteristic information of a large segment of viewers is known, an area for which the resolution is to be increased is determined based on the object that the viewer wishes to view, and the area is converted to a high resolution and delivered. Furthermore, in delivery where the characteristic information of a large segment of viewers is known, an area for which the resolution is to be increased is determined on the basis of the object to be viewed, which is based on the gender and age characteristic information, and the area is converted to a high resolution and delivered.

When the object that the viewer wishes to view is known, an area for which the resolution is to be increased is determined based on information that the viewer wishes to view, and the area is converted to a high resolution and delivered. Metadata including the attribute information of the image converted to a high resolution is then sent.

FIGS. 39A to 39F are flowcharts illustrating control of the server that performs the operations described above. Parts different from the control illustrated in FIGS. 10A to 10D will be described in detail.

Figure 39A:
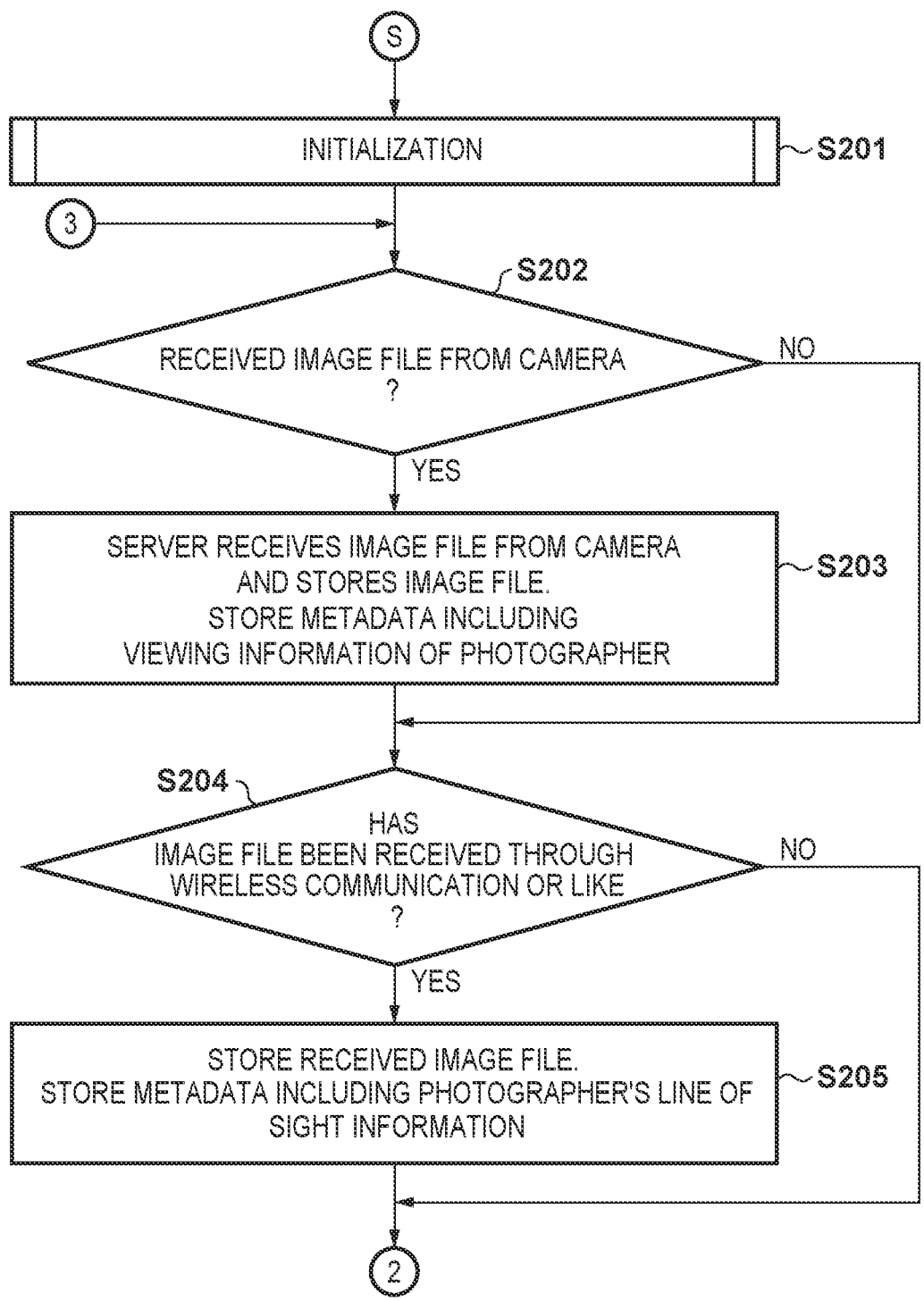
FIG. 39A is a diagram illustrating a control flow of the server.
Figure 39B:
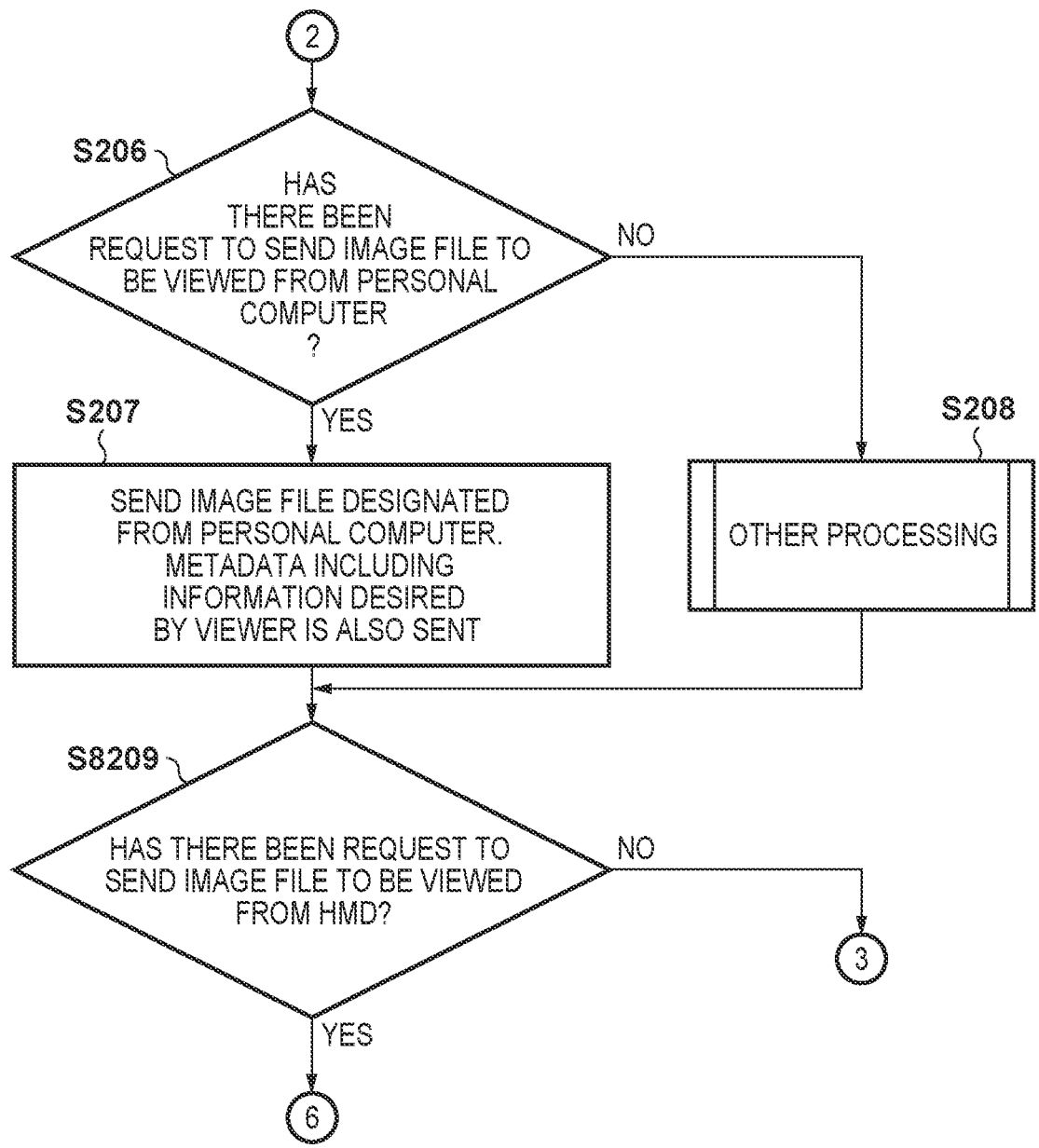
FIG. 39B is a diagram illustrating a control flow of the server.
Figure 39C:
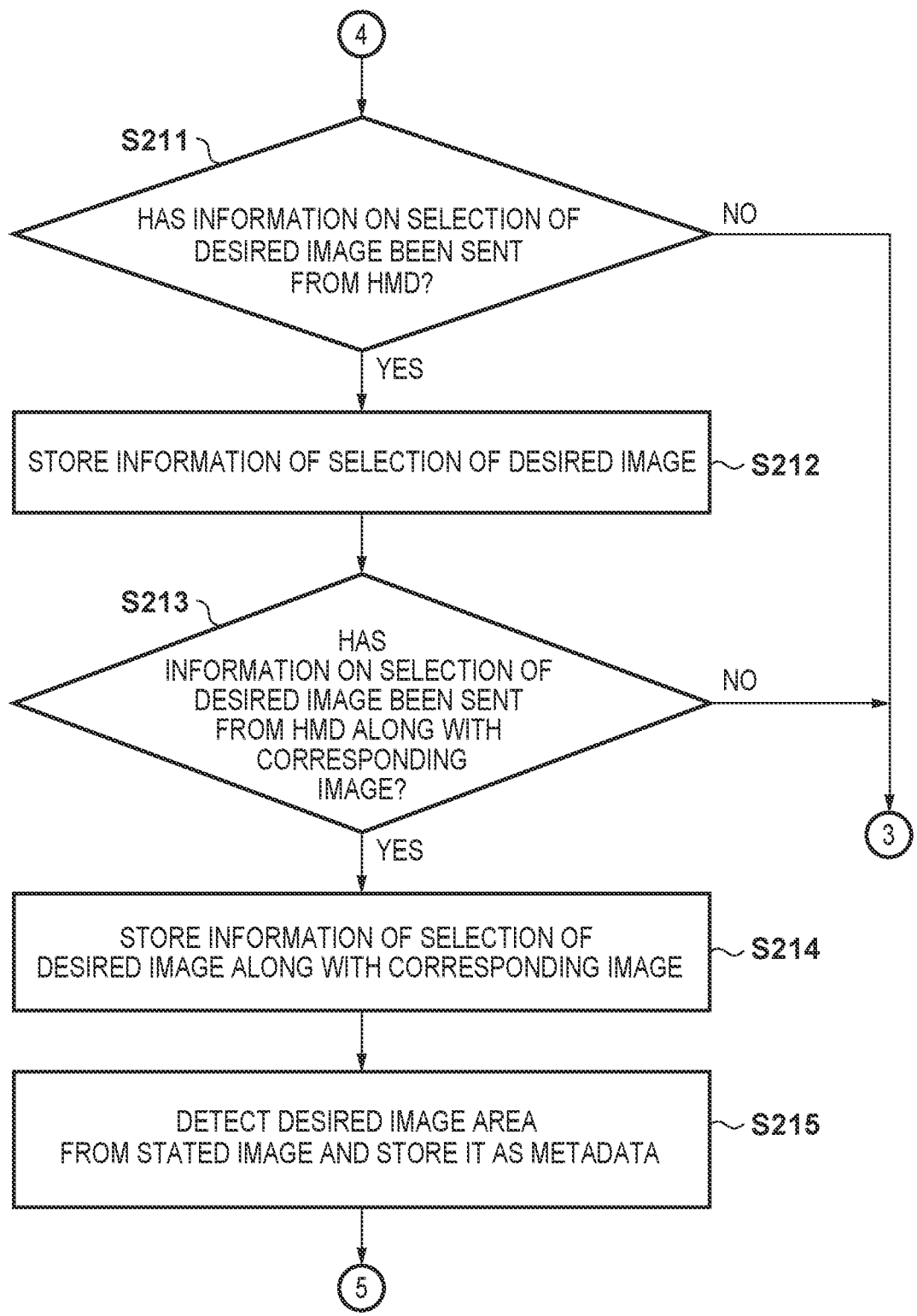
FIG. 39C is a diagram illustrating a control flow of the server.
Figure 39D:
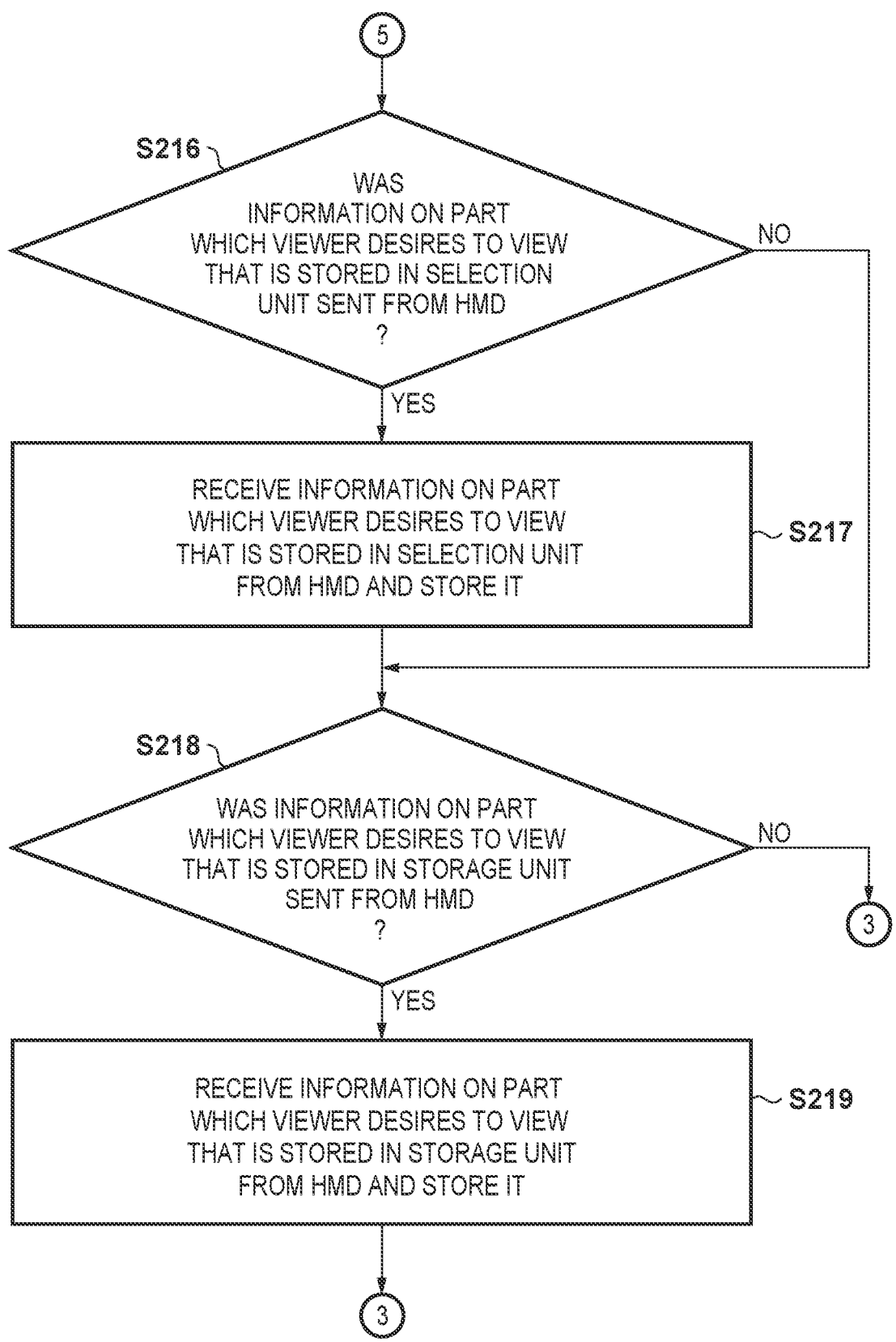
FIG. 39D is a diagram illustrating a control flow of the server.

In FIG. 39B, in S8209, the CPU 591 of the server 5000 determines whether or not there has been a request to send an image file to be viewed from the HMD. If there has been a request to send an image file to be viewed from the HMD, the sequence moves to S8220, and if not, the sequence moves to S202.

Figure 39E:
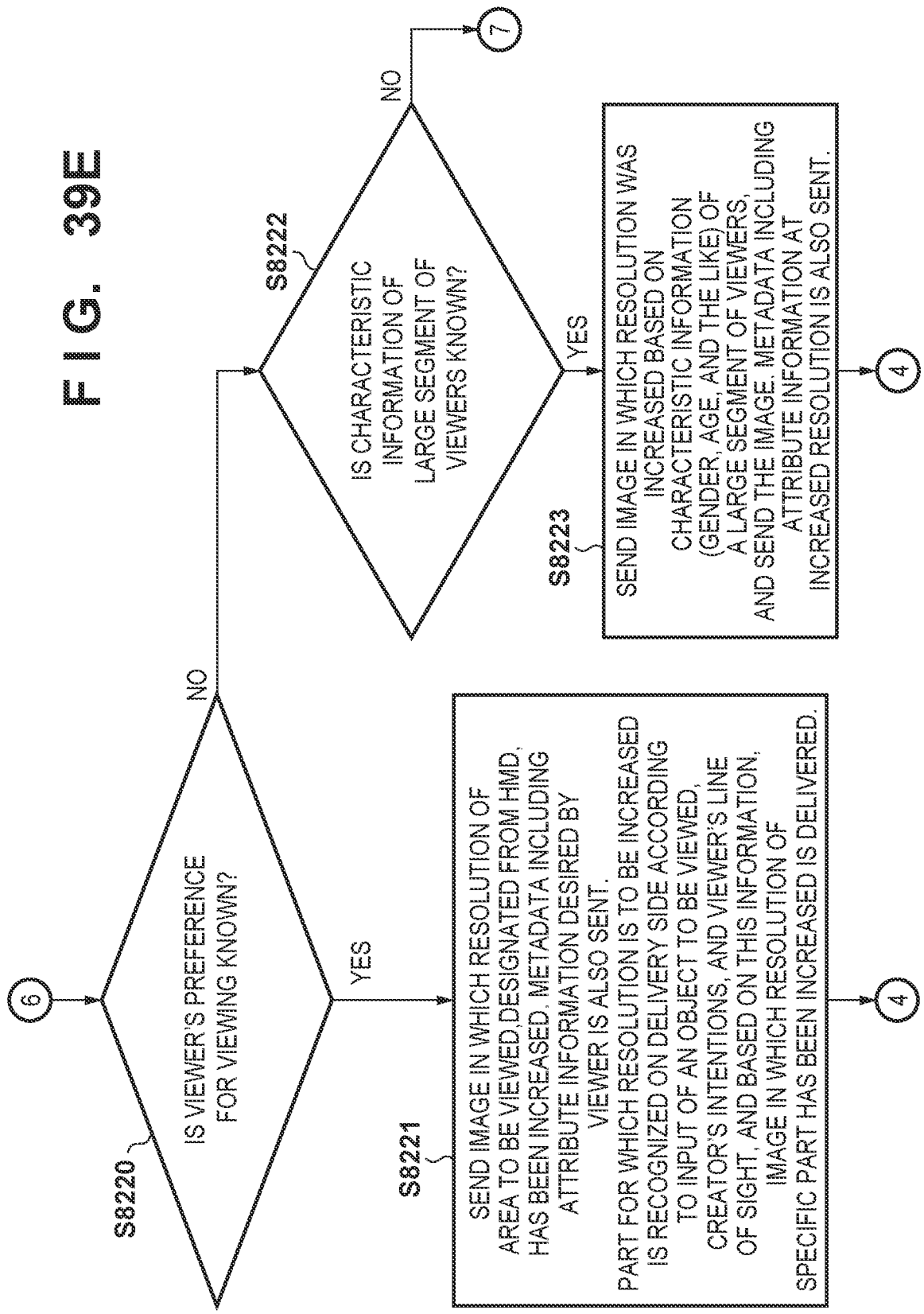
FIG. 39E is a diagram illustrating a control flow of the server.

In FIG. 39E, in S8220, the CPU 591 determines whether or not the viewer's preference for viewing is known. If the viewer's preference for viewing is known, the sequence moves to S8221, and if not, the sequence moves to S8222.

In S8221, the CPU 591 sends the image in which the resolution of the area to be viewed, designated from the HMD, has been increased. Metadata including attribute information desired by the viewer is also sent. The part for which the resolution is to be increased is recognized on the delivery side according to the input of an object to be viewed, the creator's intentions, and the viewer's line of sight, and based on this information, an image in which the resolution of a specific part is increased is delivered.

In S8222, the CPU 591 determines whether or not the characteristic information of a large segment of viewers is known. If the characteristic information of a large segment of viewers is known, the sequence moves to S8223, and if not, the sequence moves to S8224.

In S8223, the CPU 591 sends the image in which the resolution is increased based on the characteristic information (gender, age, and the like) of a large segment of viewers. Metadata including attribute information at the increased resolution is also sent.

Figure 39F:
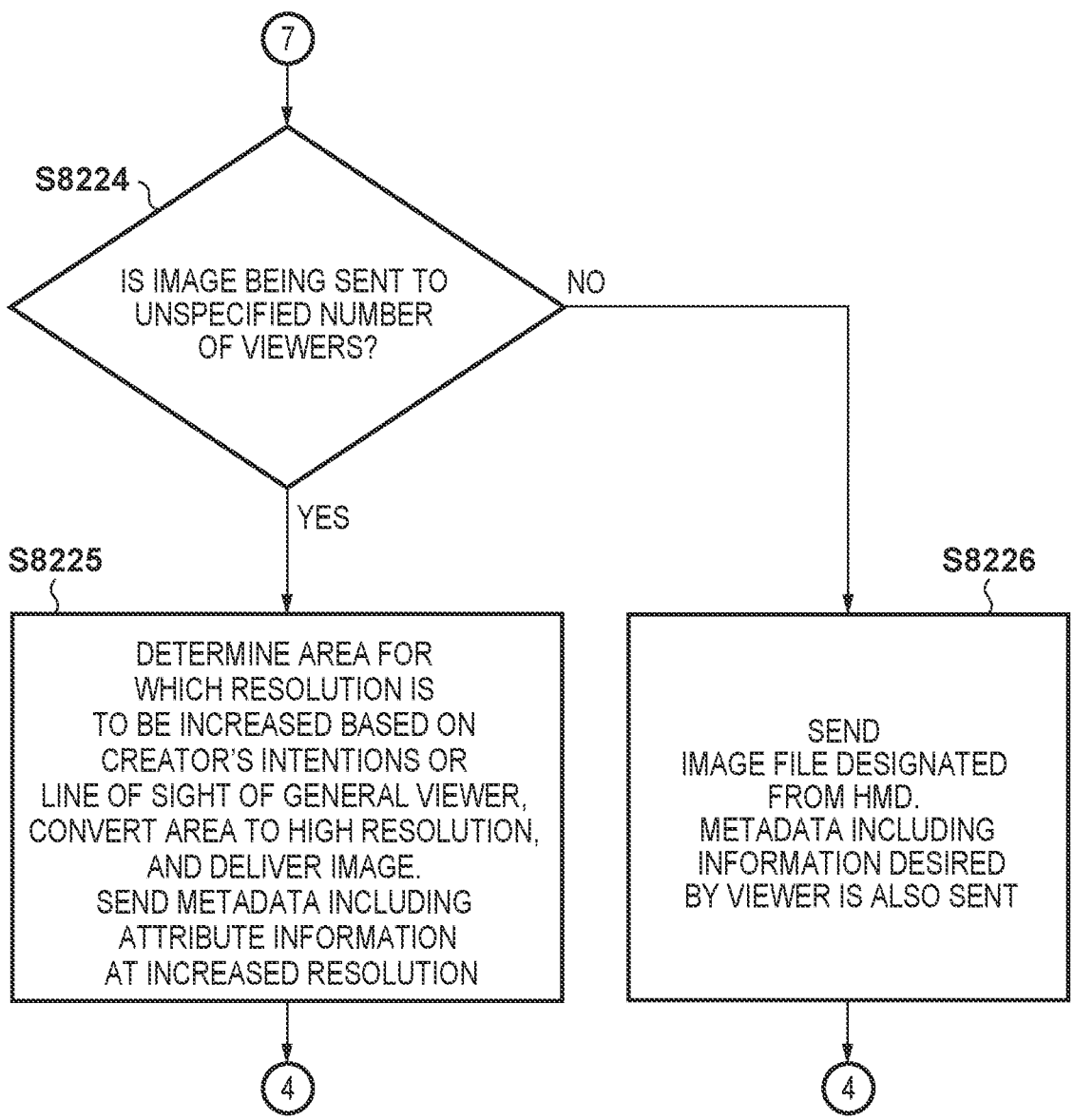
FIG. 39F is a diagram illustrating a control flow of the server.
Figure 40C:
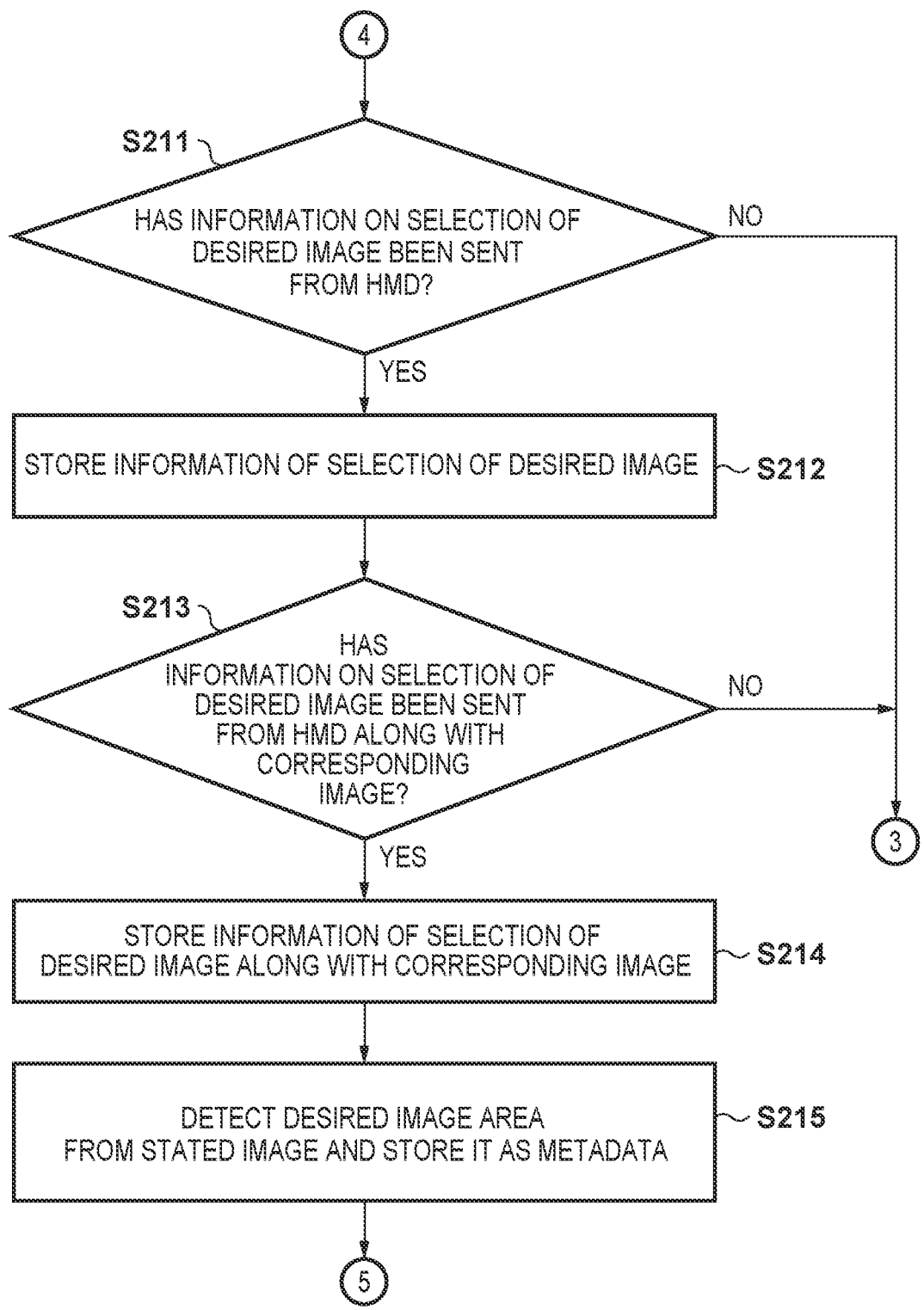
FIG. 40C is a diagram illustrating a control flow of the server.
Figure 40D:
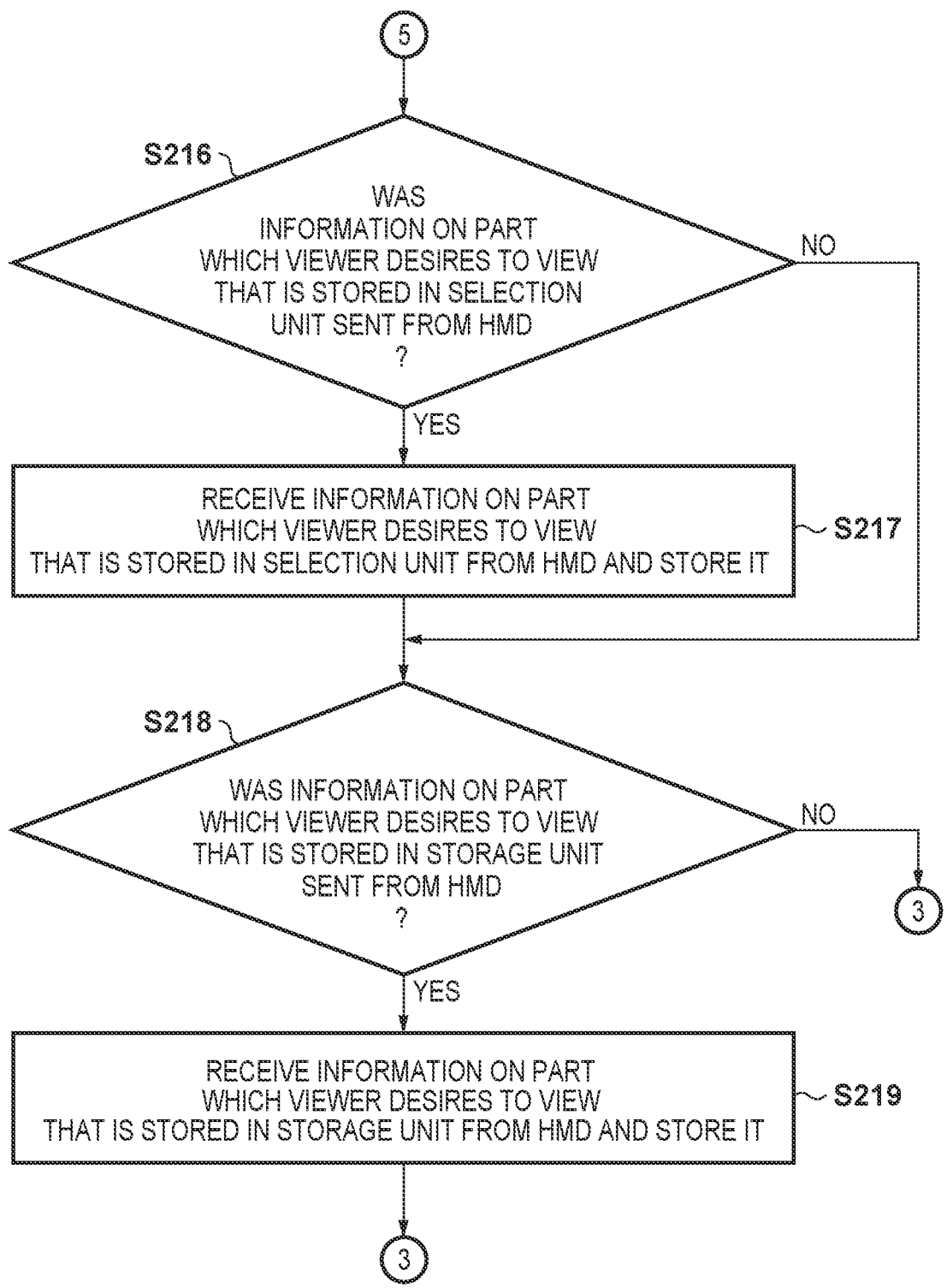
FIG. 40D is a diagram illustrating a control flow of the server.
Figure 40F:
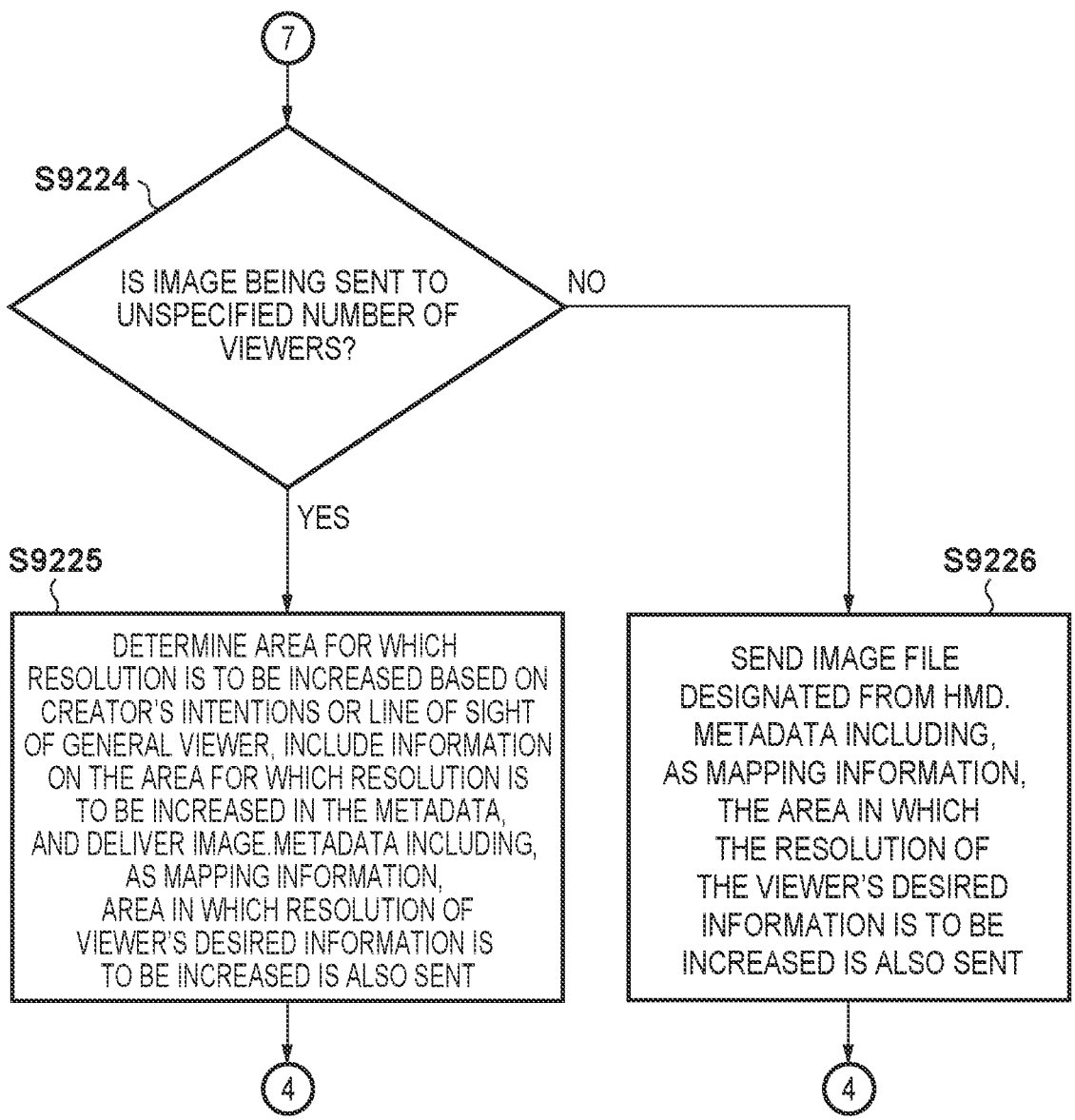
FIG. 40F is a diagram illustrating a control flow of the server.

In FIG. 39F, in S8224, the CPU 591 determines whether or not the image is being sent to an unspecified number of viewers. If the image is being sent to an unspecified number of viewers, the sequence moves to S8225, and if not, the sequence moves to S8226.

In S8225, the CPU 591 determines an area for which the resolution is to be increased based on the creator's intentions or the line of sight of a general viewer, and converts the area to a high resolution, and delivers the image. Metadata including attribute information at the increased resolution is also sent.

In S8226, the CPU 591 sends the image file designated from the HMD. Metadata including the viewer's desired information is also sent.

In the present embodiment, the part for which the resolution is to be increased can be recognized on the delivery side according to the input of an object to be viewed, the creator's intentions, and the viewer's line of sight, and based on this information, an image in which the resolution of a specific part is increased can be delivered.

Additionally, in delivery (broadcast) for the general public, determines an area in which the resolution is to be increased is determined based on the creator's intentions or the line of sight of a general viewer, and that area is then converted to a high resolution and delivered.

Meanwhile, in delivery where the characteristic information of a large segment of viewers is known, an area for which the resolution is to be increased is determined based on the object that the viewer wishes to view, and the area is converted to a high resolution and delivered.

Additionally, in delivery where the characteristic information of a large segment of viewers is known, an area for which the resolution is to be increased is determined on the basis of the object to be viewed, which is based the characteristic information such as gender and age, and the area is converted to a high resolution and delivered.

In addition, in delivery where information on the viewer is known, if the object which the viewer wishes to view is known, the area for which the resolution is to be increased is determined based on the information which the viewer wishes to view, the area is converted to a high resolution, and the image is delivered. Metadata including the attribute information of the image converted to a high resolution is also sent.

Through this, the server or the terminal can deliver the image, or send the part that the content creator or the photographer wishes to be viewed at a high resolution, without receiving a request from a viewer. Moreover, the area for which the resolution is to be increased can be changed and delivered in accordance with the destination.

Embodiment 28

The present embodiment provides a deliver system in which information on an area for which the resolution is to be increased is included in the metadata and sent as an image, and the image is sent at a low resolution.

FIGS. 40A to 40F are flowcharts illustrating control of the server that performs the operations described above. Parts different from the control illustrated in FIGS. 10A to 10D will be described in detail.

In FIG. 40B, in S9209, the CPU 591 of the server 5000 determines whether or not there has been a request to send an image file to be viewed from the HMD. If there has been a request to send an image file to be viewed from the HMD, the sequence moves to S9220, and if not, the sequence moves to S202.

In FIG. 40E, in S9220, the CPU 591 determines whether or not the viewer's preference for viewing is known. If the viewer's preference for viewing is known, the sequence moves to S9221, and if not, the sequence moves to S9222.

In S9221, the CPU 591 includes area information on the area to be viewed, designated from the HMD, in the metadata, and sends the image. Metadata including mapping information desired by the viewer is also sent. The part for which the resolution is to be increased is recognized on the delivery side according to the input of an object to be viewed, the creator's intentions, and the viewer's line of sight, and based on this information, metadata in which a specific part has been mapped is delivered.

In S9222, the CPU 591 determines whether or not the characteristic information of a large segment of viewers is known. If the characteristic information of a large segment of viewers is known, the sequence moves to S9223, and if not, the sequence moves to S9224.

In S9223, the CPU 591 includes the information on the area for which the resolution is to be increased in the metadata, based on the characteristic information (gender, age, and the like) of a large segment of viewers, and sends the image. Metadata including mapping information on the area for which the resolution is to be increased is also sent.

In FIG. 39F, in S9224, the CPU 591 determines whether or not the image is being sent to an unspecified number of viewers. If the image is being sent to an unspecified number of viewers, the sequence moves to S9225, and if not, the sequence moves to S9226.

In S9225, the CPU 591 determines an area for which the resolution is to be increased based on the creator's intentions or the line of sight of a general viewer, includes information on the area for which the resolution is to be increased in the metadata, and delivers the image. Metadata including mapping information on the area for which the resolution is to be increased is also sent.

In S9226, the CPU 591 sends the image file designated from the HMD. Metadata including, as mapping information, the area in which the resolution of the viewer's desired information is to be increased is also sent.

According to the present embodiment, information on an area for which the resolution is to be increased can be included in the metadata and sent as an image, and the image can be sent at a low resolution.

This makes it possible to send the image at 30 ppd and then, on the receiving side, convert the image to the equivalent of 60 ppd and display the image.

Embodiment 29

The foregoing embodiments have mainly described receiving an image from a server and displaying the image in a head-mounted display. However, rather than being limited to a server, an image from a terminal may be received and displayed in the head-mounted display.

According to the present embodiment, the delivery side need not be limited to a server. This makes it possible to deliver images from a terminal to the head-mounted display.

According to the present invention, images can be displayed at at least a predetermined framerate even with limited processor performance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image display system comprising:
a head-mounted display configured to display a three-dimensional image, and
a server configured to send a low resolution three dimensional image to the head-mounted display, the server sending the image to the head-mounted display having added, to the low resolution image as metadata, information on a part of the low resolution image for which resolution is to be increased,
wherein the head-mounted display includes
at least one processor or circuit configured to function as:
a selection unit configured to select a viewing object desired by a viewer from the low resolution three-dimensional image;
a detection unit configured to detect a part to view corresponding to the viewing object selected by the selection unit; and
a resolution increasing unit configured to increase a resolution of the part to view that has been detected based on the metadata,
wherein the head-mounted display displays the three-dimensional image in which the resolution of the part to view has been increased at least a predetermined framerate.

2. The image display system according to claim 1, wherein the selection unit is configured to selecting a plurality of the viewing objects.

3. The image display system according to claim 1, wherein the at least one processor or circuit is configured to further function as a registration unit configured to register the viewing object selected by the selection unit.

4. The image display system according to claim 1, wherein the selection unit selects the viewing object by specifying an individual person from a group of a plurality of people.

5. The image display system according to claim 4, wherein the selection unit specifies the individual person from a response received when a viewer is asked who the viewer is a fan of.

6. The image display system according to claim 1, wherein the selection unit selects the viewing object by specifying the viewing object from a plurality of parts of a body.

7. The image display system according to claim 3, wherein the viewing object desired by many viewers is registered by the registration unit.

8. The image display system according to claim 3, wherein the at least one processor or circuit is configured to further function as:
a unit configured to detect a level of satisfaction of a viewer,
wherein a viewing object which is desired by many viewers and for which the level of satisfaction is high is registered by the registration unit.

9. The image display system according to claim 7, wherein another head-mounted display is notified of the viewing object that has been registered.

10. The image display system according to claim 1, wherein the metadata includes attribute information on the part to view for which the resolution is to be increased.

11. The image display system according to claim 10, wherein the attribute information on the part to view for which the resolution is to be increased is attribute information indicating an individual person specified from a group of a plurality of people.

12. The image display system according to claim 10, wherein the attribute information on the part to view for which the resolution is to be increased is attribute information indicating a part specified from a plurality of parts of a body.

13. The image display system according to claim 1, wherein the server sends a low-resolution image to the head-mounted display, and the metadata includes map information on an area for which the resolution is to be increased in the head-mounted display.

14. The image display system according to claim 1, wherein the server sends, to the head-mounted display, an image in which the resolution of the part to view, for which the resolution is to be increased, has been increased.

15. The image display system according to claim 14, wherein when sending, to the head-mounted display, the image in which the resolution of the part to view, for which the resolution is to be increased, has been increased, the server adds attribute information on the part to view for which the resolution has been increased to the image as metadata.

16. The image display system according to claim 1, wherein an angular pixel density of the part to view in the image for which the resolution is to be increased is 60 ppd, and an angular pixel density of other parts of the image is 30 ppd.

17. The image display system according to claim 1, wherein the selection unit selects the viewing object based on information on a setting of the head-mounted display.

18. The image display system according to claim 1, where the selection unit selects the viewing object based on operation information in a terminal.

19. The image display system according to claim 1, wherein the selection unit selects the viewing object according to a designation made by a creator of the image.

20. The image display system according to claim 1, wherein the selection unit selects the viewing object based on information on a line of sight of a photographer.

21. The image display system according to claim 20, wherein the information on the line of sight of the photographer is information on a line of sight viewed from at least a predetermined length of time.

22. The image display system according to claim 20, wherein the head-mounted display displays the image without increasing the resolution if the image does not include metadata of the information on the line of sight of the photographer.

23. The image display system according to claim 1, wherein when processing the image using processing performed by another device, the head-mounted display selects whether to increase the resolution of the entire image and display the image at a predetermined framerate, or display the image, in which the resolution is increased only for the part to view, at a framerate higher than the predetermined framerate.

24. The image display system according to claim 1, wherein the selection unit selects the viewing object based on information on a line of sight of a viewer.

25. The image display system according to claim 19, wherein the head-mounted display displays the image without increasing the resolution if the image does not include metadata of the information on a line of sight of the viewer.

26. The image display system according to claim 1, wherein the selection unit selects the viewing object based on characteristic information of a viewer.

27. The image display system according to claim 26, wherein the characteristic information is age and gender.

28. The image display system according to claim 1, wherein the selection unit selects the viewing object based on information on a line of sight of a photographer and information on a line of sight of a viewer.

29. The image display system according to claim 1, wherein the selection unit selects the viewing object based on information on a line of sight of a photographer having a characteristic similar to a characteristic of a photographer and information on a line of sight of a viewer having a characteristic similar to a characteristic of a viewer.

* * * * *